(12) United States Patent
Nakamura et al.

(10) Patent No.: US 10,838,497 B2
(45) Date of Patent: Nov. 17, 2020

(54) HAPTIC INFORMATION PRESENTATION SYSTEM

(71) Applicant: MIRAISENS, Inc., Ibaraki (JP)

(72) Inventors: Norio Nakamura, Ibaraki (JP); Natsuo Koda, Ibaraki (JP); Koji Osaki, Ibaraki (JP)

(73) Assignee: MIRAISENS, Inc., Ibaraki (JP)

( * ) Notice: Subject to any disclaimer, the term of this patent is extended or adjusted under 35 U.S.C. 154(b) by 265 days.

(21) Appl. No.: 15/285,022

(22) Filed: Oct. 4, 2016

(65) Prior Publication Data

US 2017/0220111 A1 Aug. 3, 2017

(30) Foreign Application Priority Data

Oct. 5, 2015 (JP) .................. 2015-208387

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01)

(58) Field of Classification Search
CPC combination set(s) only.
See application file for complete search history.

(56) References Cited

U.S. PATENT DOCUMENTS

2011/0050404 A1* 3/2011 Nakamura .............. G06F 3/016
340/407.1

* cited by examiner

*Primary Examiner* — Deeprose Subedi

(57) ABSTRACT

In a haptic information presenting system, a haptic presenting device presents a stimulus by an object and/or to the object, controls the stimulus that is applied to the object in accordance with an operation by an operator, and thereby generates a tactile force, the haptic presenting device presents at least one of oscillation, displacement, and deformation to the object, the haptic presenting device is a sense synthesizing and guiding device that synthesizes sensations of guidance, and the sense synthesizing and guiding device generates at least one of a sensation of pressure, a sensation of a force, and the sensory illusion to the object by a vibration that includes a sweep vibration.

6 Claims, 152 Drawing Sheets

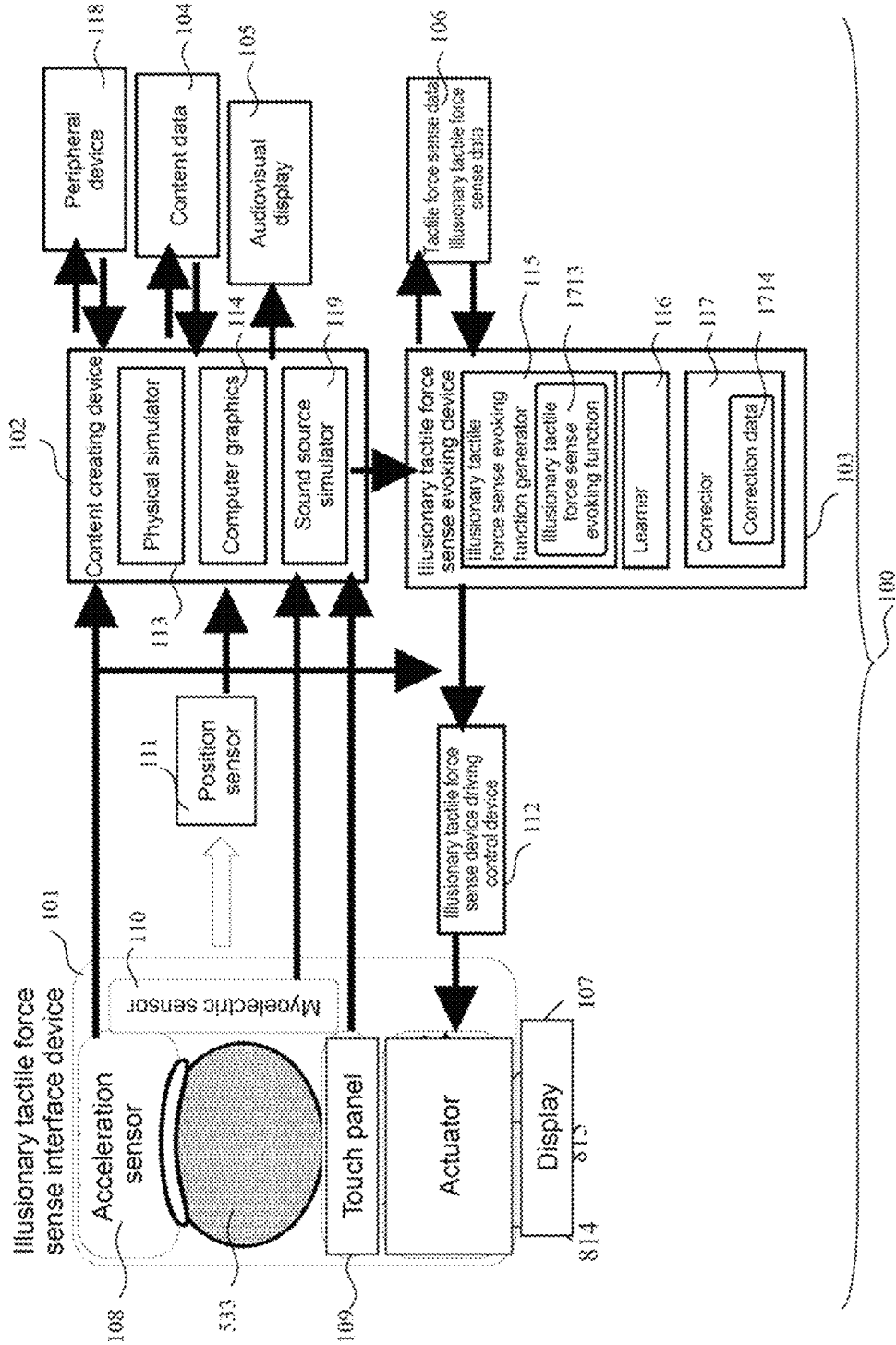
FIG. 1 System configuration of haptic sense display

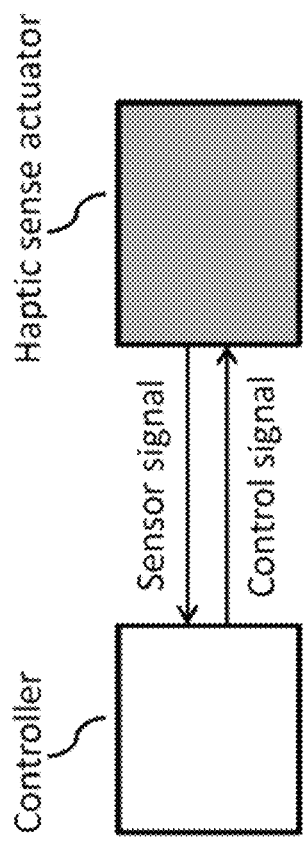
FIG. 2 System configuration of haptic sense display

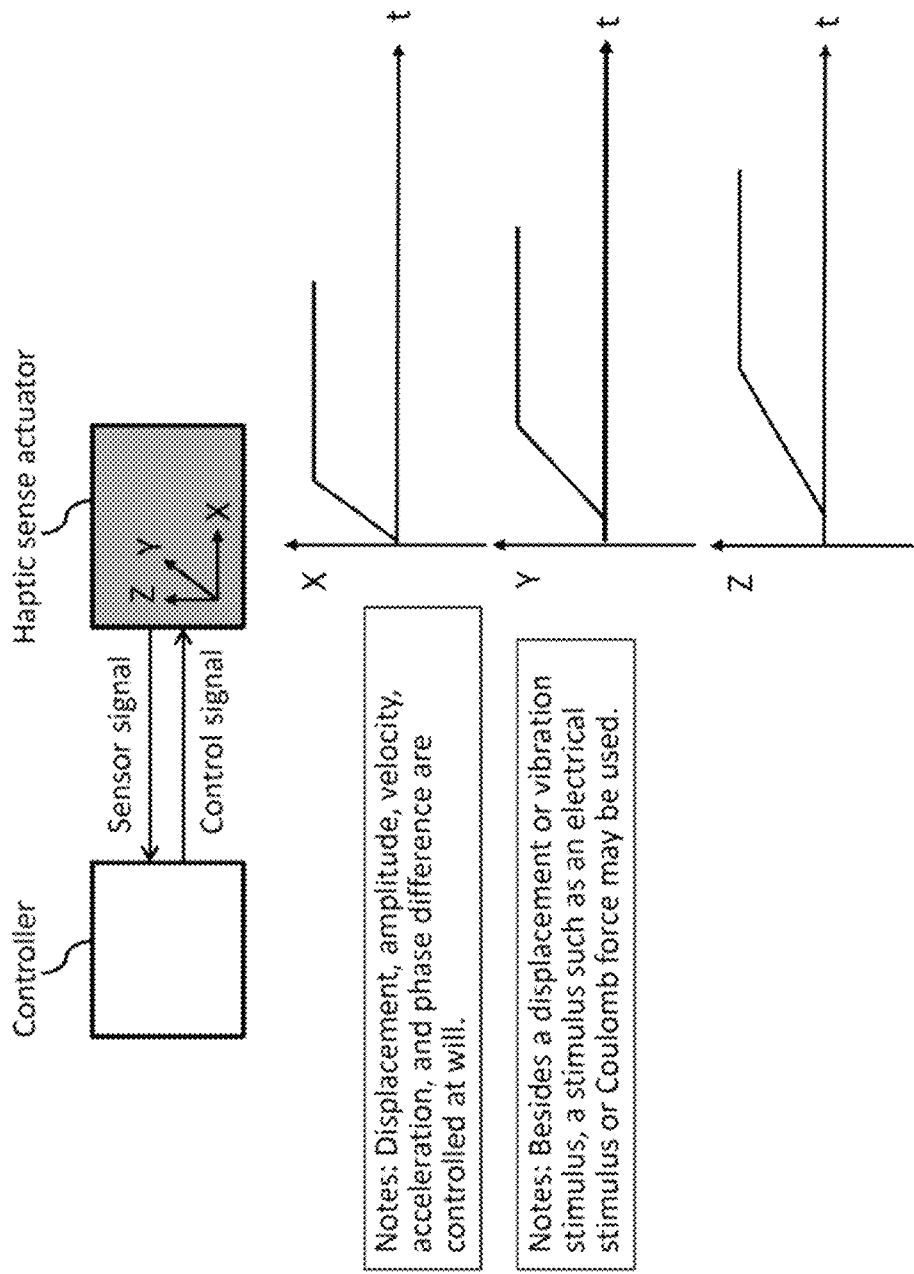
FIG. 3 Displacement control of haptic sense actuator

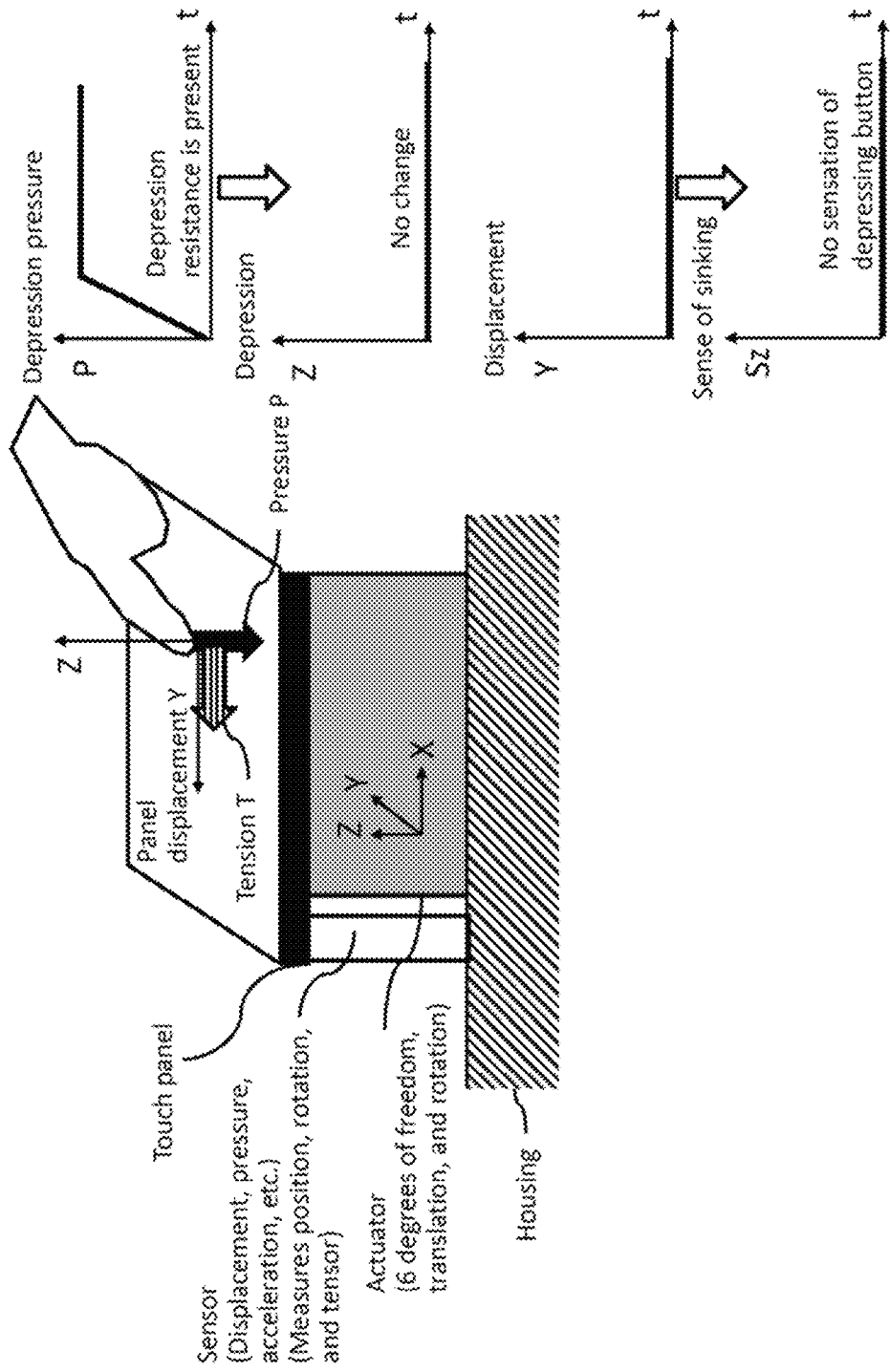

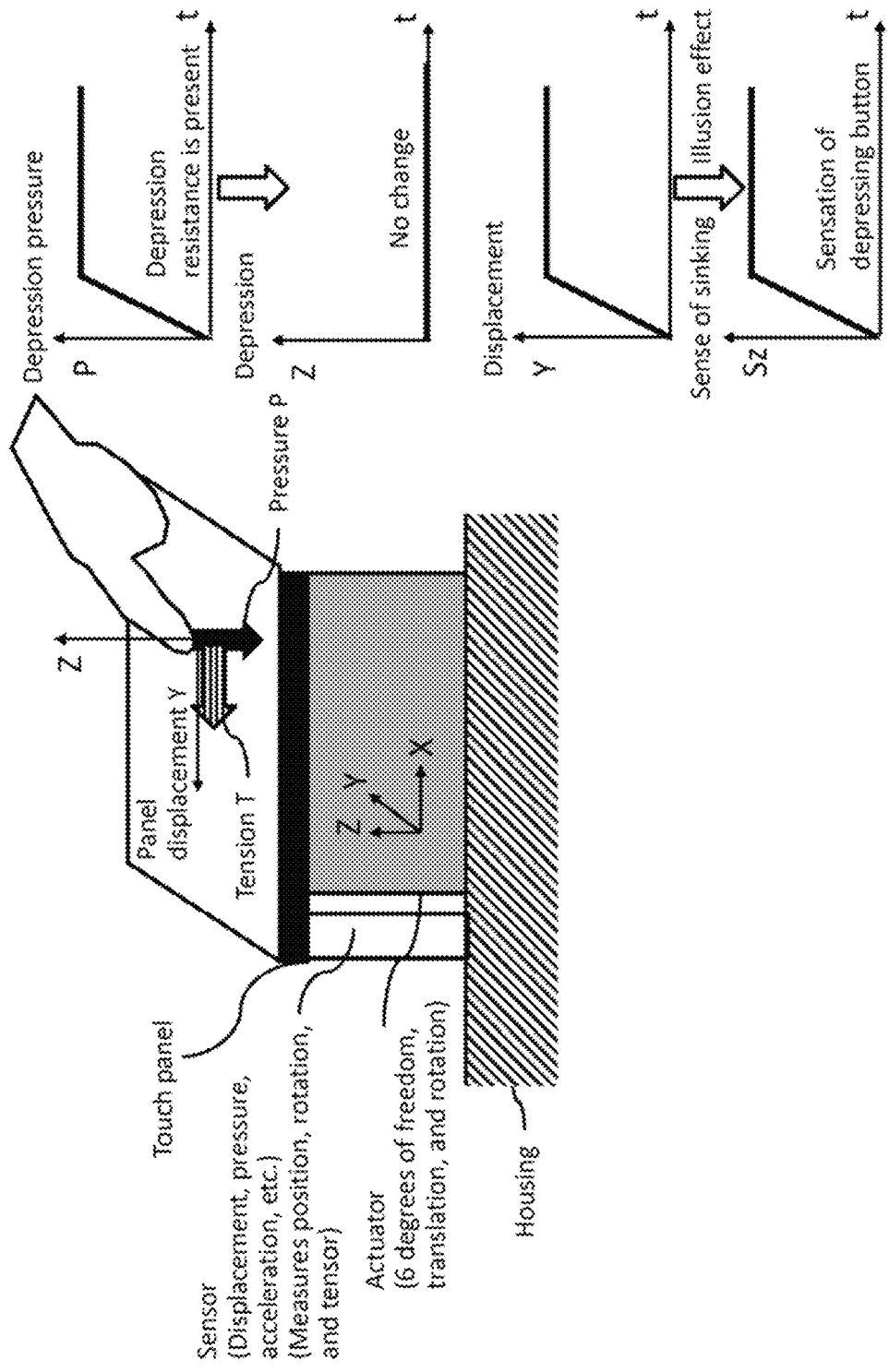
FIG. 5 Points of illusion phenomena (Illusion)

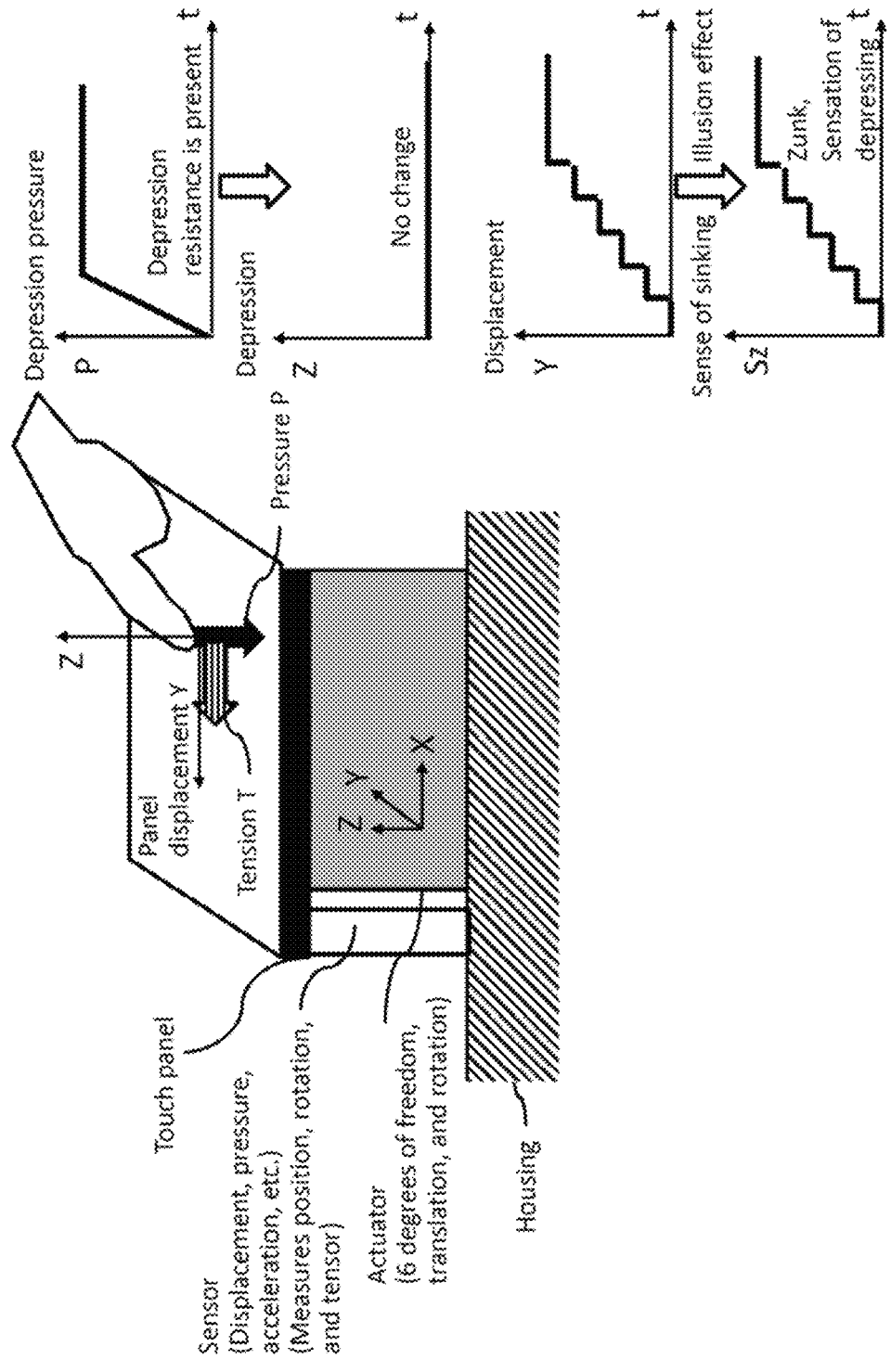
FIG. 6 Points of illusion phenomena (Continuous illusion)

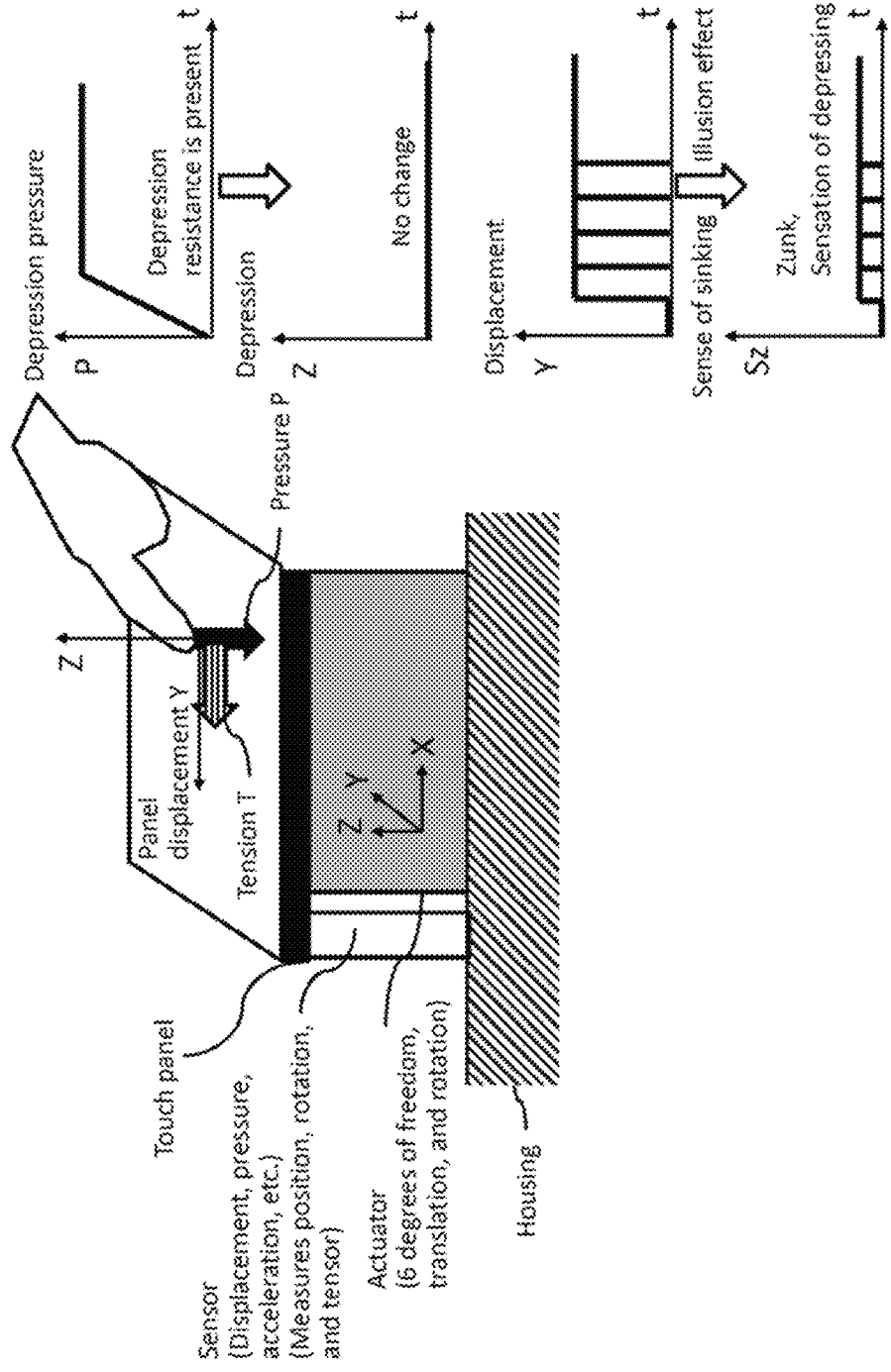
FIG. 7 Points of illusion phenomena (Continuous illusion)

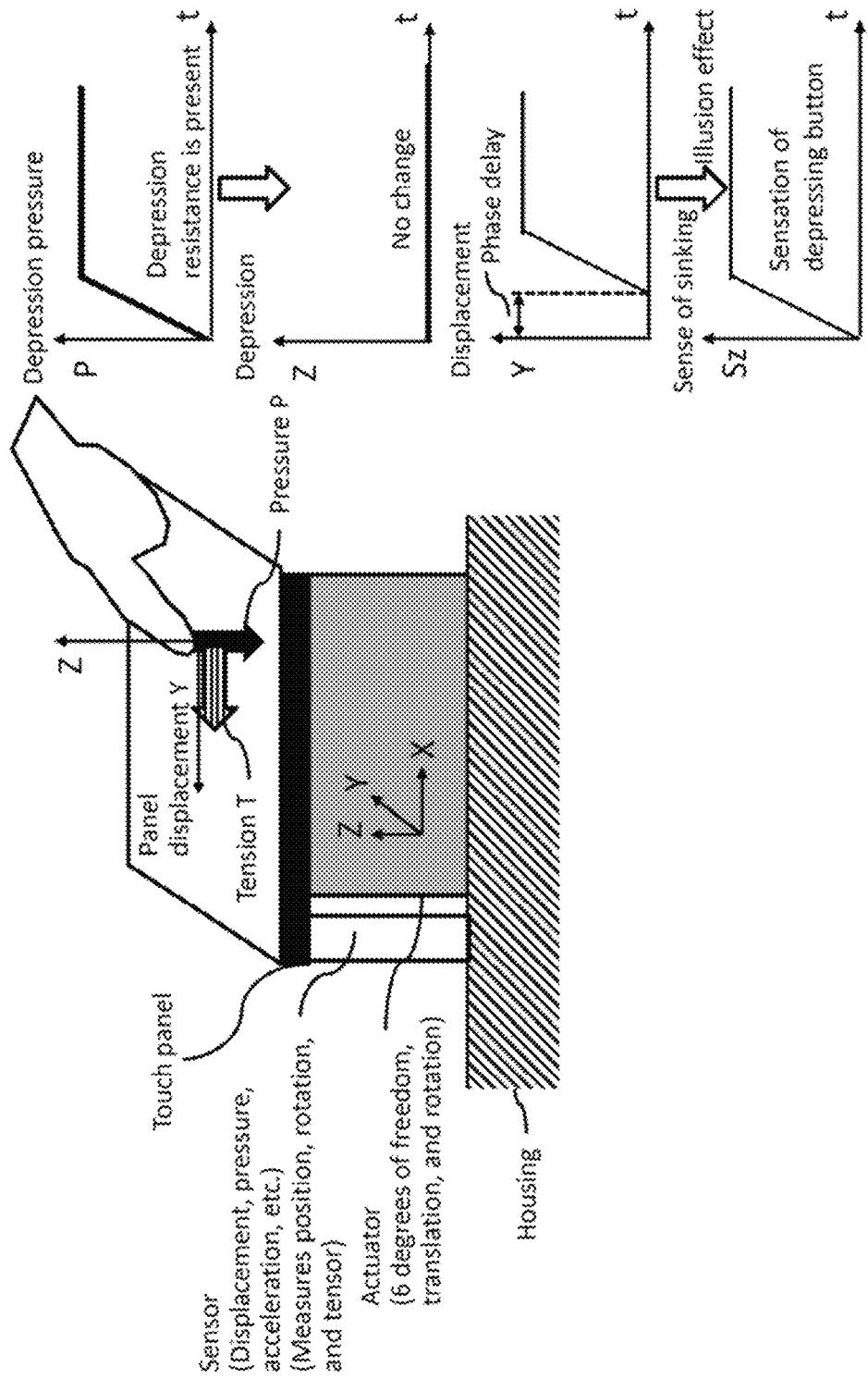
FIG. 8 Points of illusion phenomena (Phase delay)

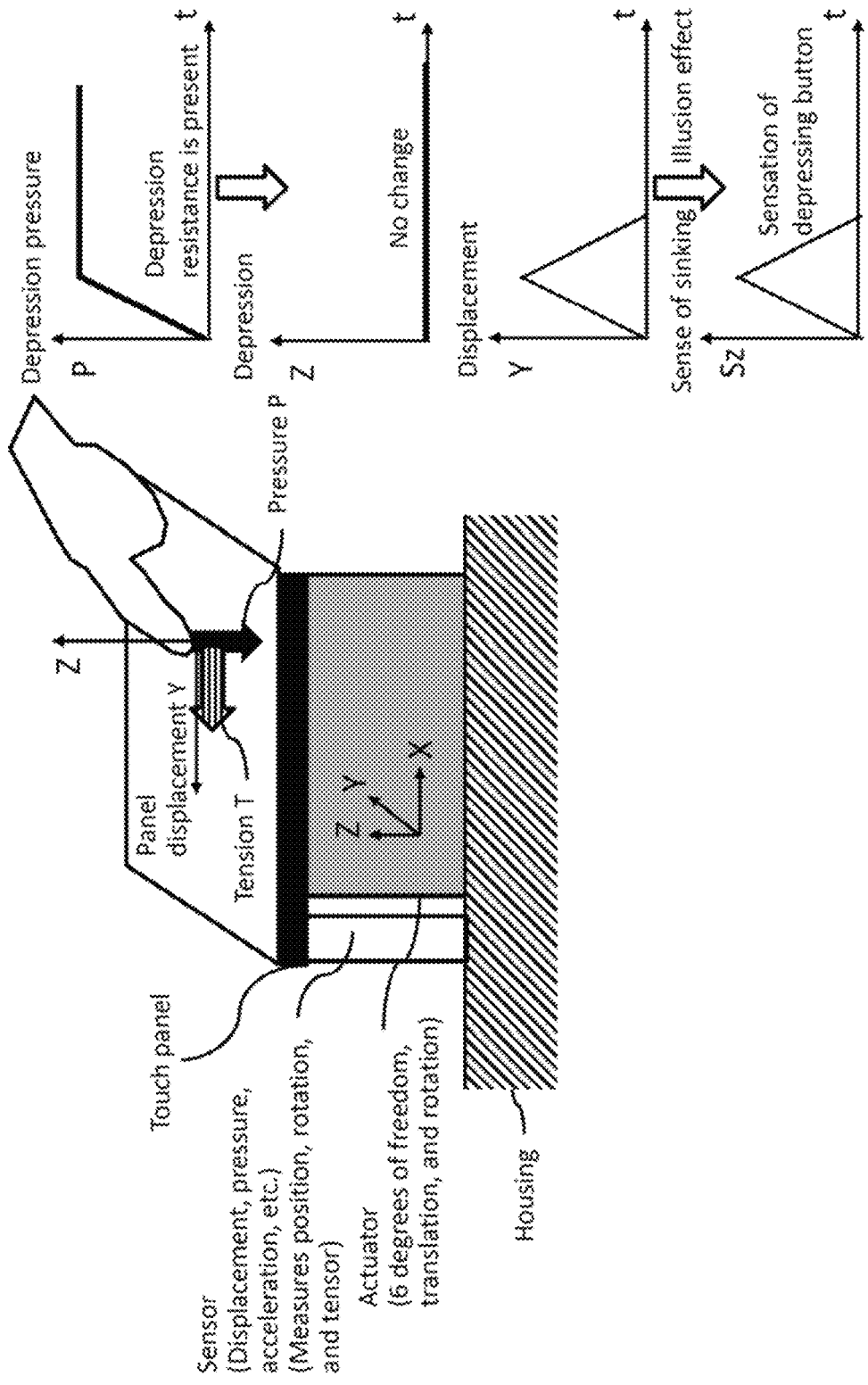
FIG. 9 Points of illusion phenomena (Illusion)

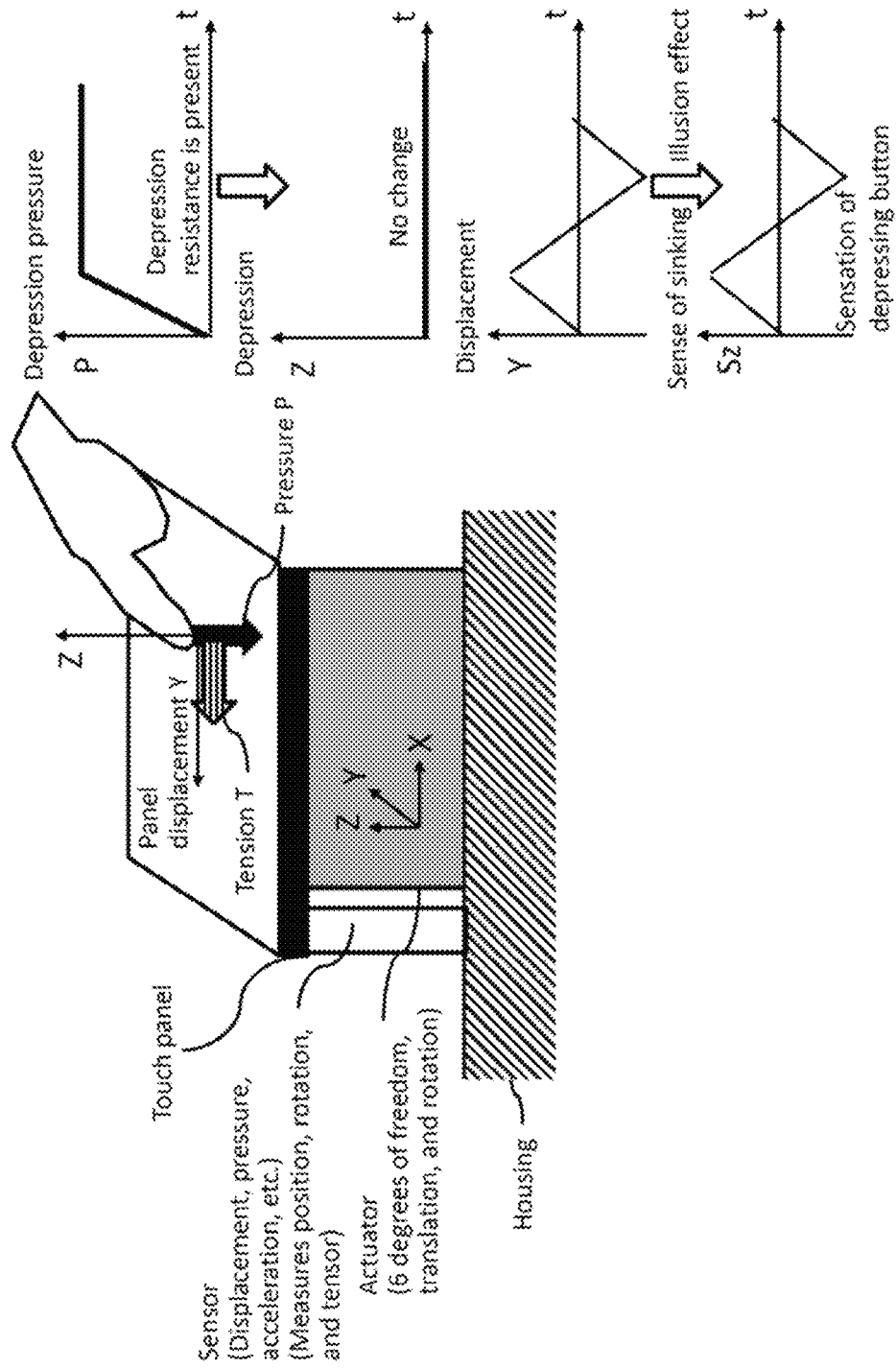
FIG. 10 Points of illusion phenomena (Illusion)

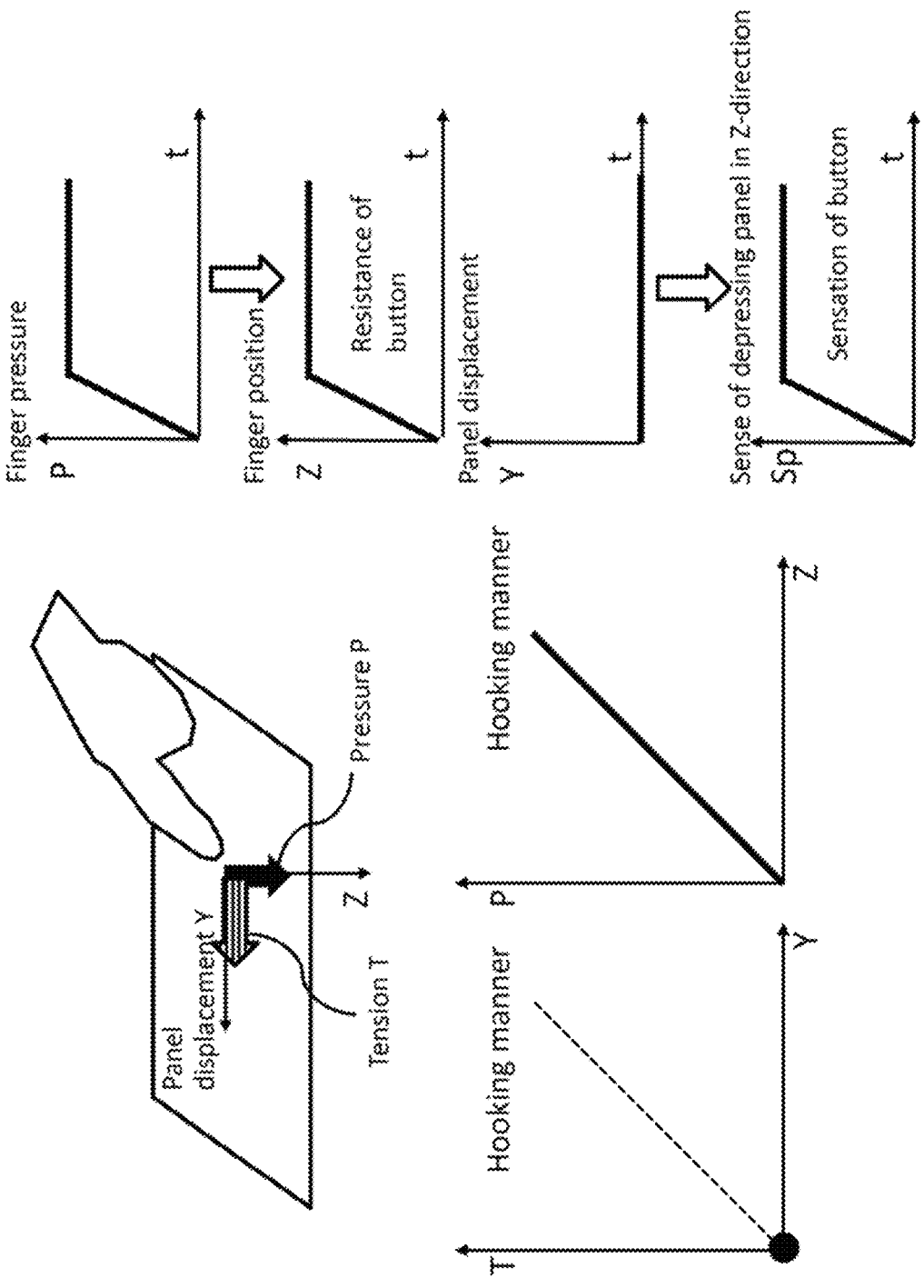
FIG. 11 Way to depress panel with finger: stepwise depression (Common)

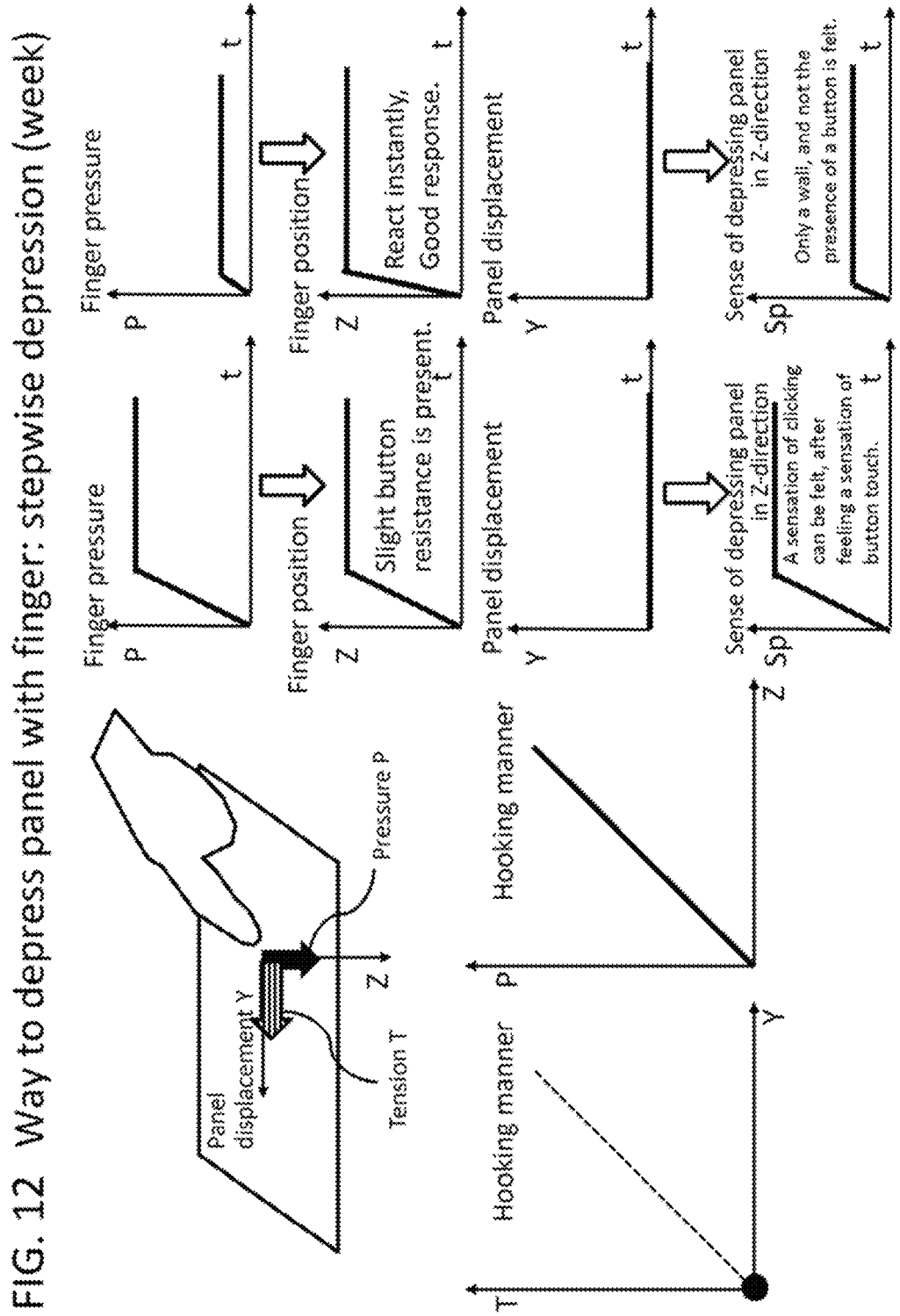
FIG. 12 Way to depress panel with finger: stepwise depression (week)

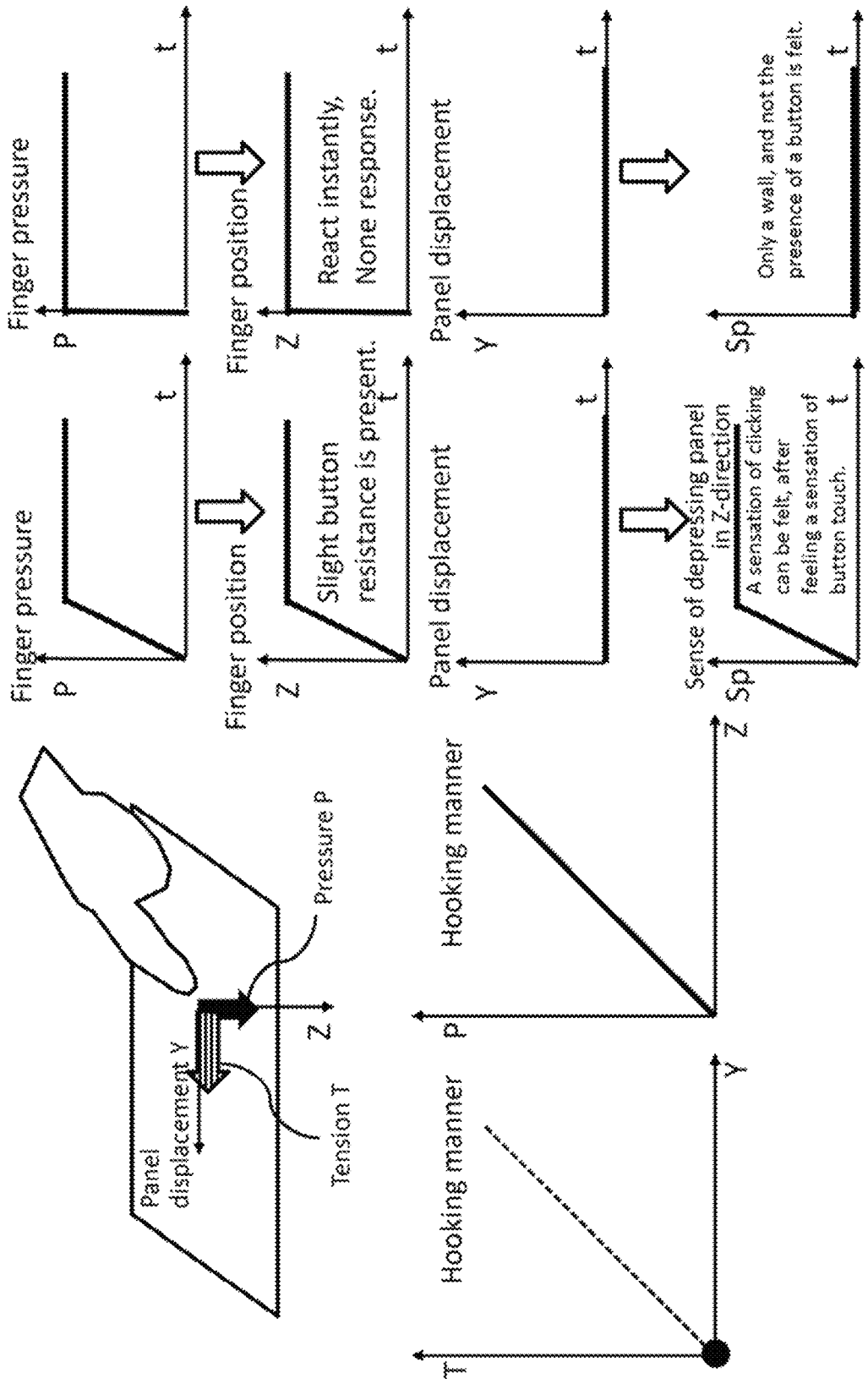
FIG. 13 Way to depress panel with finger: stepwise depression (None)

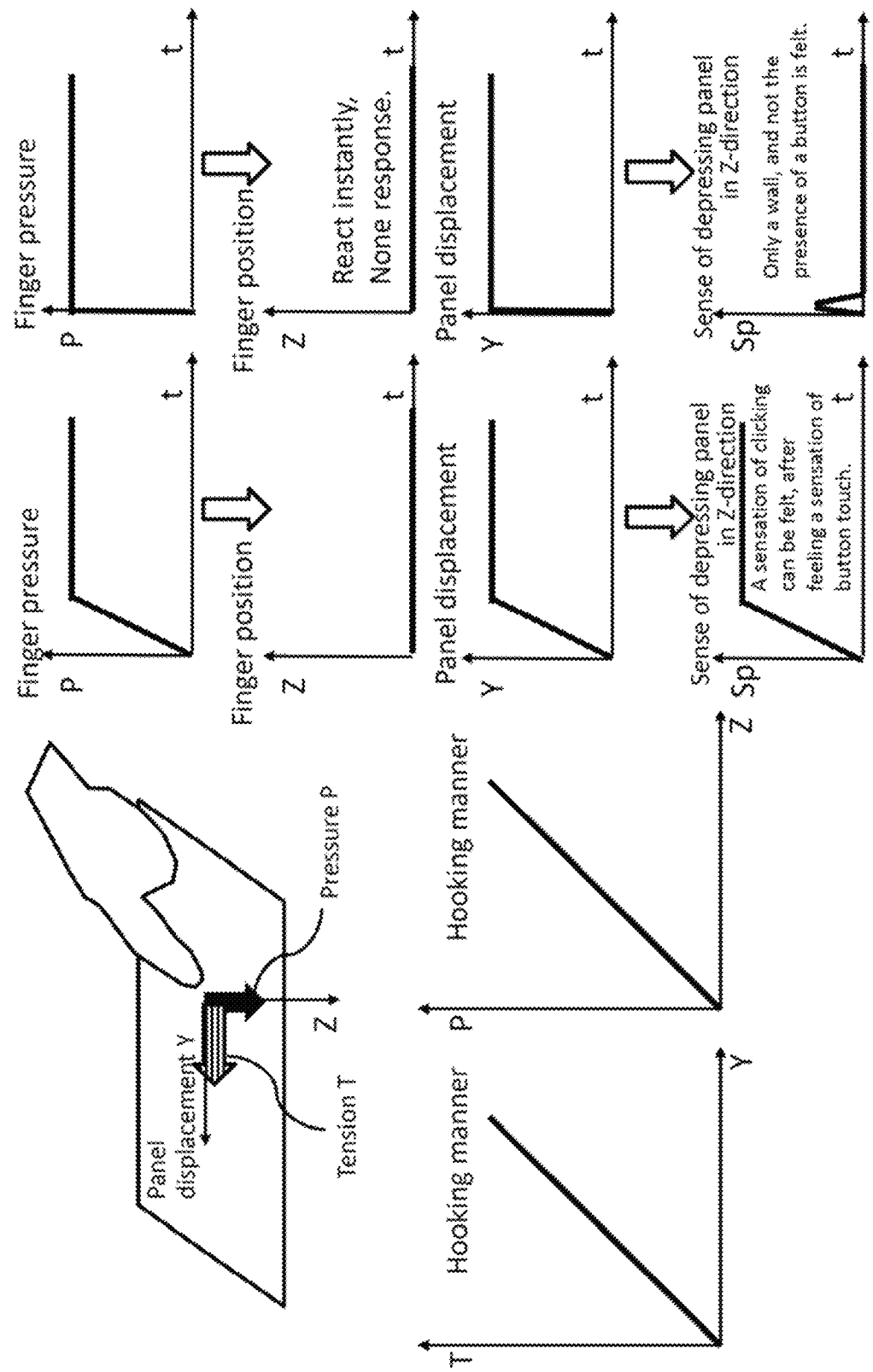
FIG. 14 Way to depress panel with finger: stepwise depression (Illusion)

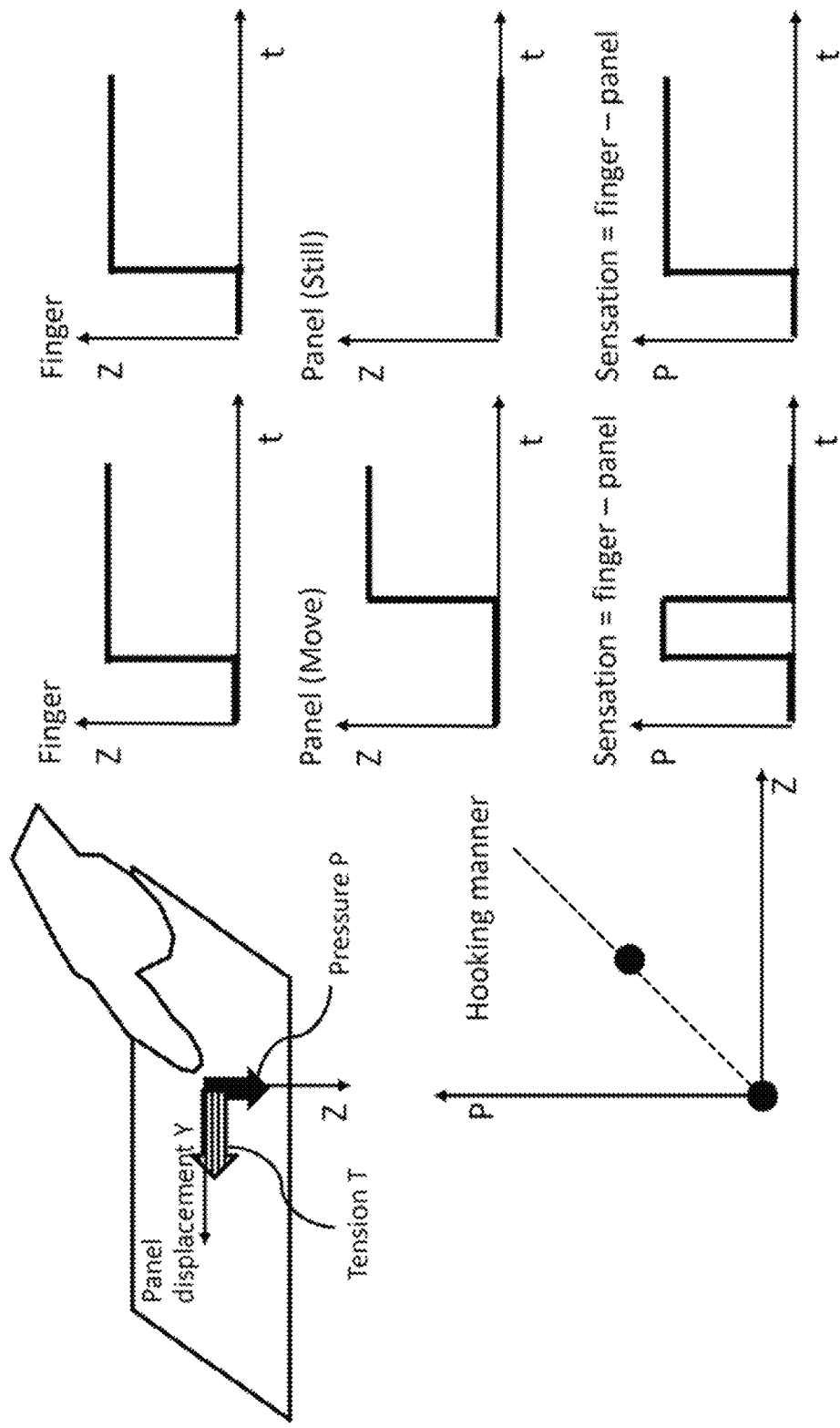
FIG. 15 Way to depress panel with finger: stepwise depression (Common)

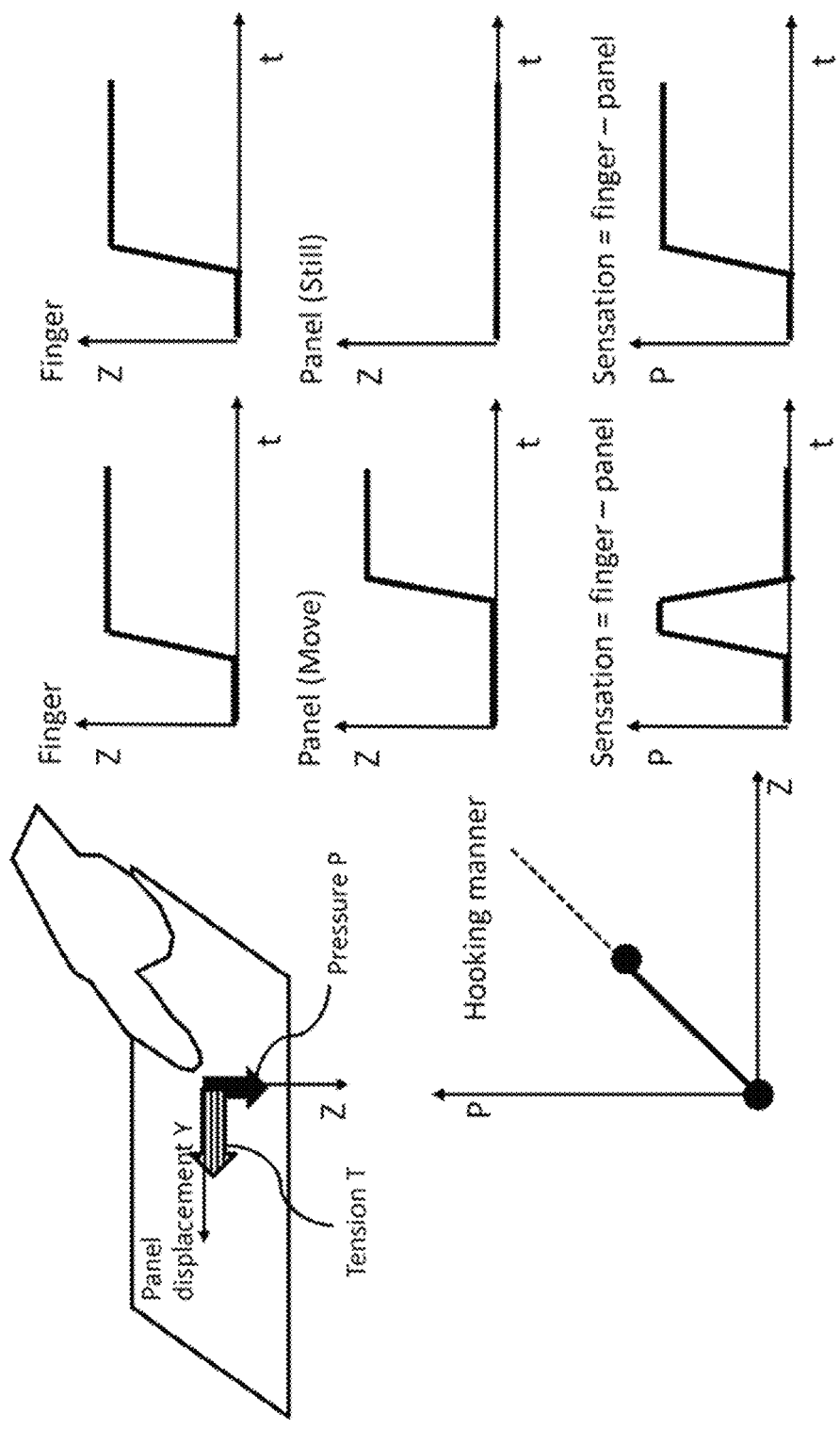
FIG. 16 Way to depress panel with finger: stepwise depression (Common)

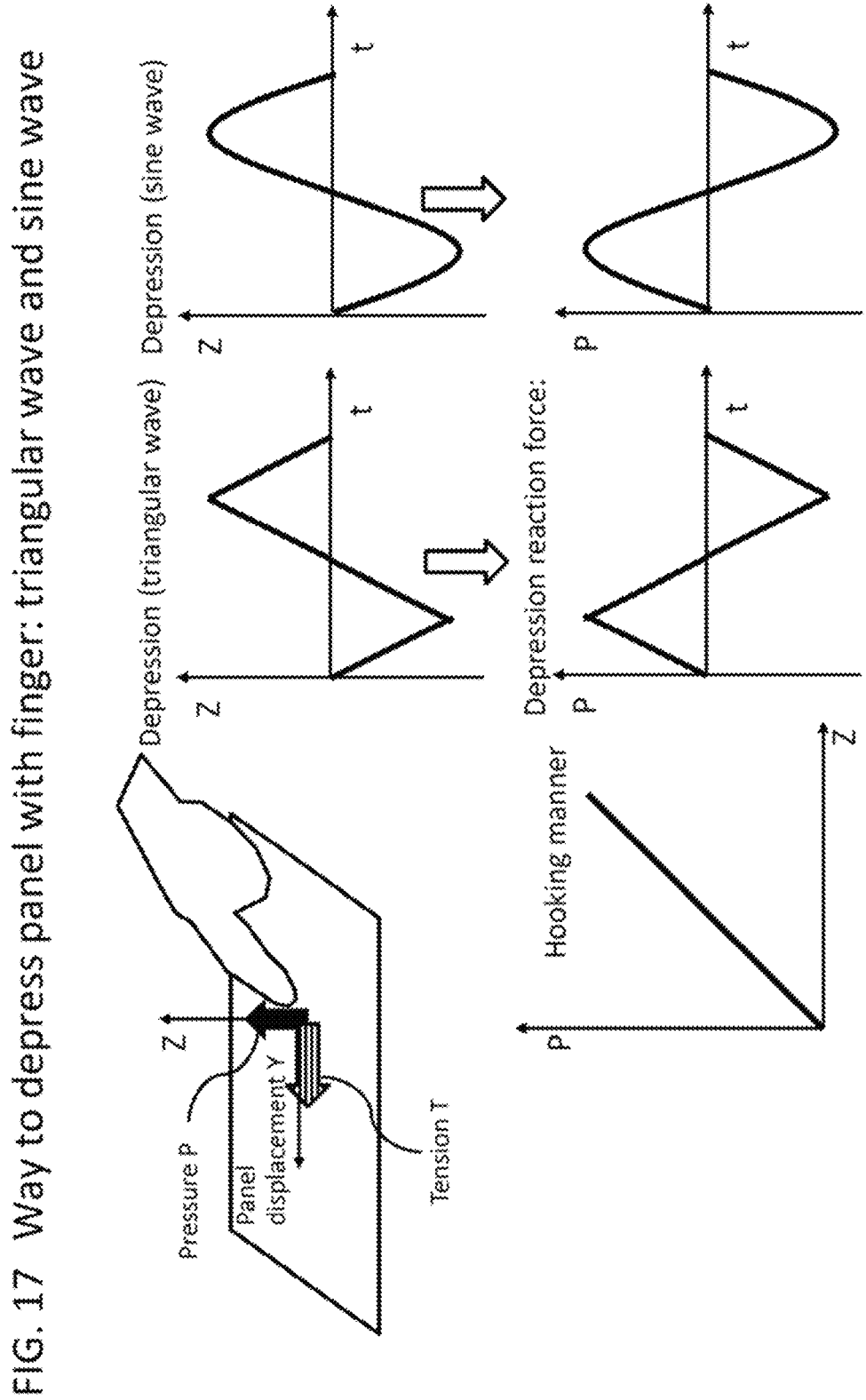
FIG. 17 Way to depress panel with finger: triangular wave and sine wave

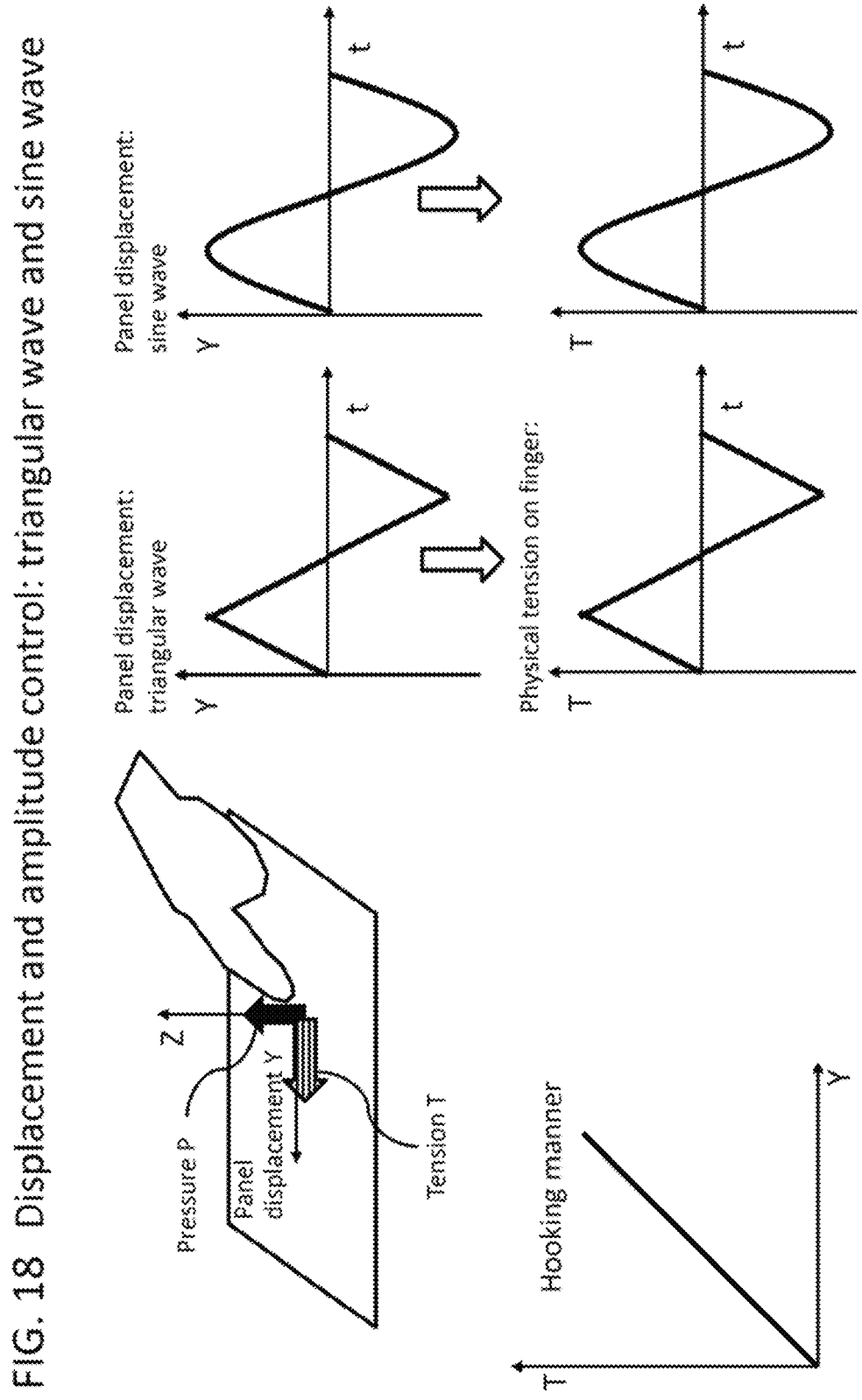
FIG. 18 Displacement and amplitude control: triangular wave and sine wave

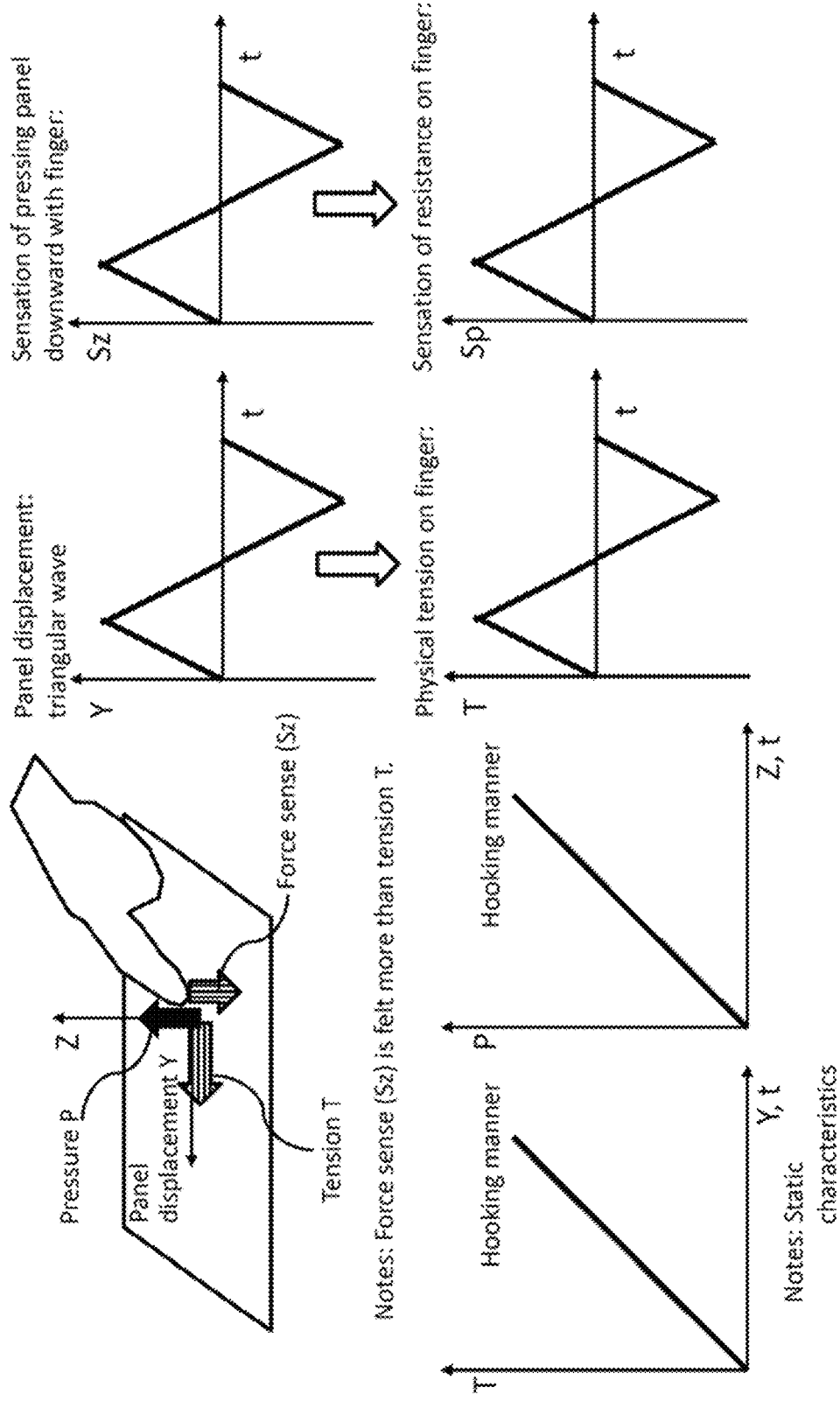
FIG. 19 Displacement and amplitude control: Pressing (downward)

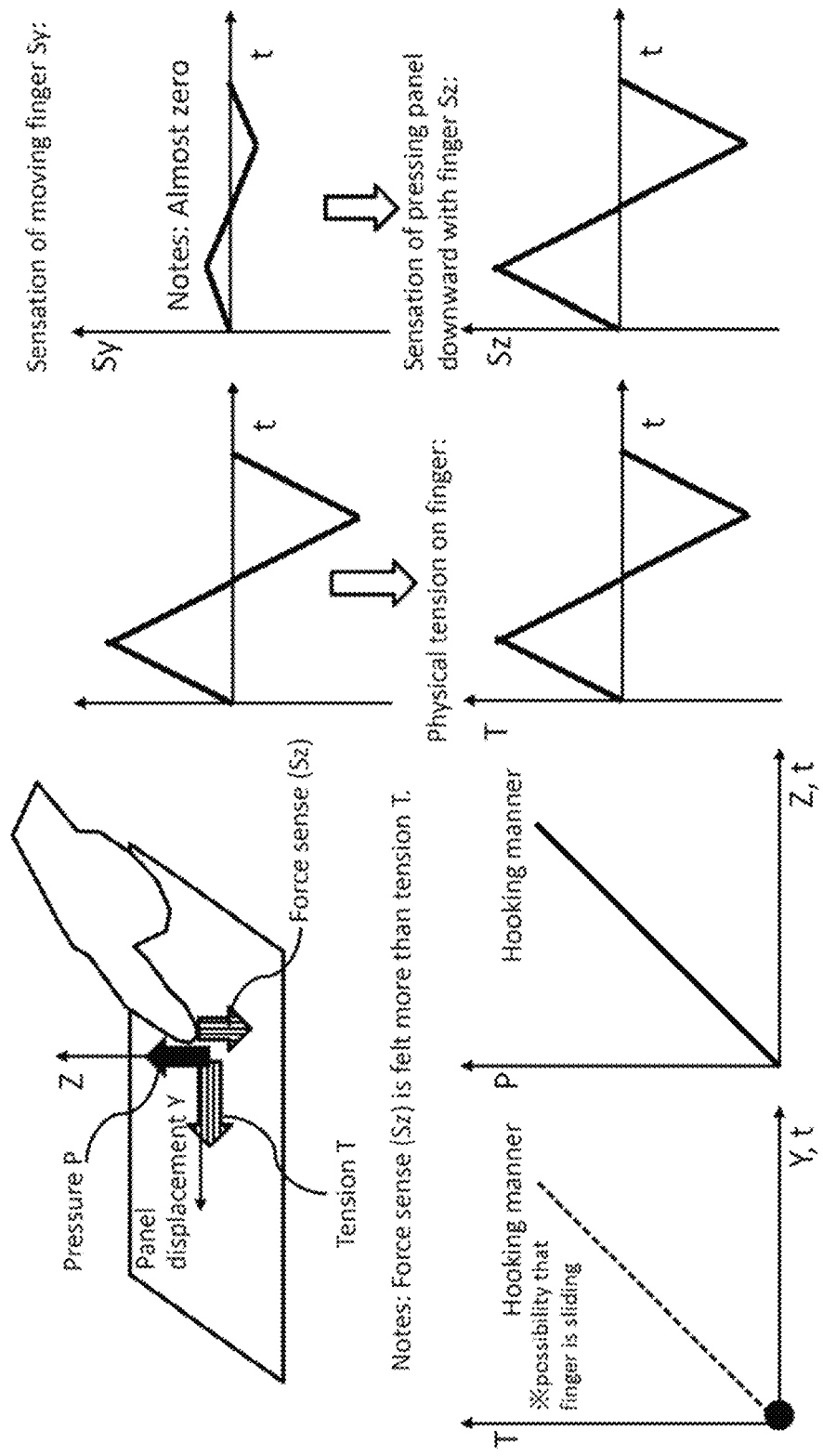
FIG. 20 Displacement and amplitude control: sense of pressing panel (Unconscious sliding)

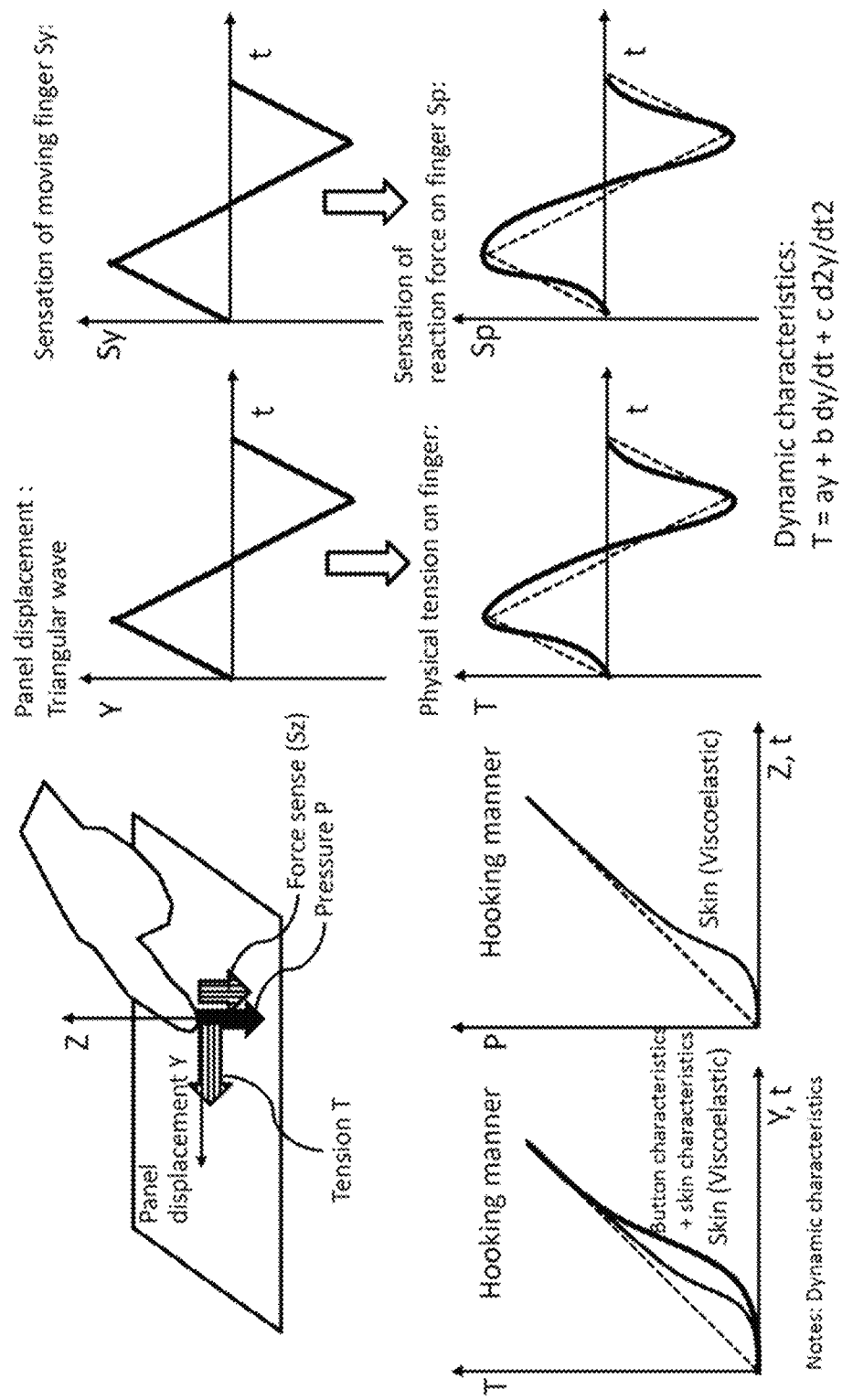
FIG. 21 Displacement and amplitude control: viscoelastic property (Button characteristics)

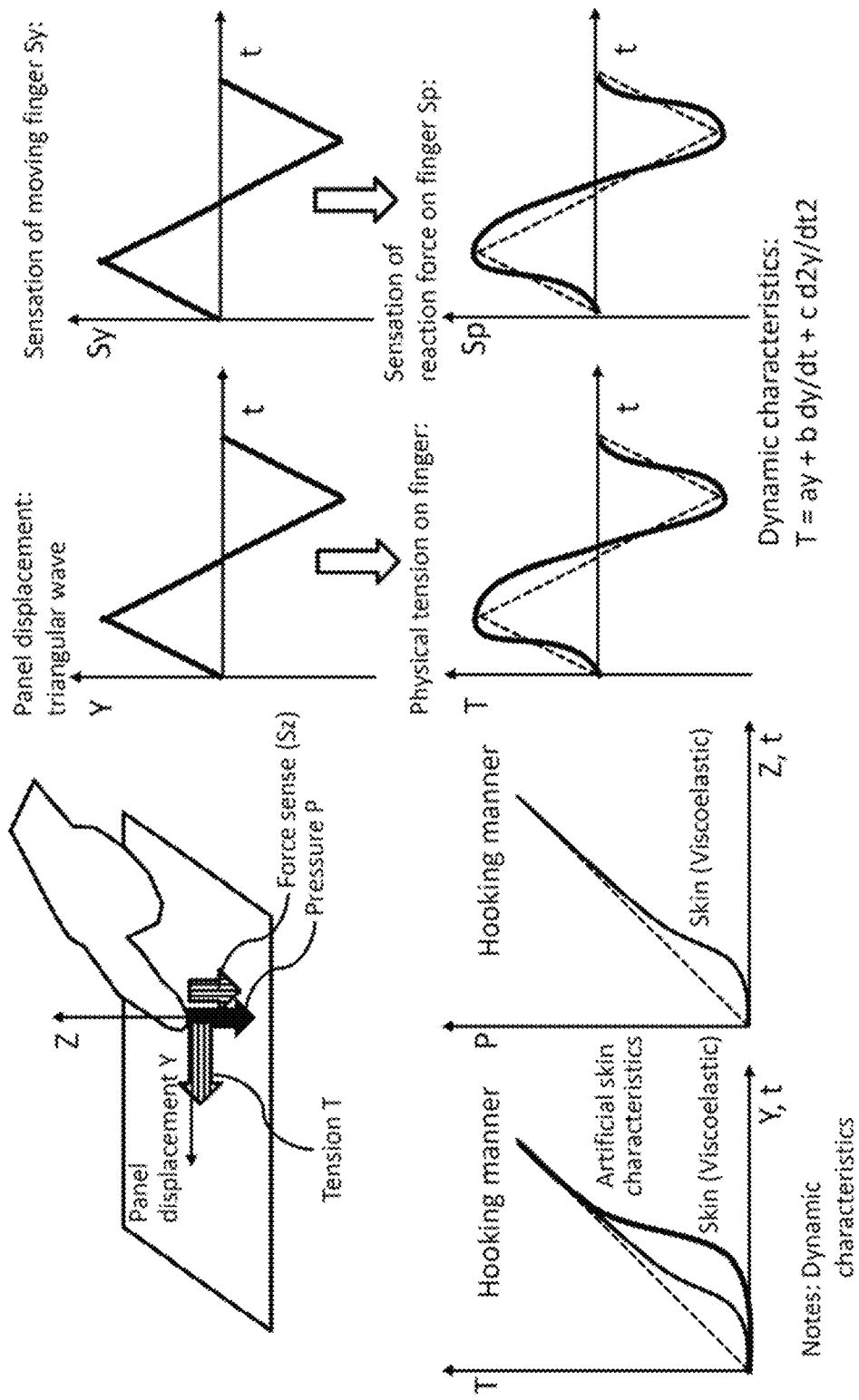
FIG. 22 Displacement and amplitude control: viscoelastic property (Artificial skin sense)

FIG. 23 Displacement and amplitude control: triangular wave
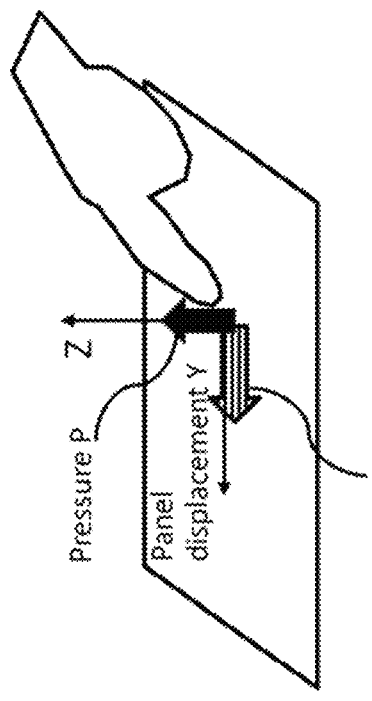
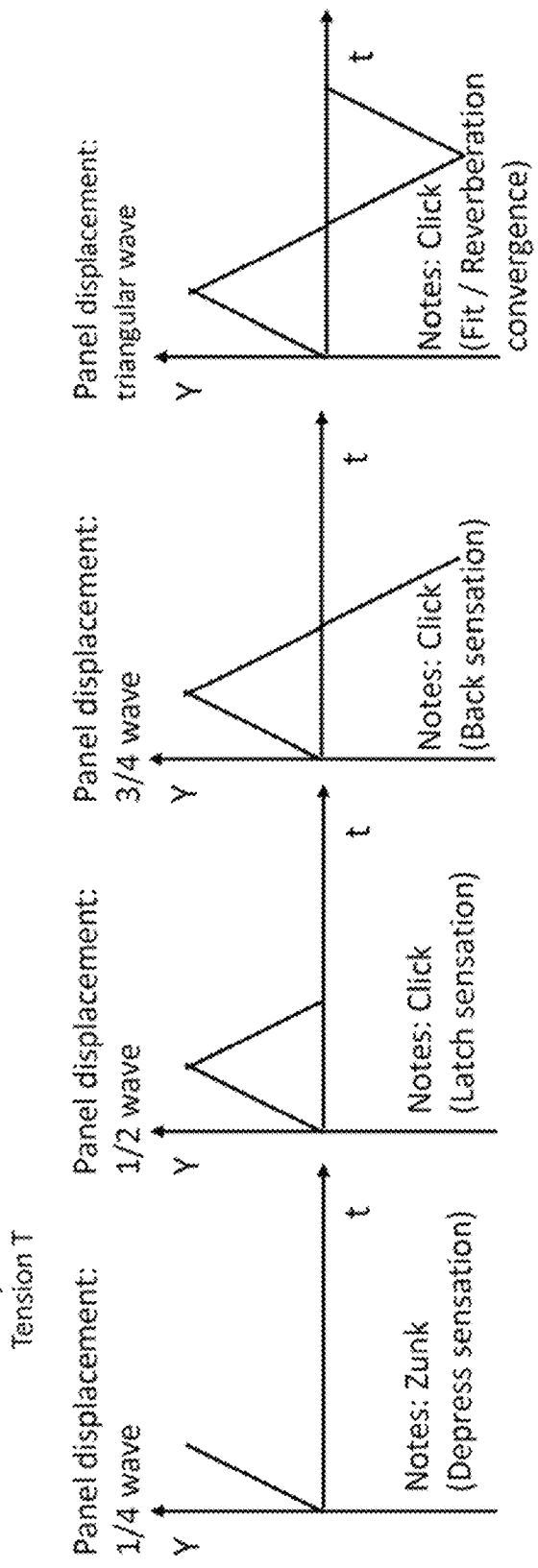

FIG. 24 Displacement and amplitude control: sine wave
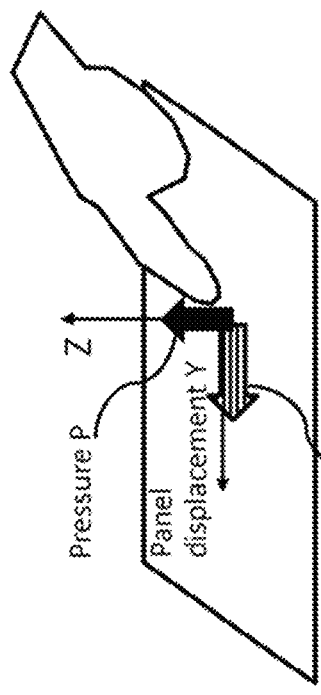
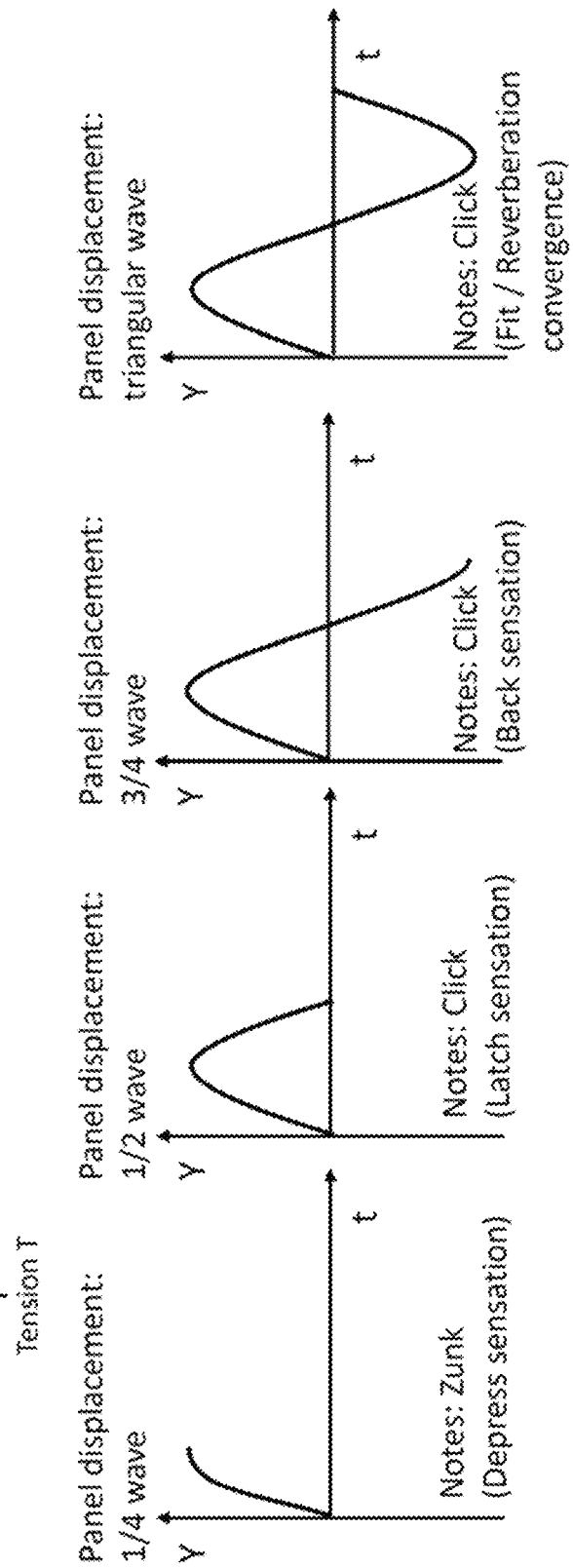

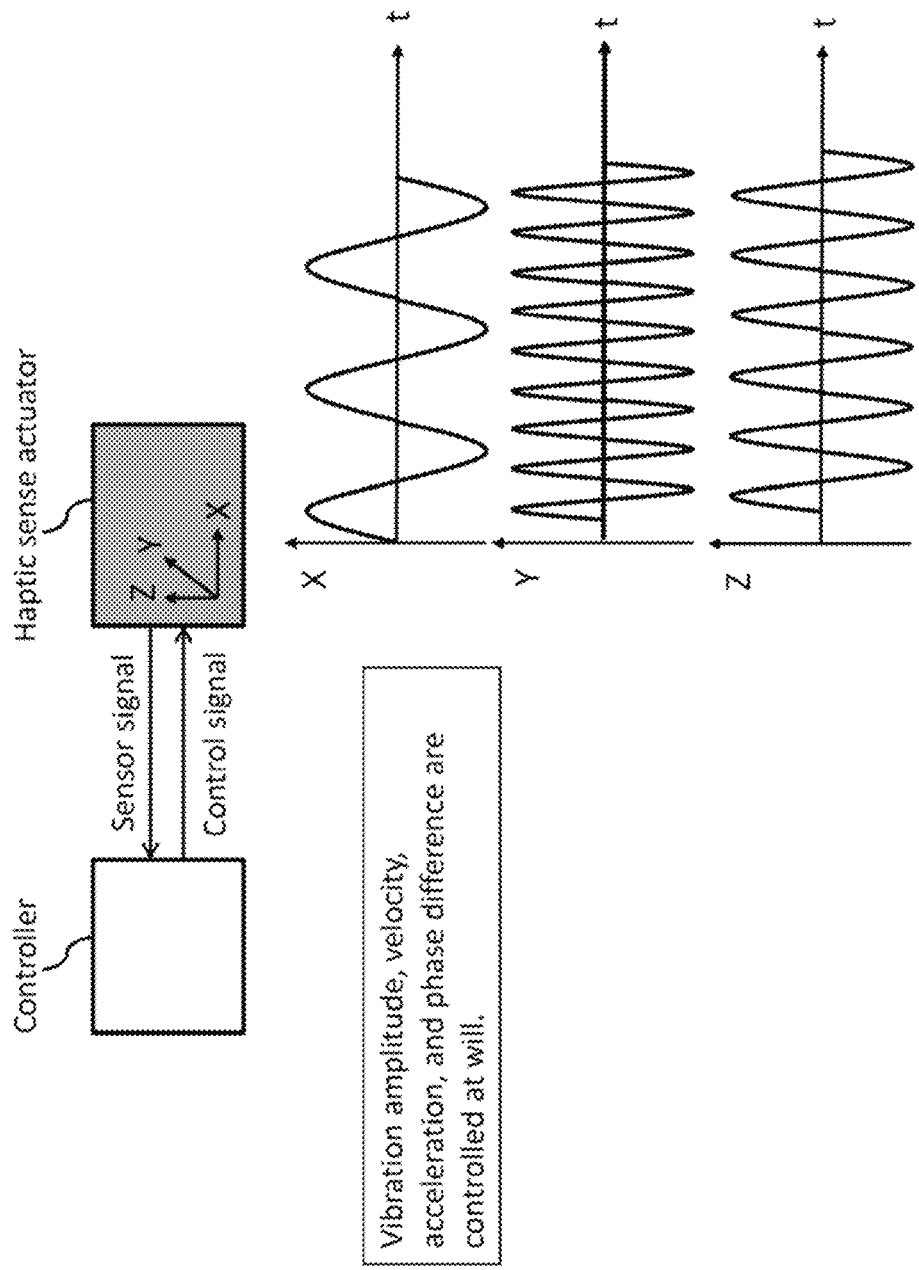
FIG. 25 Vibration control of haptic sense actuator

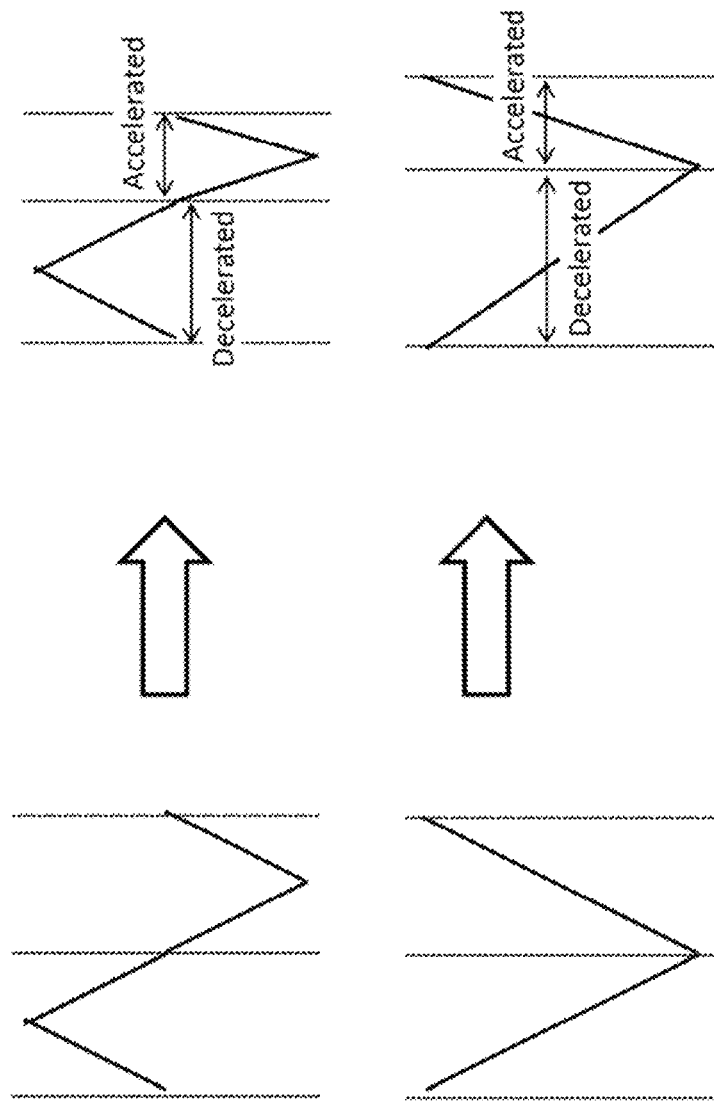
FIG. 26 Waveform control: displaced waveform

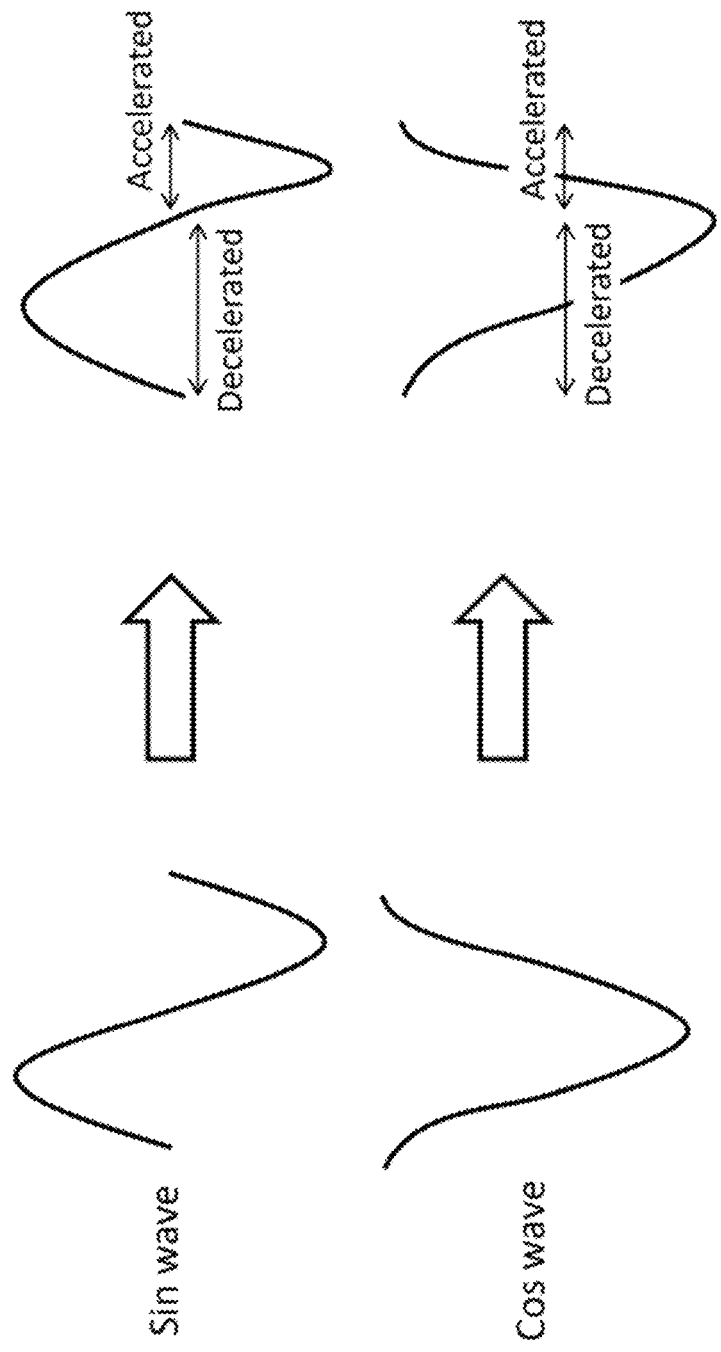
FIG. 27 Waveform control: accelerated and decelerated waveform

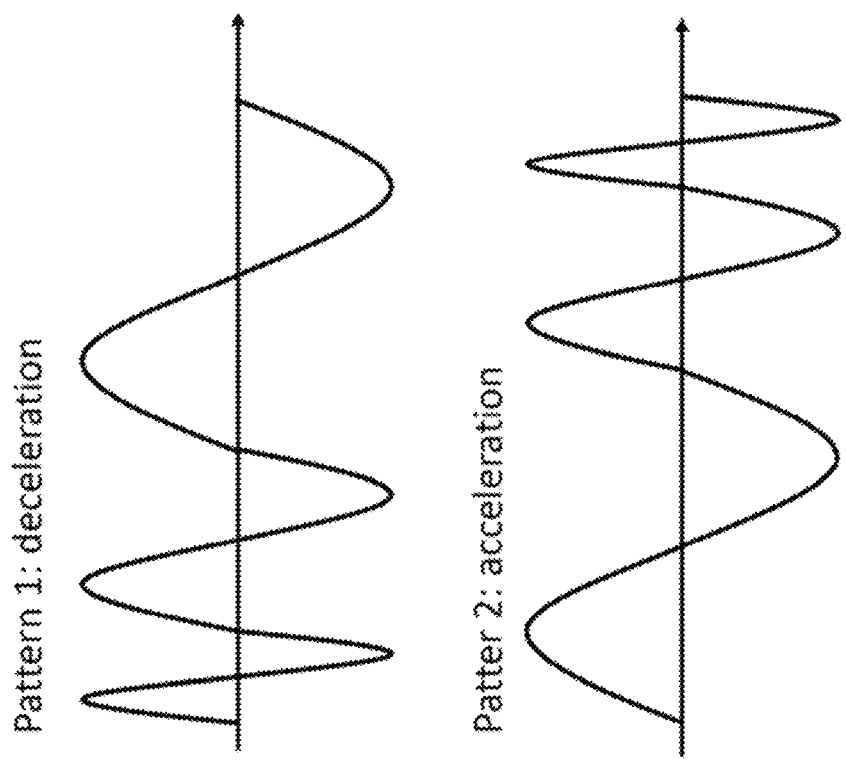
FIG. 28 Waveform control: accelerated sweep (Sense of click)

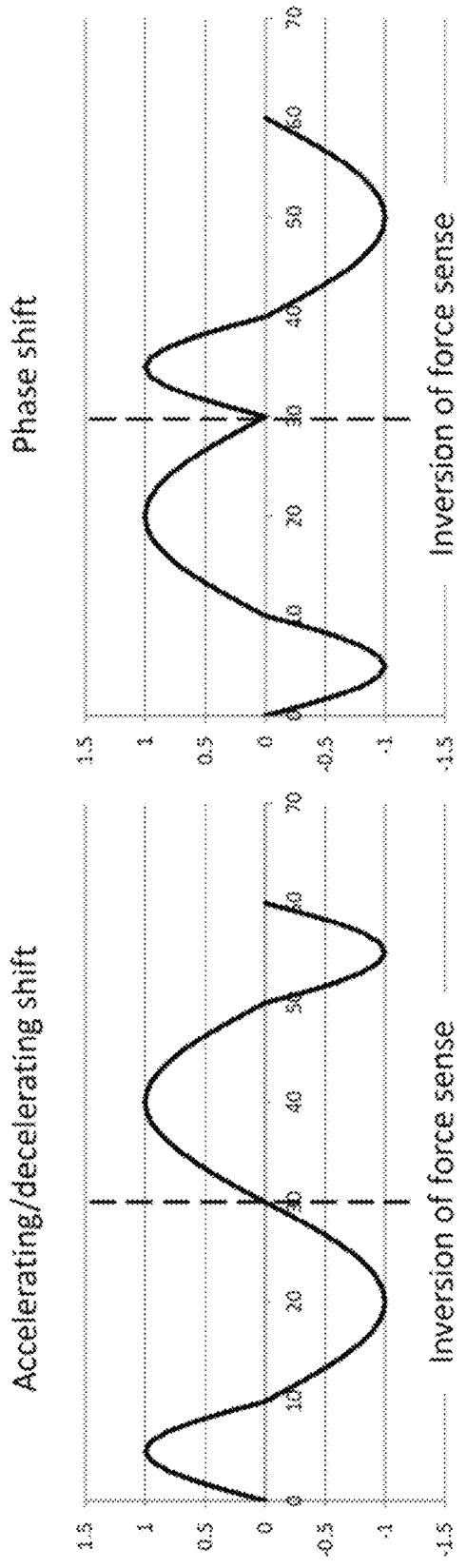
FIG. 29 Waveform control: acceleration/shift control

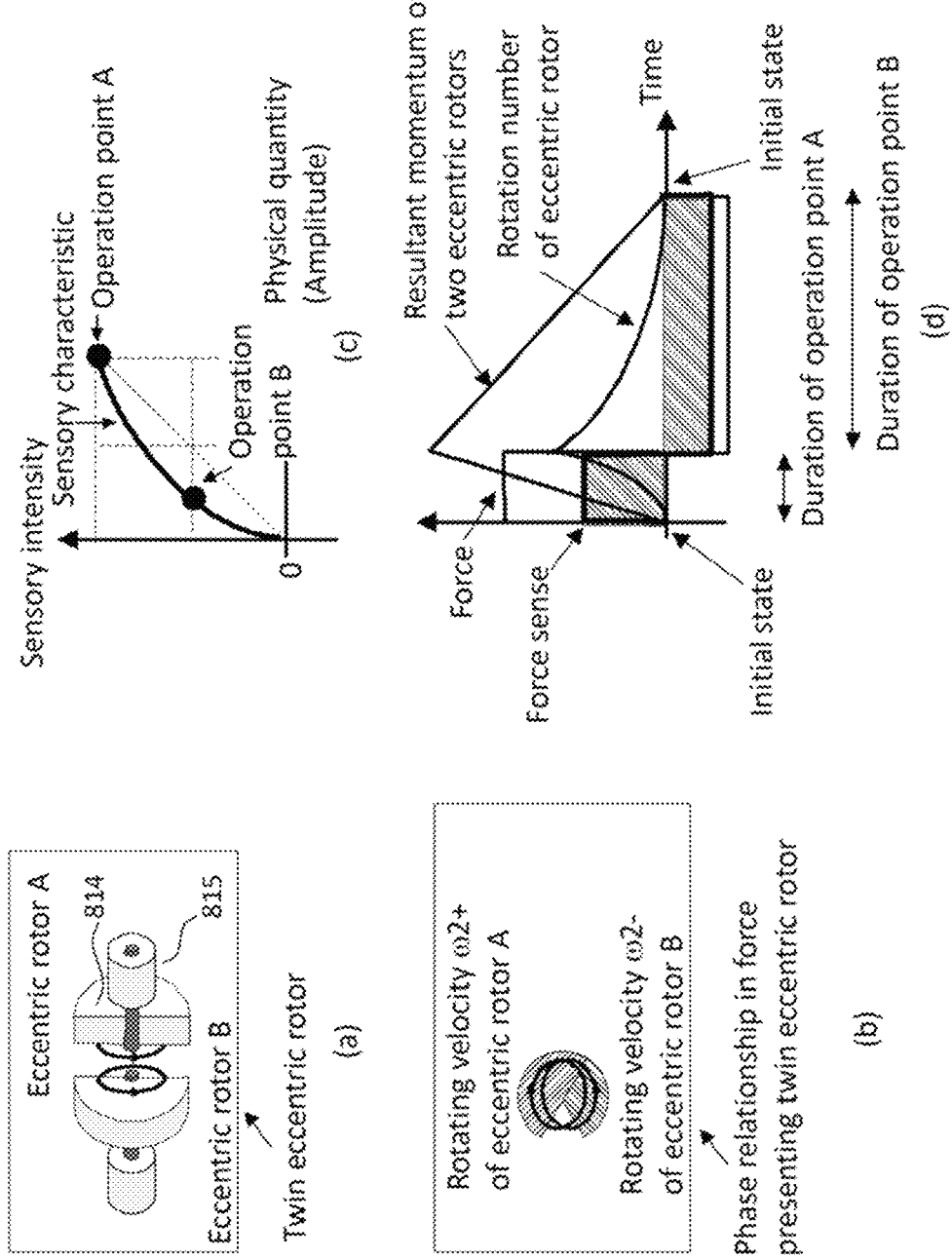
FIG. 30 Example of actuator (Eccentric motor)

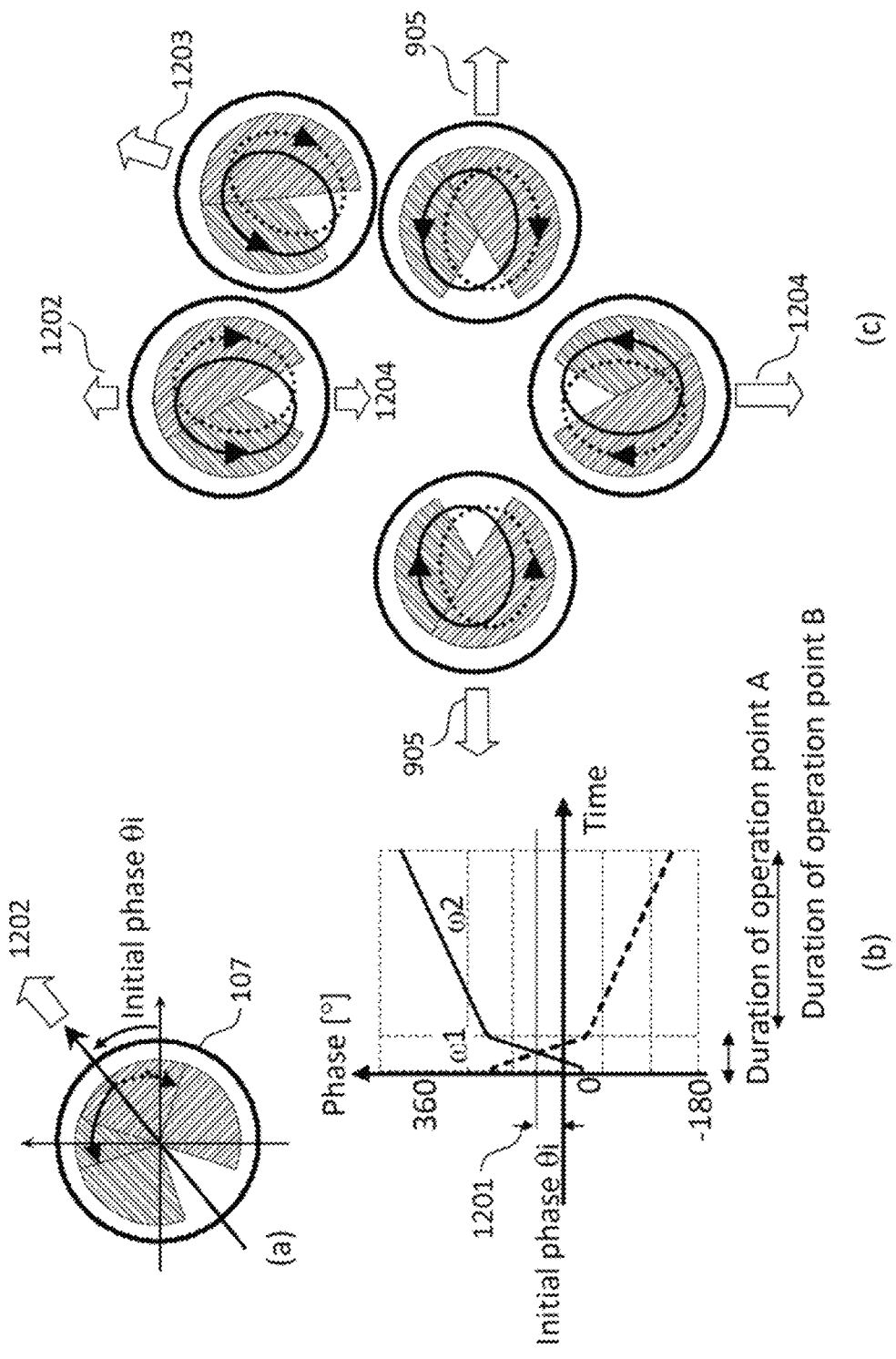
FIG. 31 Example of actuator (Eccentric motor)

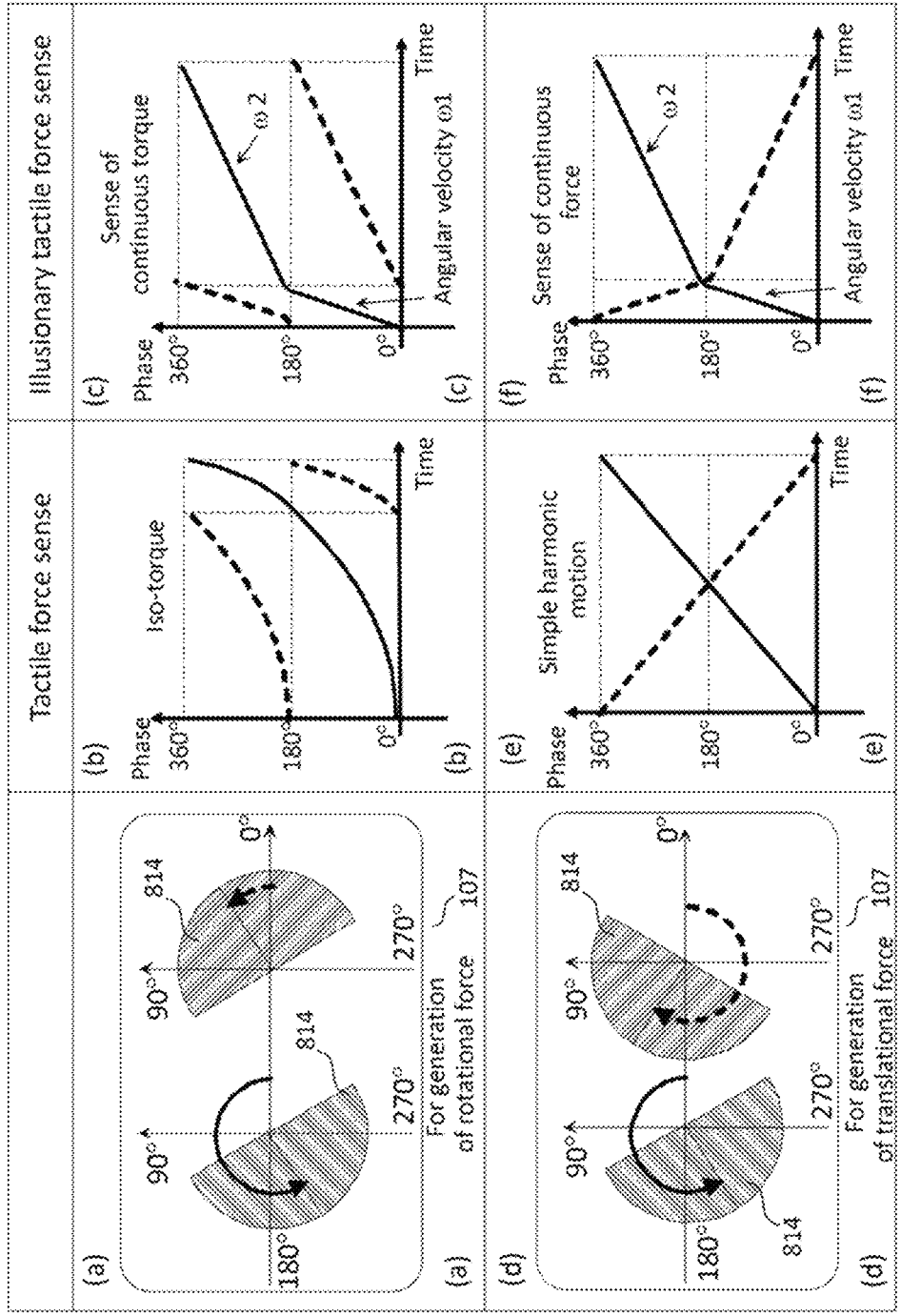
FIG. 32 Example of actuator (Eccentric motor)

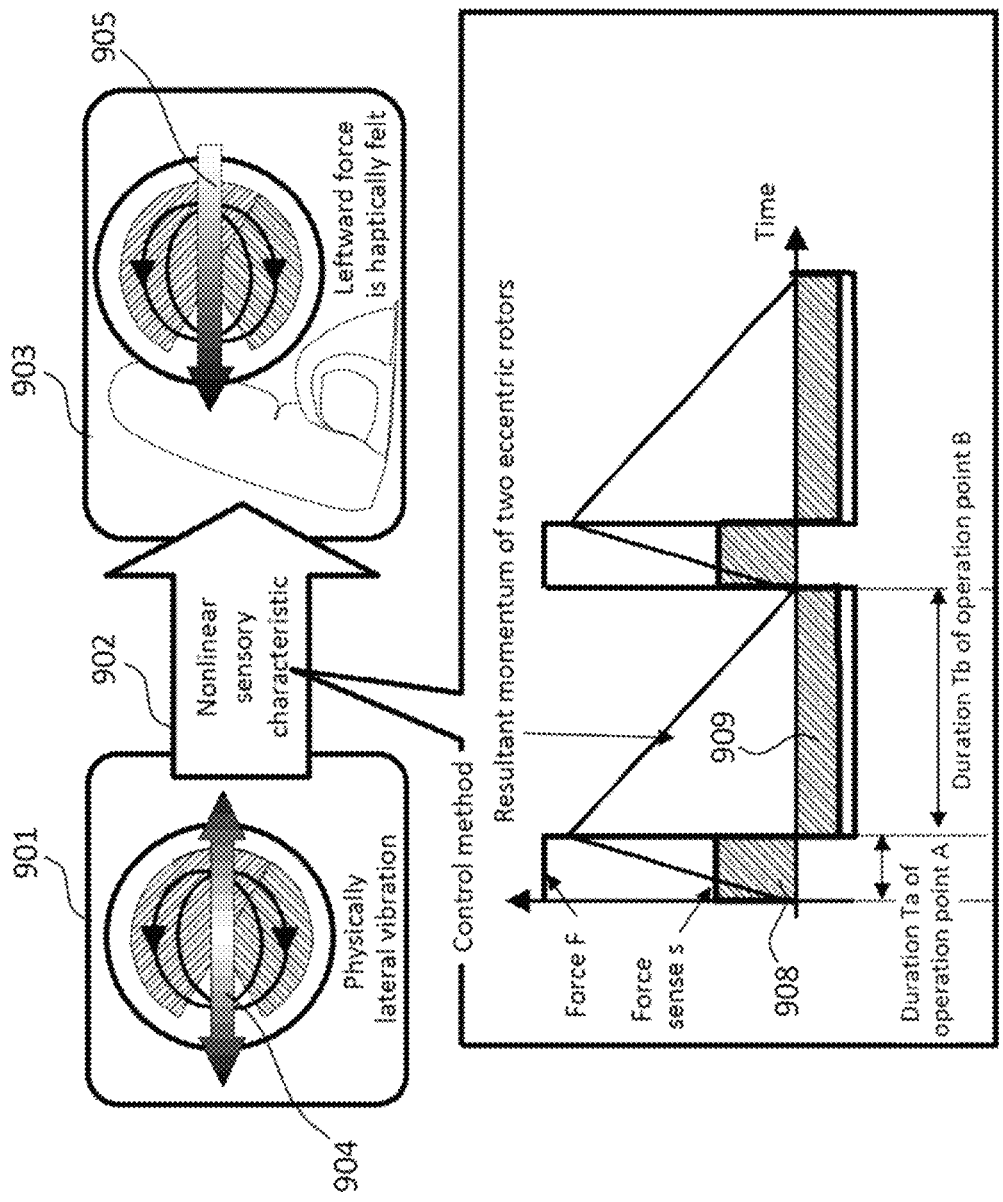
FIG. 33 Generation of illusionary tactile force sense

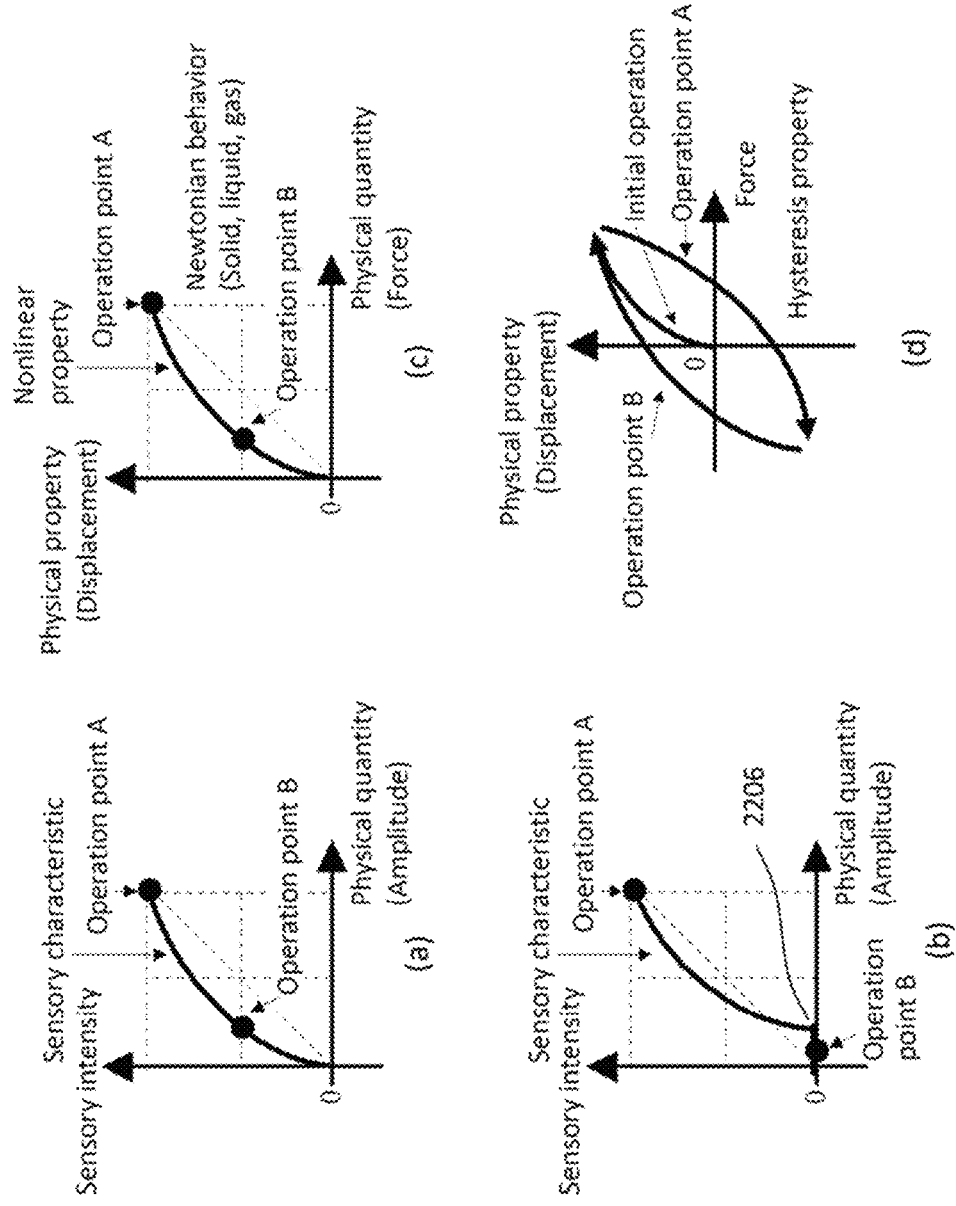
FIG. 34 Sensory characteristic, physical property, and hysteresis

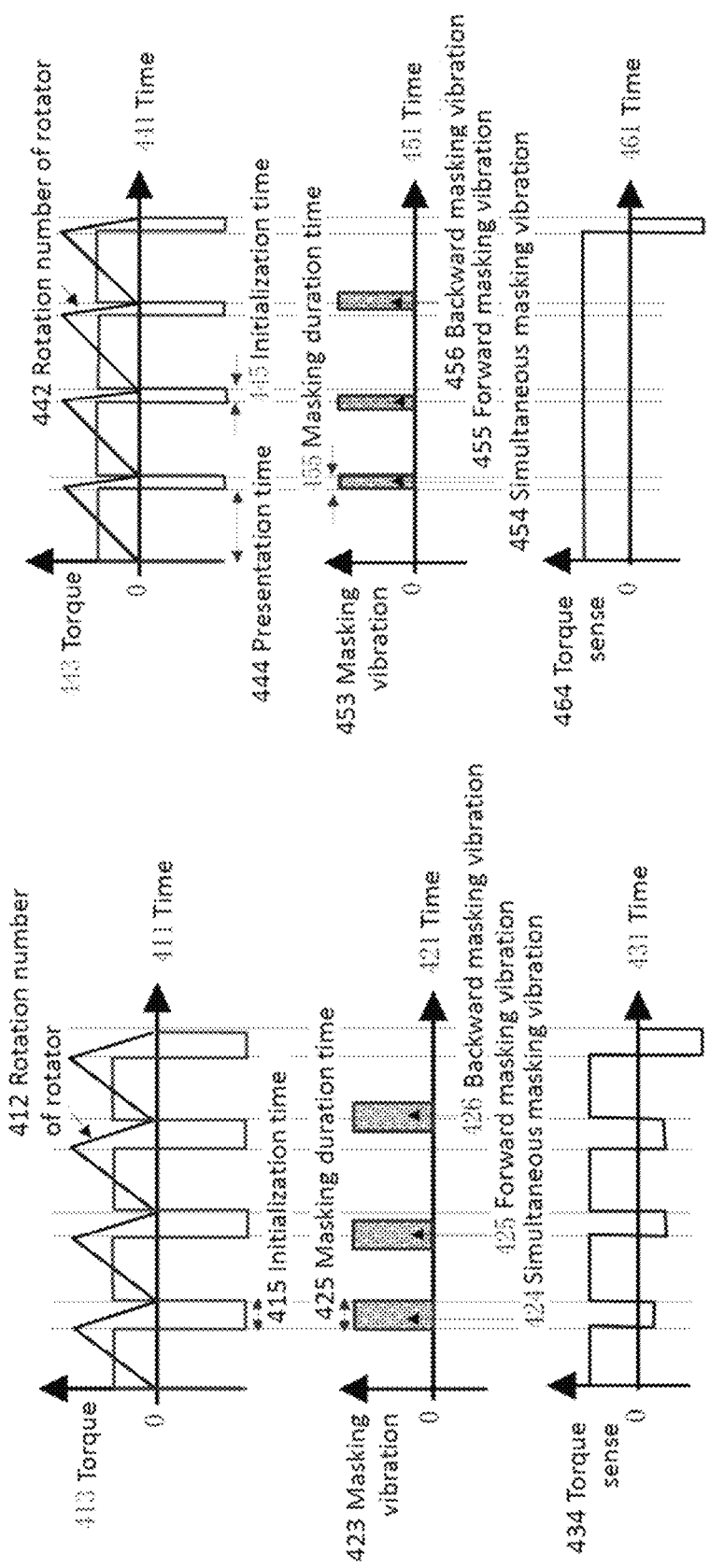
FIG. 35 sensory characteristic and masking method

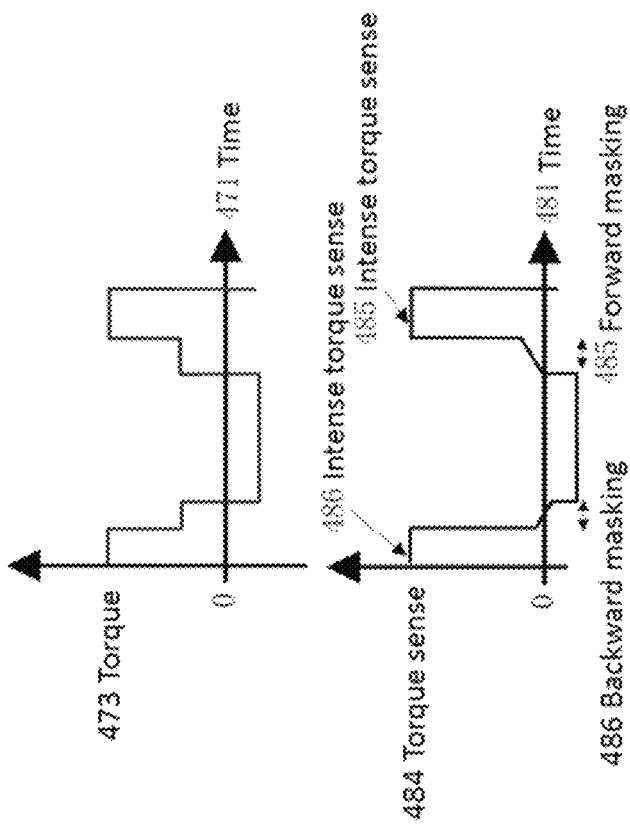
FIG. 36 sensory characteristic and masking method

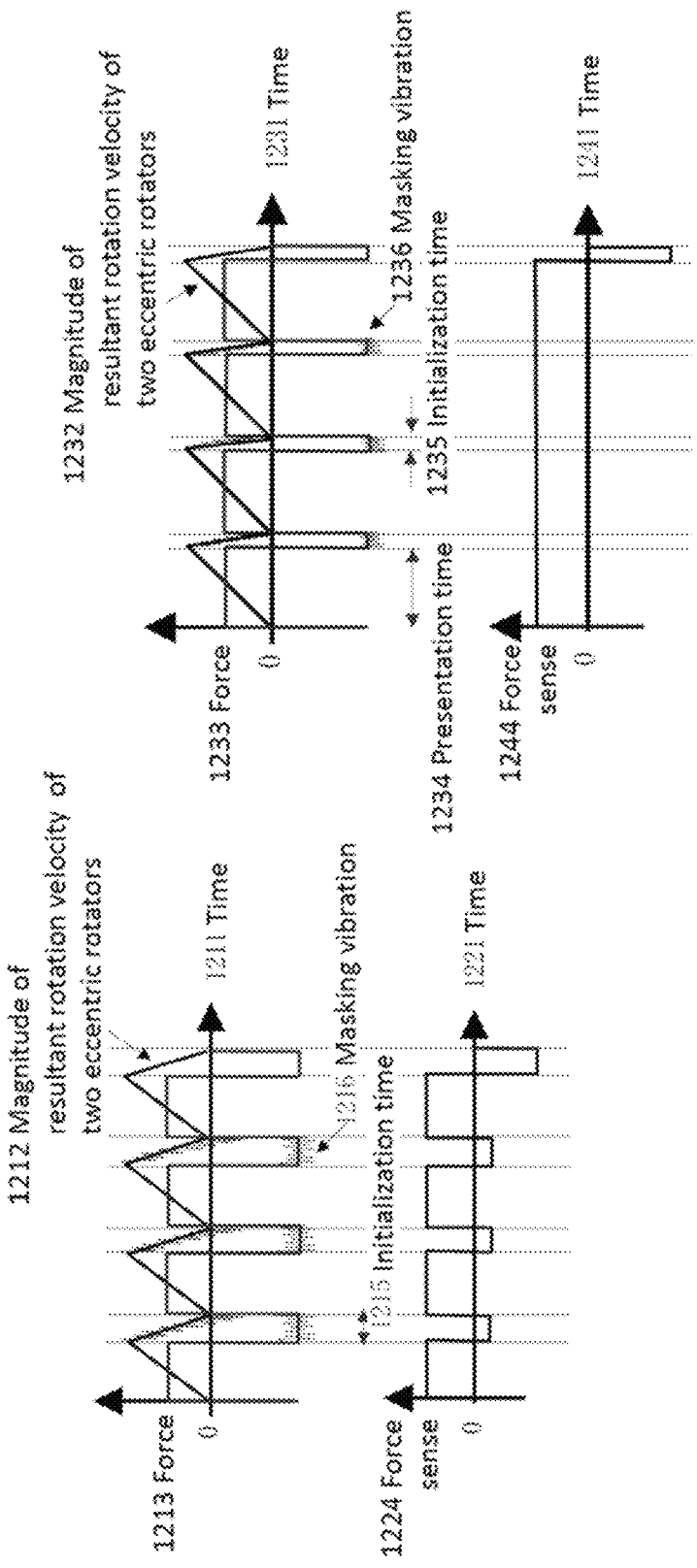
Fig. 37 sensory characteristic and masking method

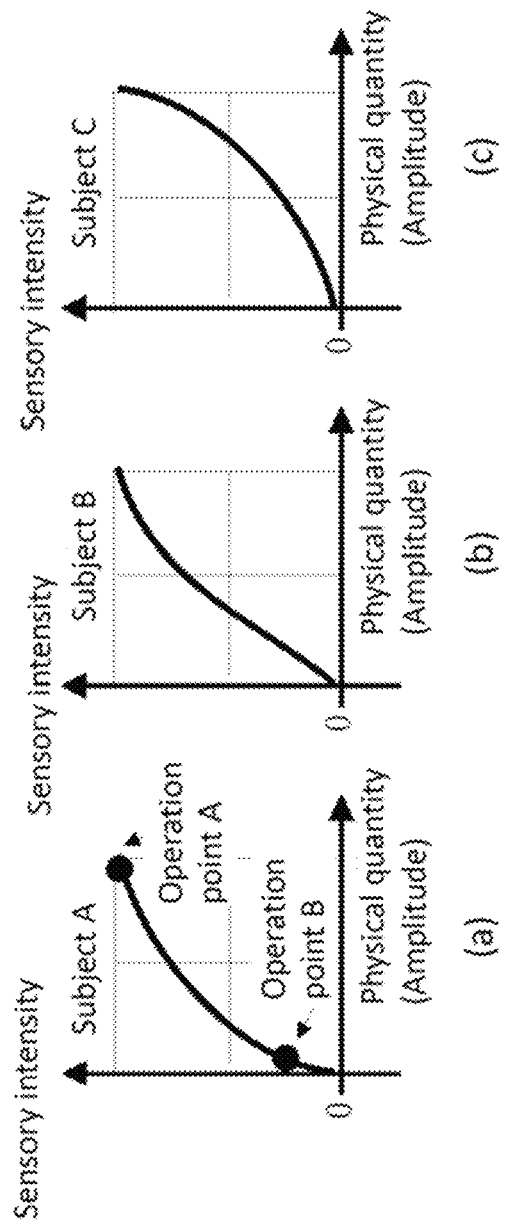
FIG. 38 Individual difference of sensory characteristic

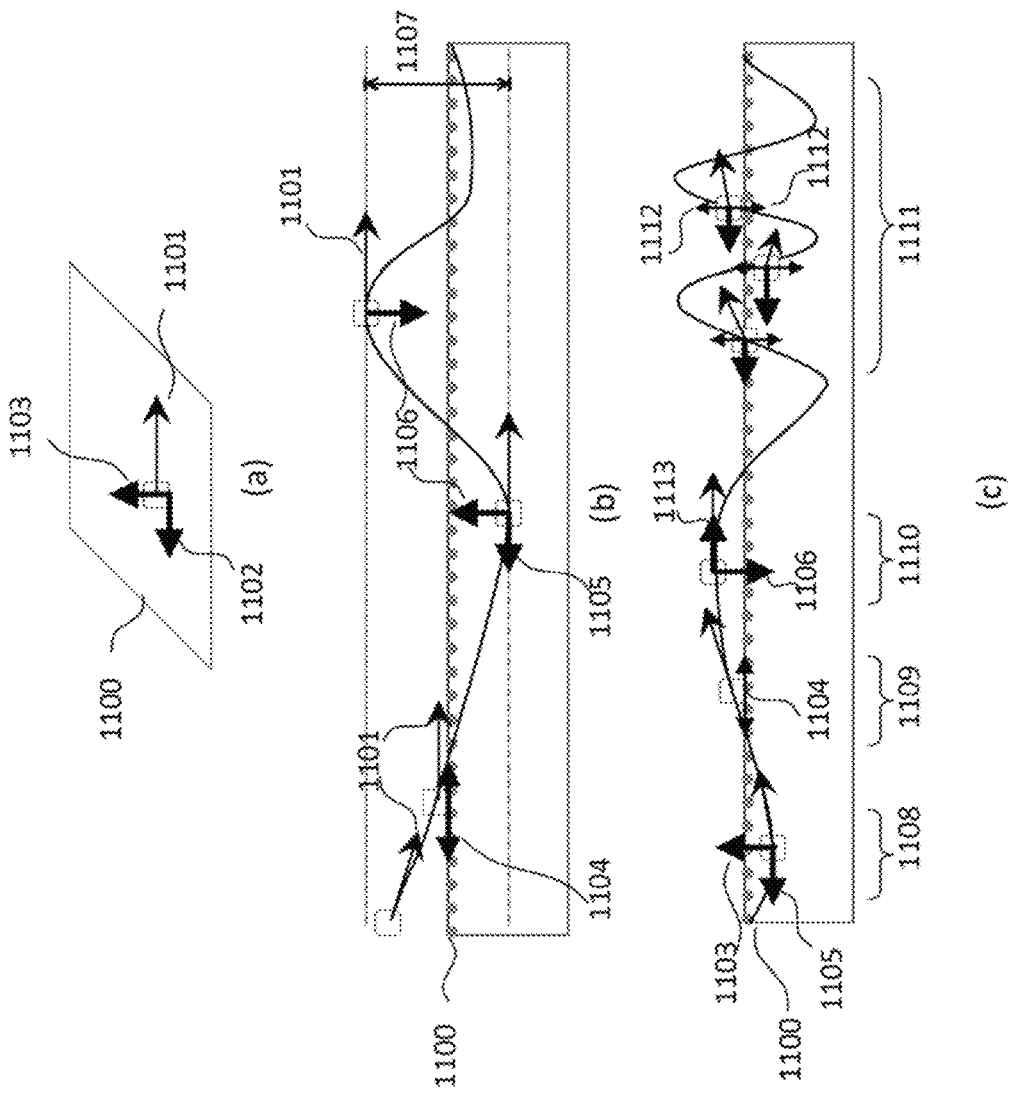
FIG. 39 Control method

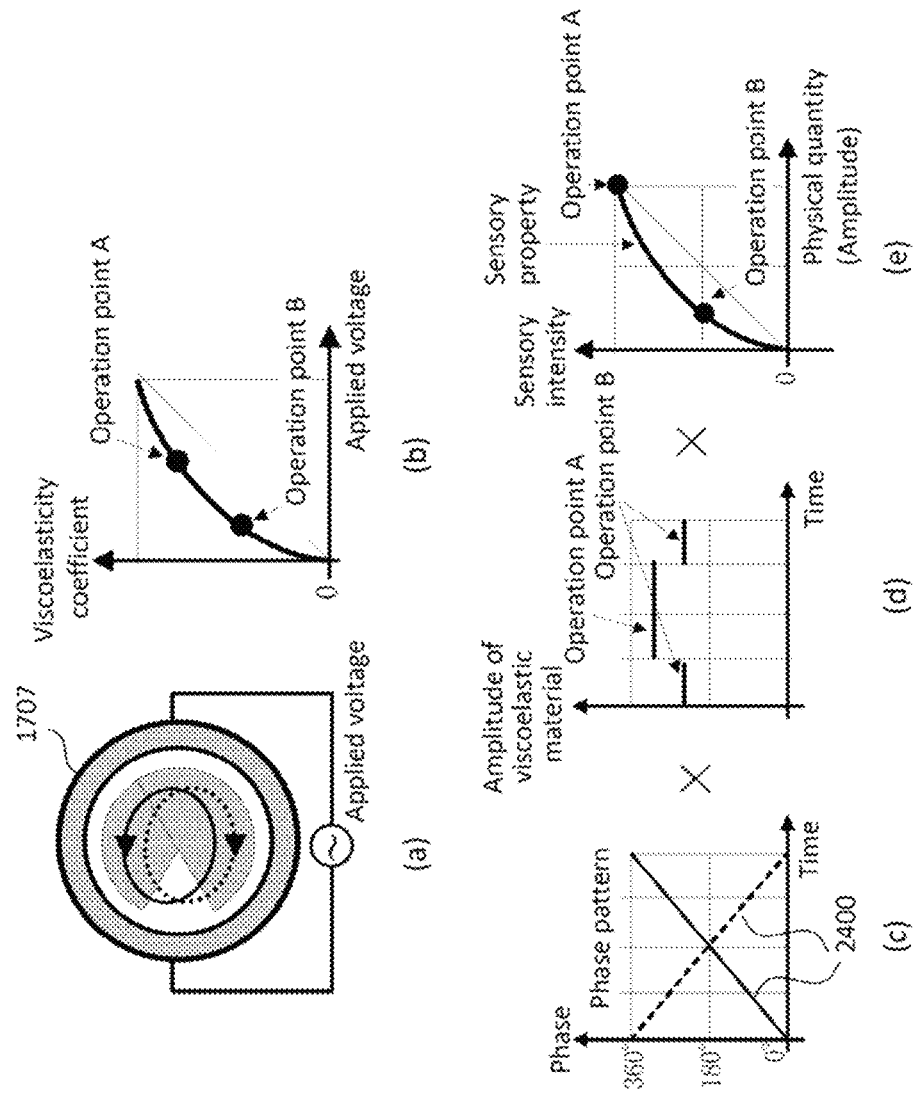
FIG. 40 Nonlinear control of physical property

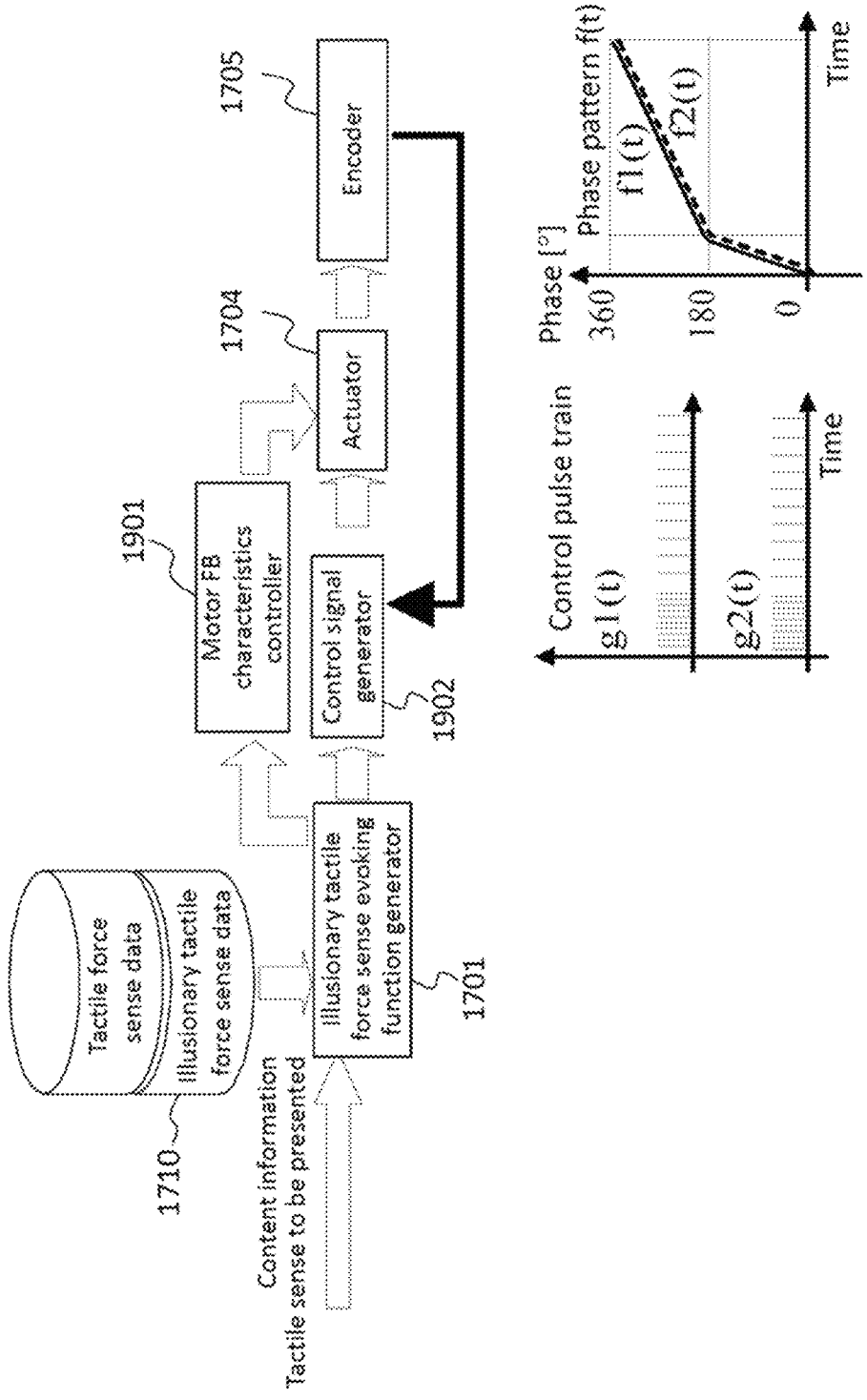
FIG. 41 Example of an actuator (Eccentric motor)

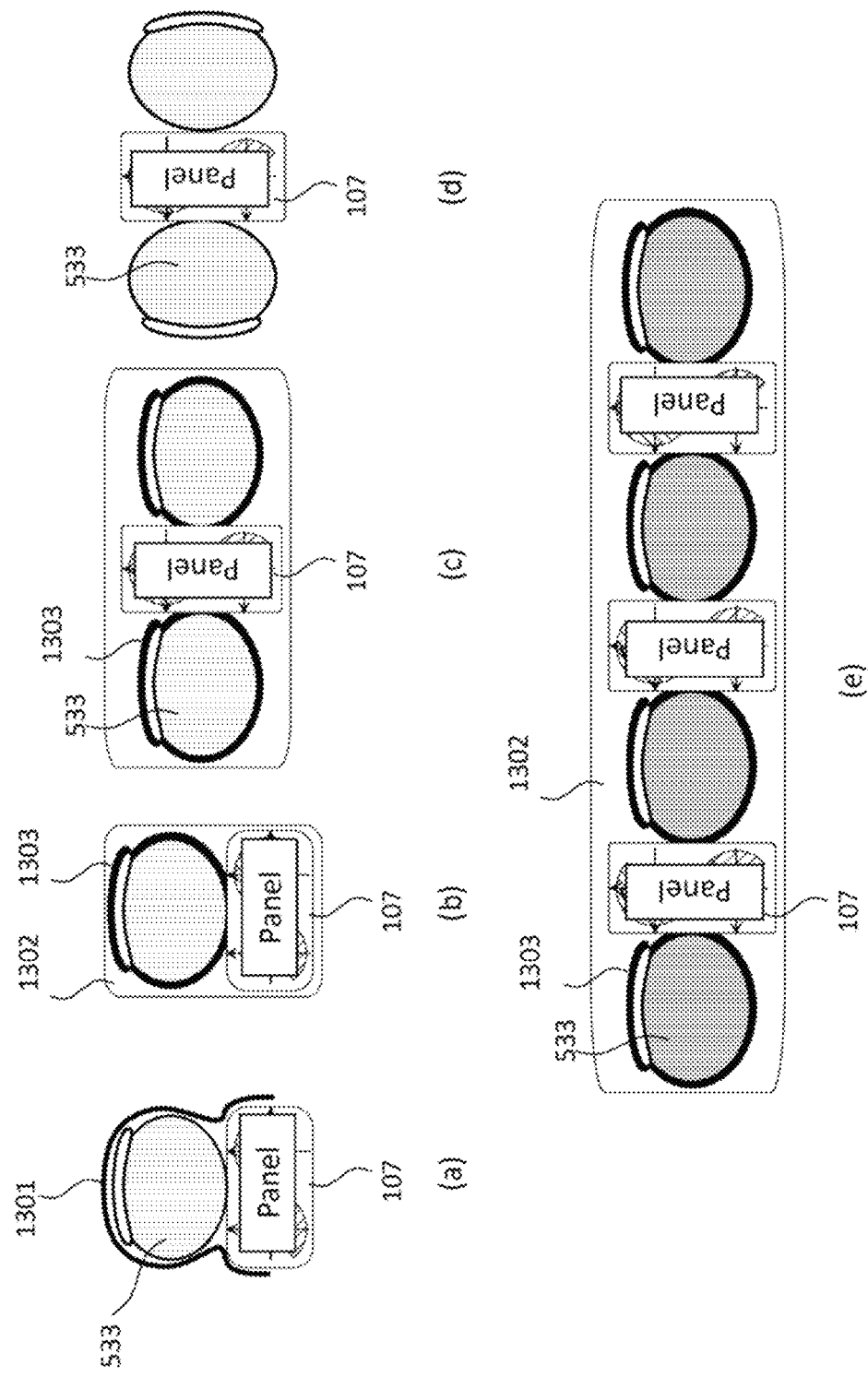
FIG. 42 Examples of installation method (for installing Panel on fingertip)

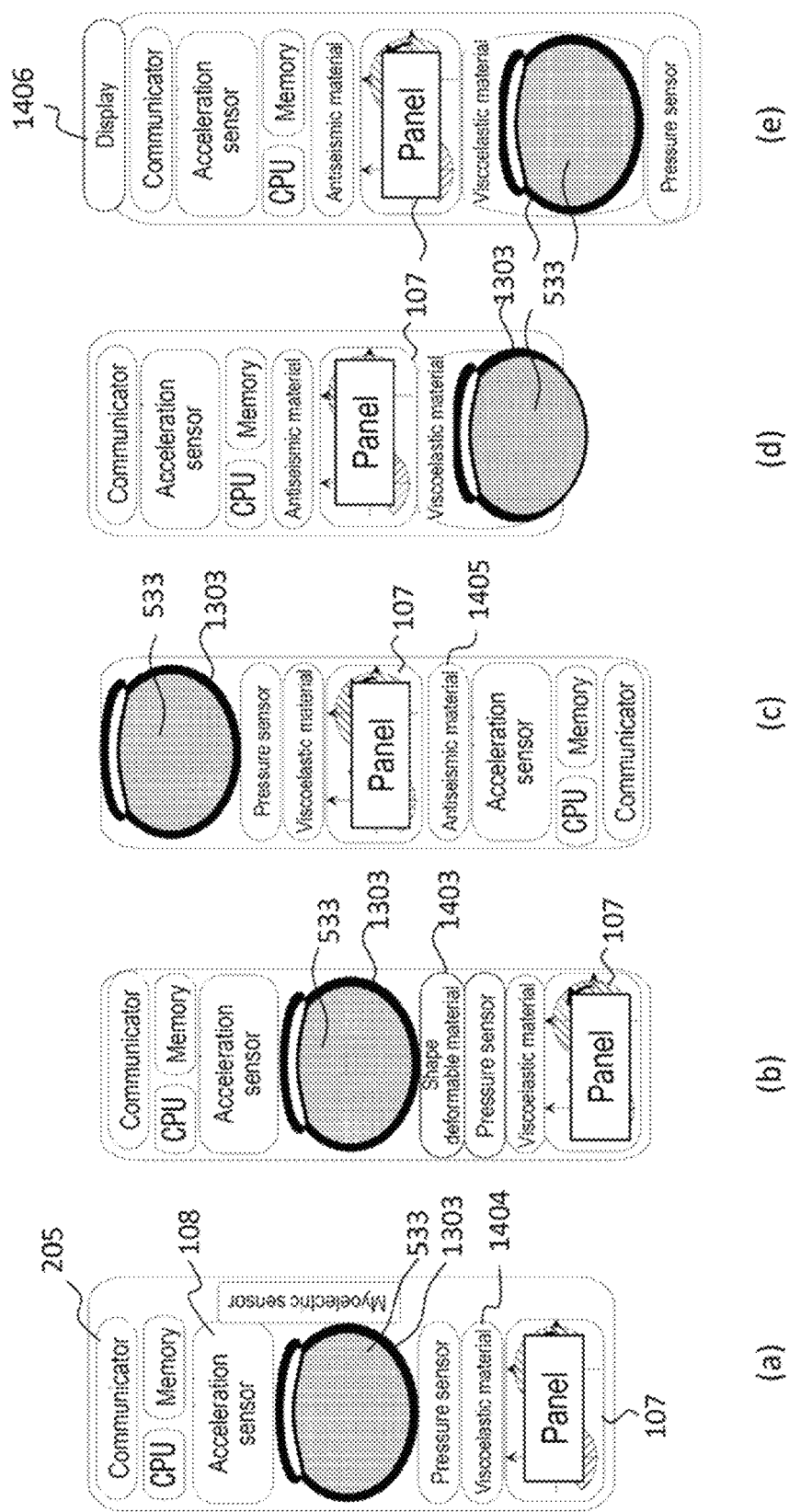
FIG. 43 Configurations and examples of installation method

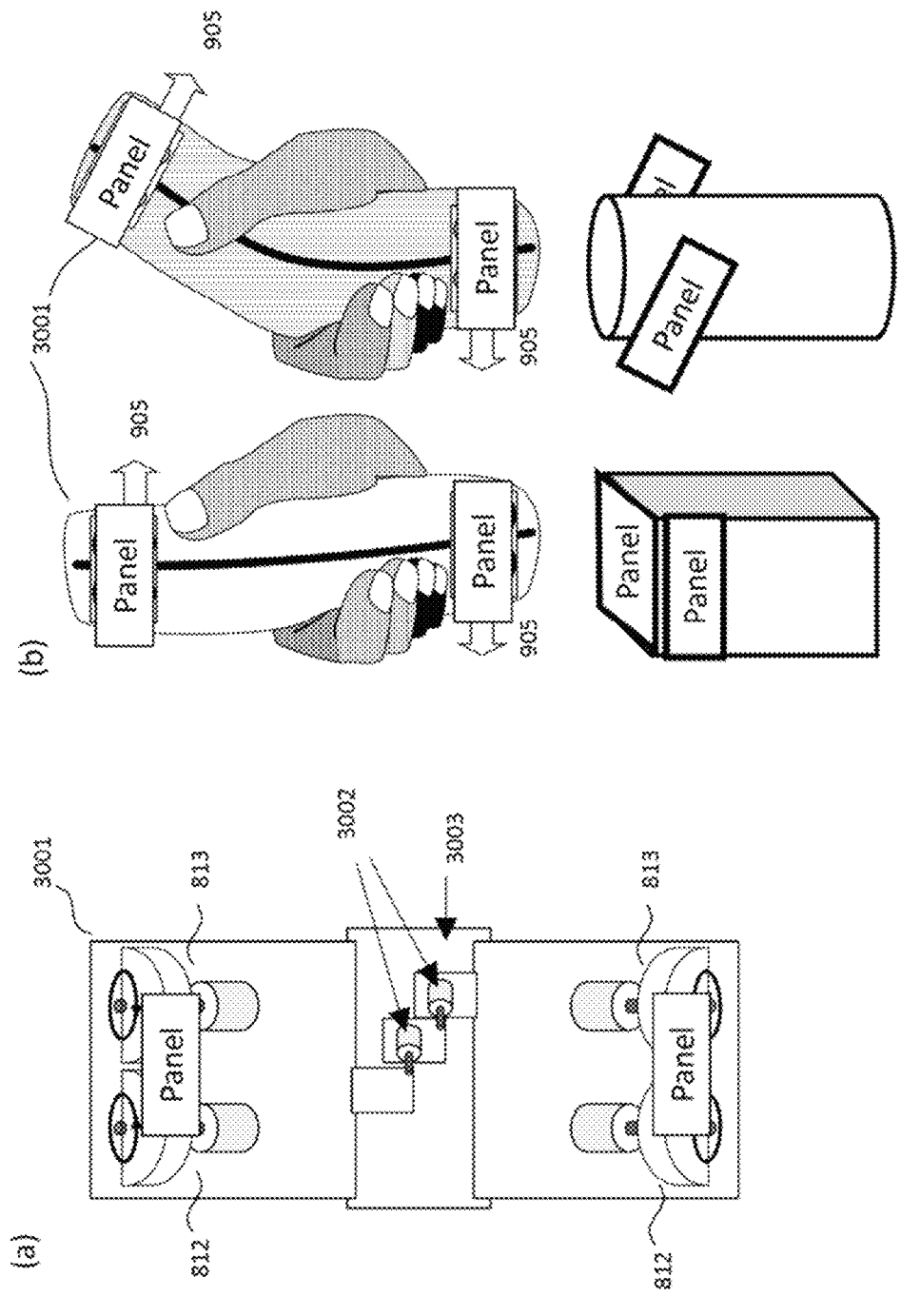
FIG. 44 Installation method (Grip type and variation)

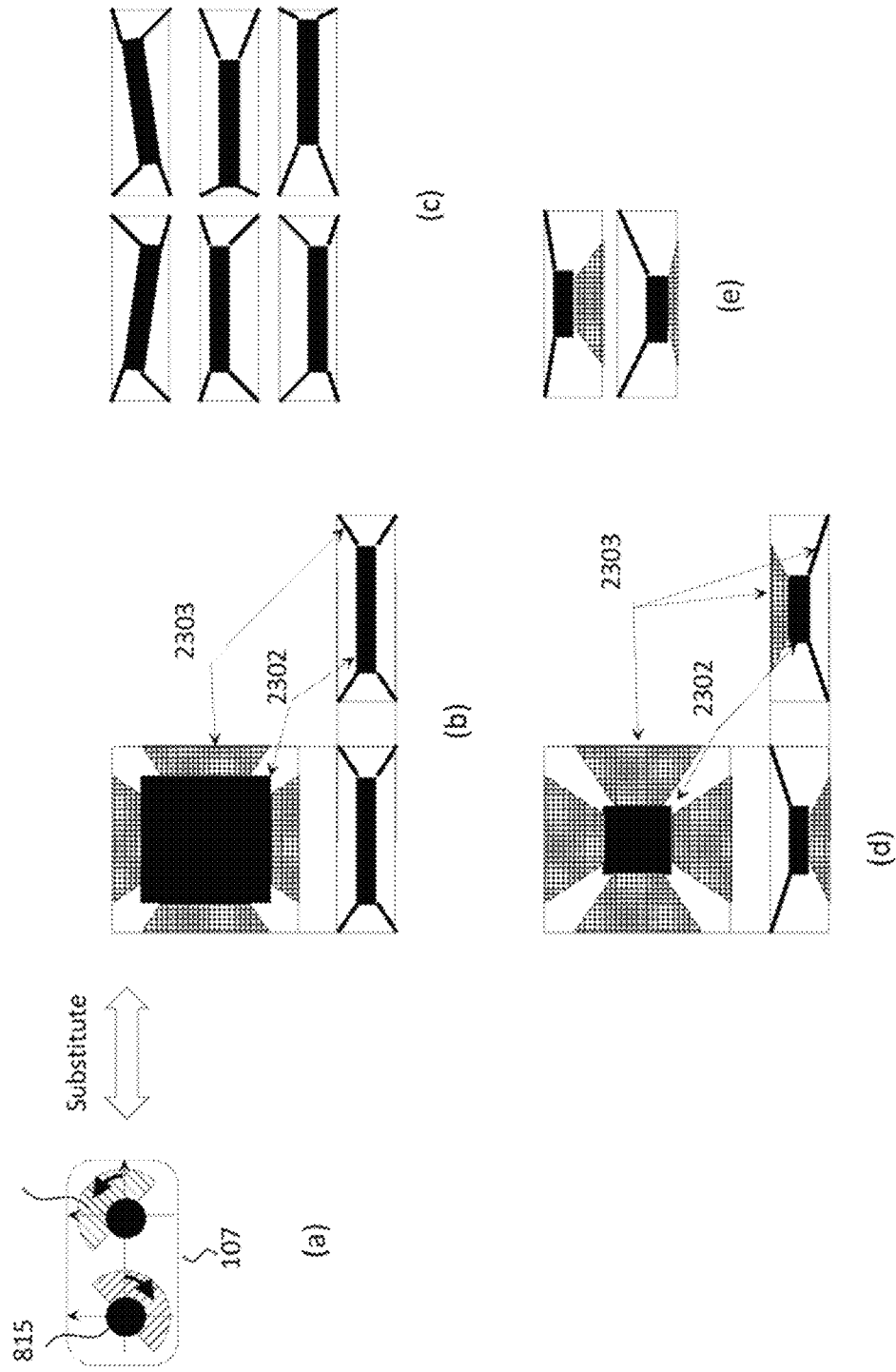
FIG. 45 Example of actuator (Artificial muscle)

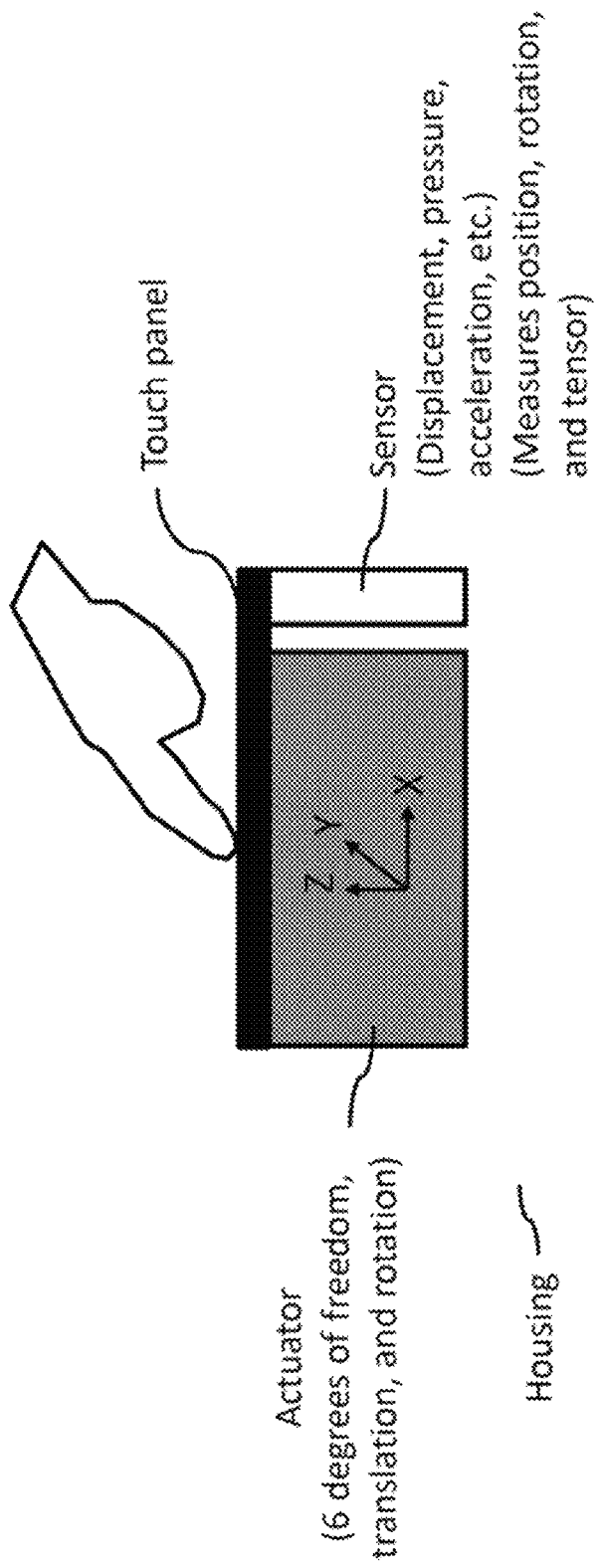
FIG. 46 Haptic Actuator Element Unit

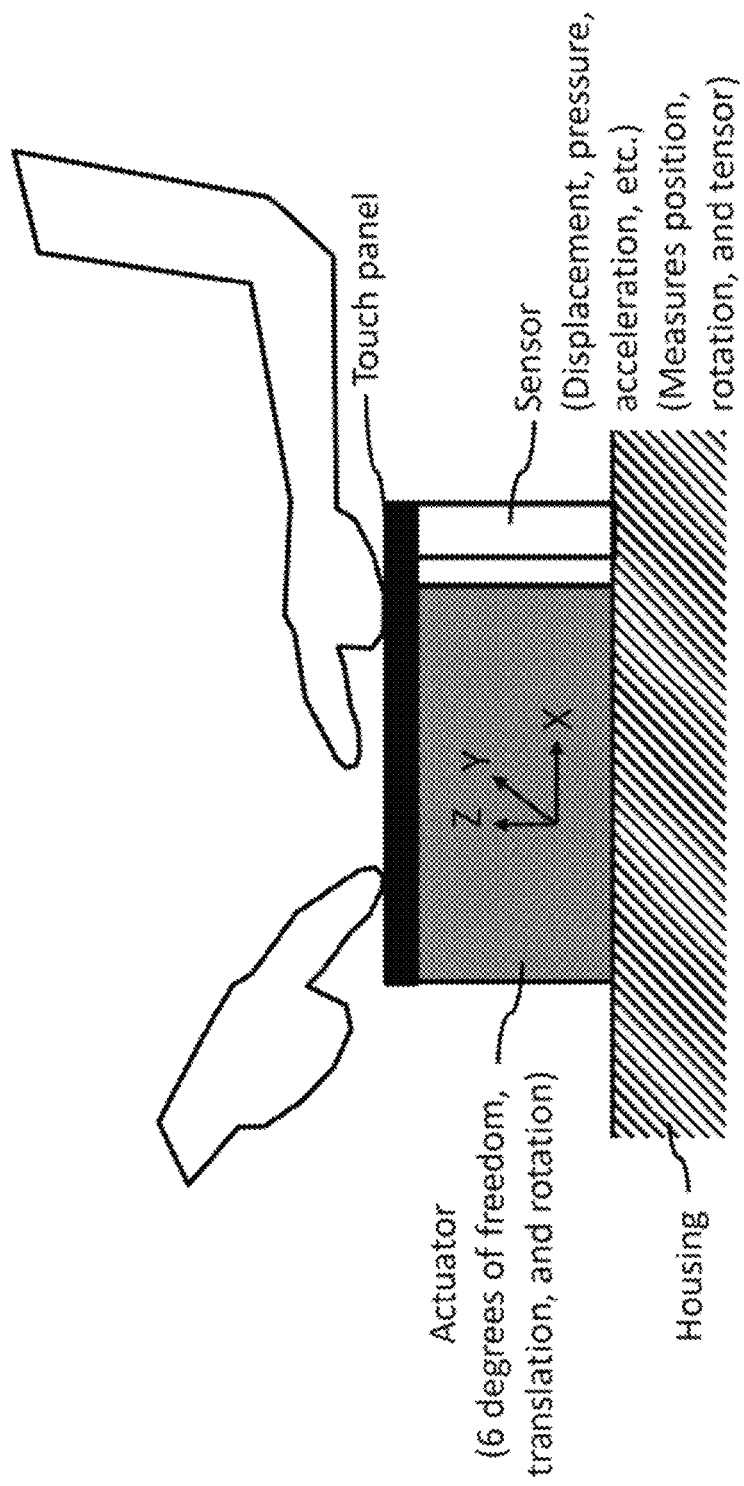
FIG. 47 Table type

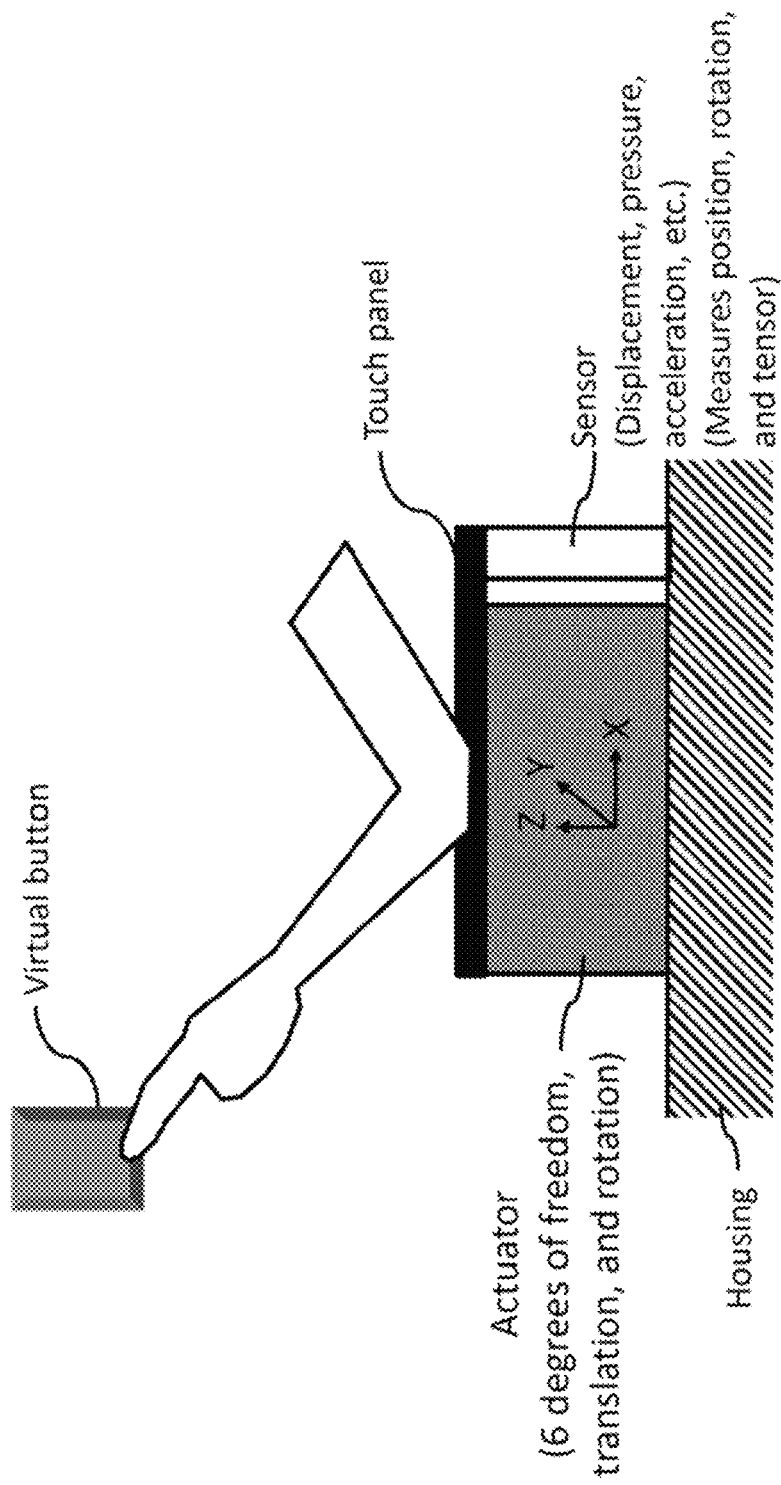

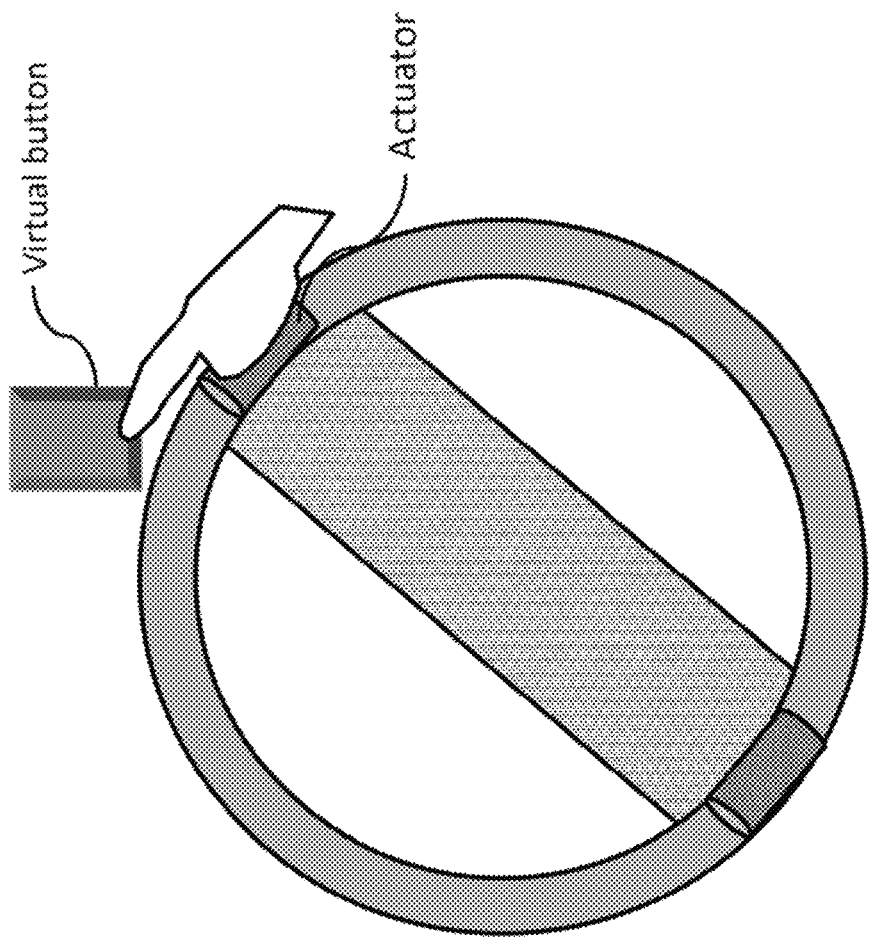
FIG. 49 Handle type

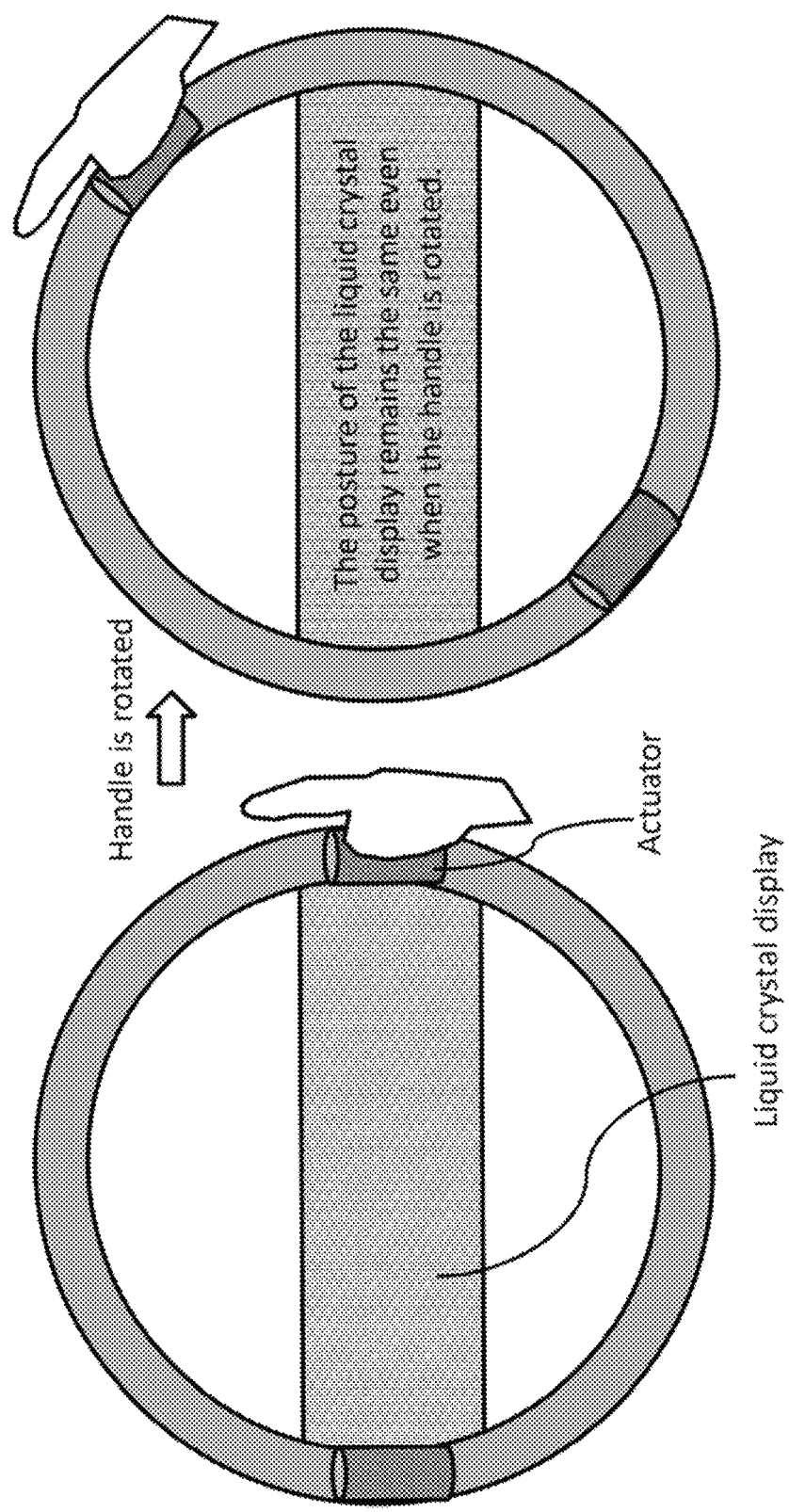
FIG. 50 Handle type

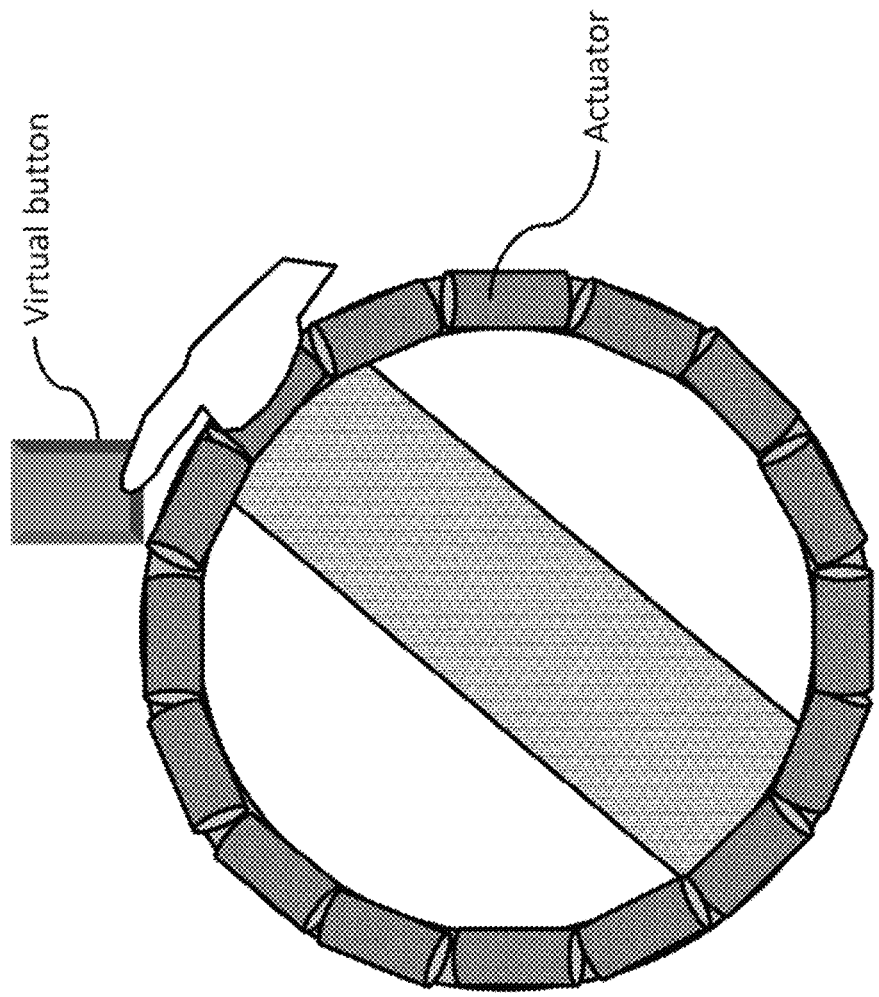
FIG. 51 Handle type

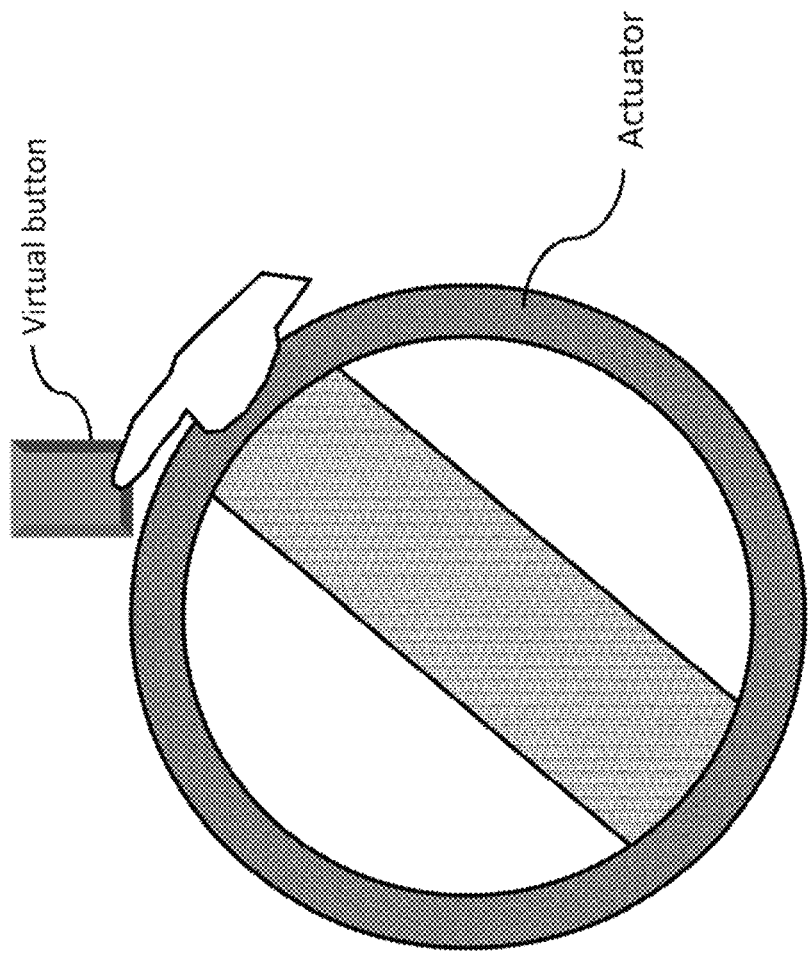
FIG. 52 Handle type

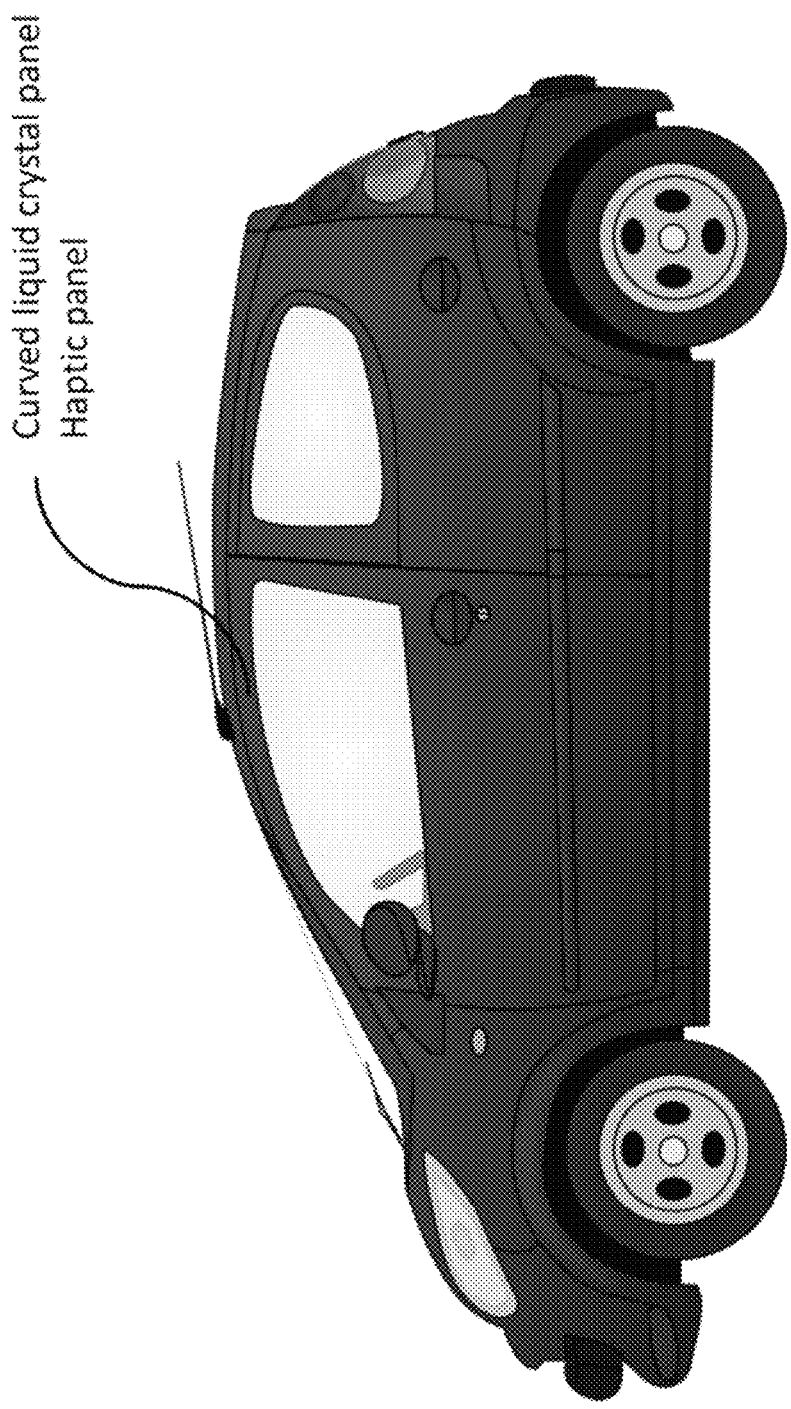
FIG. 53 Surface layer type

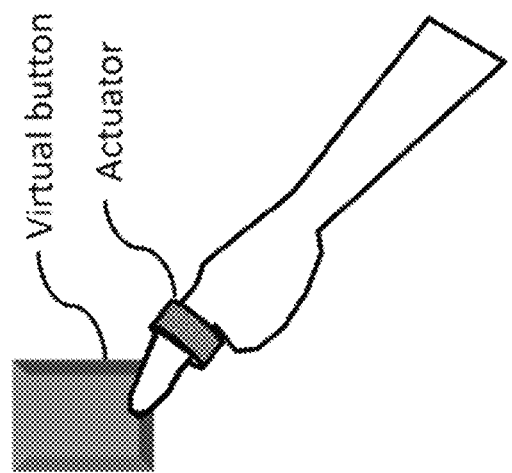
FIG. 54 Ring type

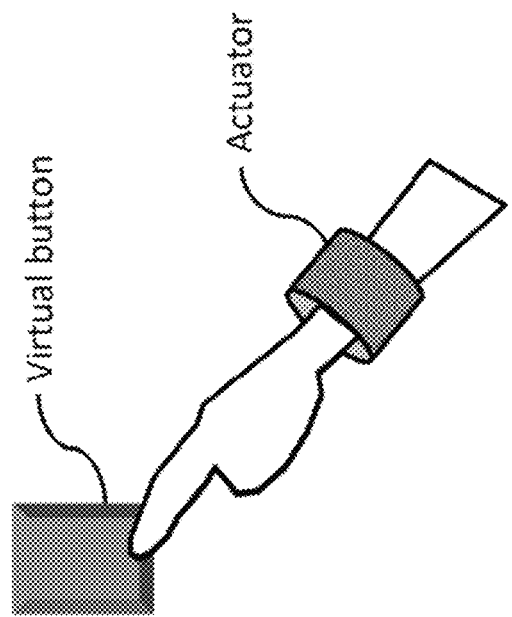
FIG. 55 Wrist band type

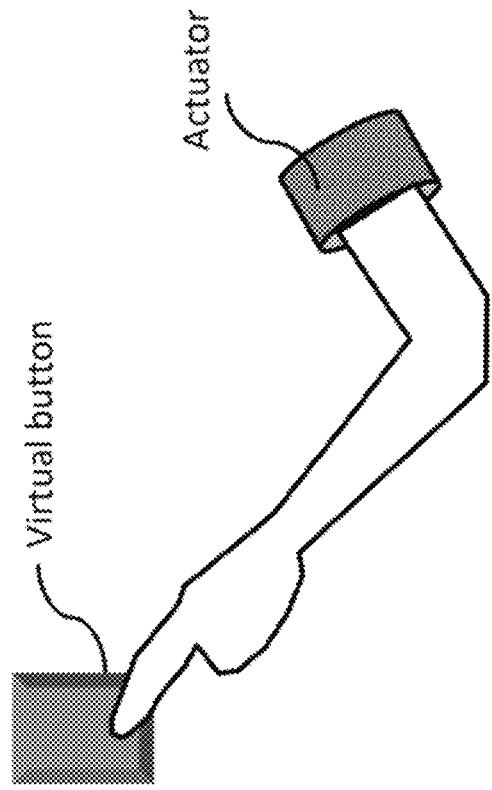
FIG. 56 Arm ring type

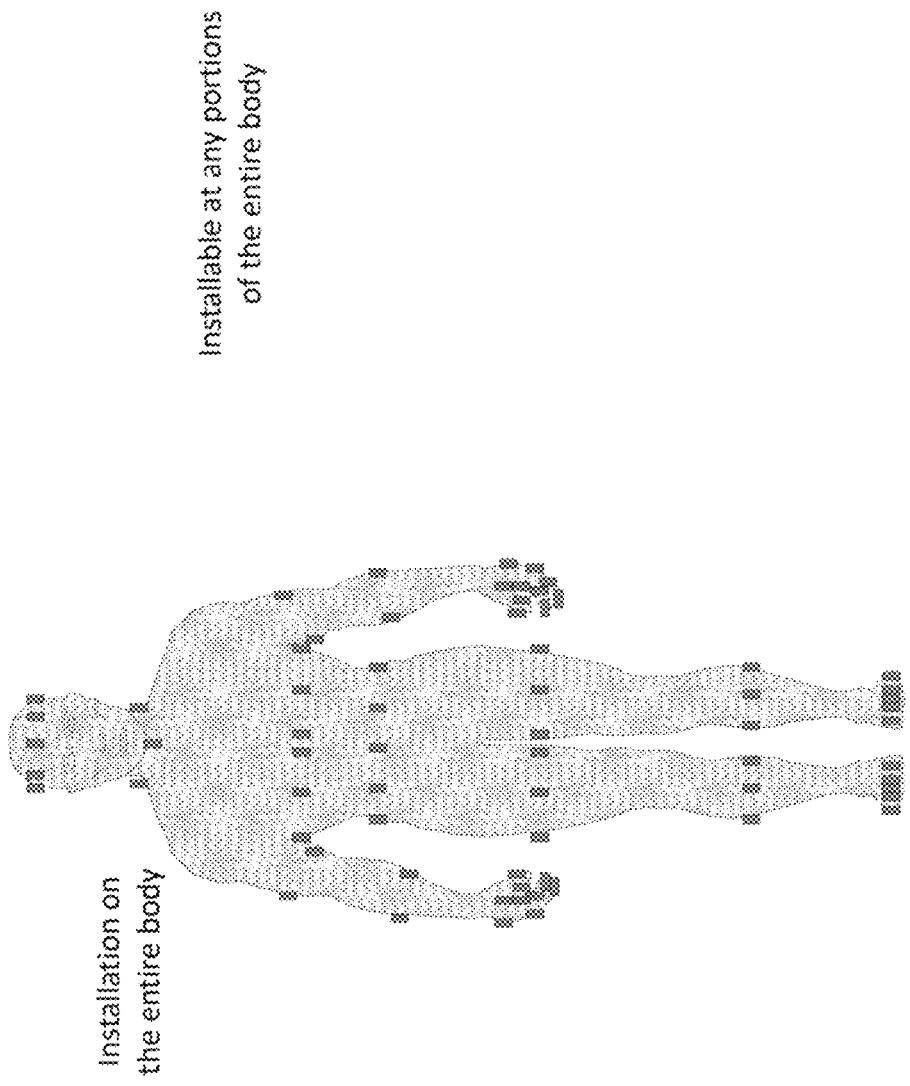
FIG. 57 Installation portions

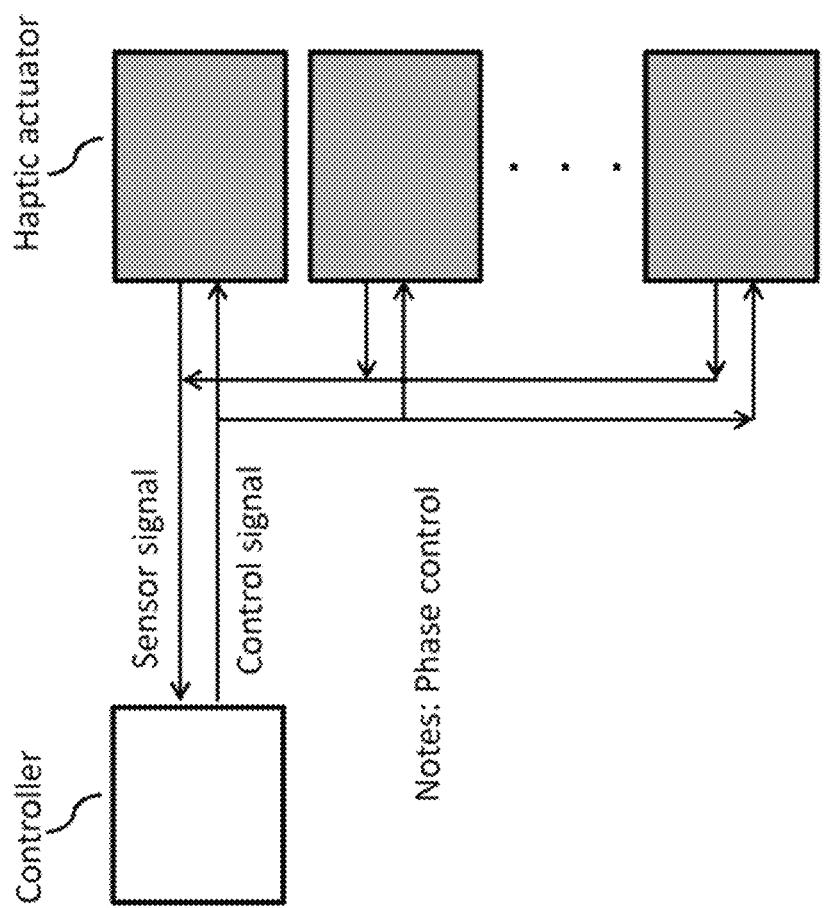
FIG. 58 Variation of control wires (Parallel arrangement)

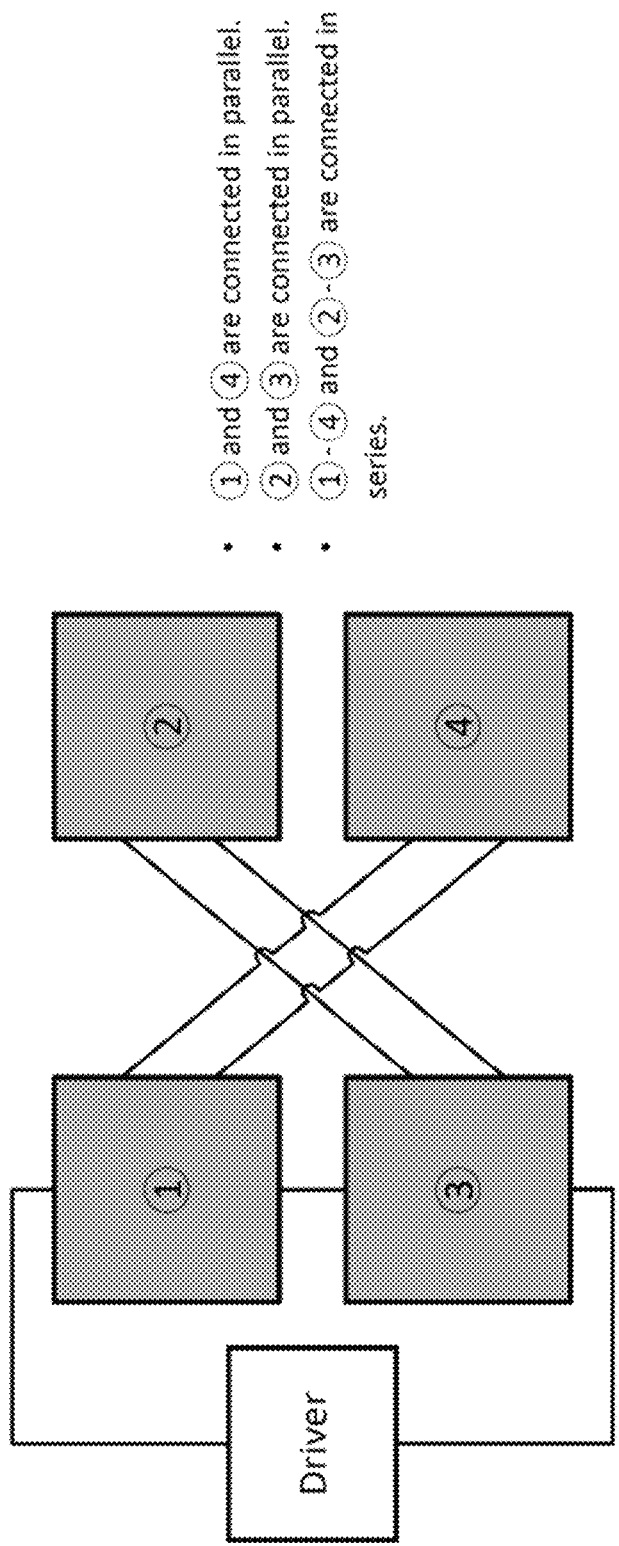
FIG. 59 Variation of control wires (Crossed arrangement)

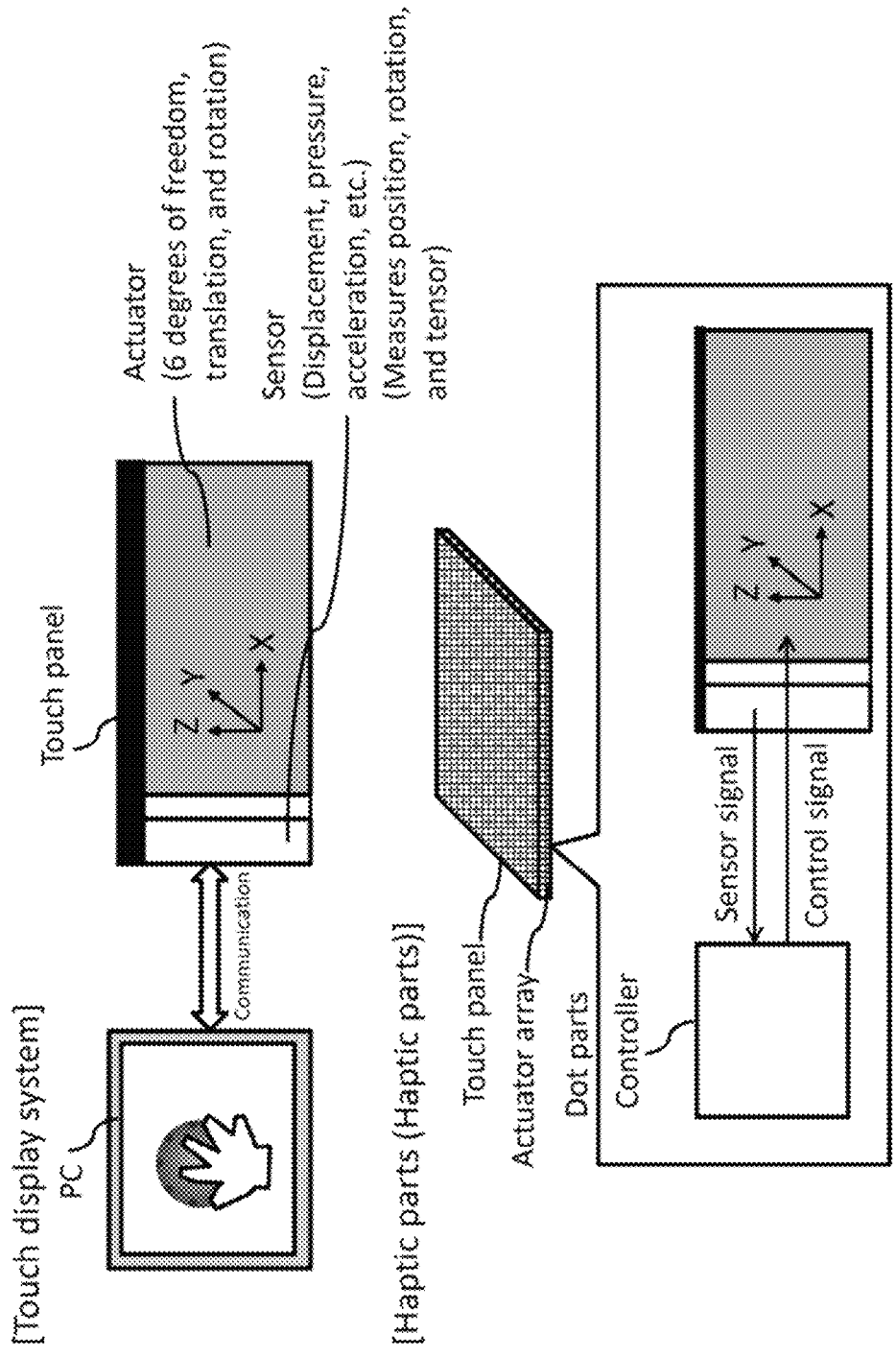
FIG. 60 System and parts

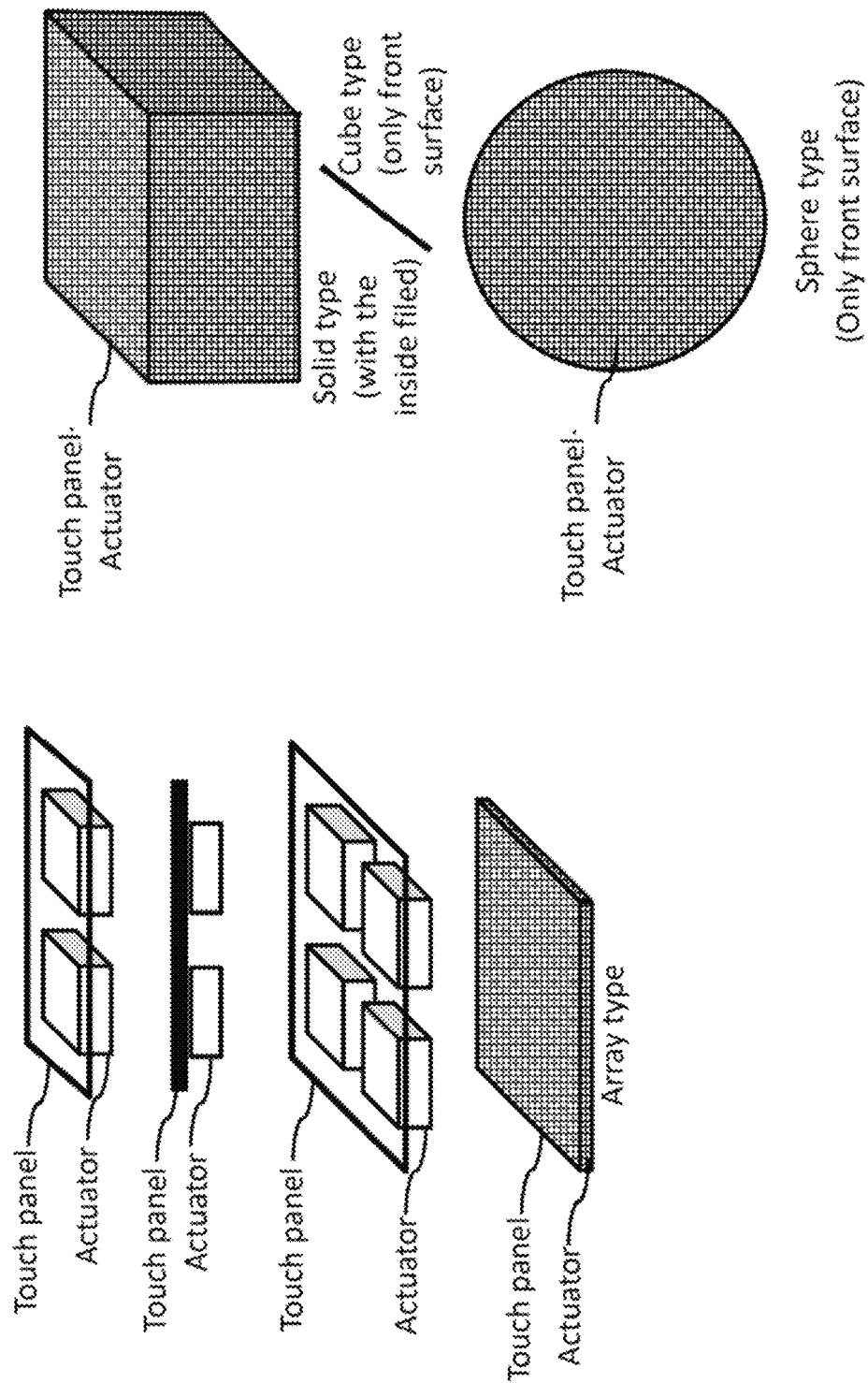
FIG. 61 Variation of module integration

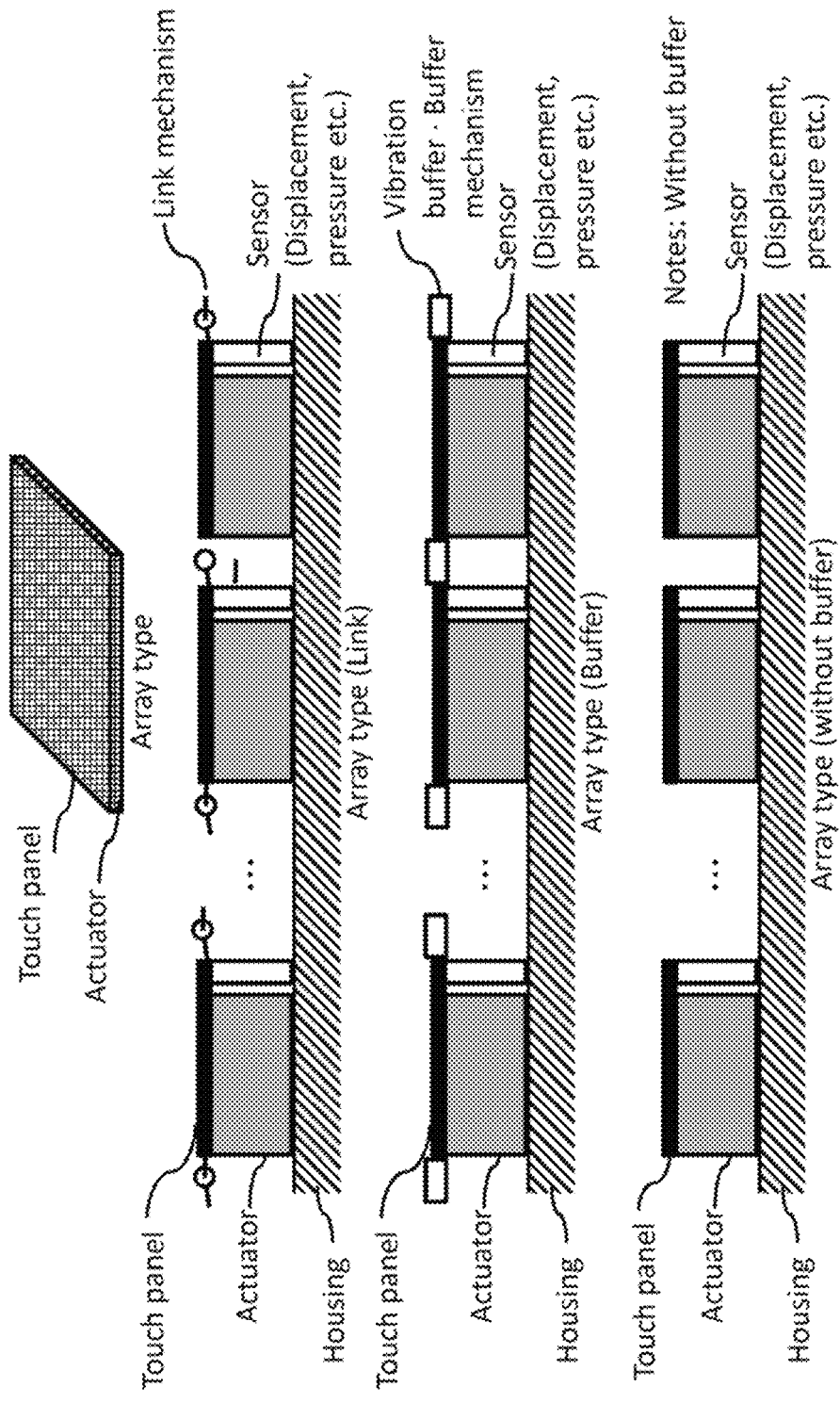
FIG. 62 Array type and module (Flat plane, free-form curved surface)

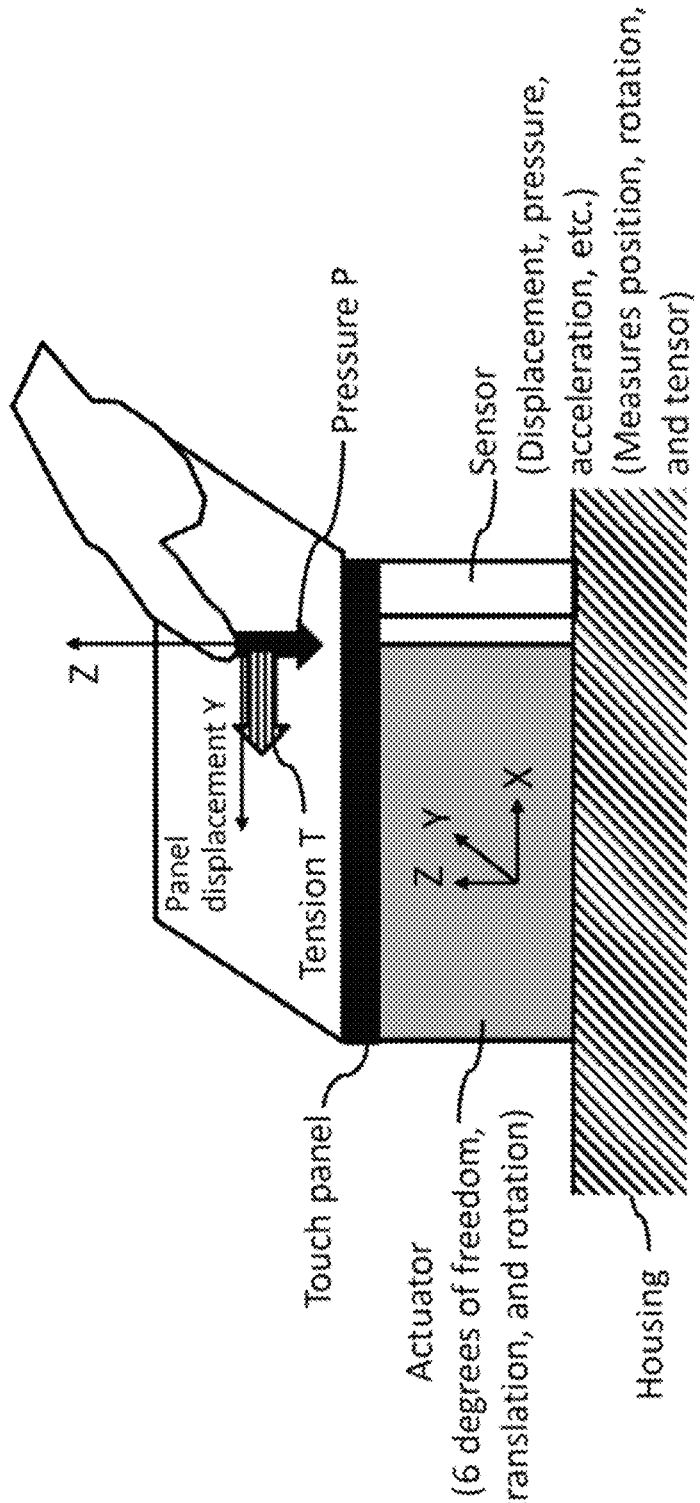
FIG. 63 Points of illusion phenomenon

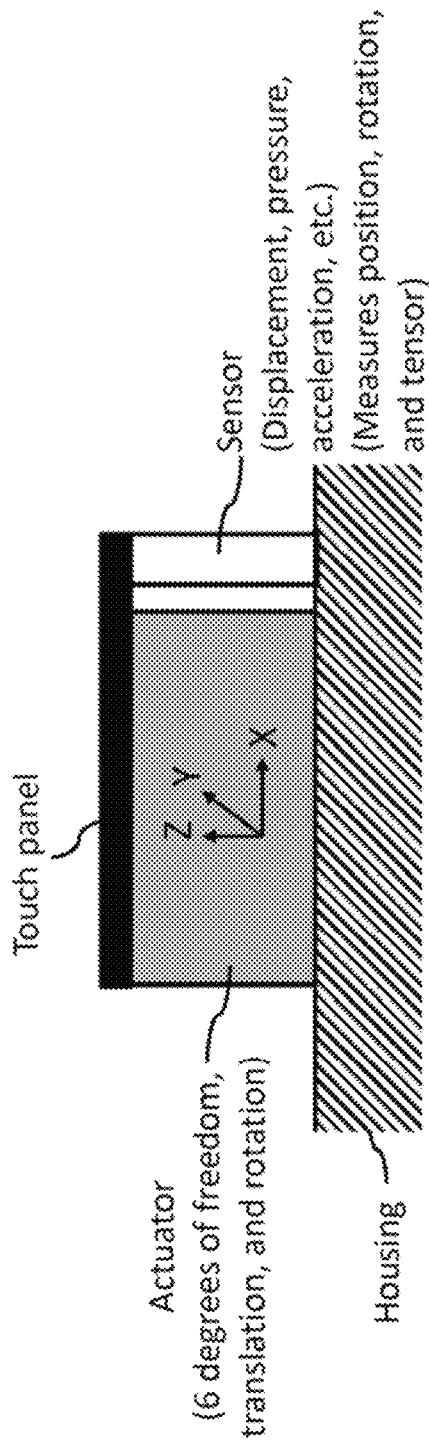
FIG. 64 Basic module of haptic device

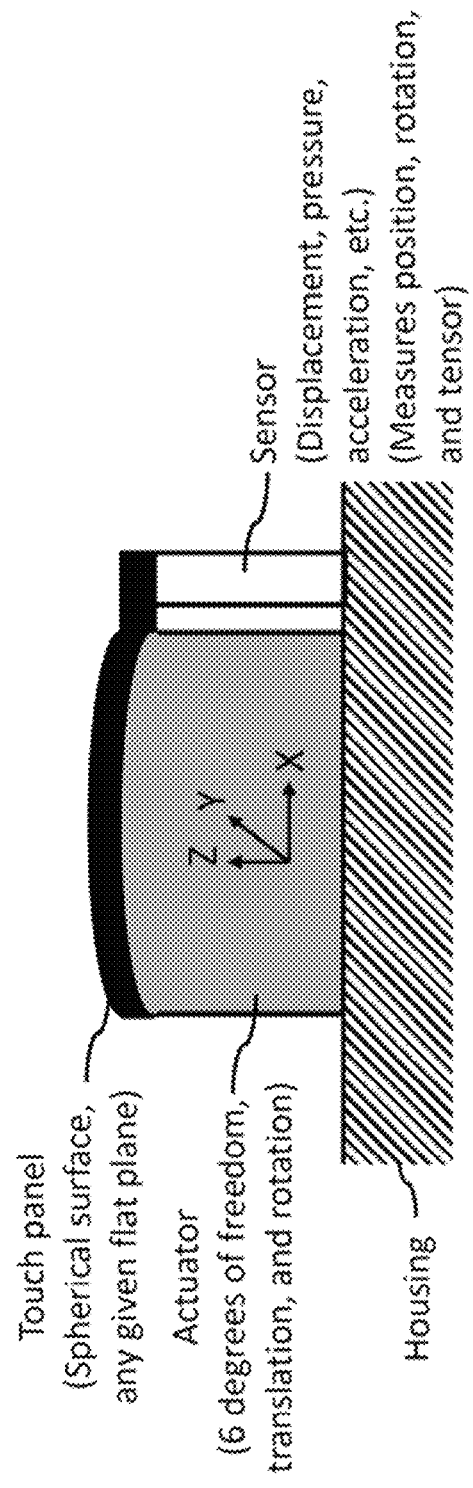
FIG. 65 Basic module of haptic device

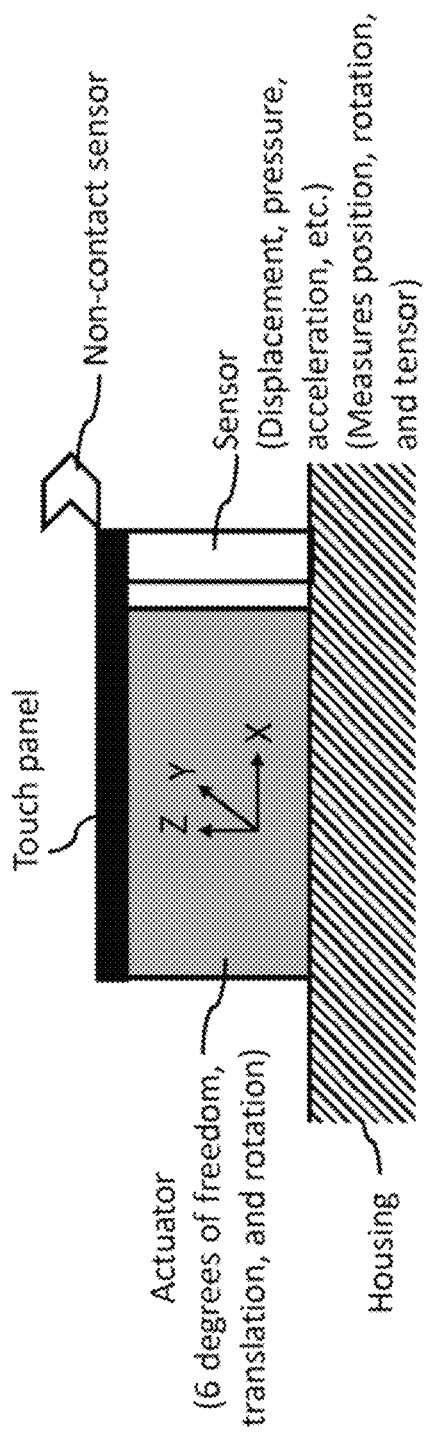
FIG. 66 Haptic device (Compatible with real time)

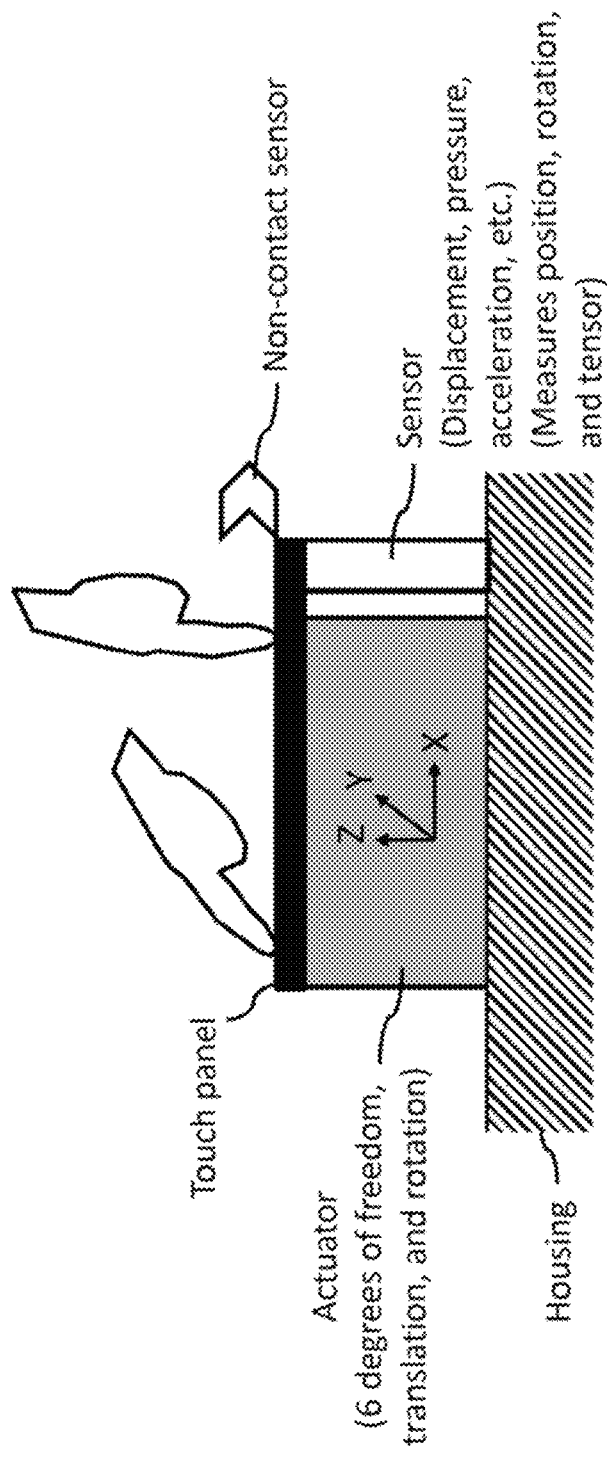
FIG. 67 Haptic device (Reflection of contact state)

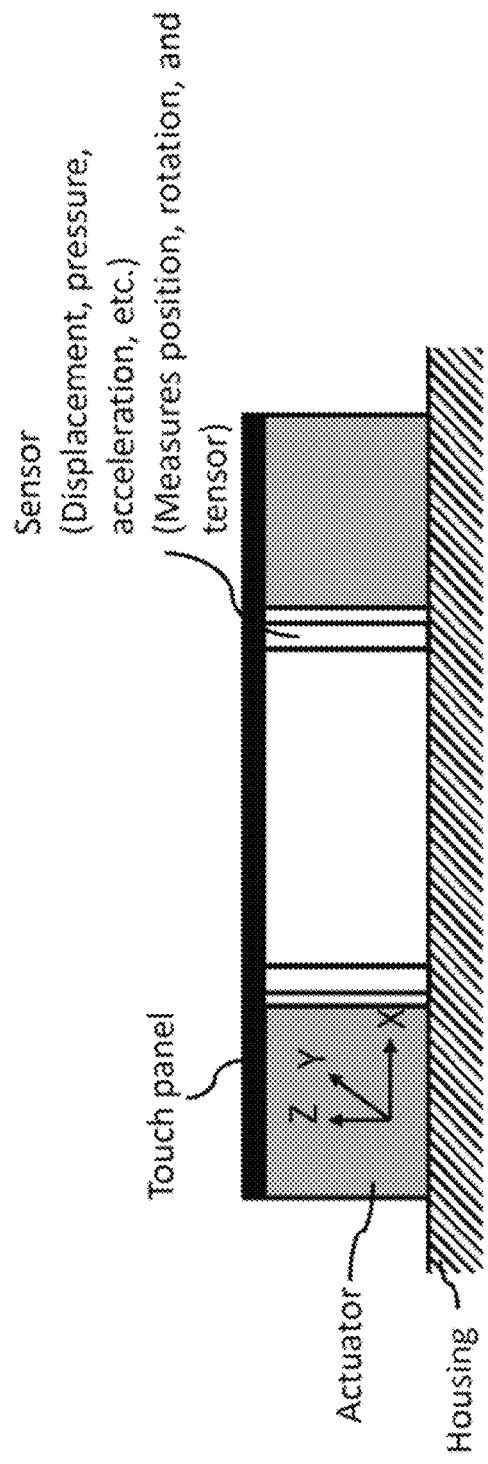
FIG. 68 Panel-type module

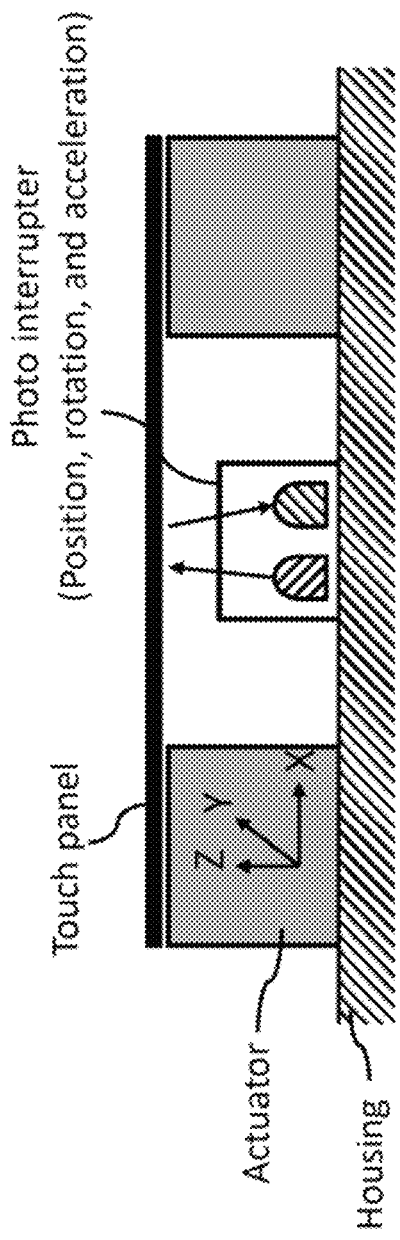
FIG. 69 Panel-type module (Photo interrupter)

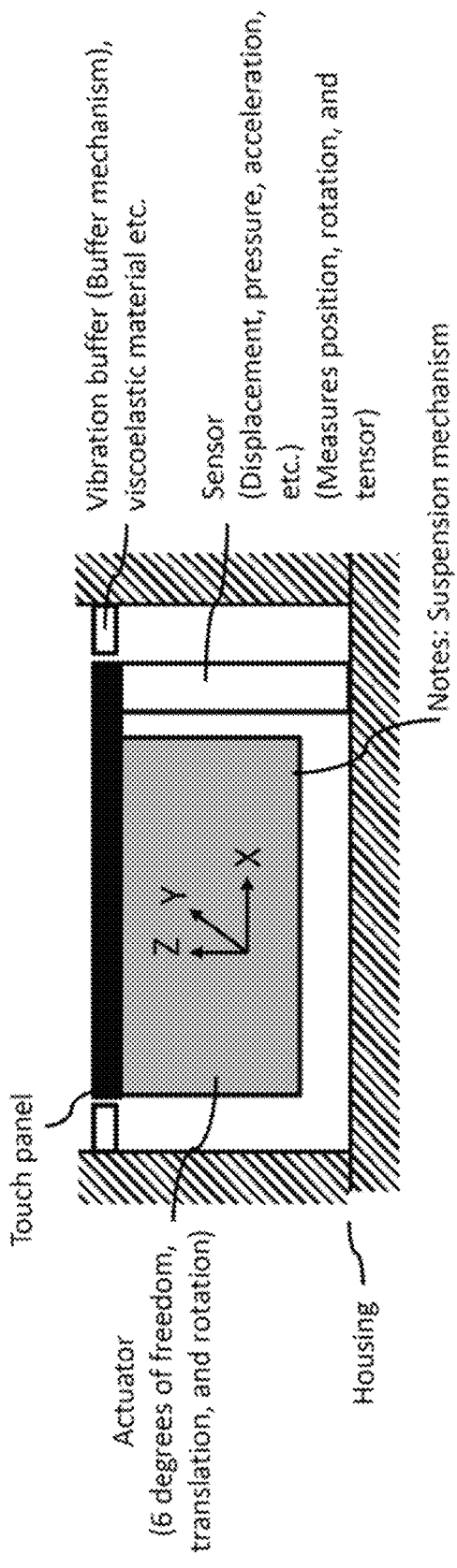
FIG. 70 Panel-type module (Suspended and isolated)

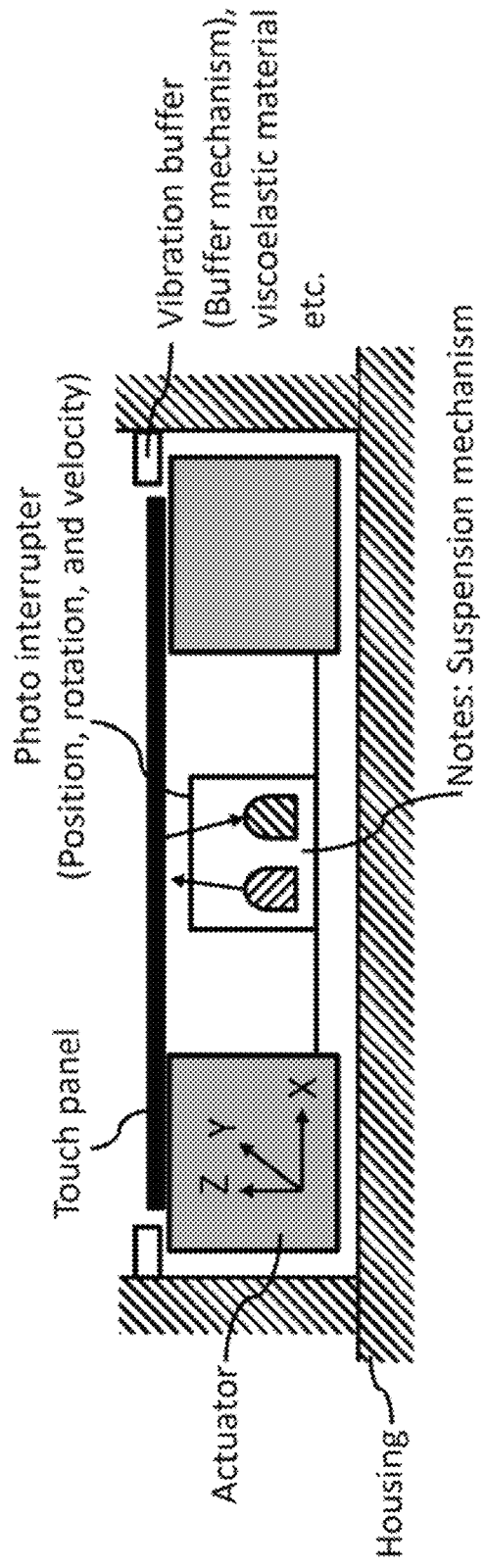
FIG. 71 Panel-type module (Suspended/isolated)

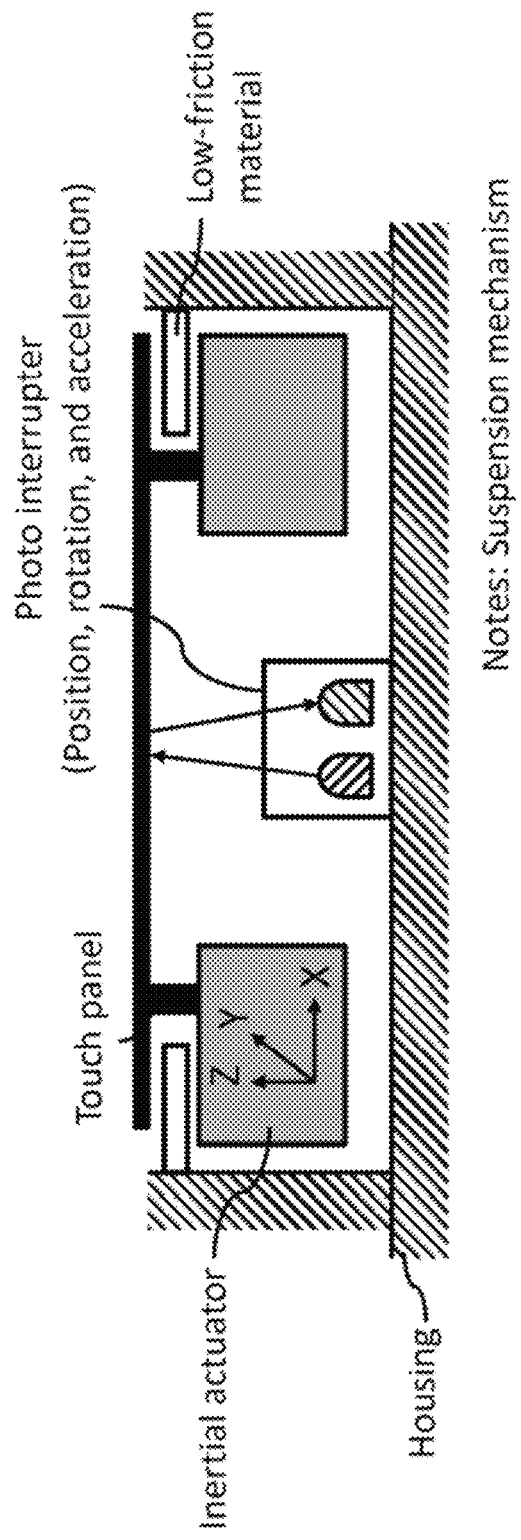
FIG. 72 Panel (Floating inertial actuator)

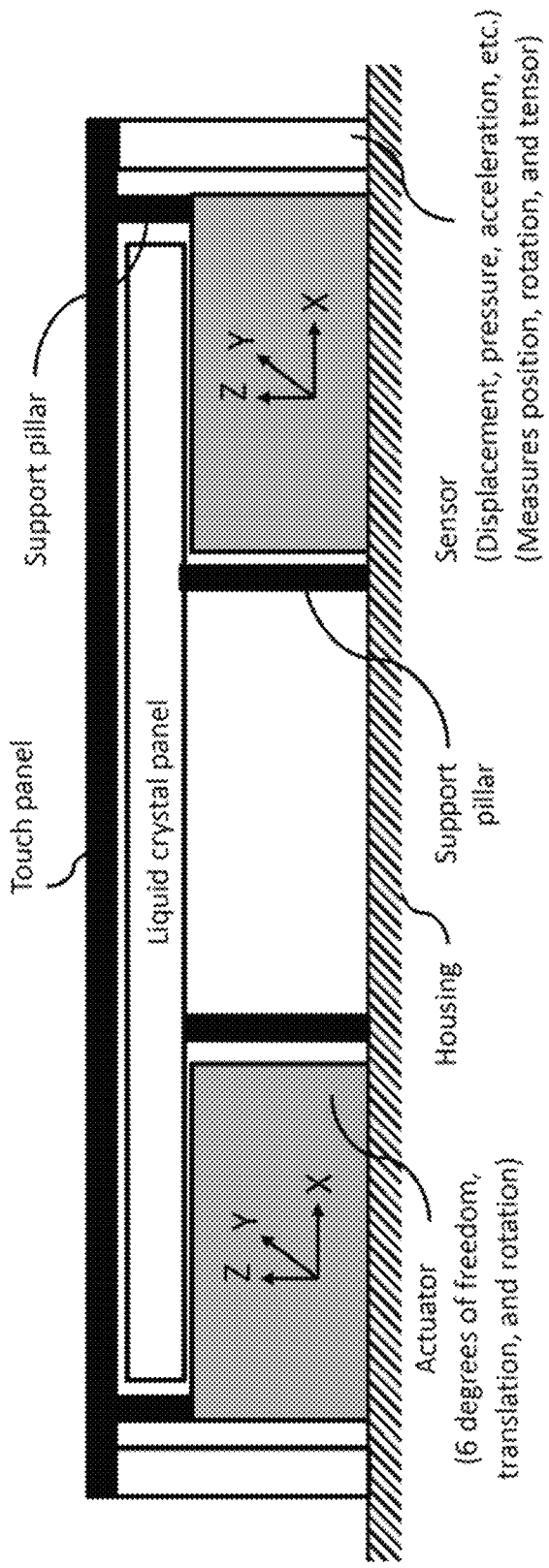
FIG. 73 Liquid crystal touch panel-type module

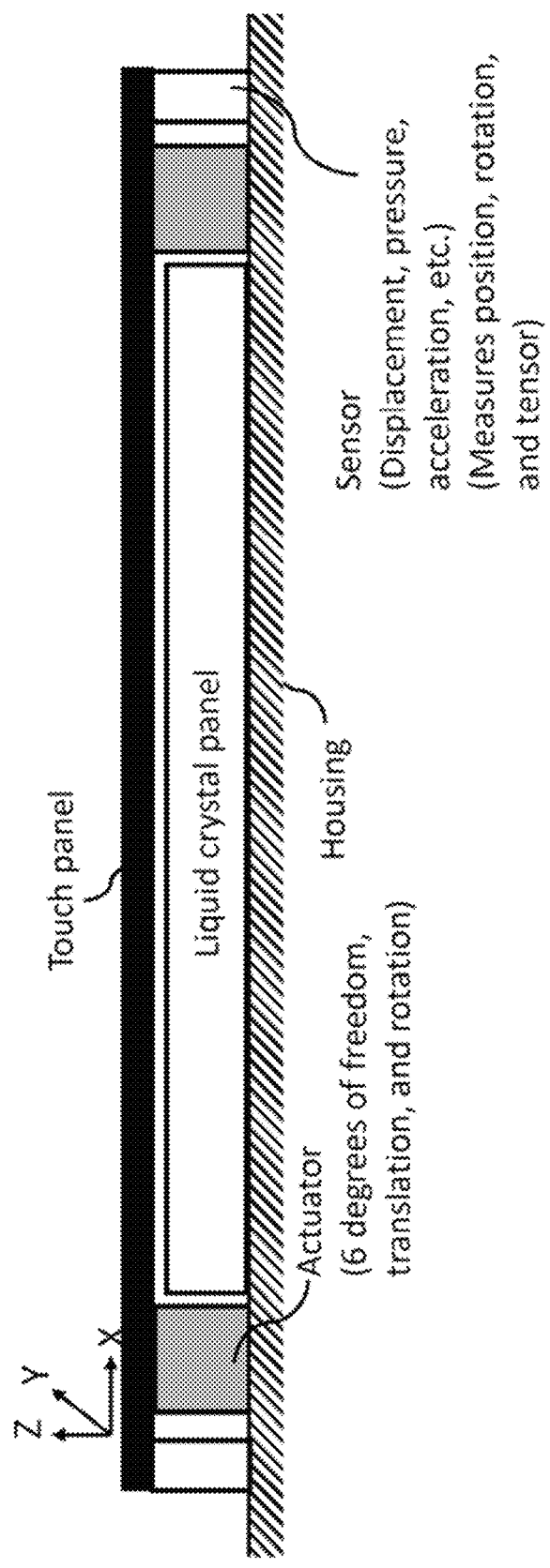
FIG. 74 Liquid crystal touch panel-type module (Thin type)

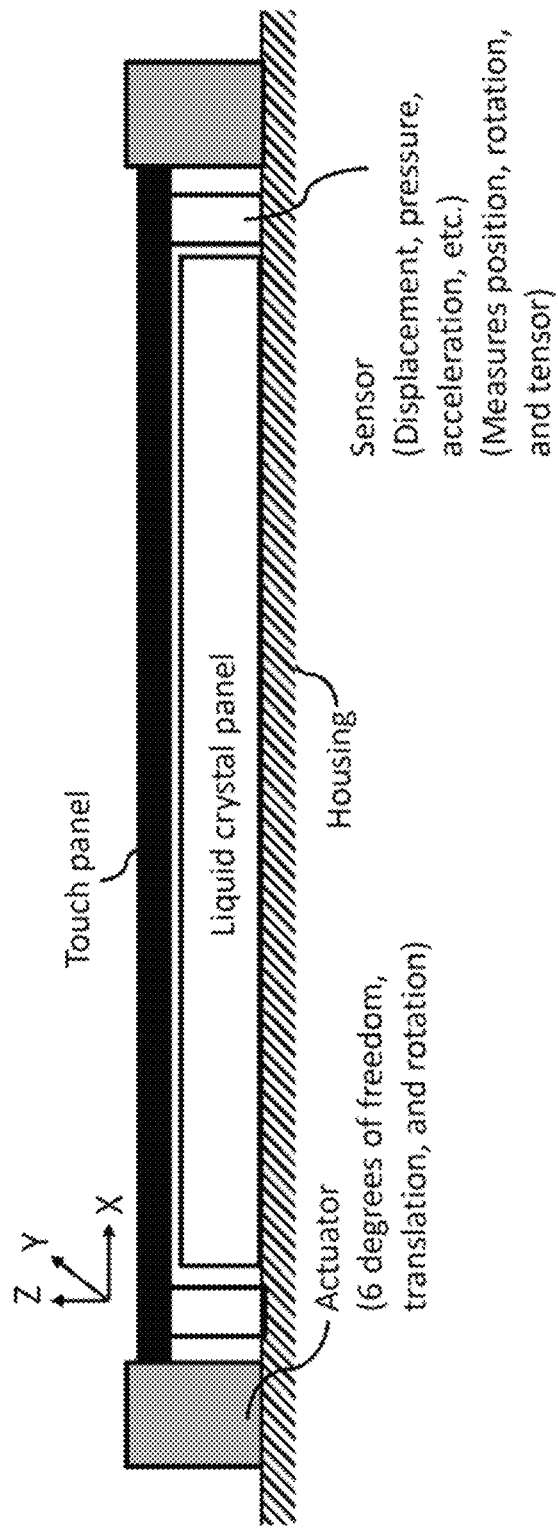
FIG. 75 Liquid crystal touch panel-type module (Thin type)

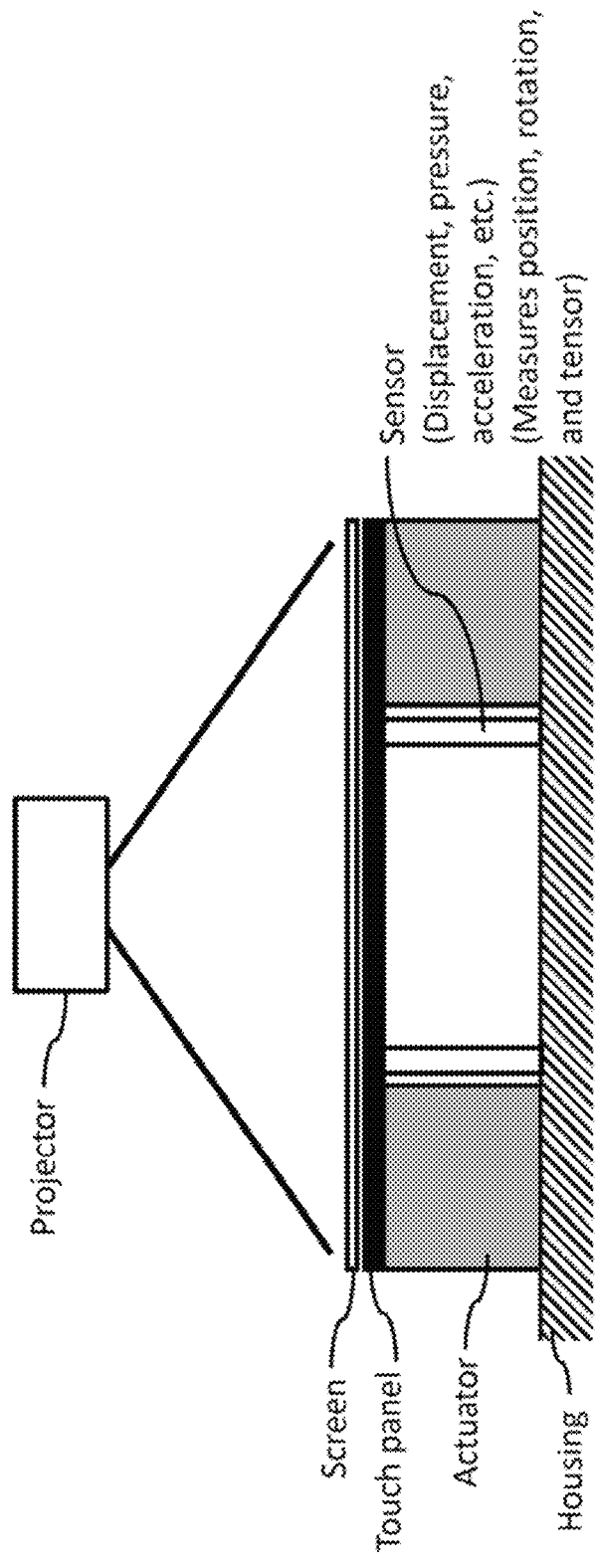
FIG. 76 Touch panel-type module (Projection)

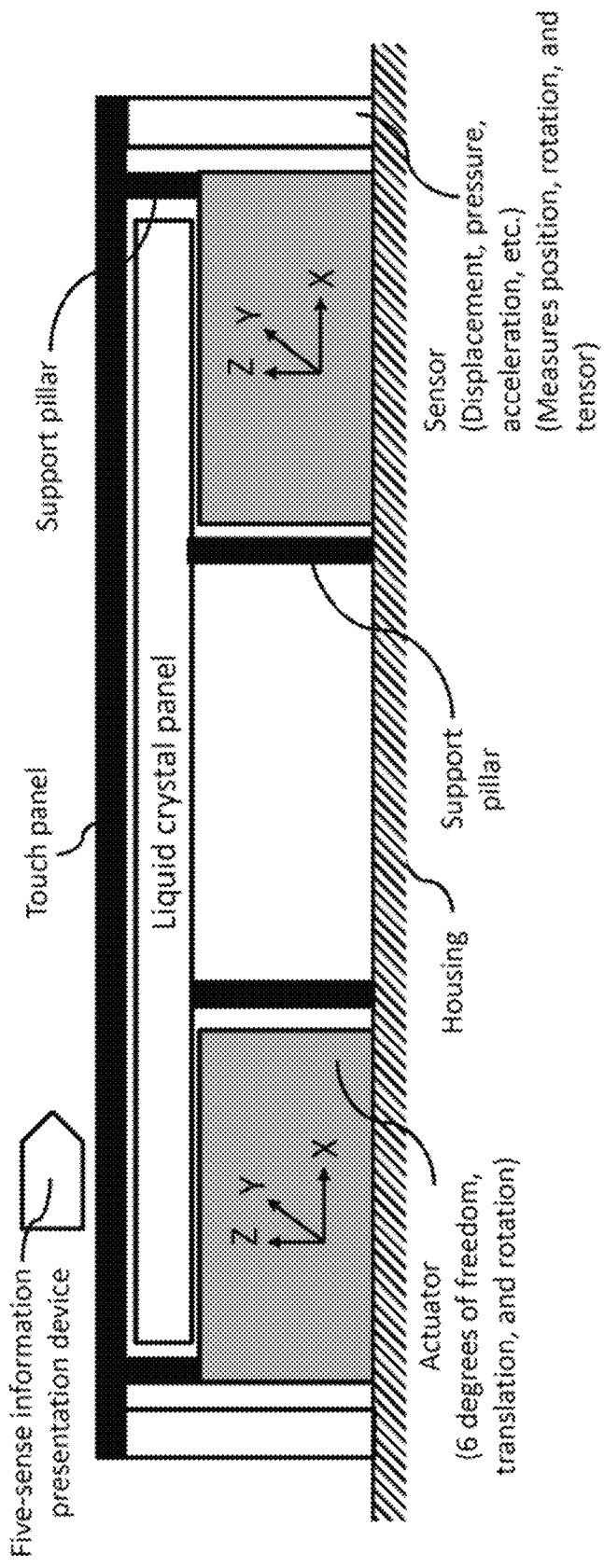
FIG. 77 Multi-modal effect

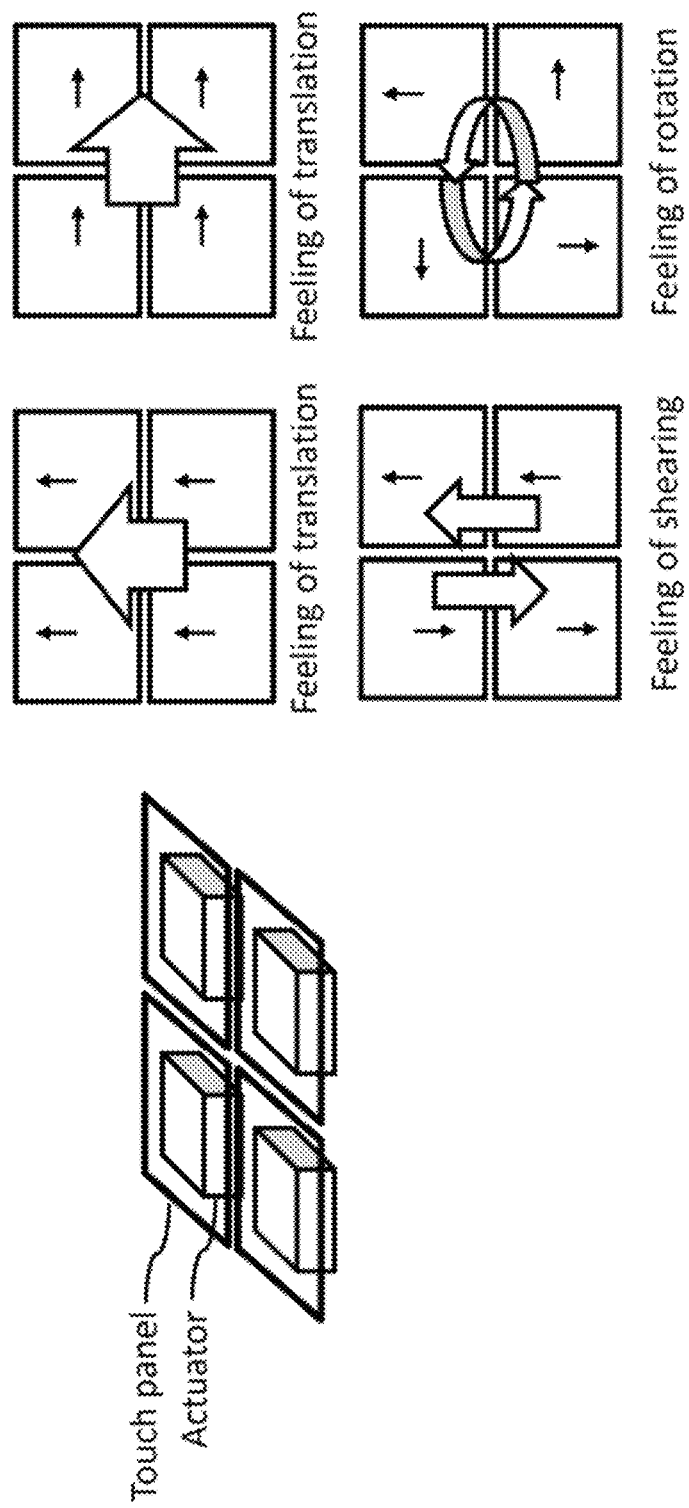
FIG. 78 Multi-touch array unit

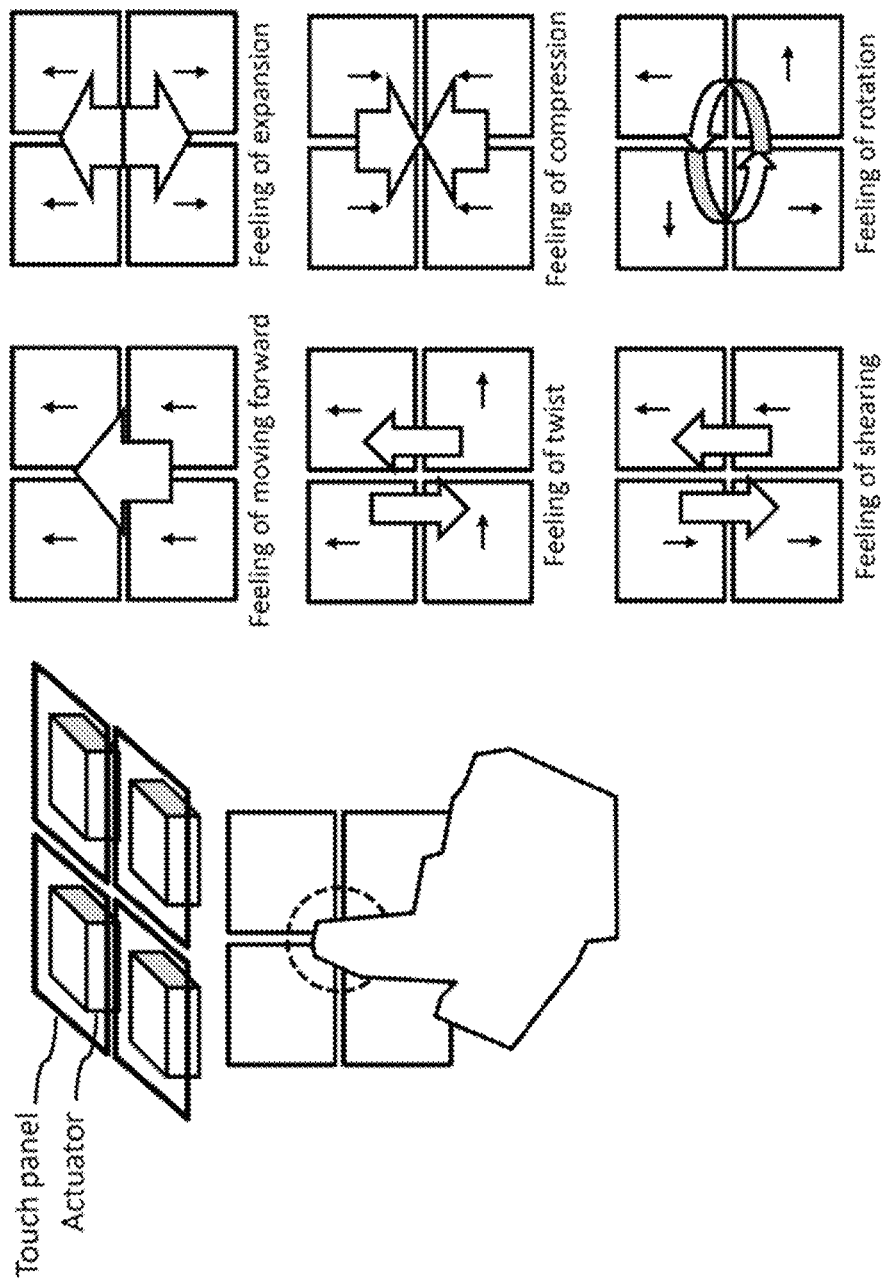
FIG. 79 Sense-combining control (Physical and between organs)

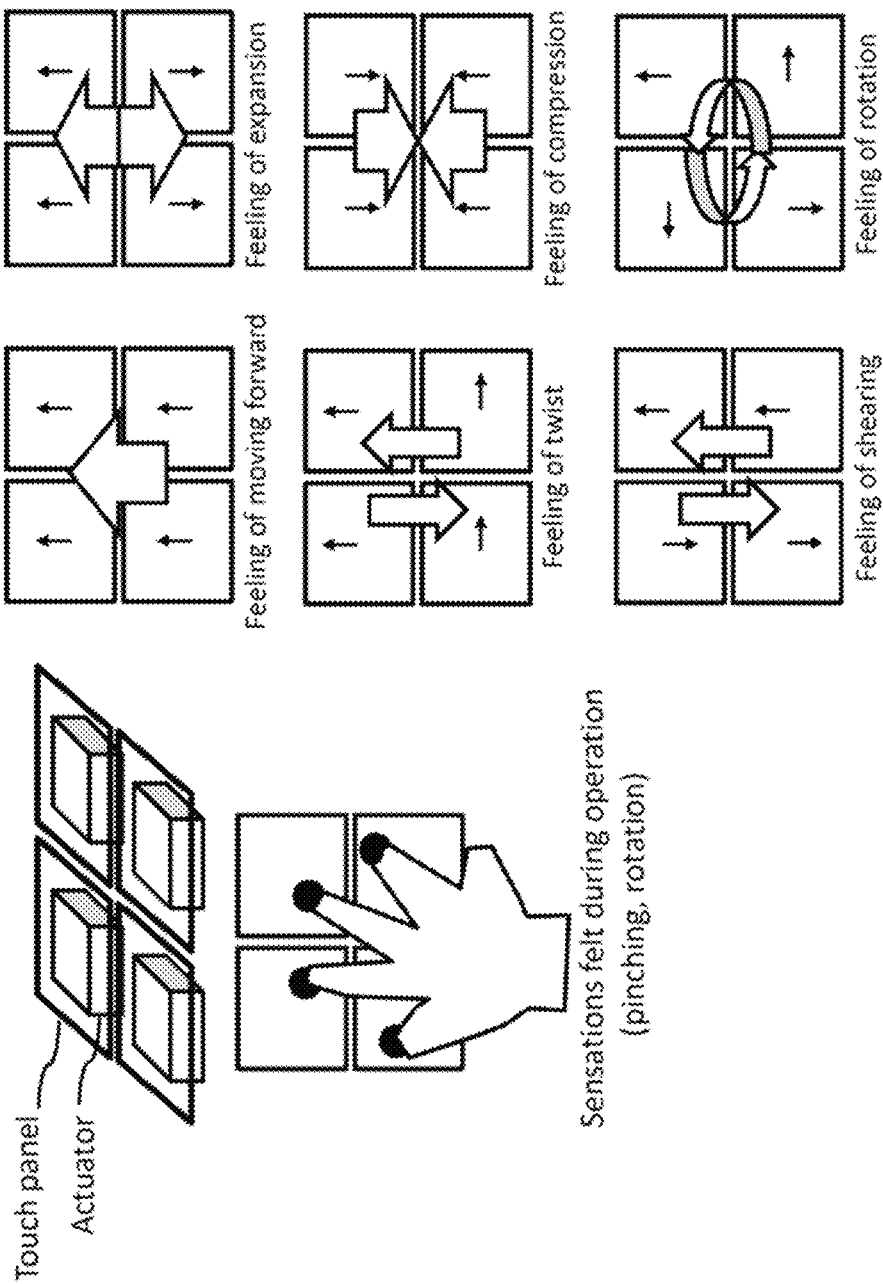

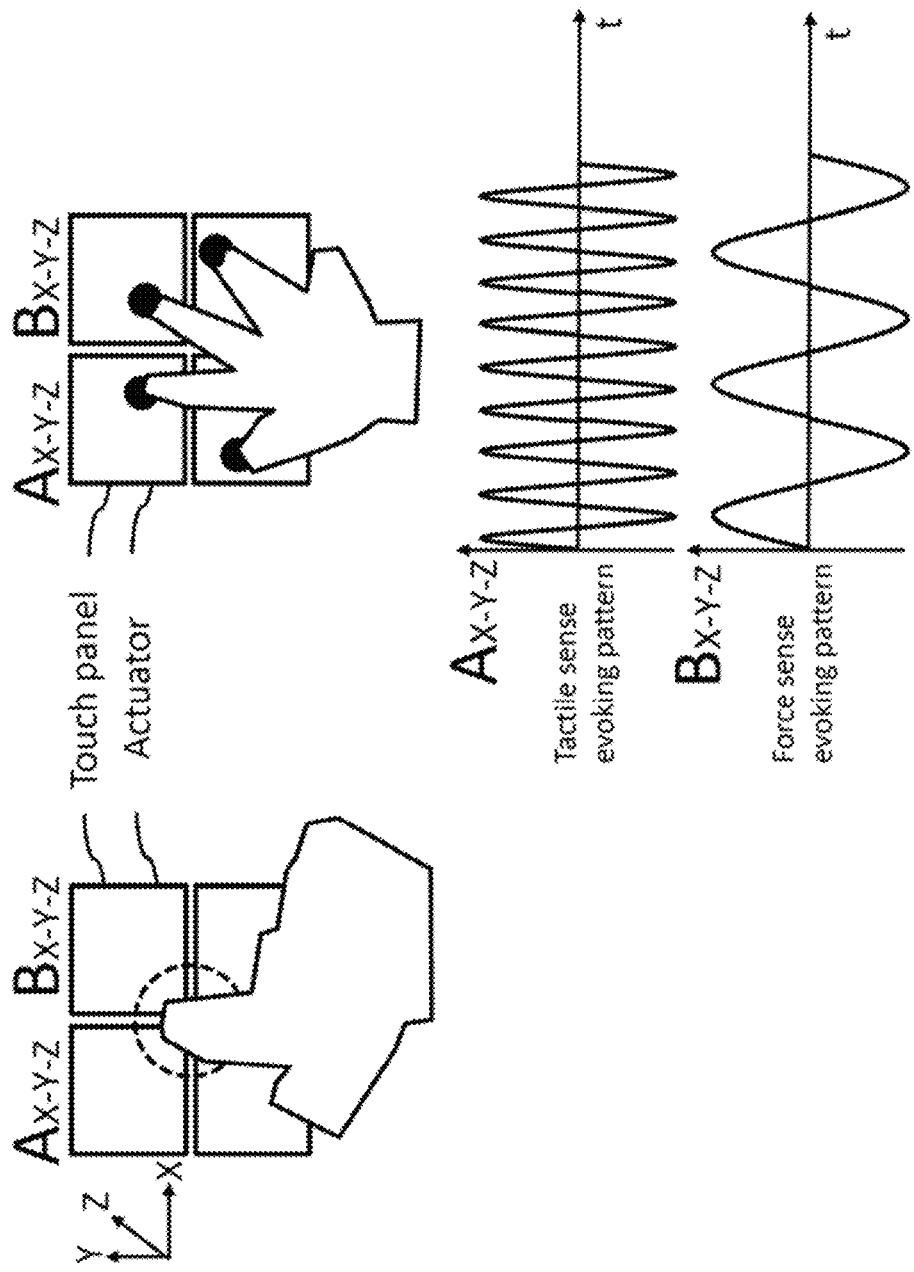
FIG. 81 Sense-combining control (Tactile sense and force sense)

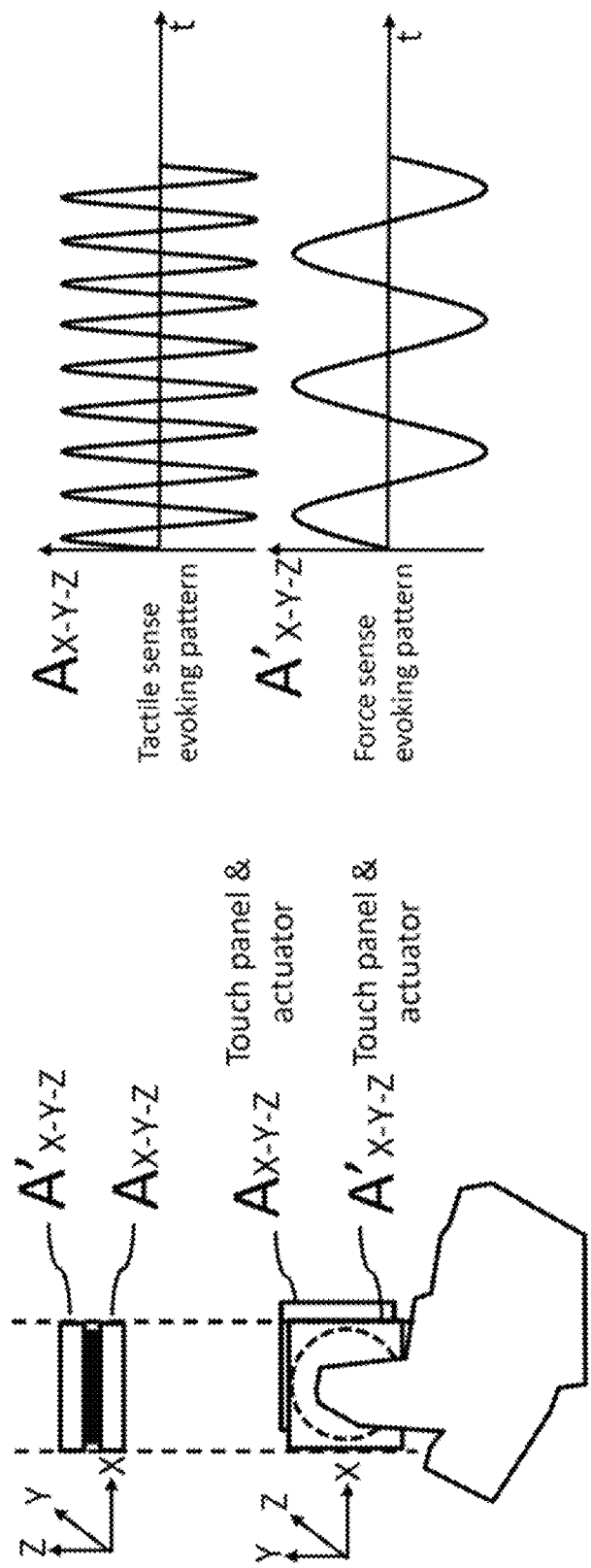
FIG. 82 Sense-combining control (Tactile sense and force sense)

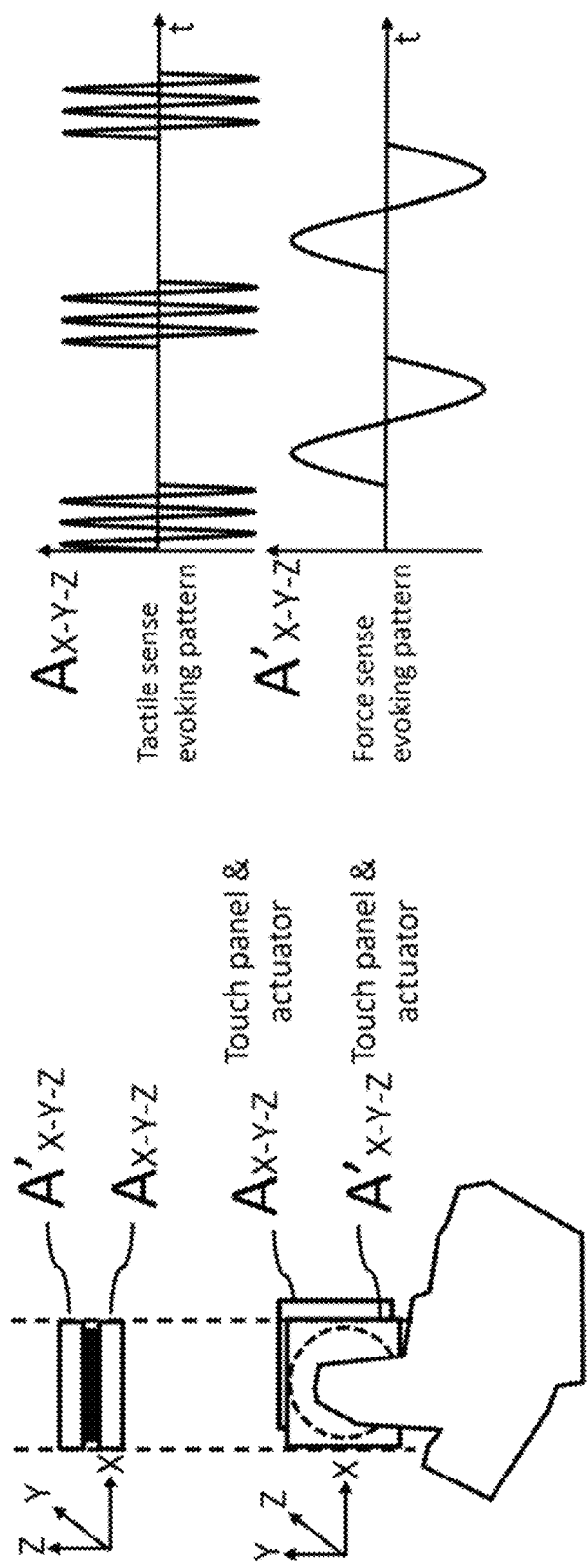
FIG. 83 Sense-combining control (Tactile sense and force sense)

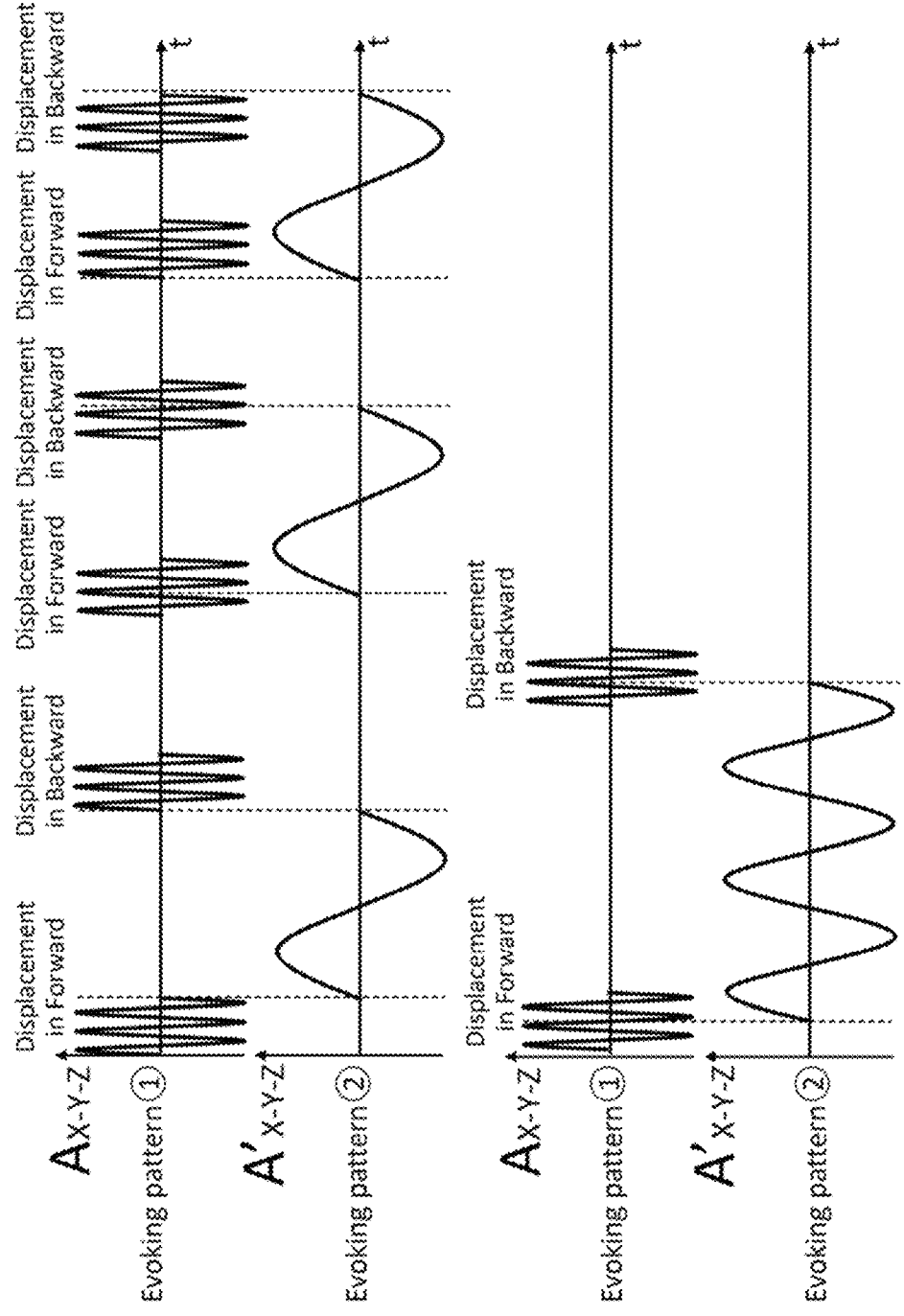

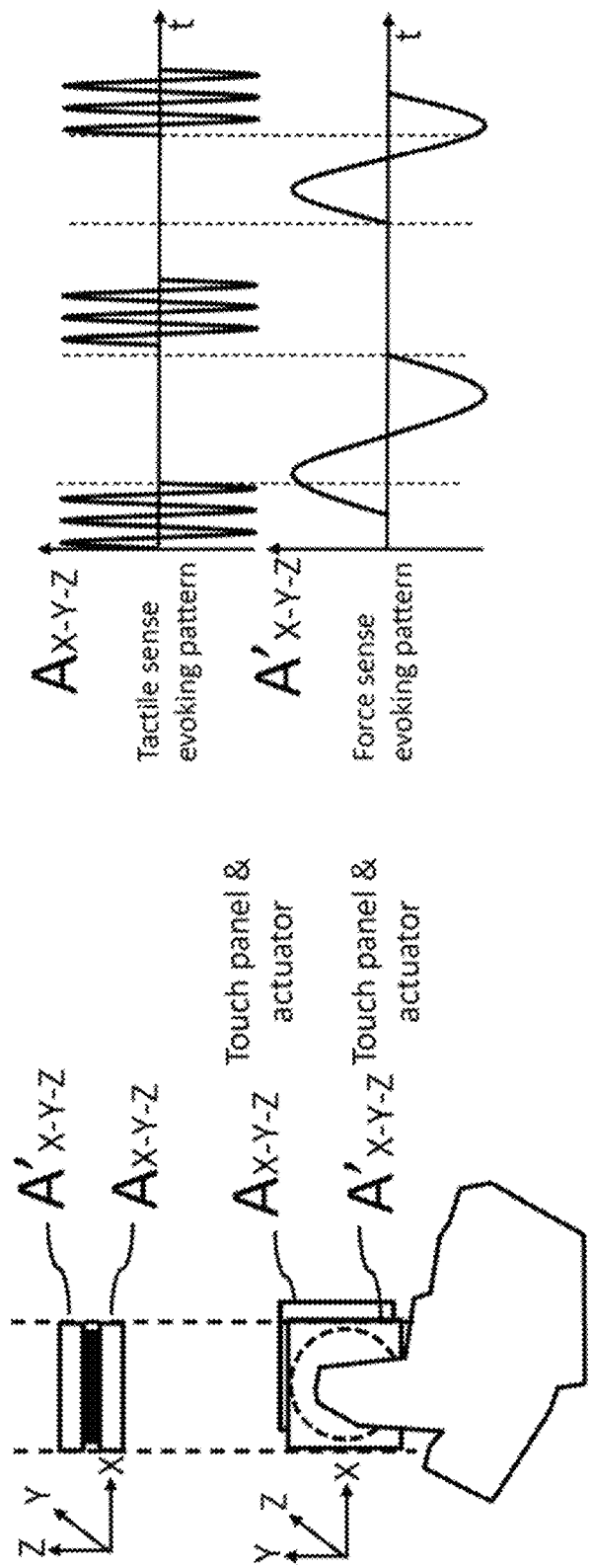
FIG. 85 Sense-combining control (Tactile sense + force sense and overlap)

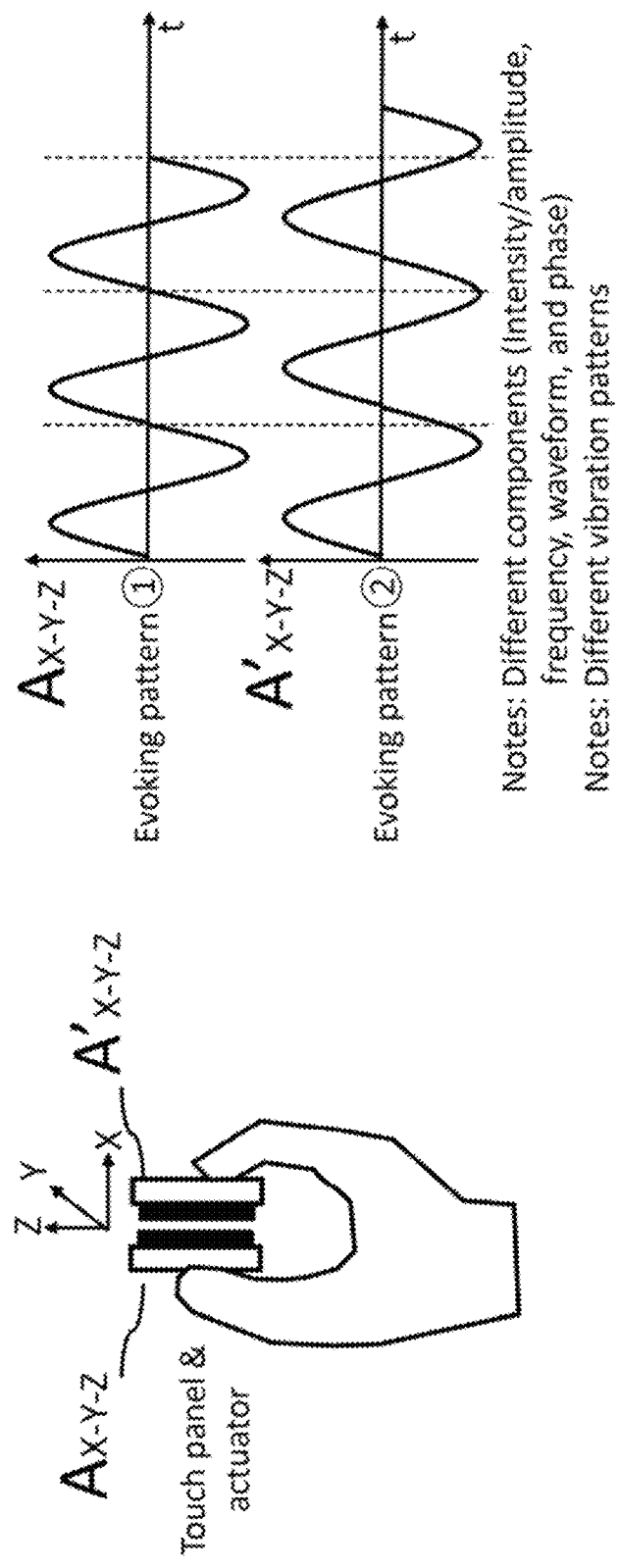
FIG. 86 Sense-combining control (Difference/comparison)

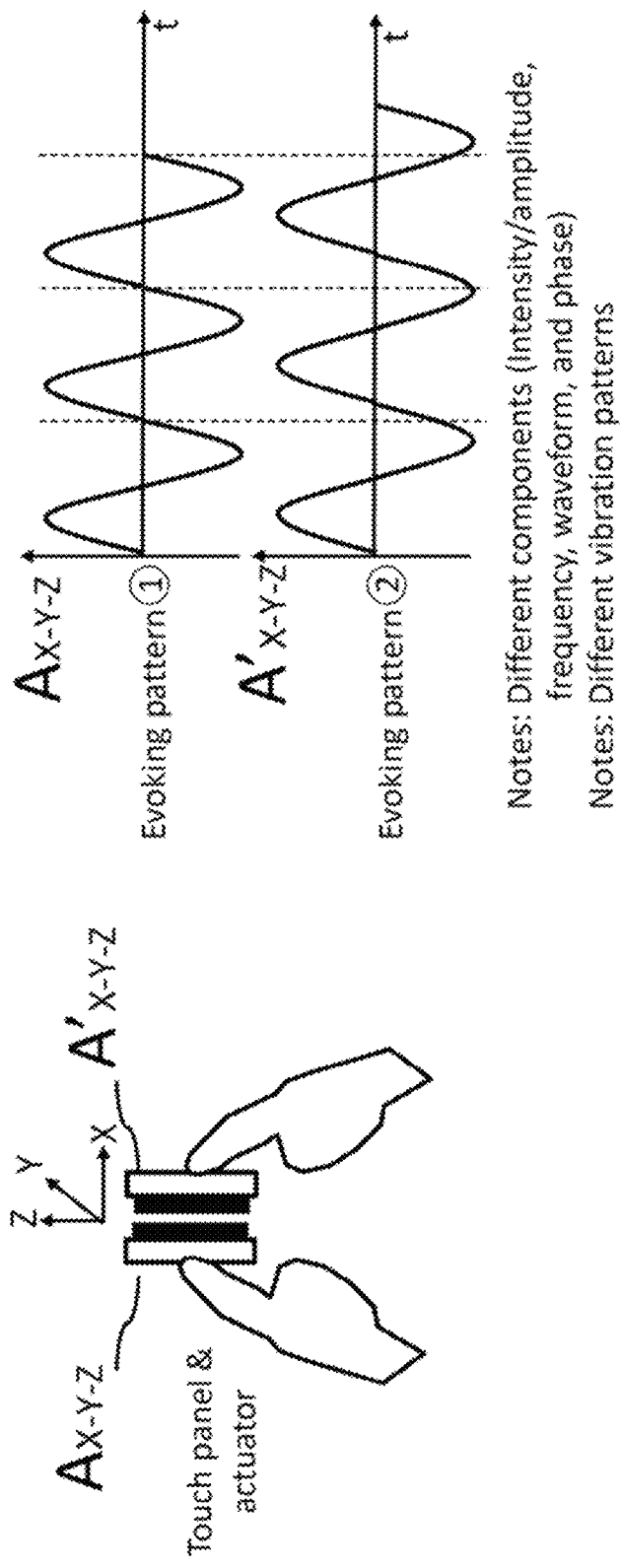
FIG. 87 Sense-combining control (Difference/comparison)

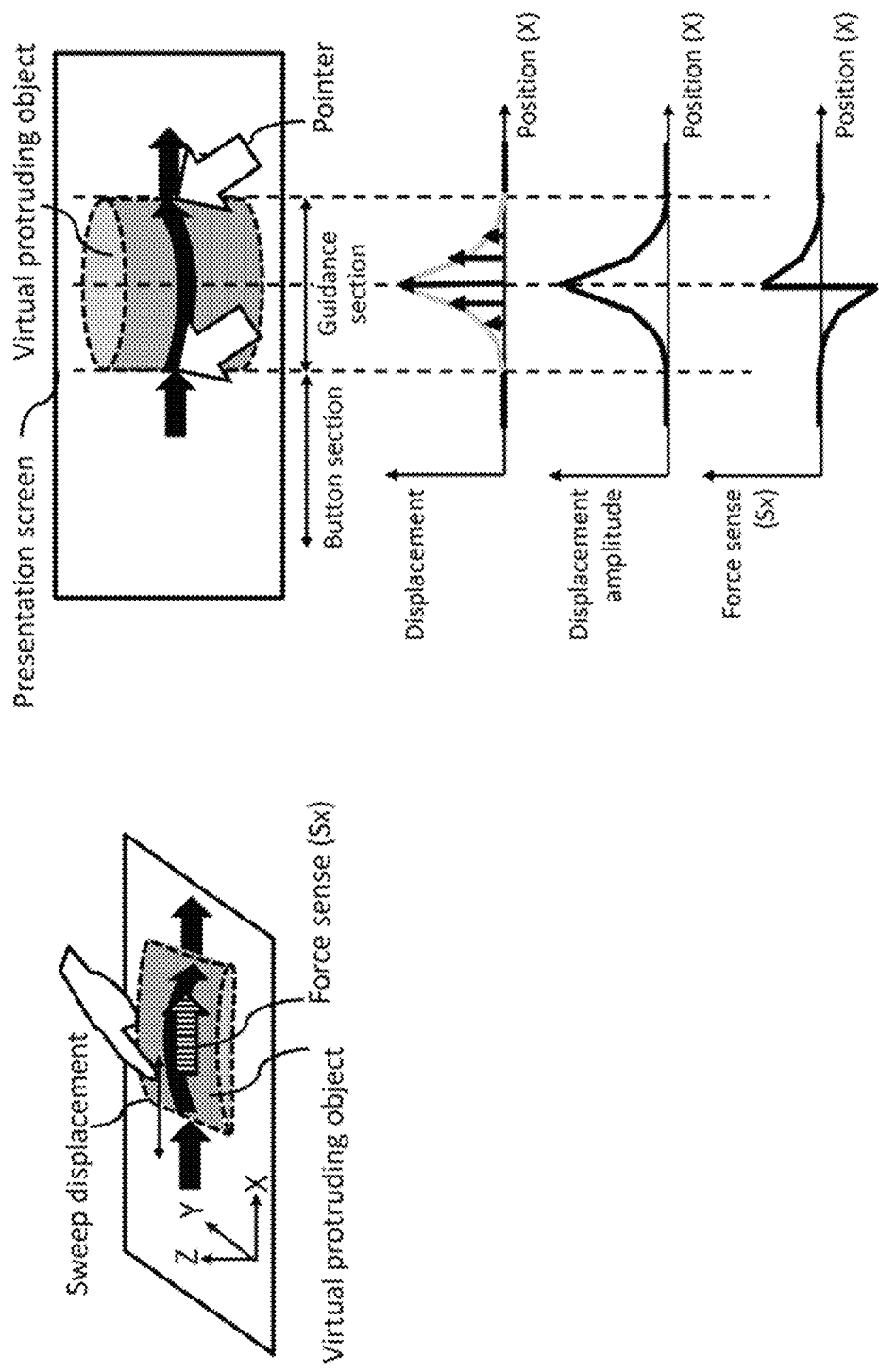
FIG. 88 Generation of sense of button shape
(Sense of touching mountain-like protrusion)

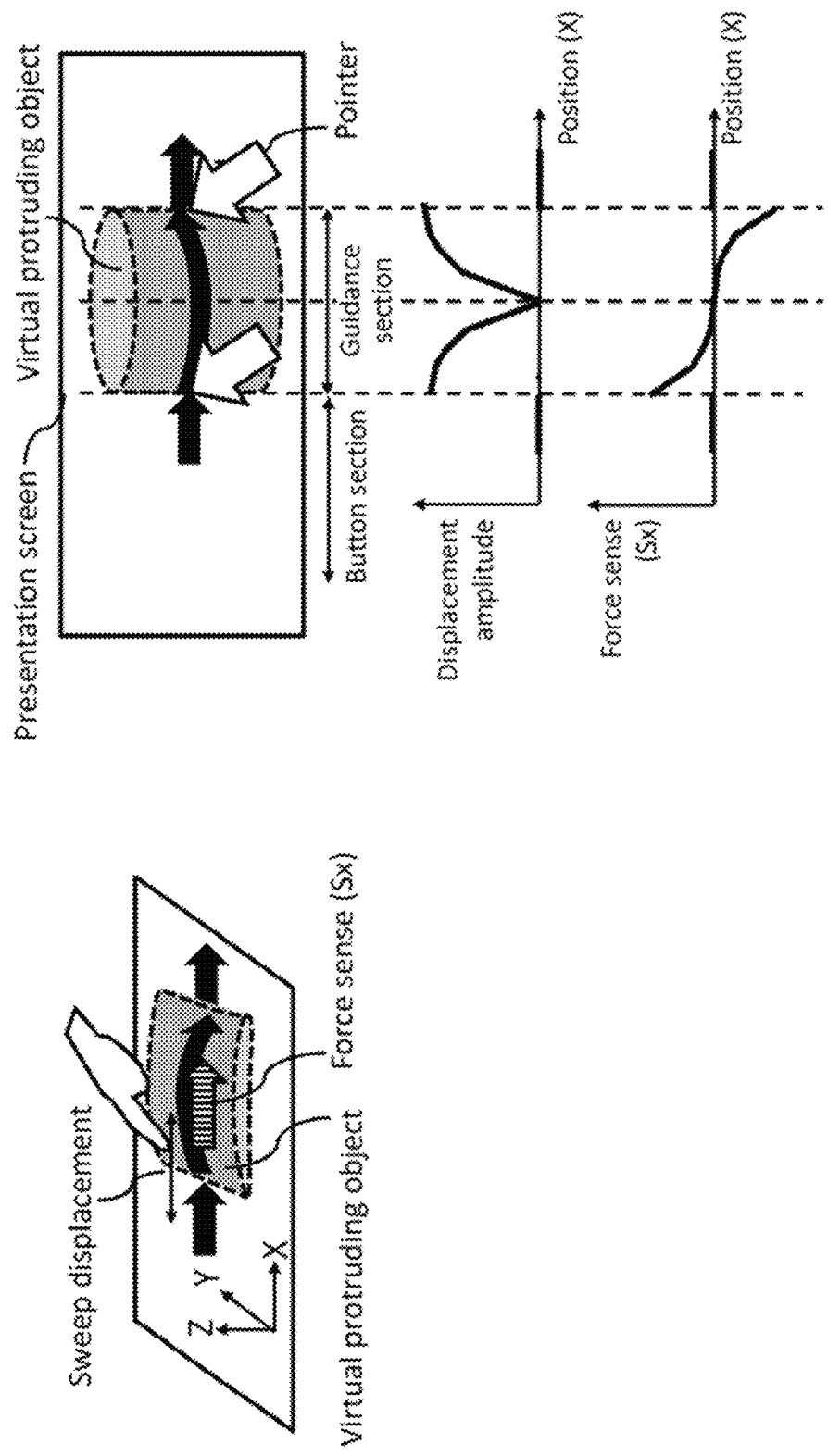
FIG. 89 Generation of sense of button shape
(Sense of touching semi-cylindrical protrusion)

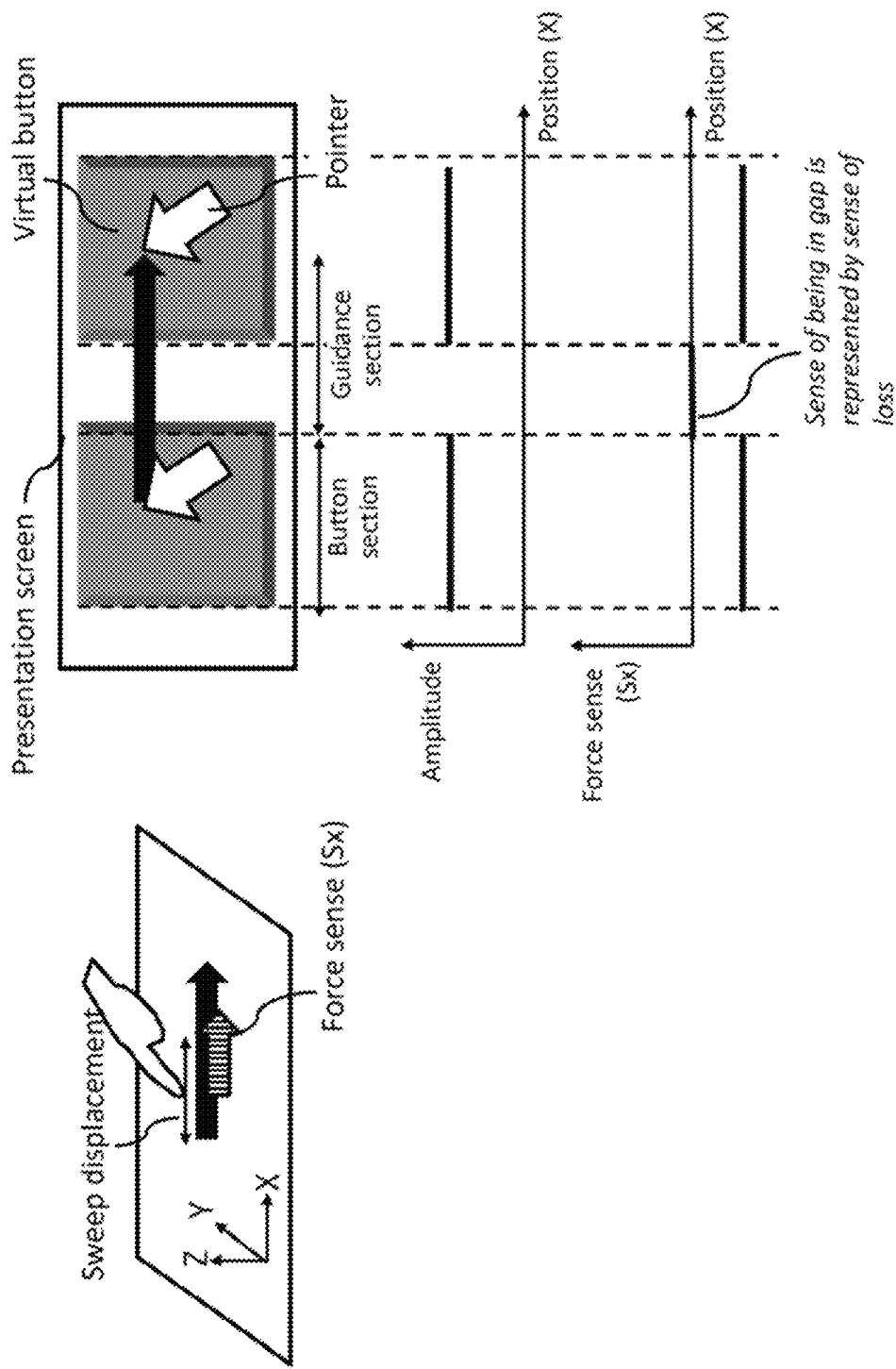
FIG. 90 Generation of sense of button touch (Sense of being in recessed gap)

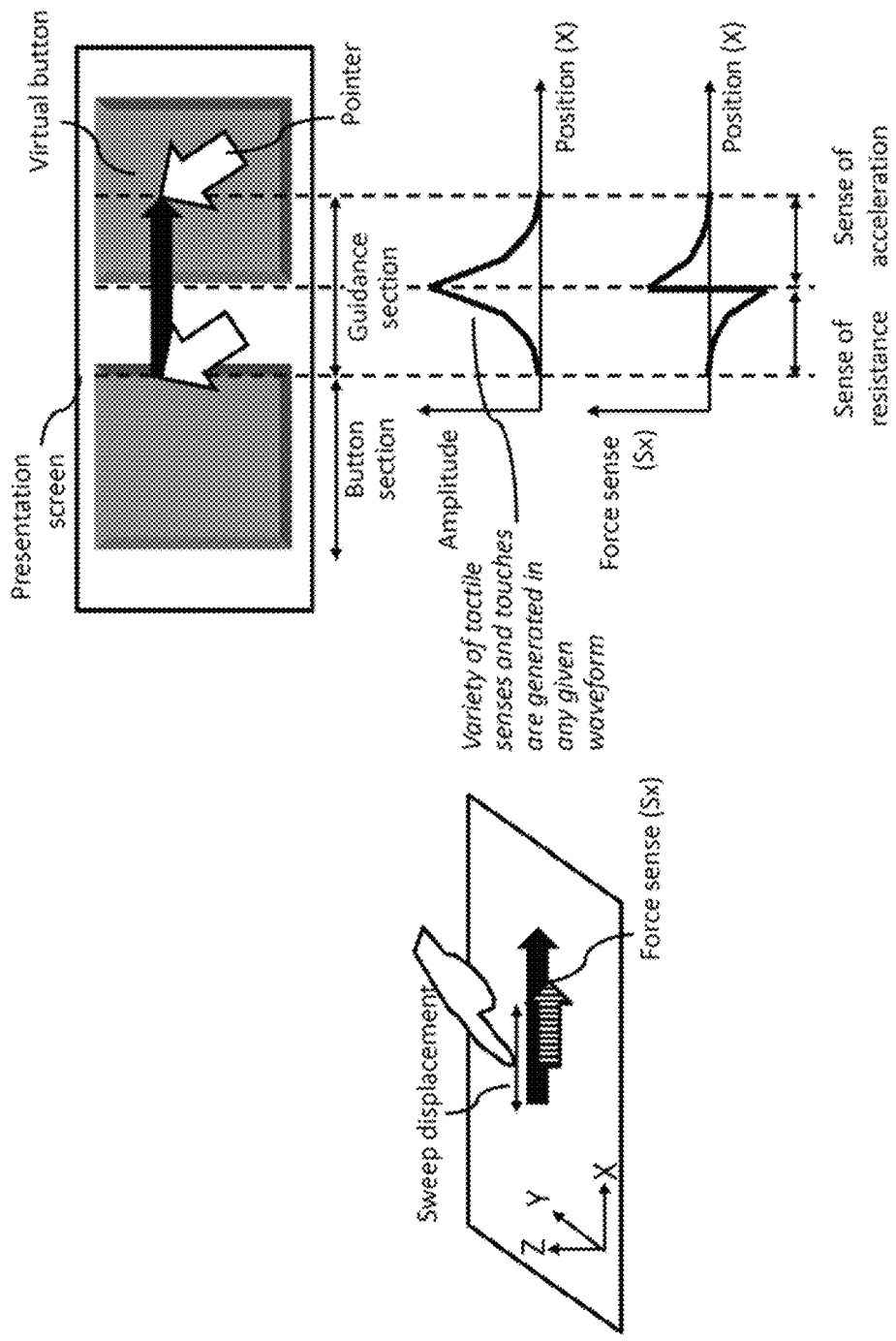
FIG. 91 Control of sense of guidance at position between buttons (Sense of crossing)

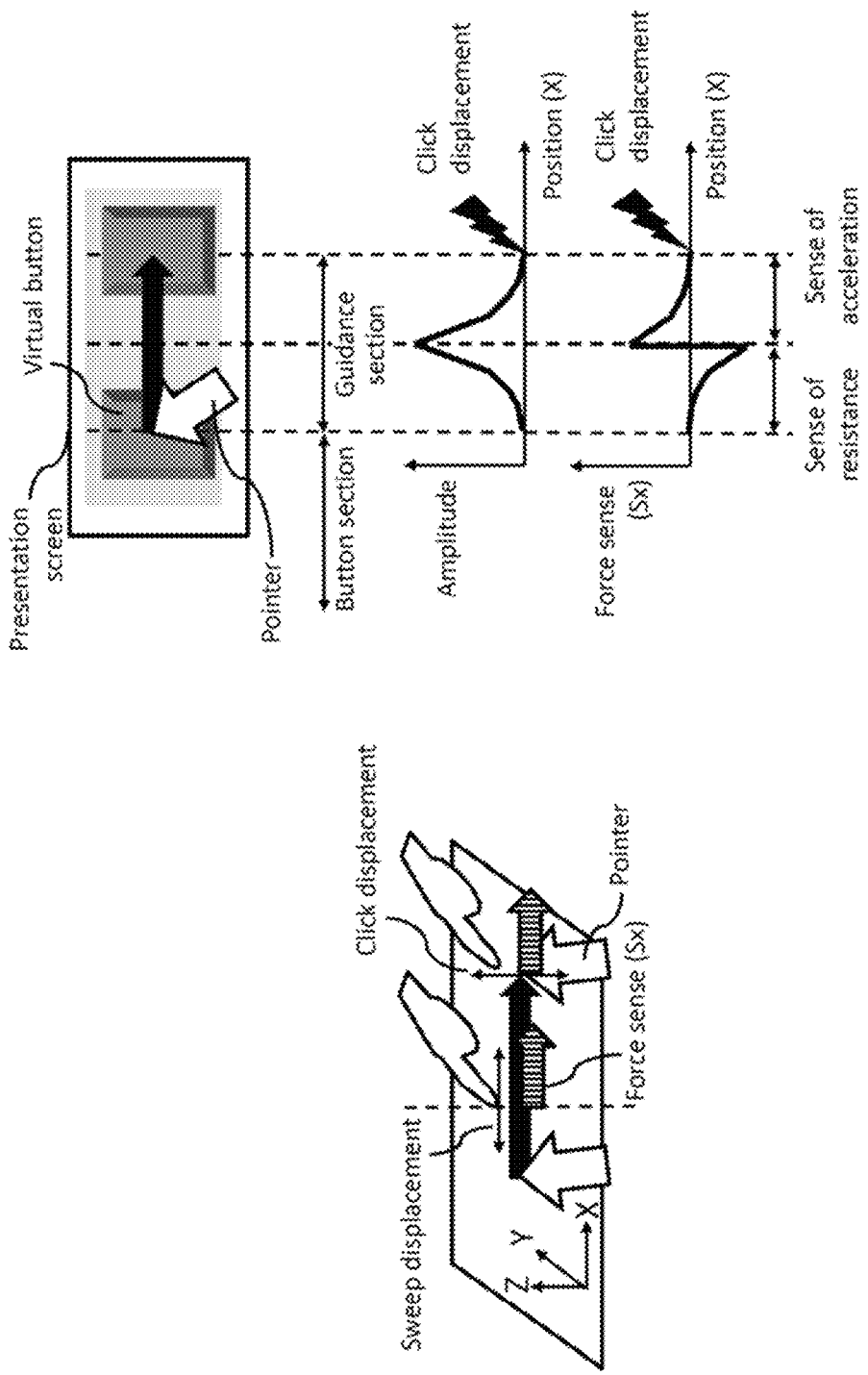
FIG. 92 Control of sense of guidance at position between buttons (Sense of being at edge point)

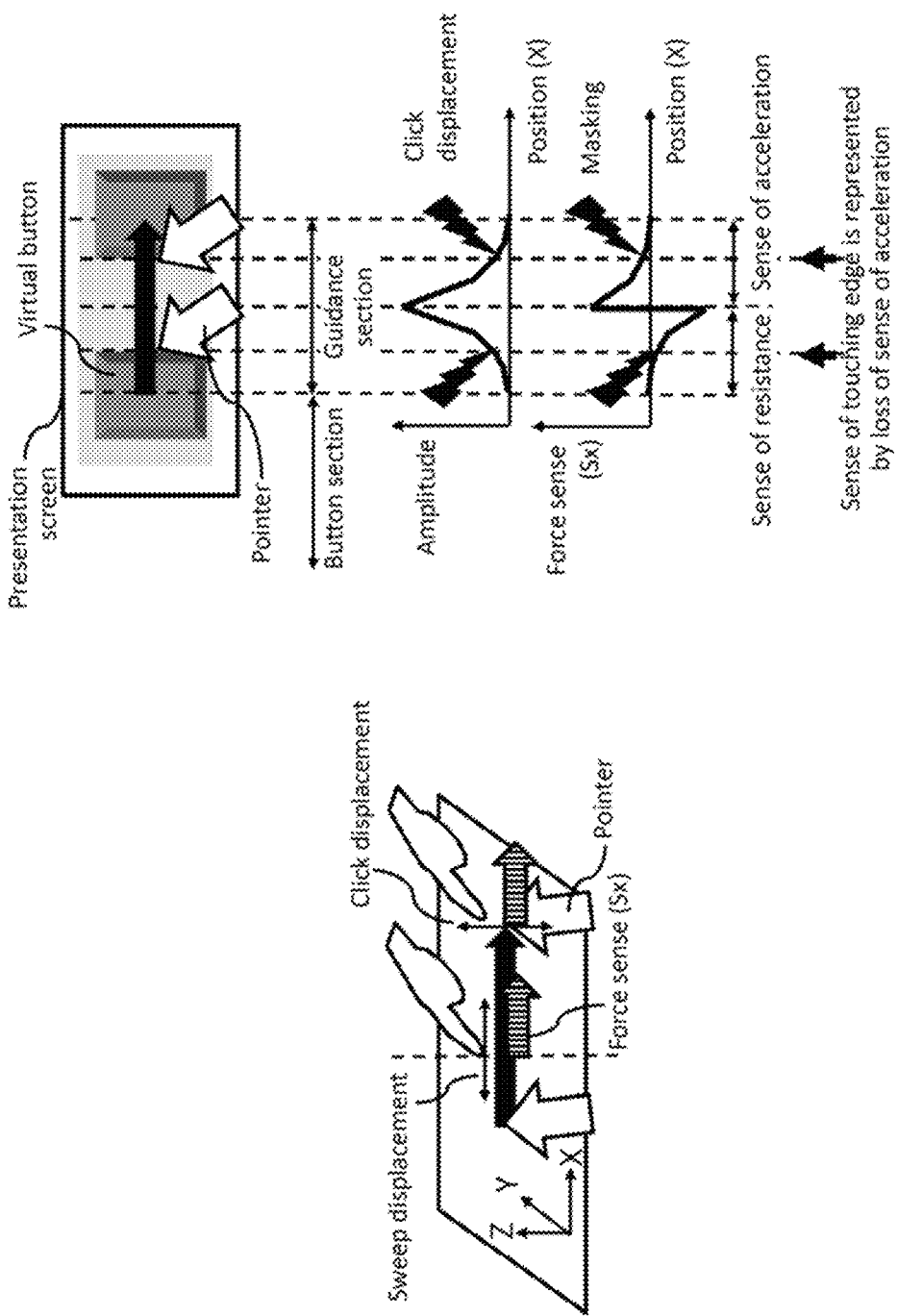
FIG. 93 Control of sense of guidance at position between buttons (Sense of touching edge)

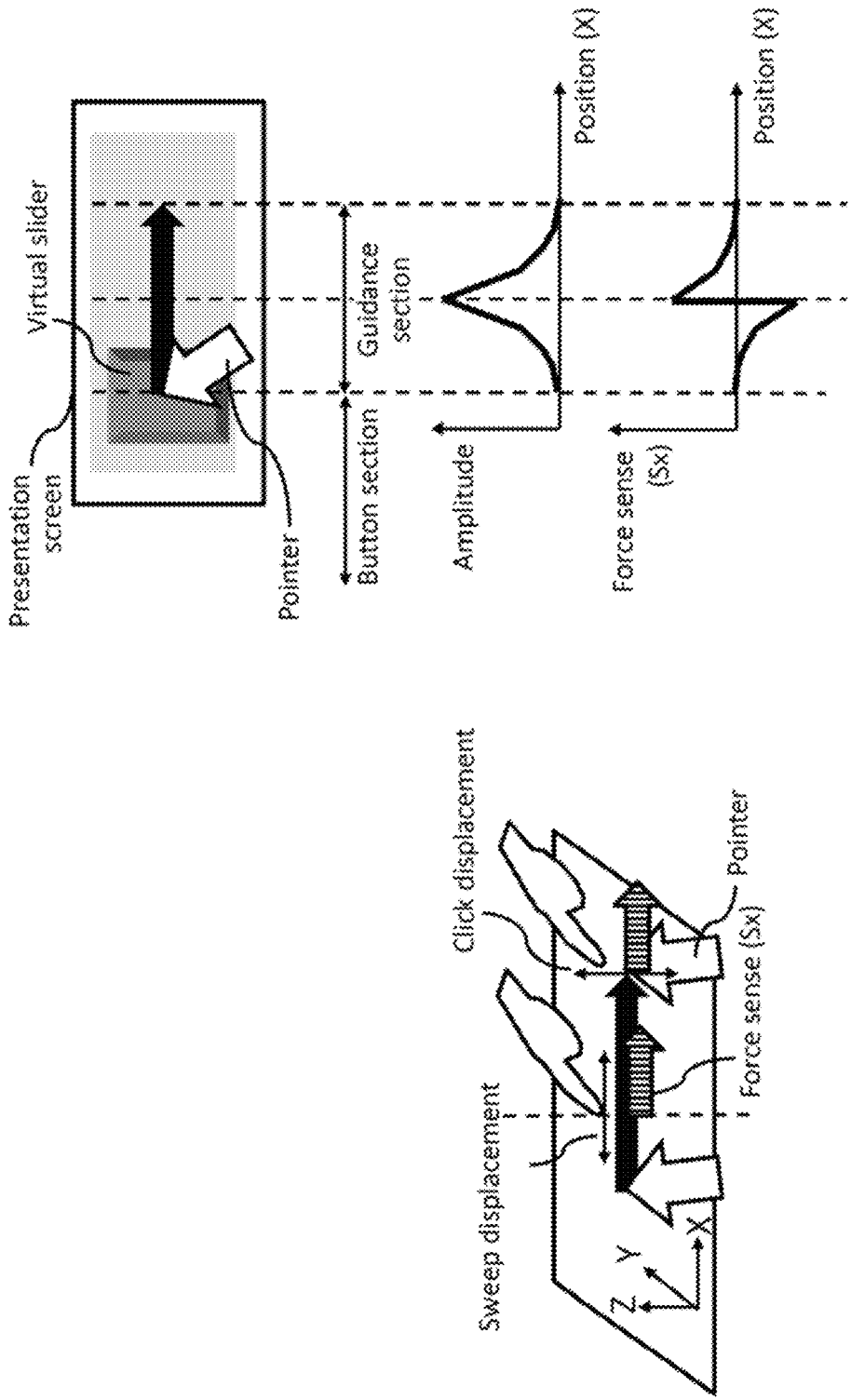
FIG. 94 Slider (Control of haptics)

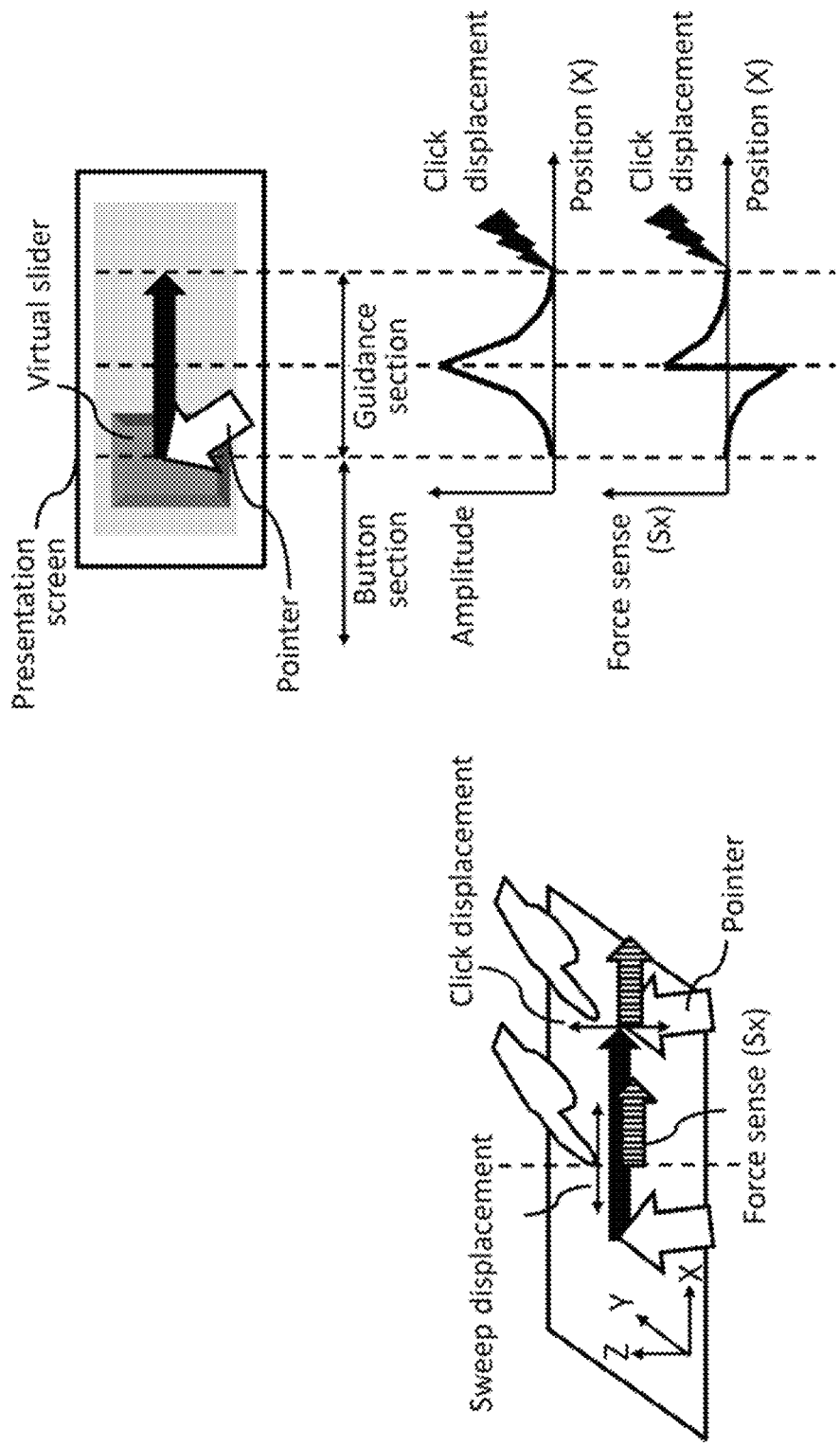
FIG. 95 Slider (Control of haptics)

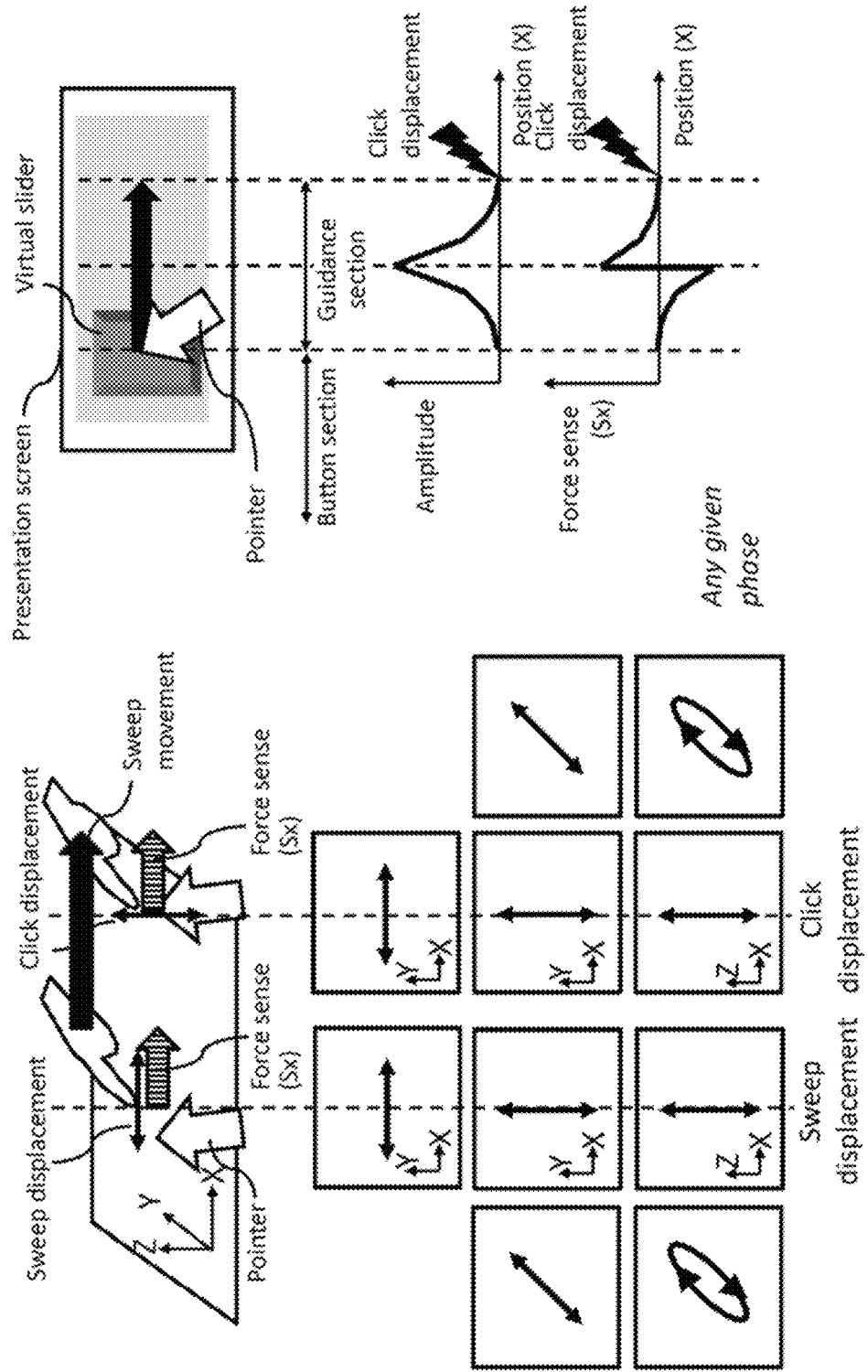
FIG. 96 Slider (Control of sensation)

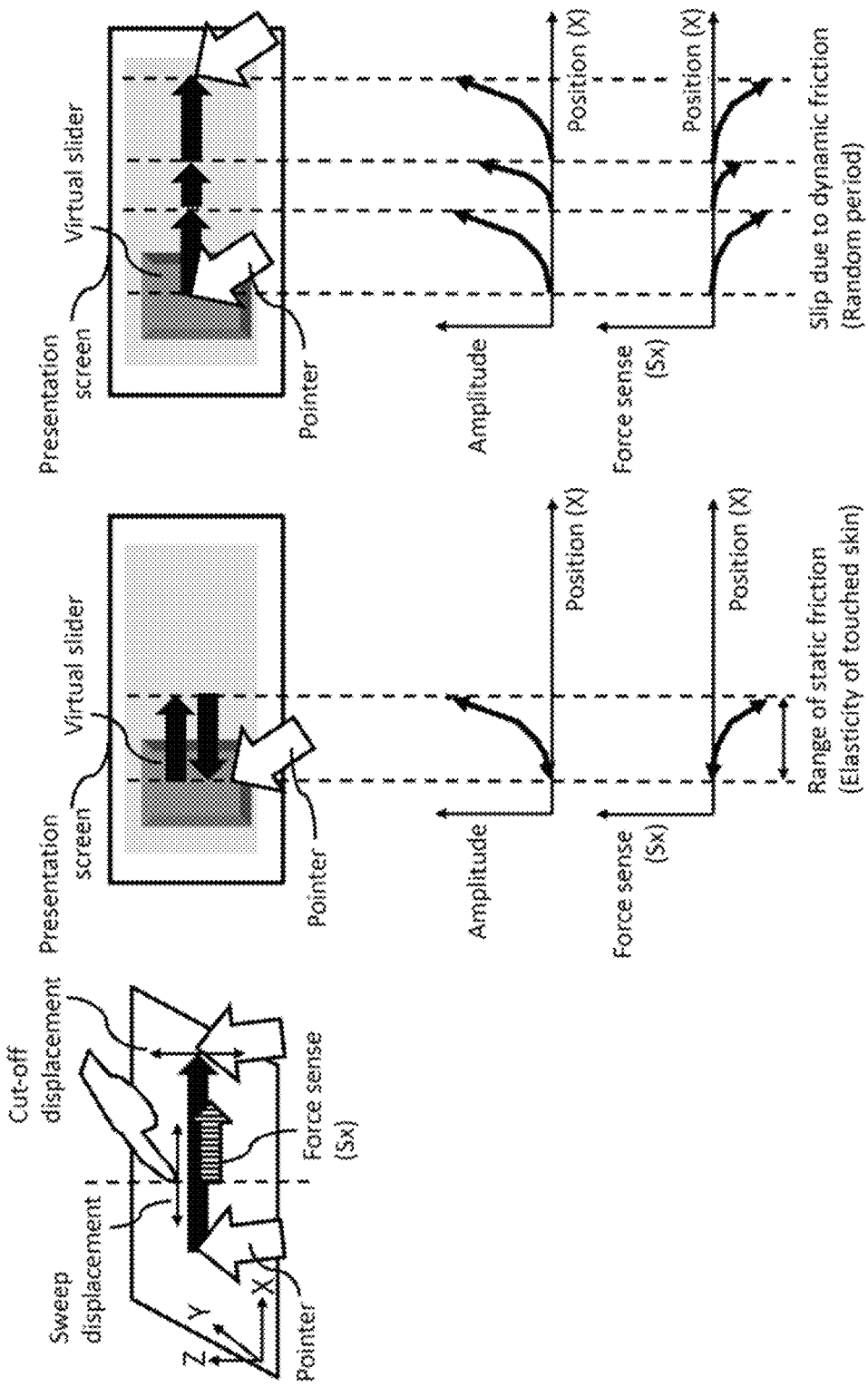
FIG. 97 Control of static friction and dynamic friction

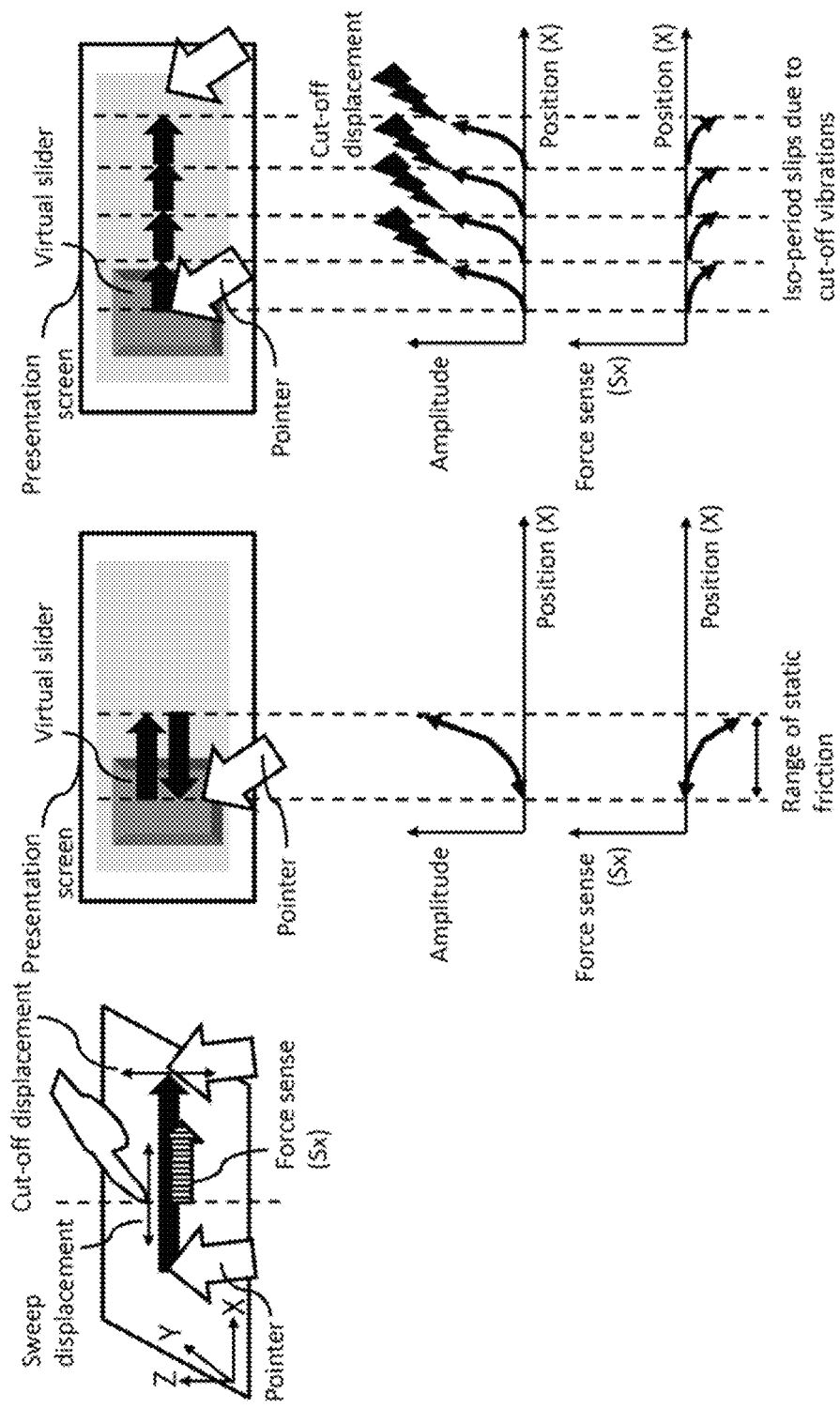
FIG. 98 Control of dynamic friction (to achieve iso-period)

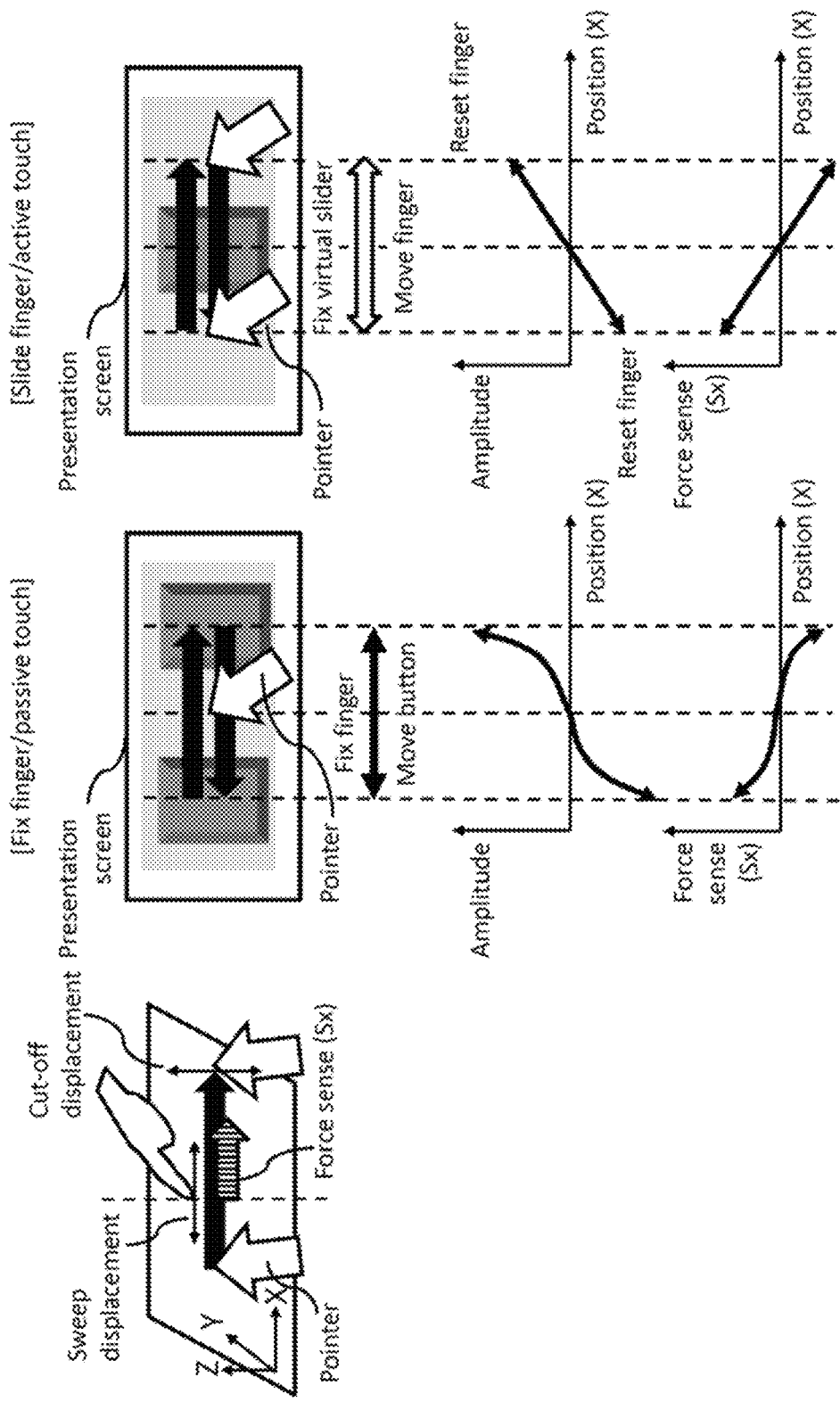
FIG. 99 Control of static friction

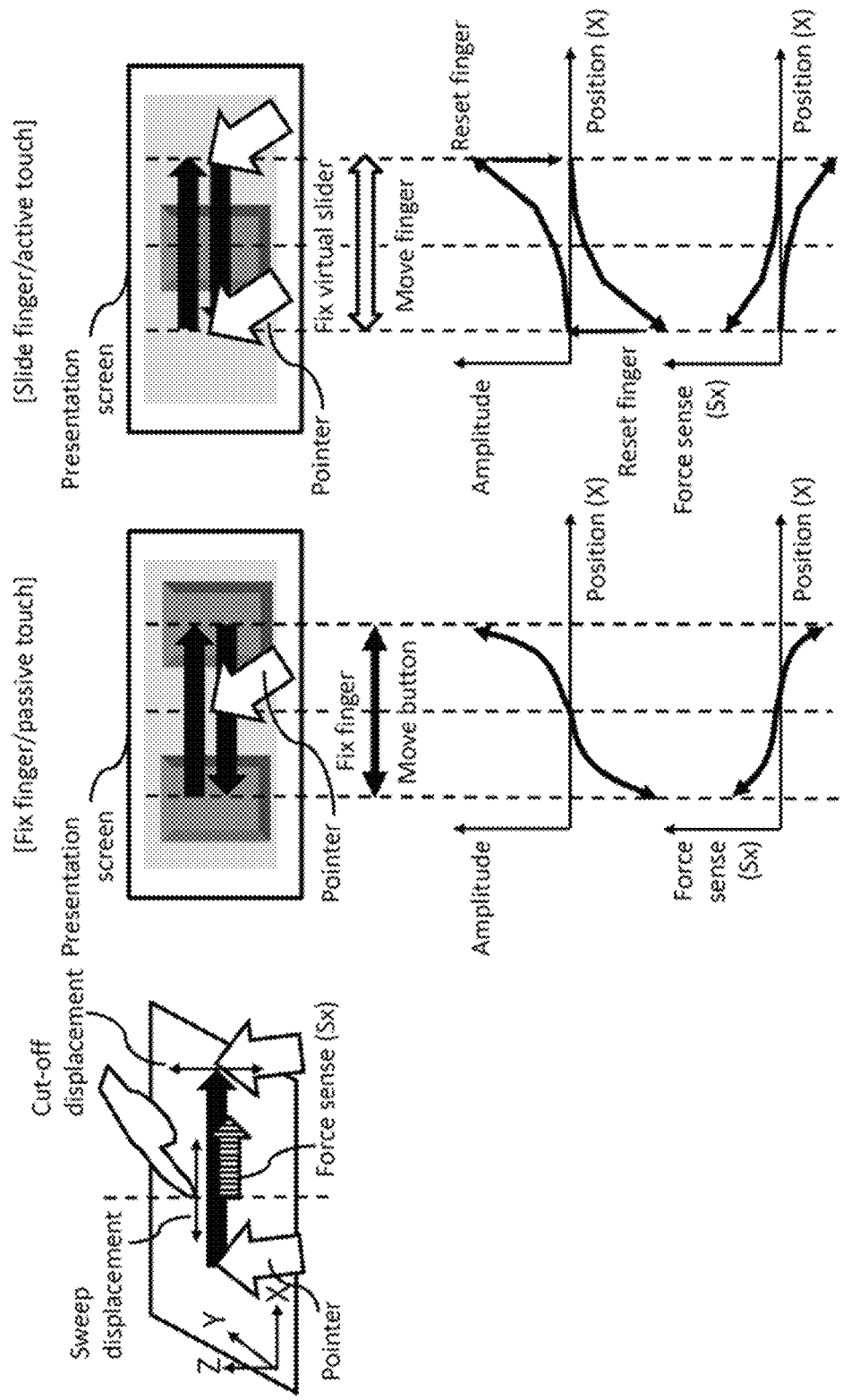
FIG. 100 Control of static friction

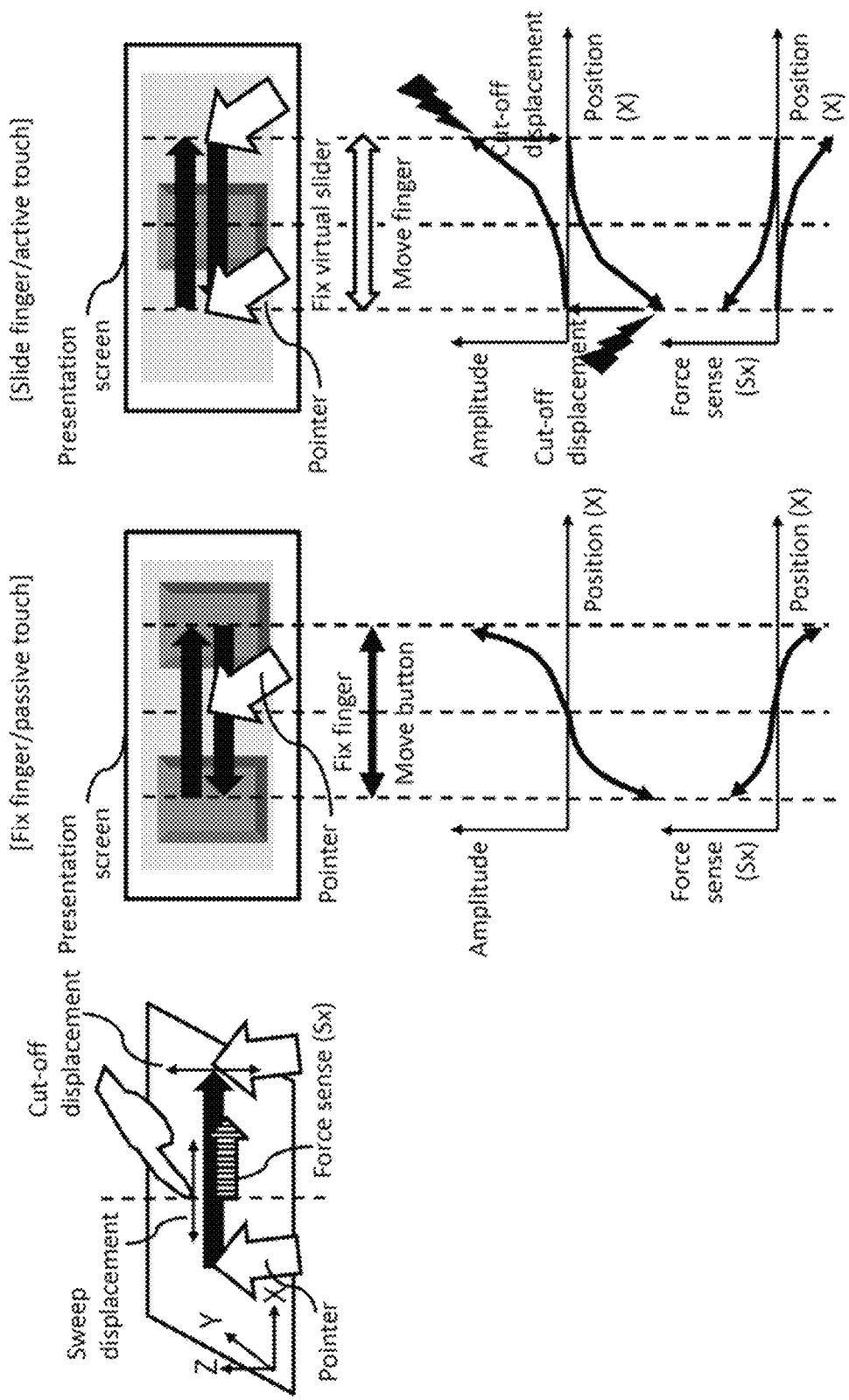
FIG. 101 Control of static friction

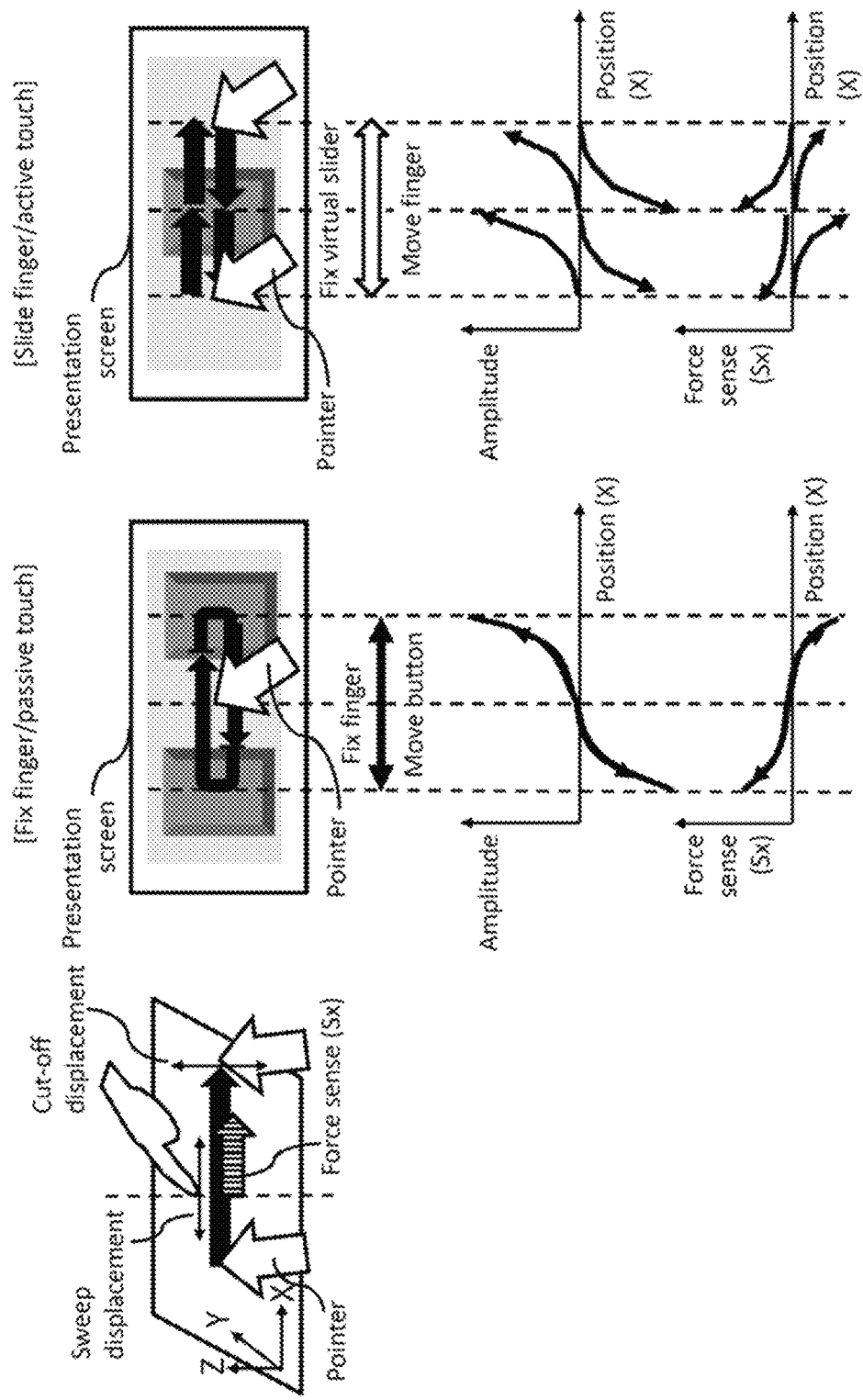
FIG. 102 Control of dynamic friction

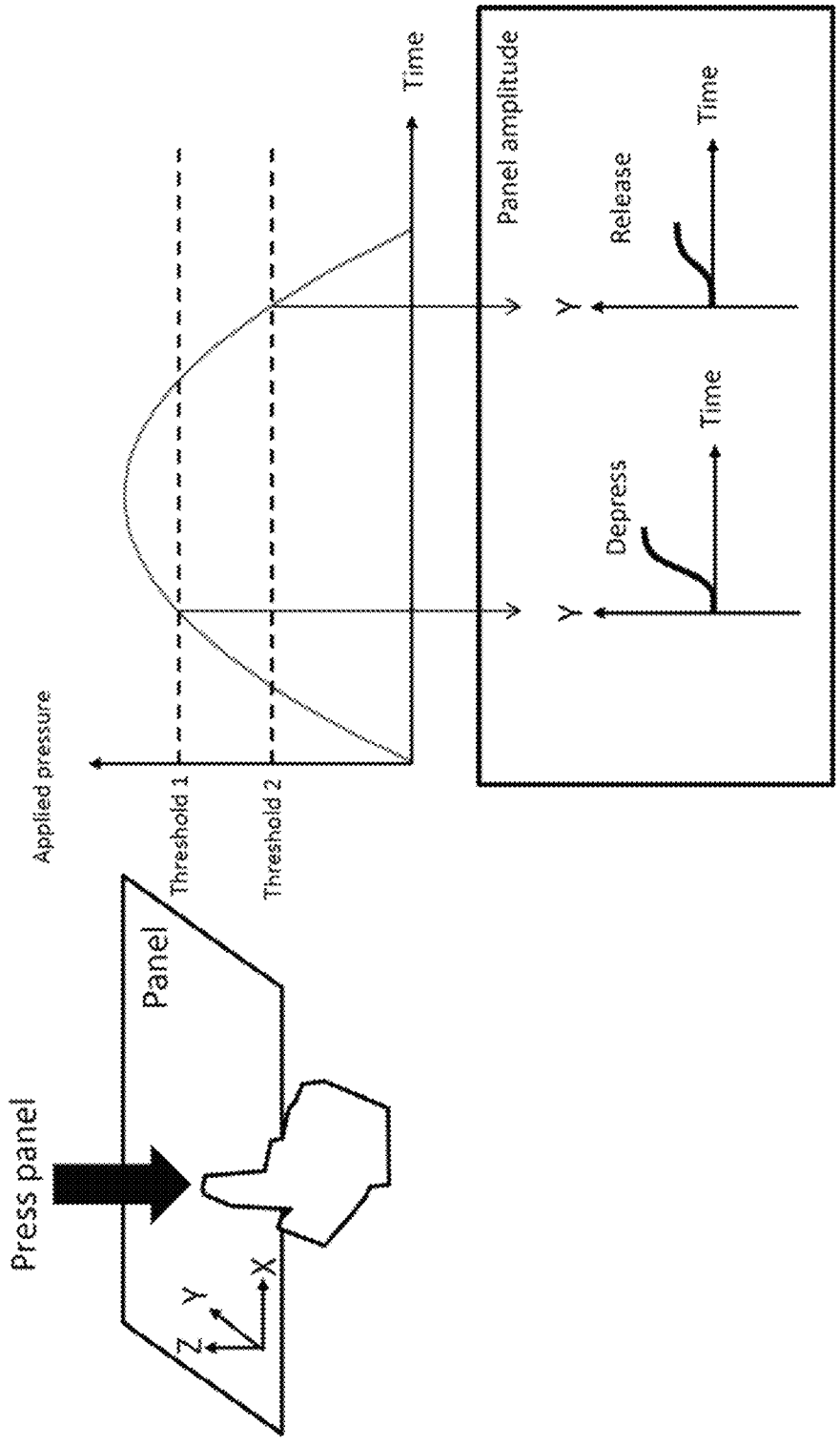
FIG. 103 Control of sense of depressing button

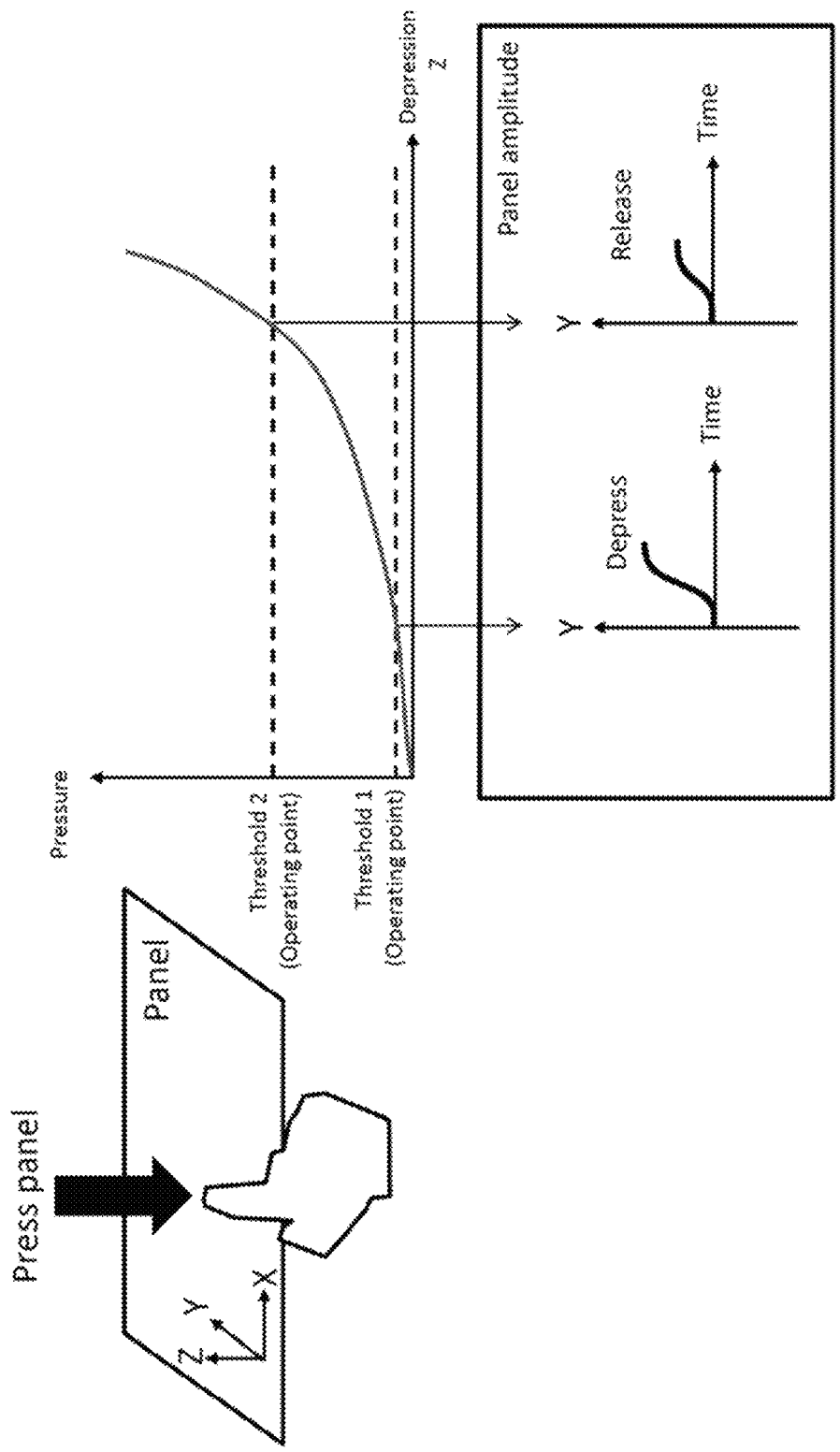
FIG. 104 Control of sense of depressing button (Double trigger)

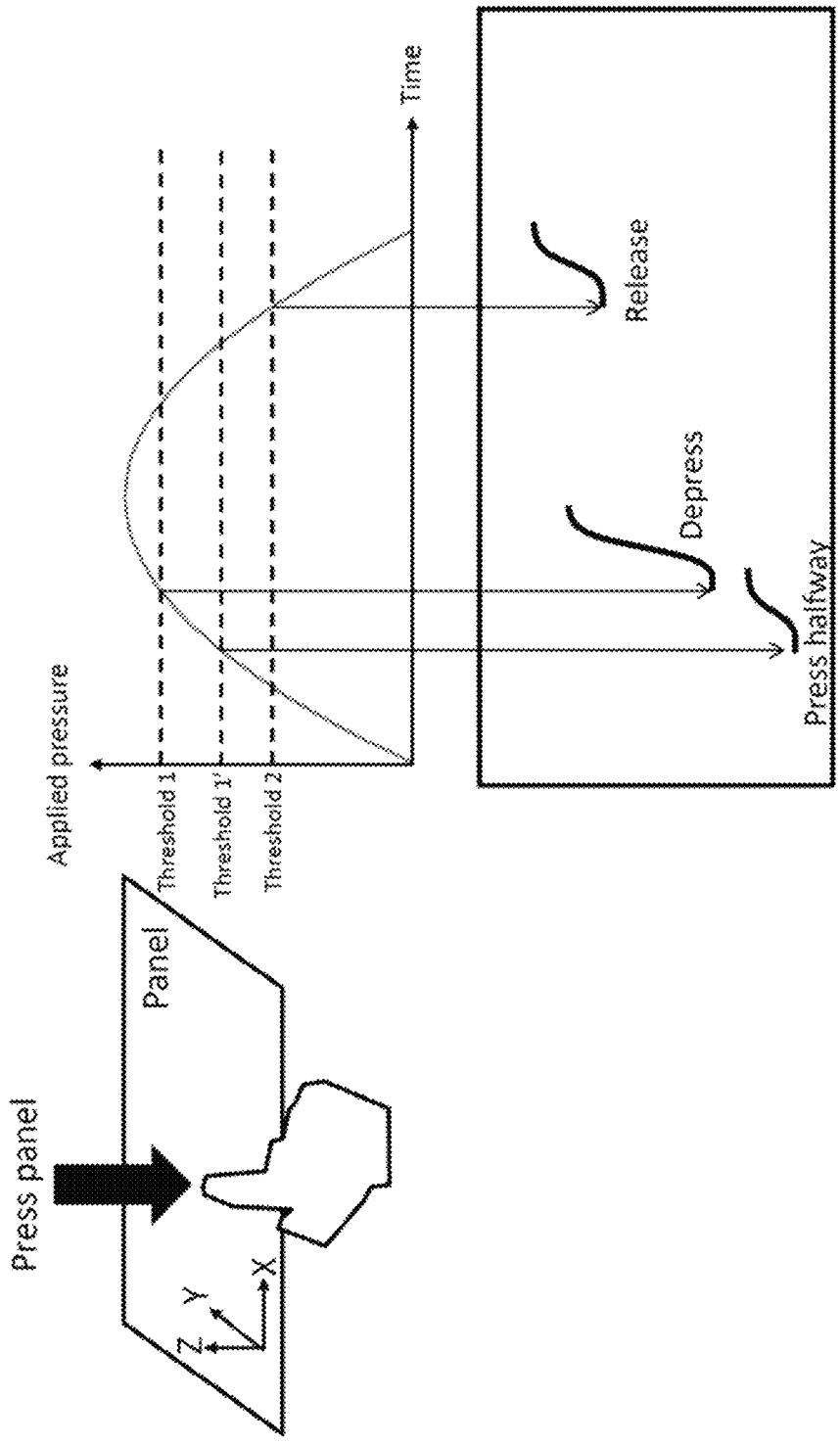
FIG. 105 Control of sense of depressing button

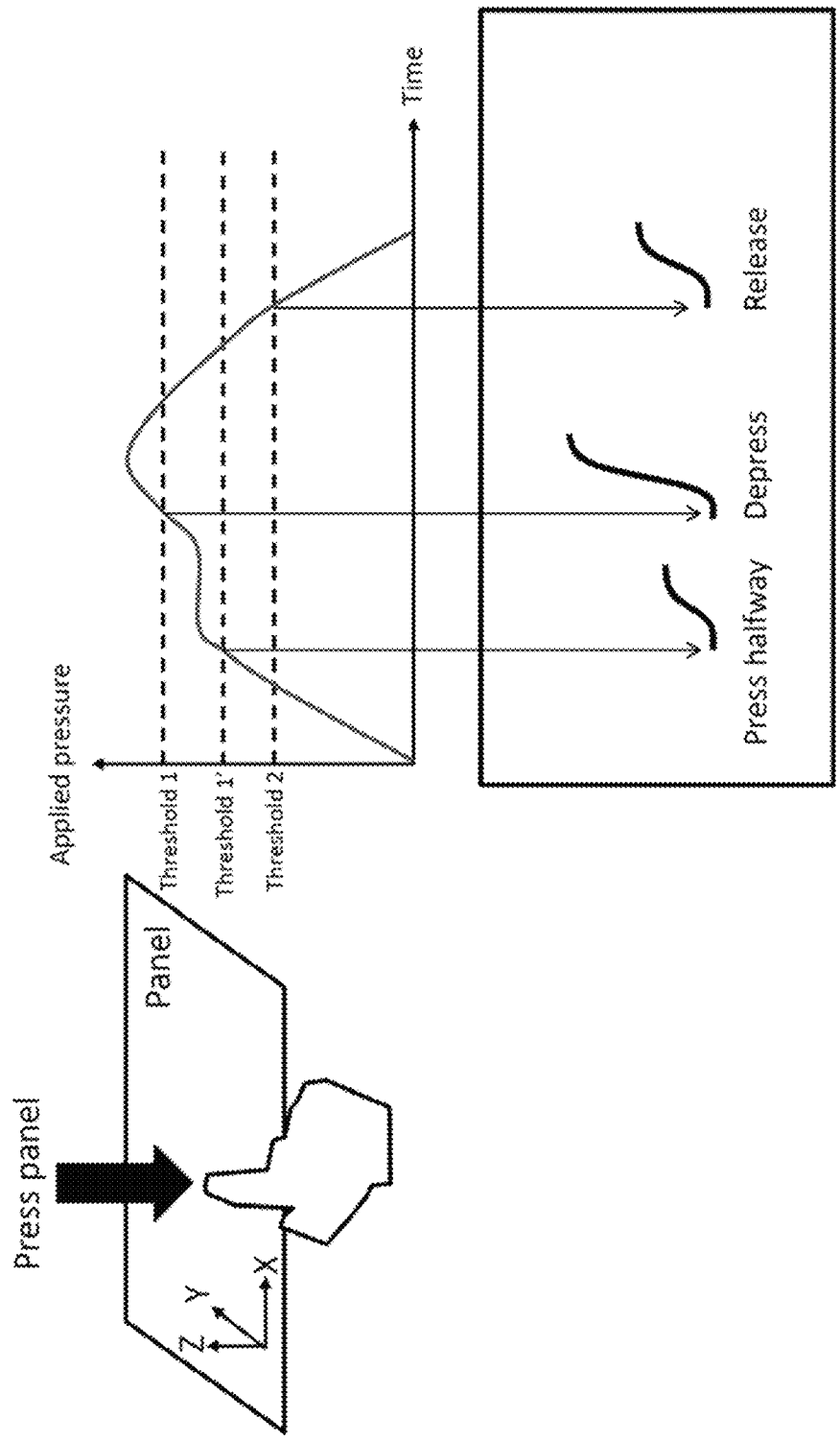

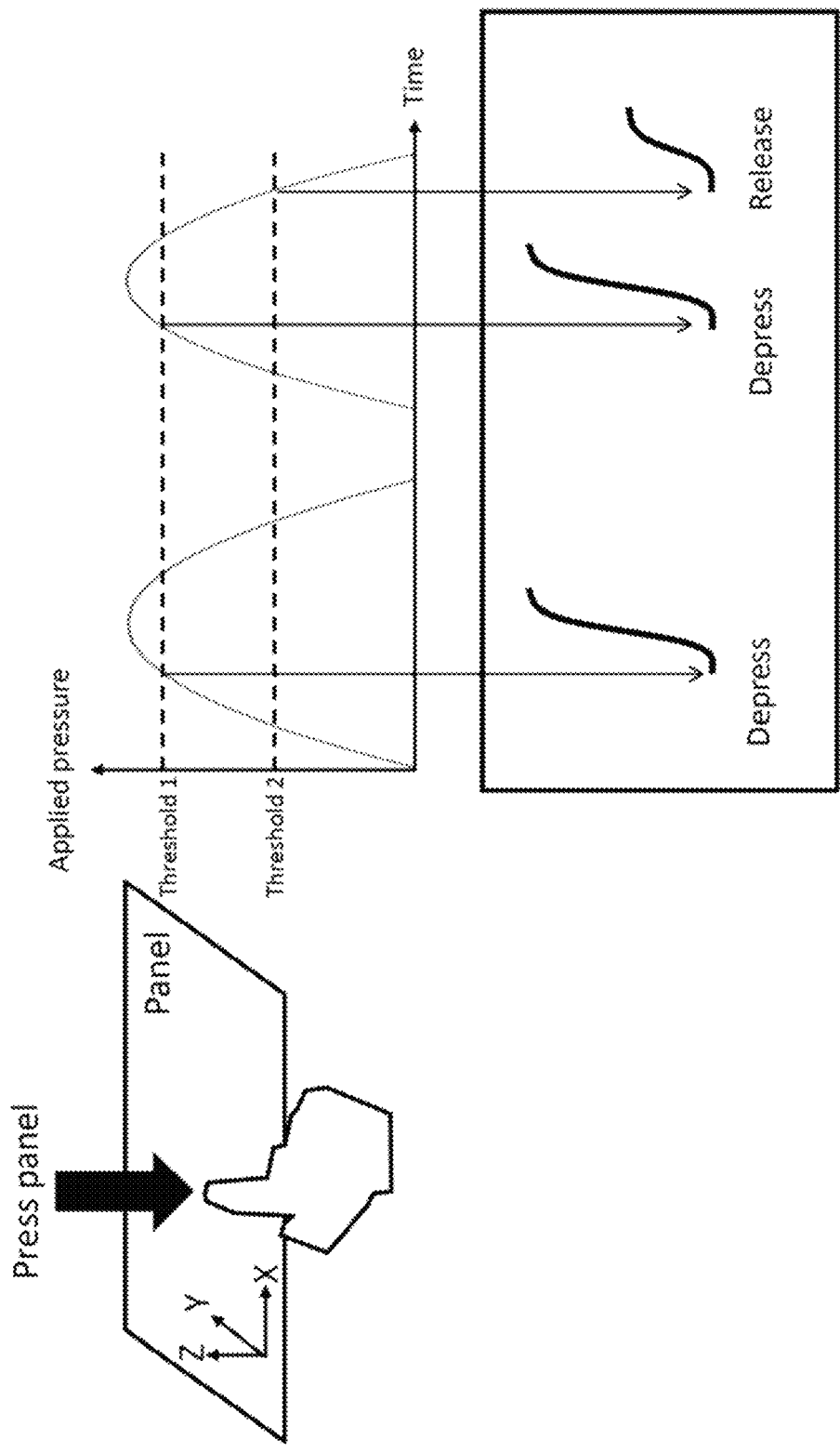
FIG. 107 Control of sense of depressing button

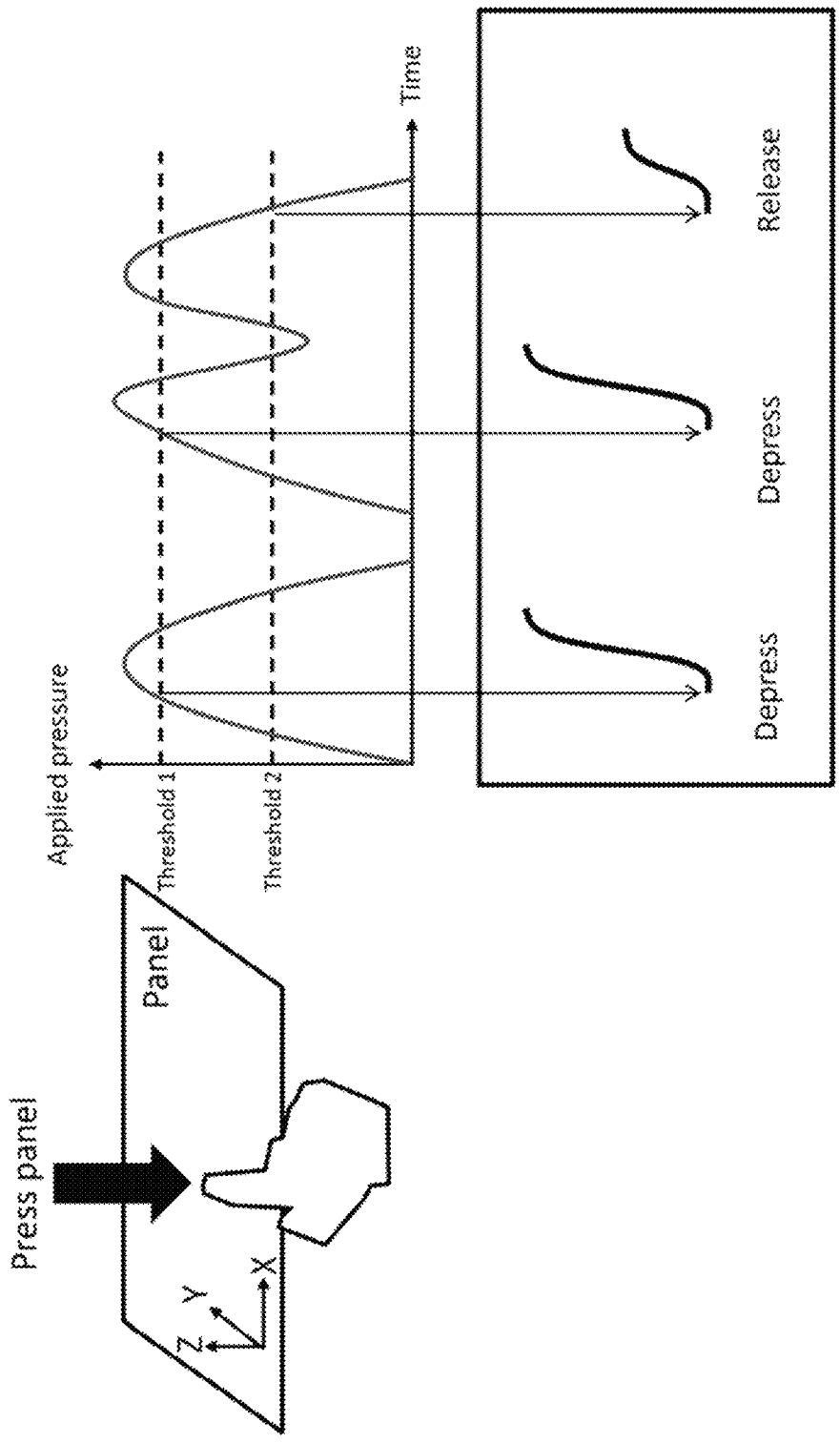
FIG. 108 Control of sense of depressing button (Latch)

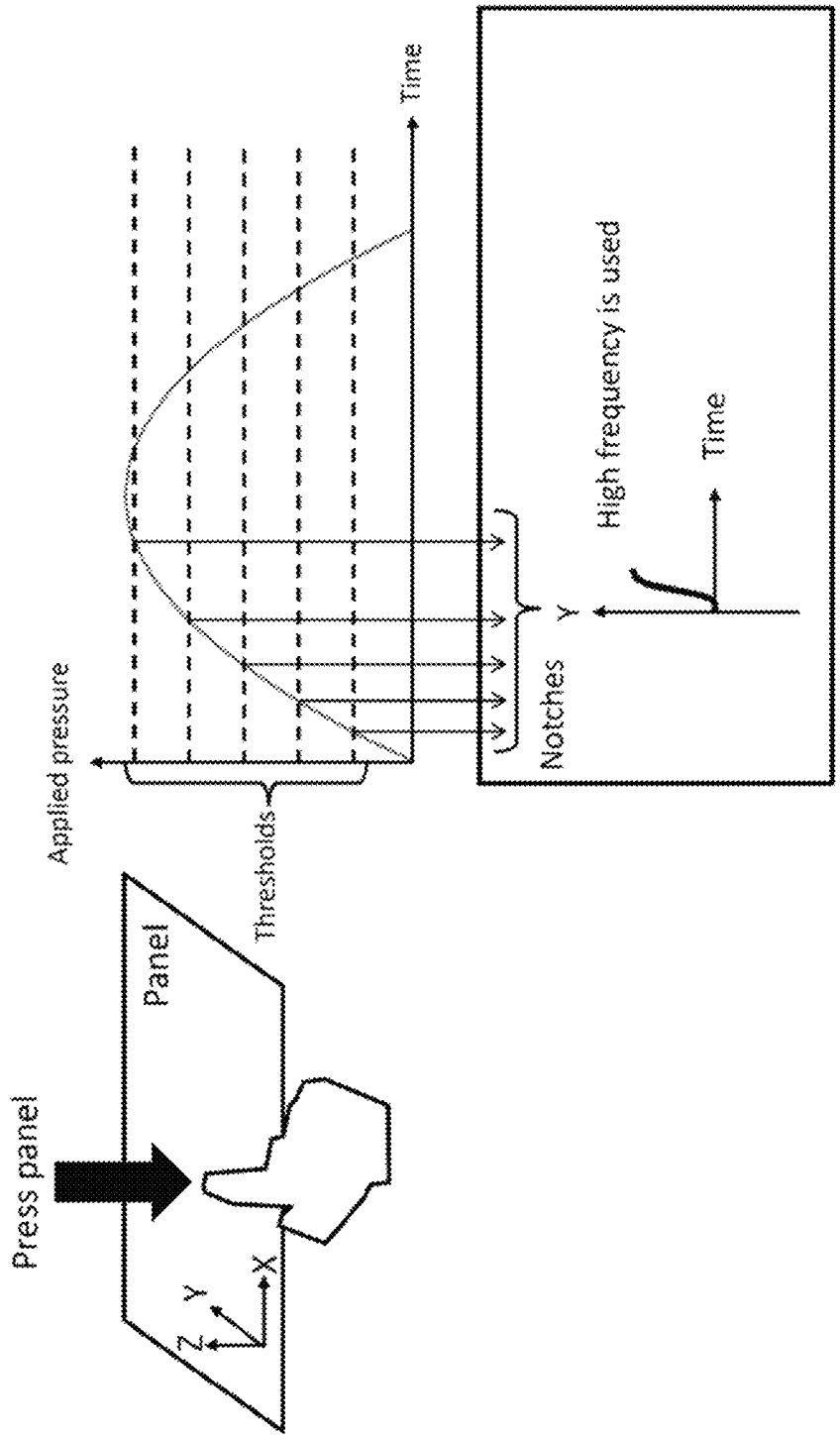
FIG. 109 Control of sense of depressing button (Equally spaced thresholds)

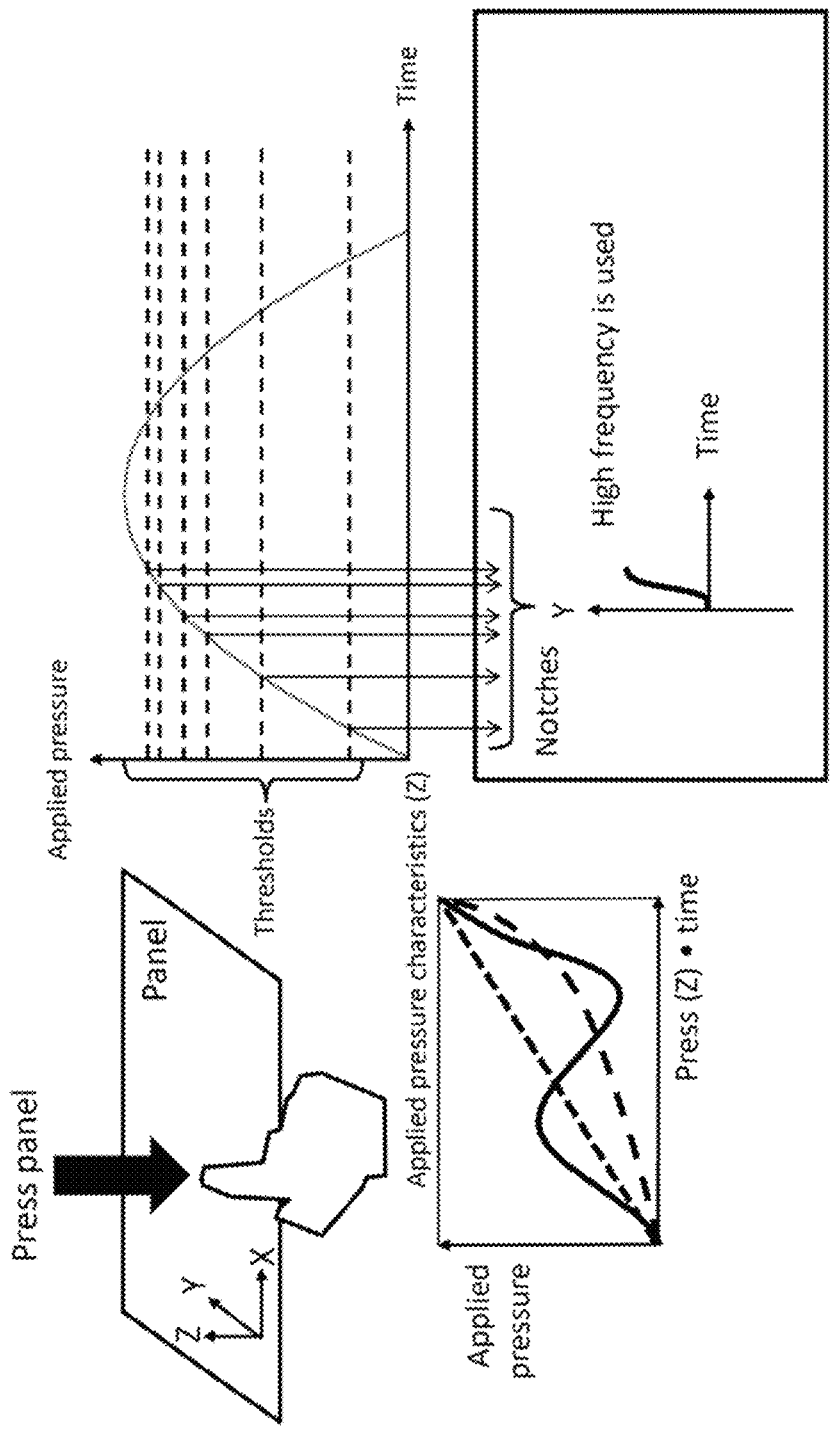
FIG. 110 Control of sense of depressing button (Unequally spaced thresholds)

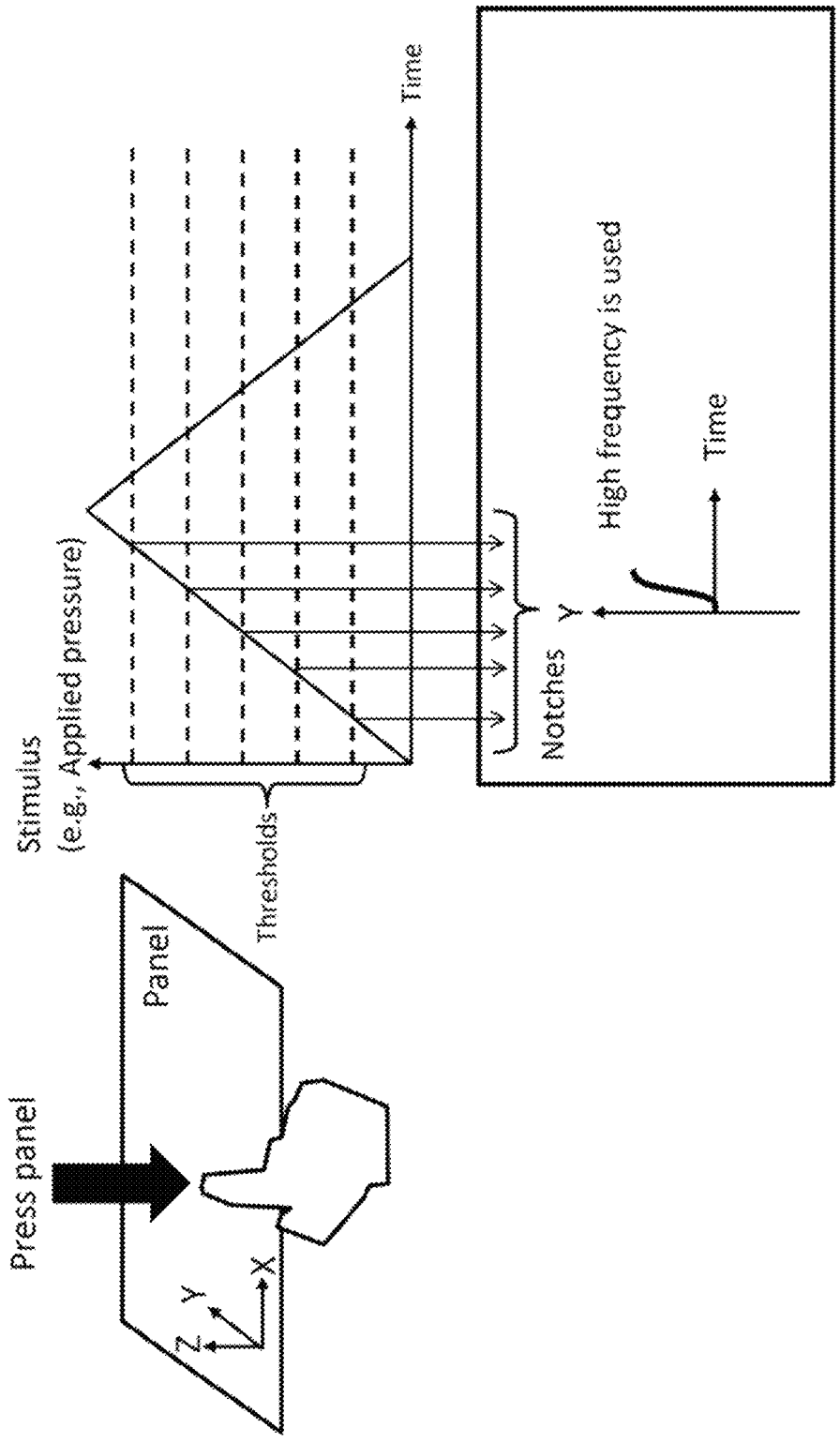
FIG. 111 Control of sense of depressing button (Equally spaced thresholds)

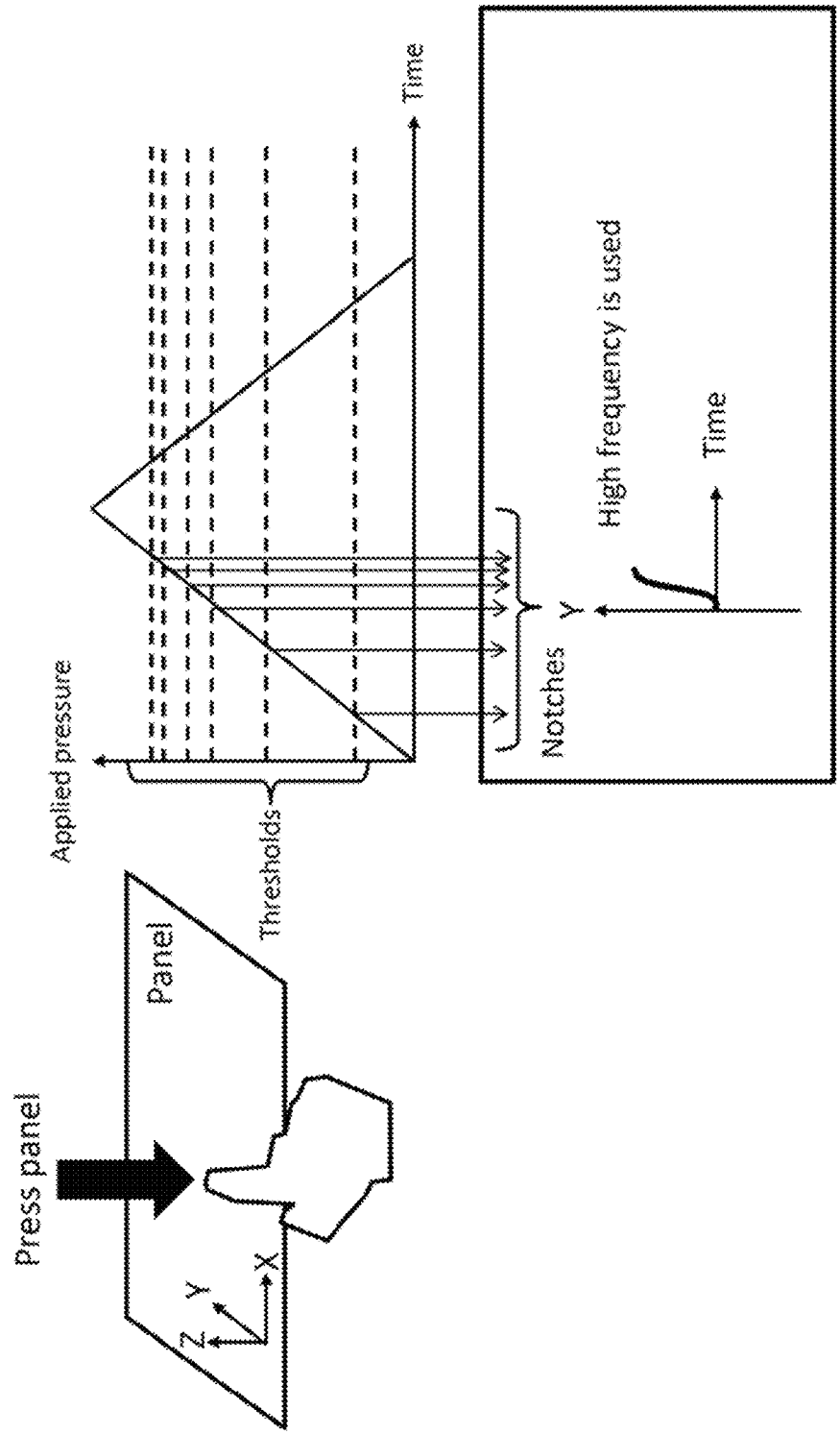
FIG. 112 Control of sense of depressing button (Unequally spaced thresholds)

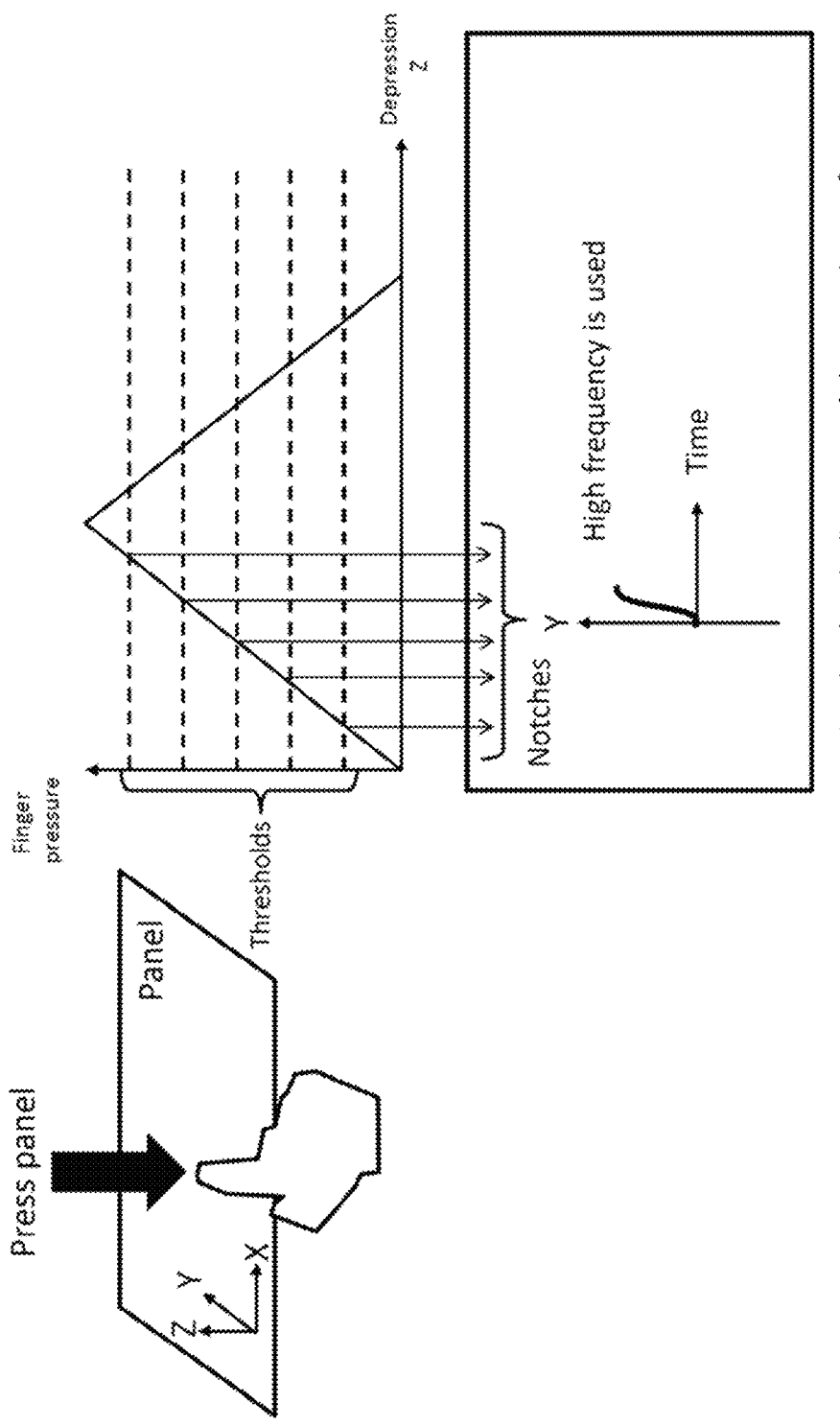
FIG. 113 Control of sense of depressing button (Equally spaced thresholds)

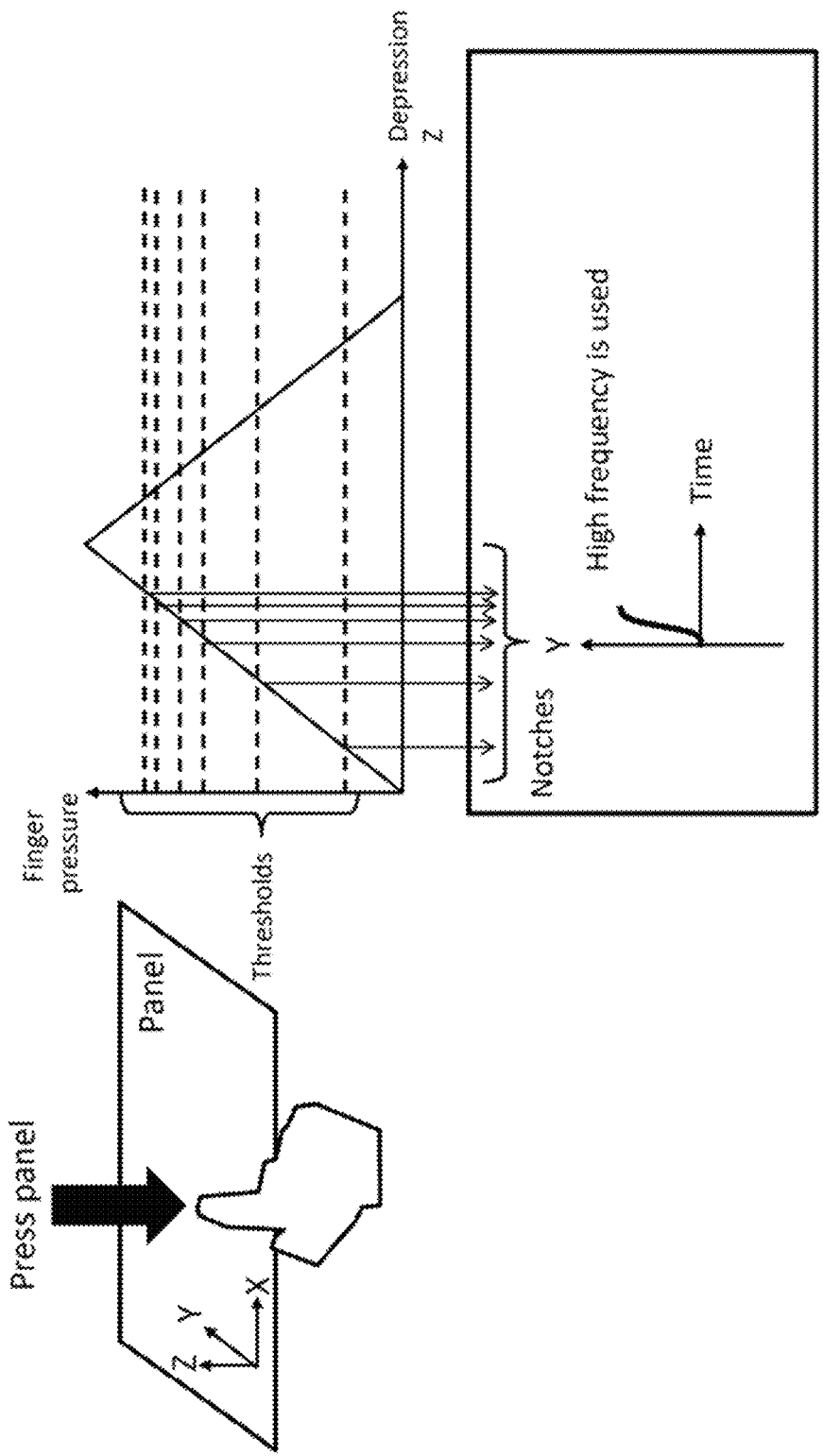
FIG. 114 Control of sense of depressing button (Unequally spaced thresholds)

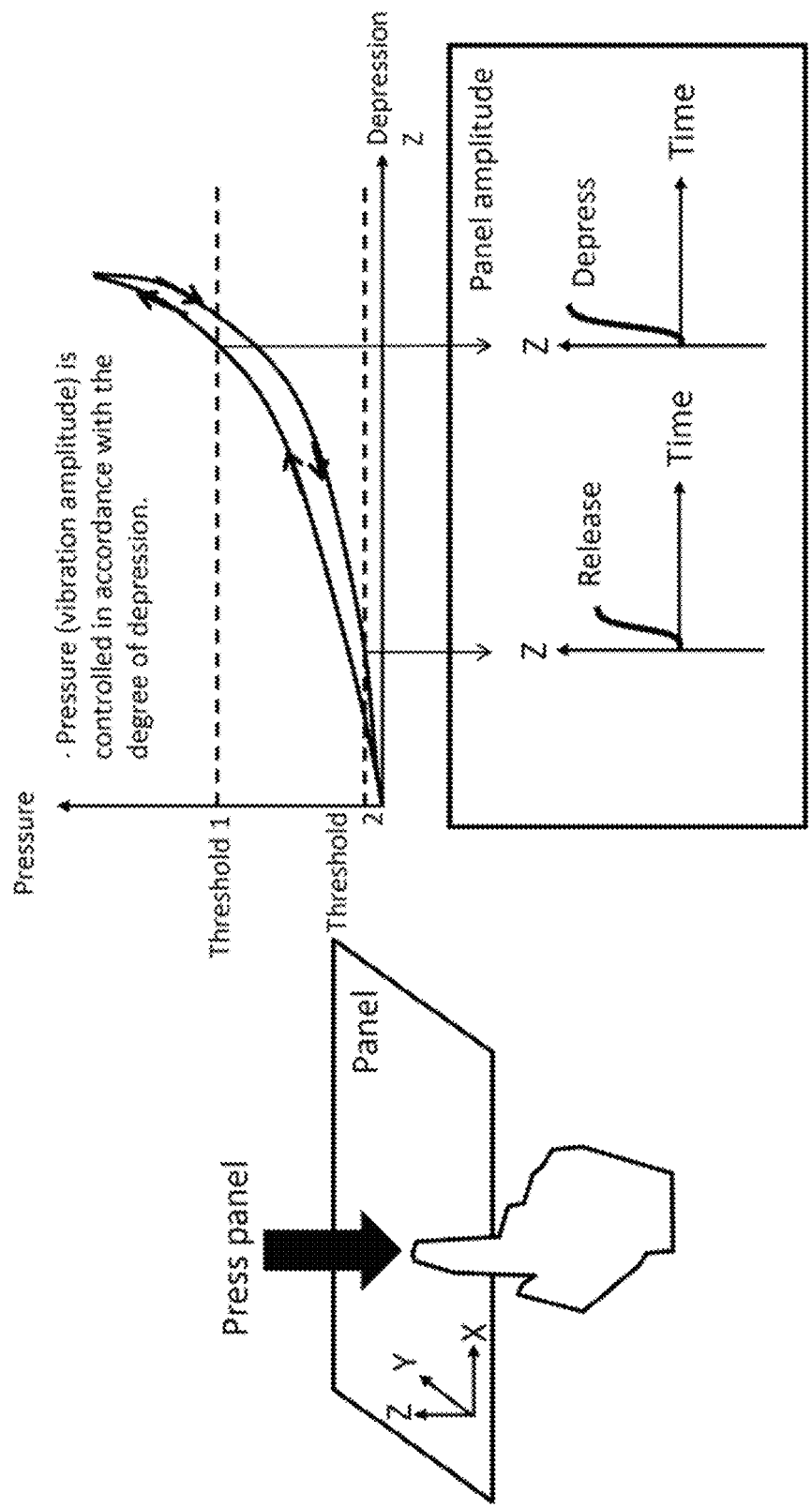
FIG. 115 Control of sense of depressing button (Hysteresis)

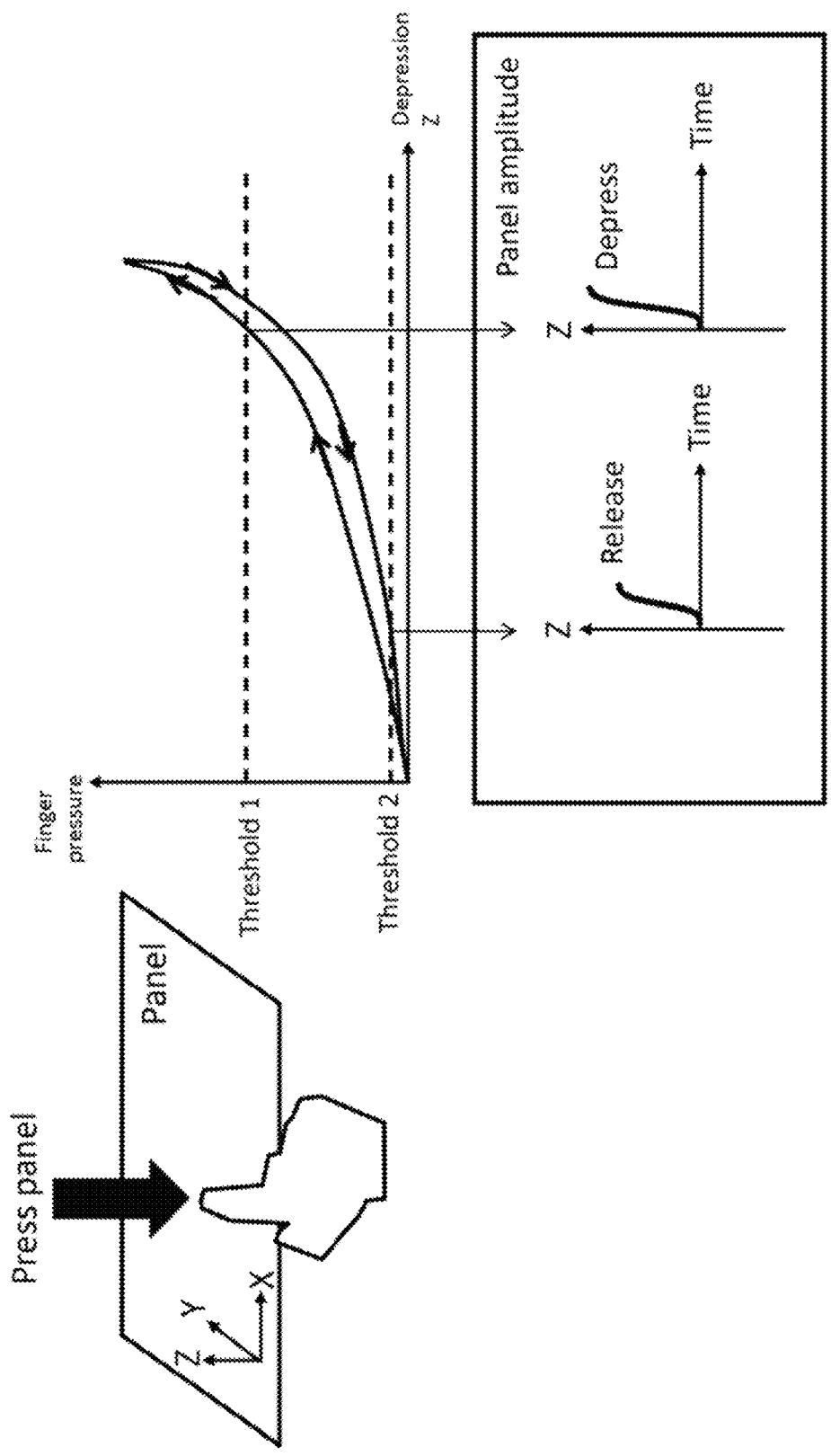
FIG. 116 Control of sense of depressing button (Control of finger pressure function)

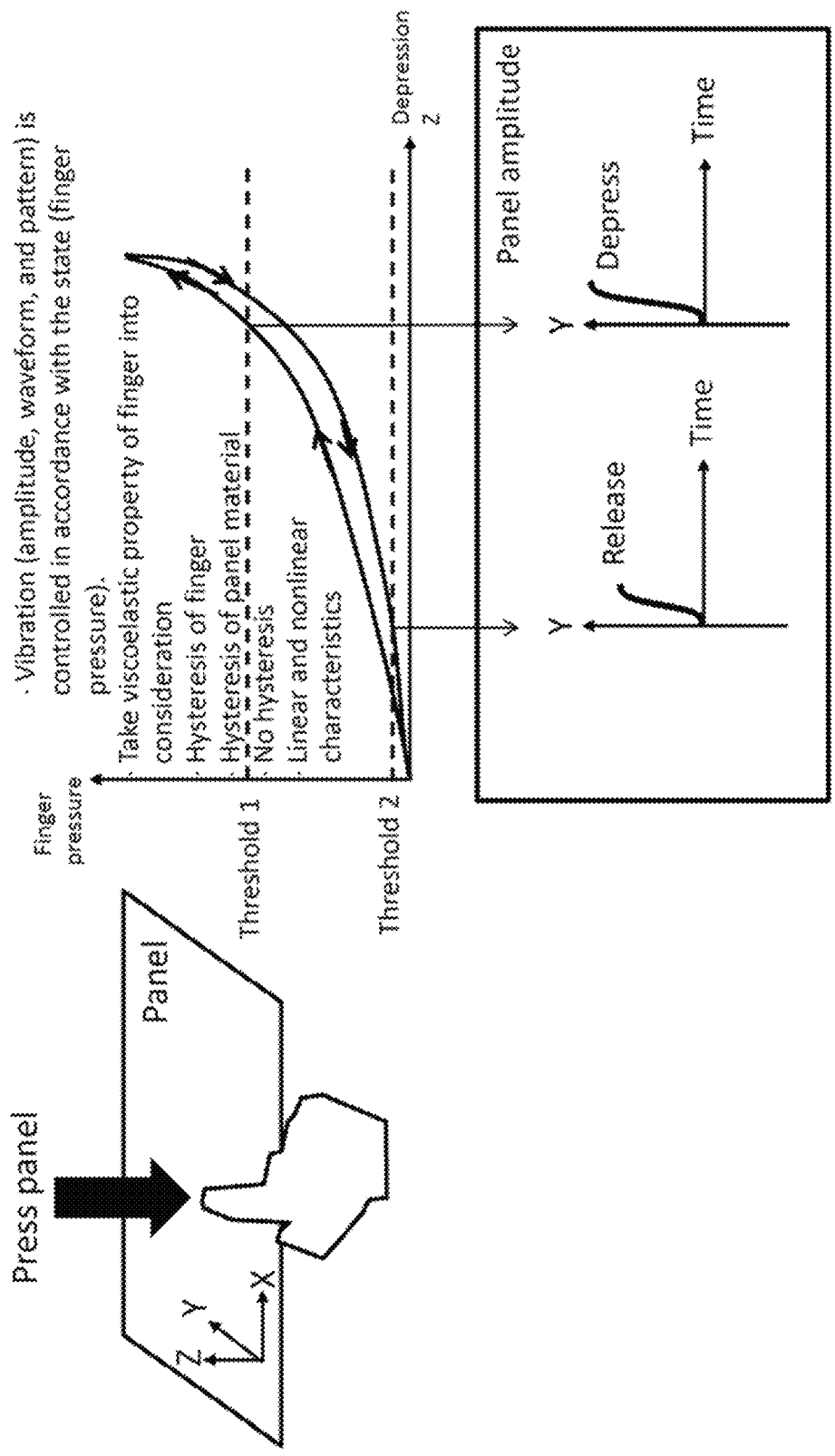
FIG. 117 Control of sense of depressing button (Adaptive control of waveform)

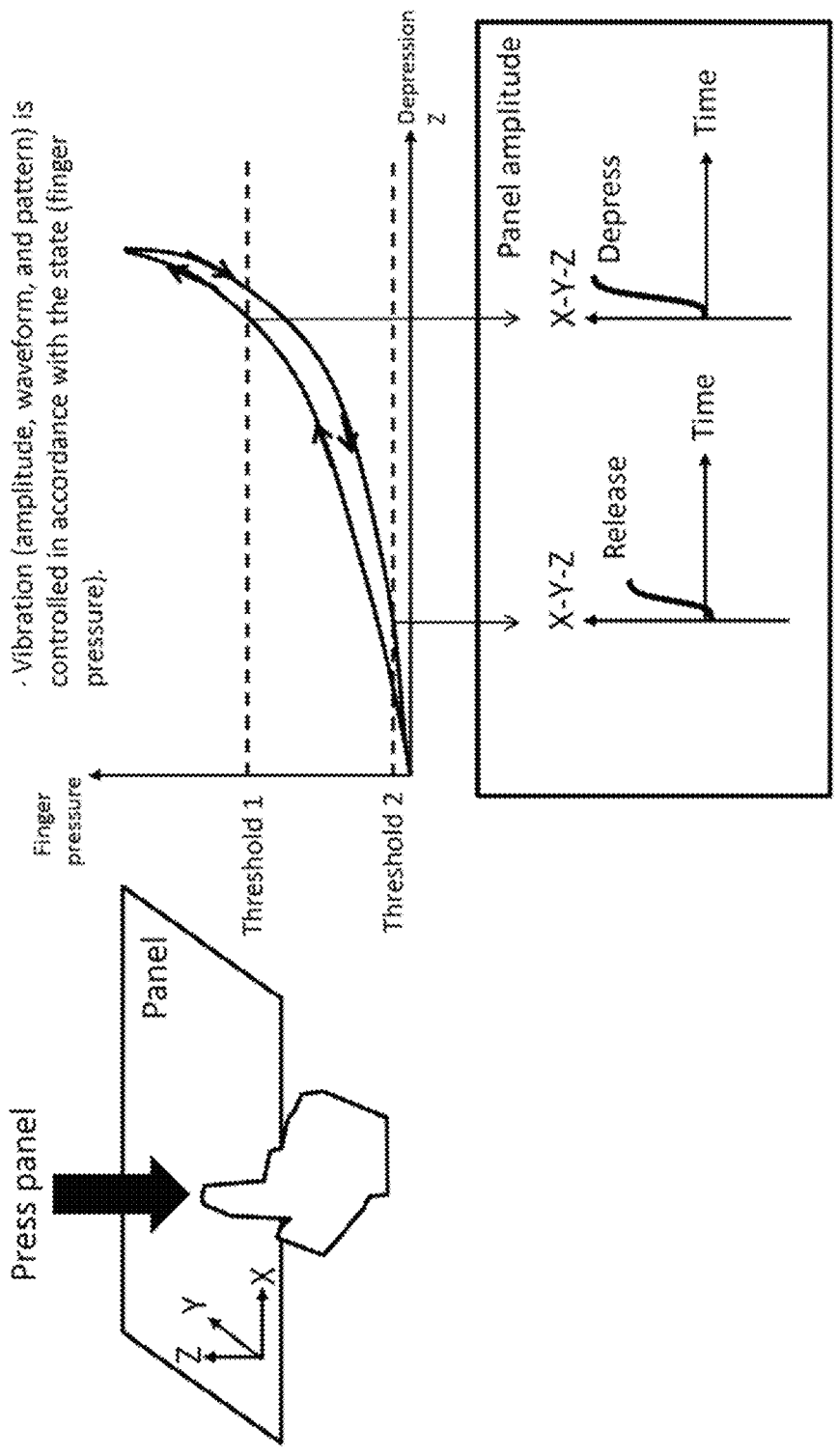
FIG. 118 Control of sense of depressing button (3D vibration control)

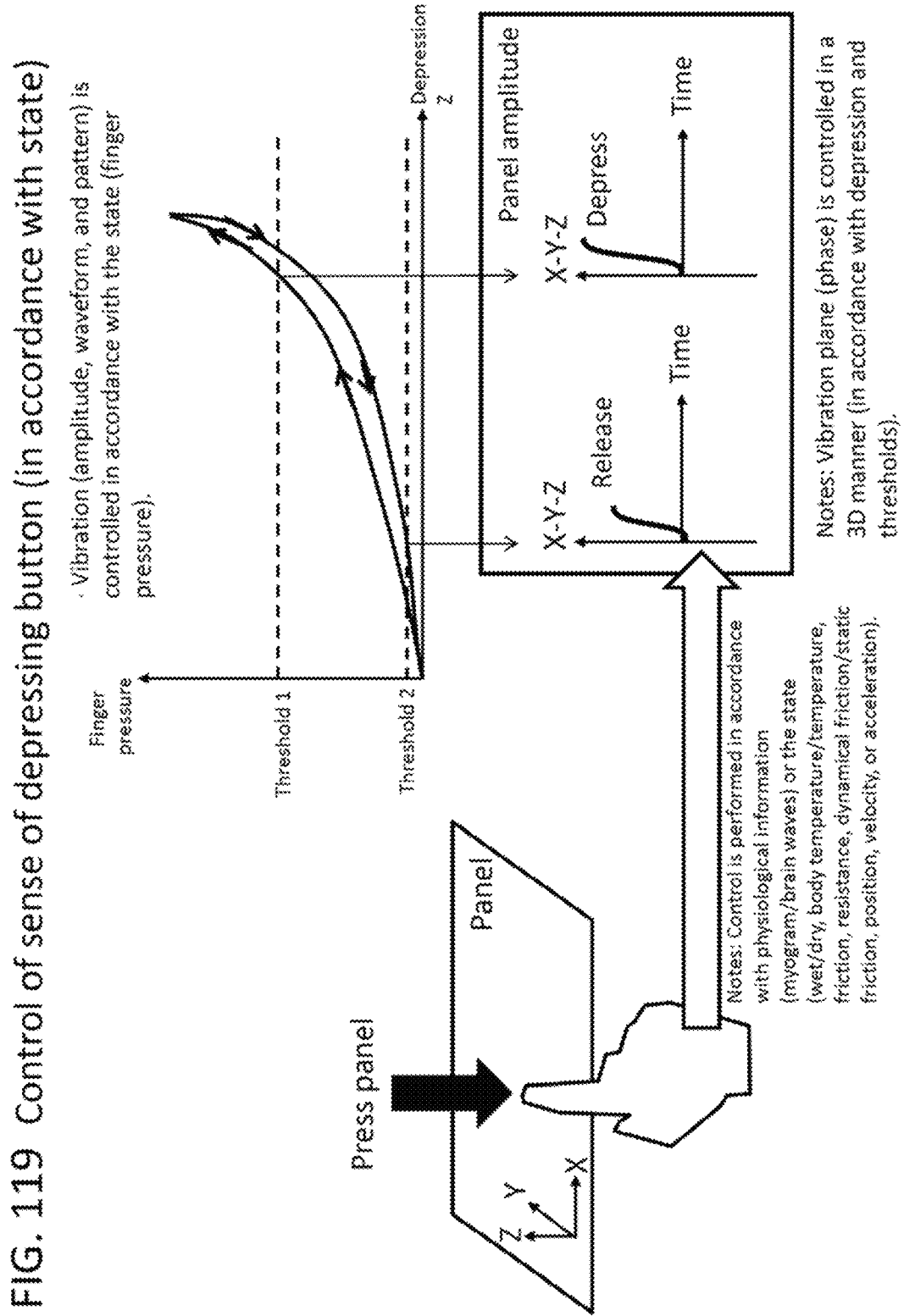
FIG. 119 Control of sense of depressing button (in accordance with state)

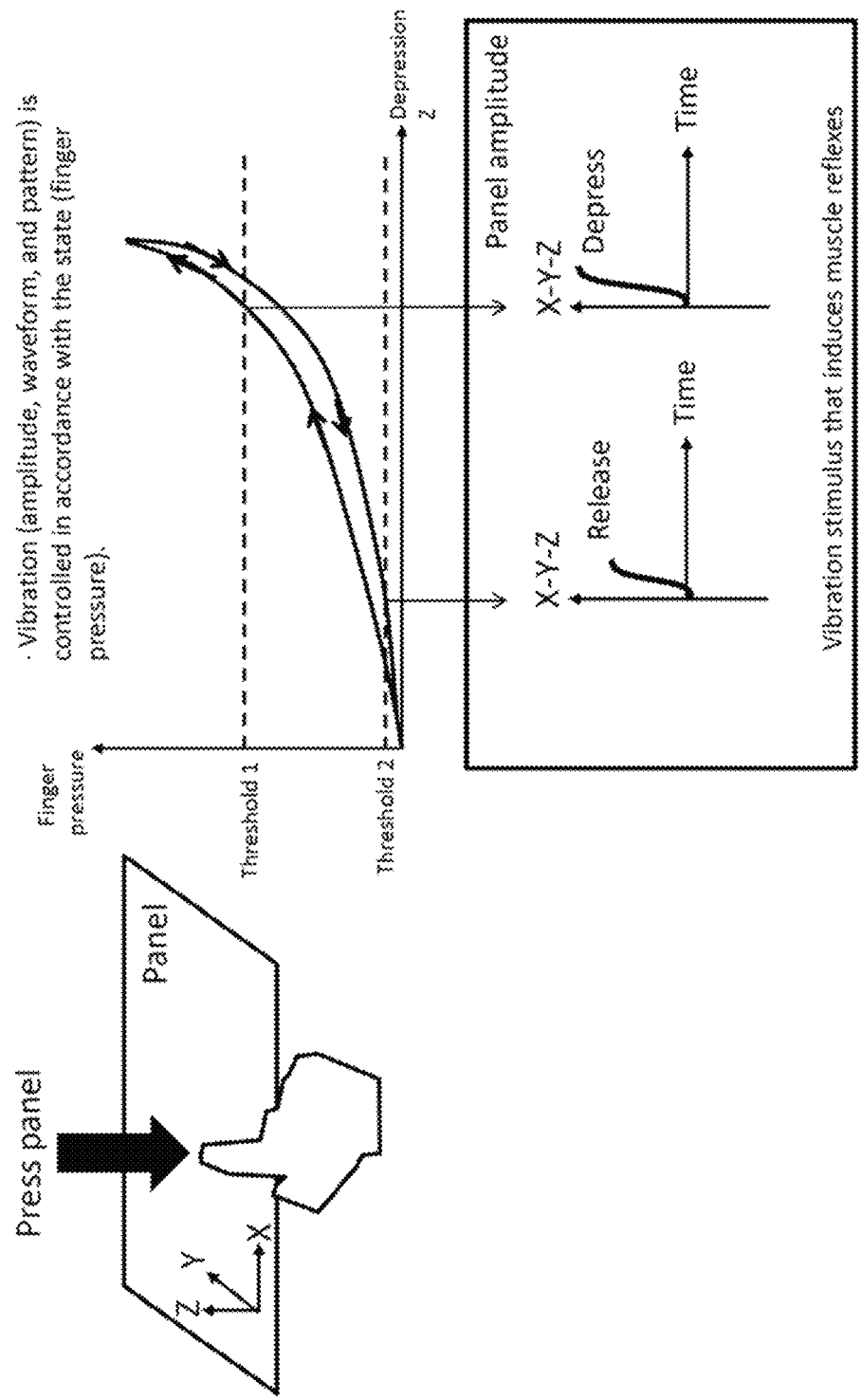
FIG. 120 Control of sense of depressing button (induction of muscle reflexes)

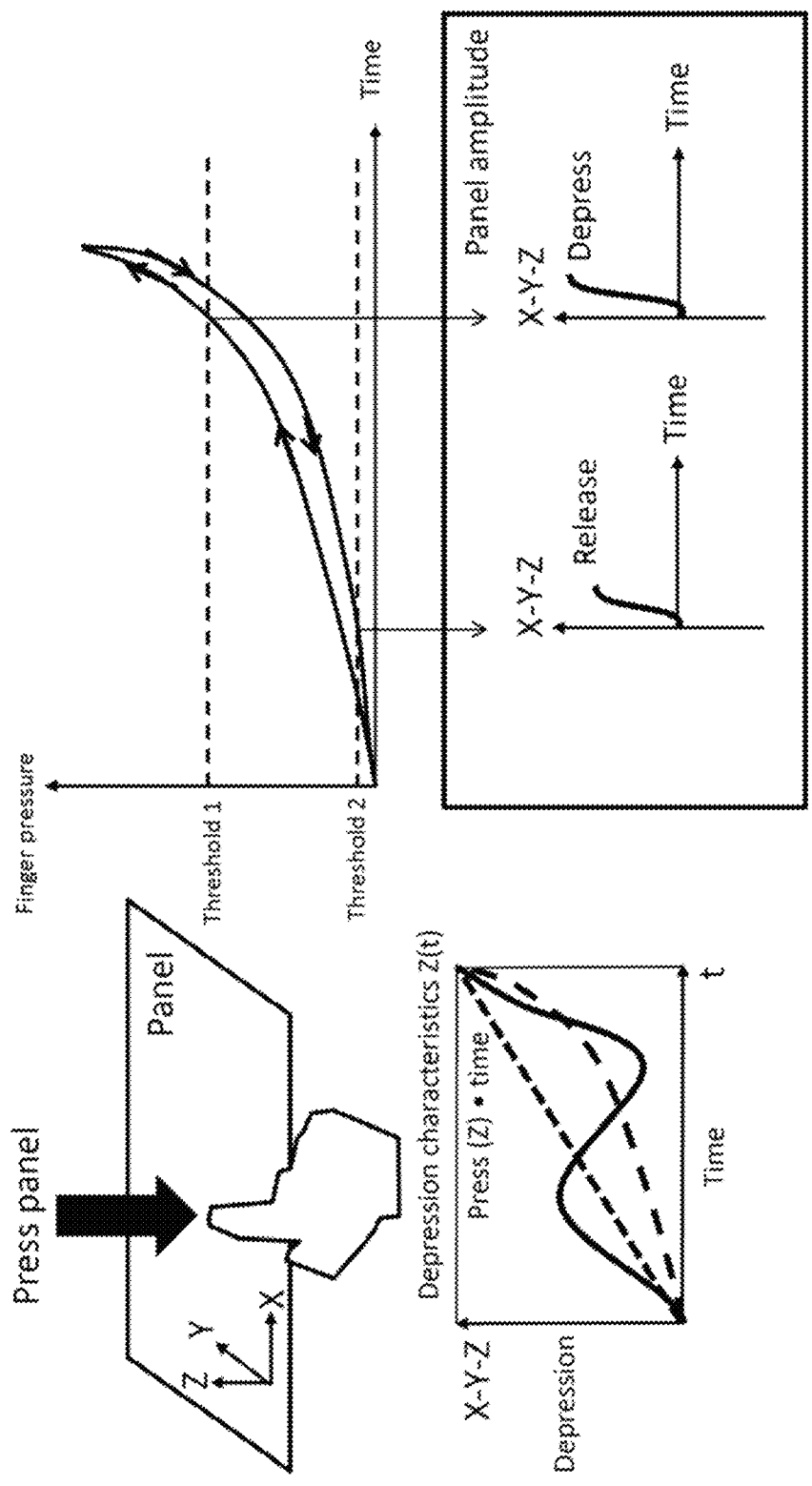
FIG. 121 Control of sense of depressing button (temporal pattern control)

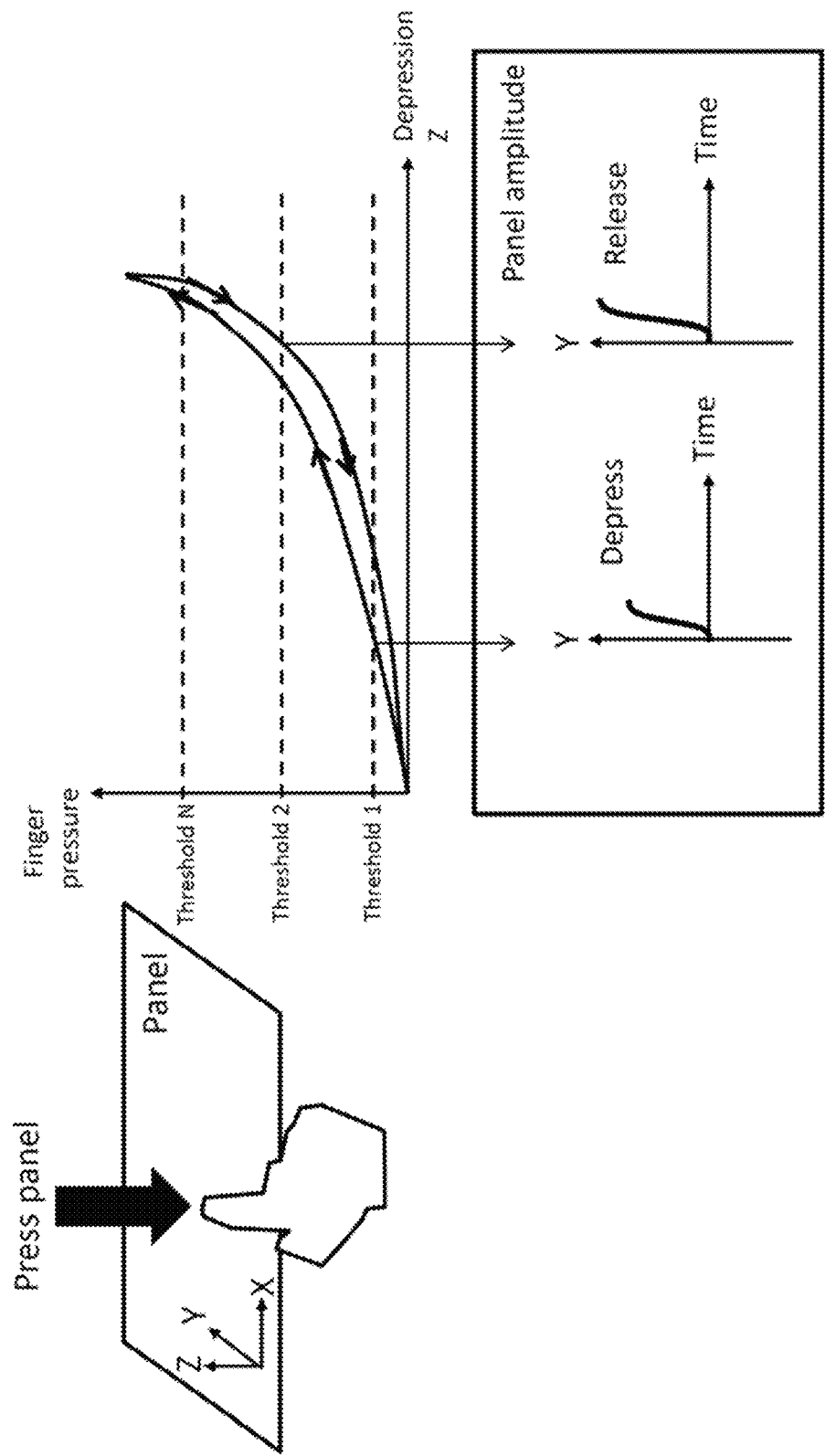
FIG. 122 Control of sense of depressing button (threshold control)

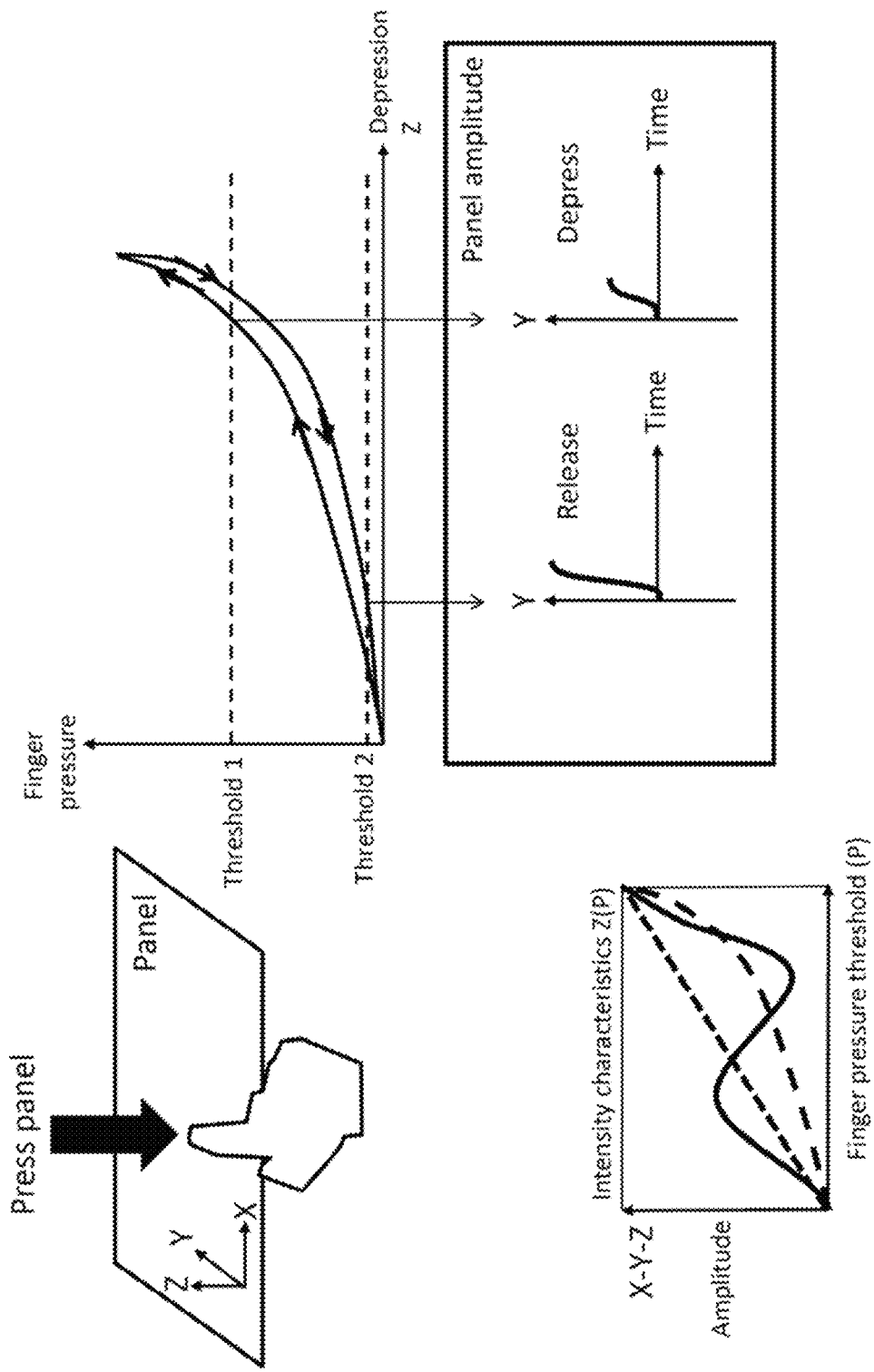
FIG. 123 Control of sense of depressing button (Pulse amplitude control)

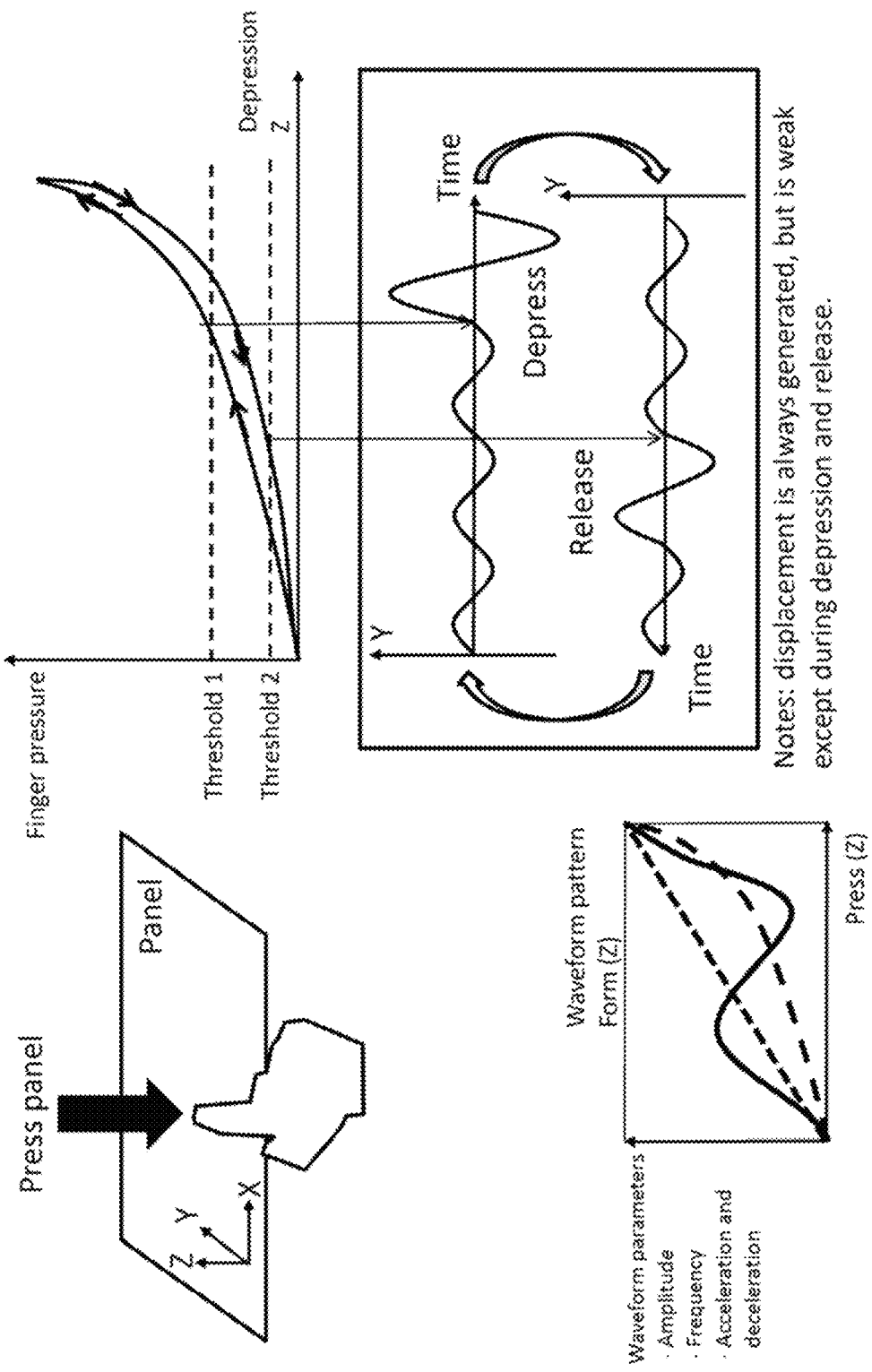
FIG. 124 Control of sense of depressing button (Waveform control)

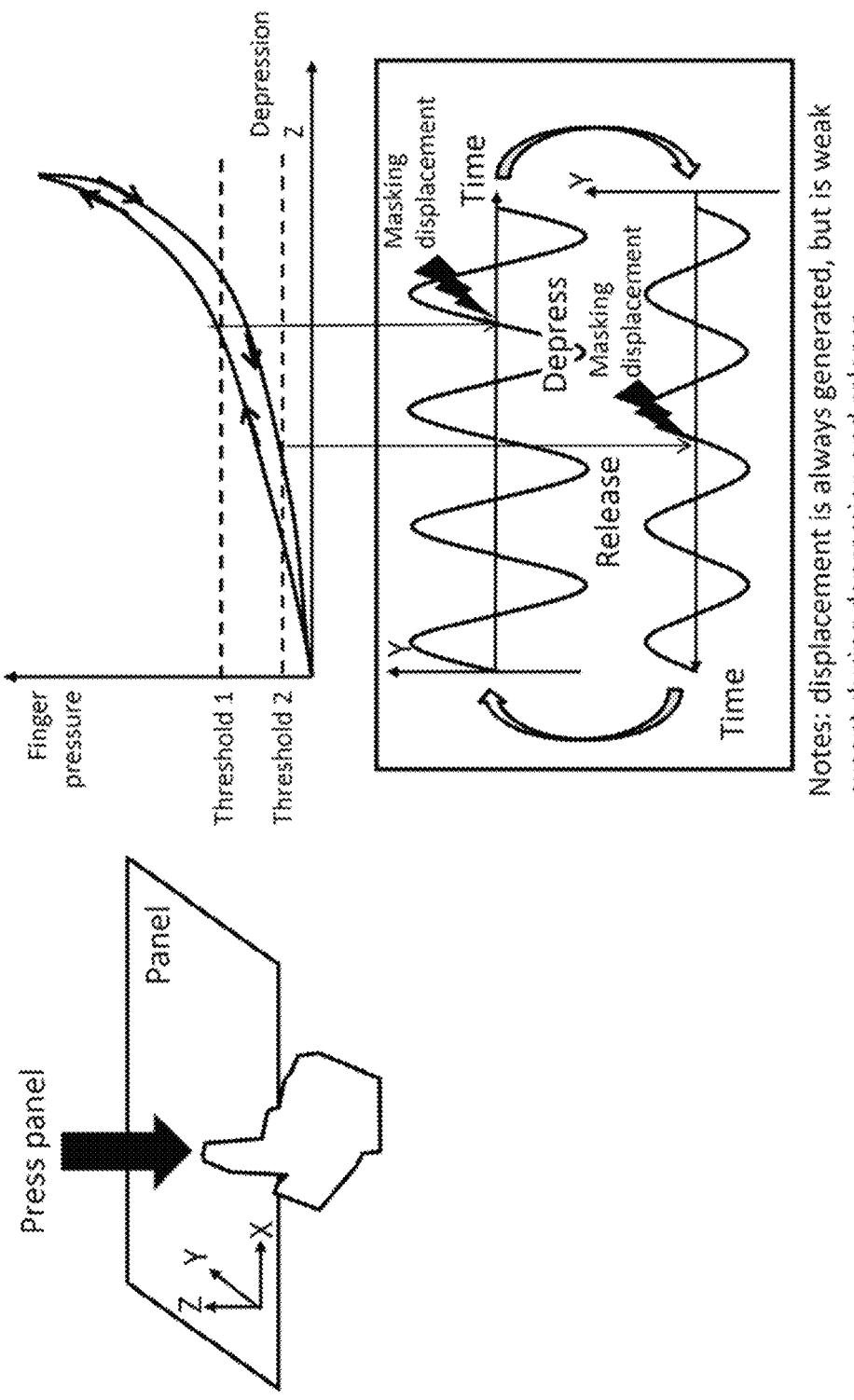
FIG. 125 Control of sense of depressing button (Masking control)

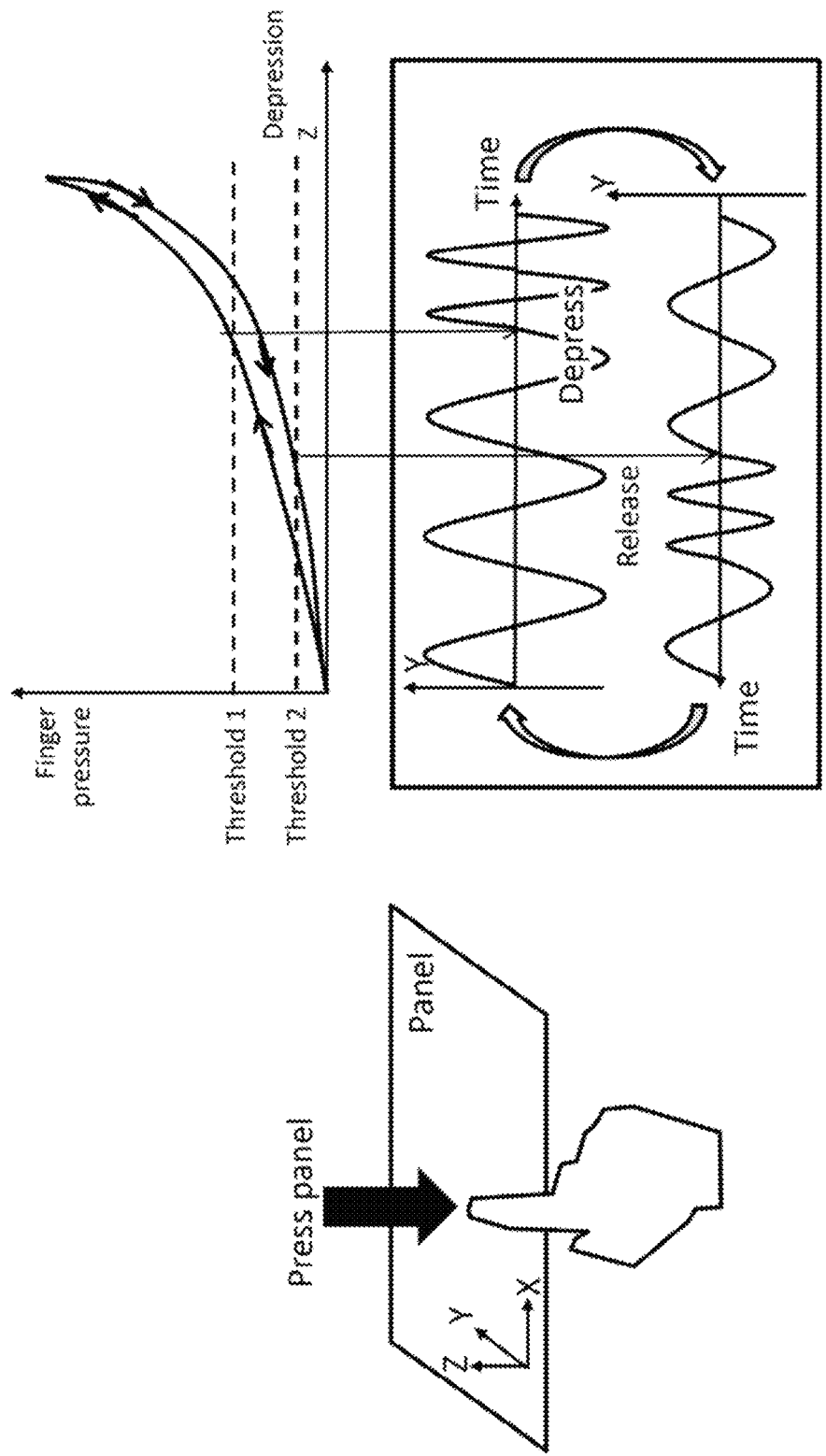
FIG. 126 Control of sense of depressing button (Dynamic and static friction)

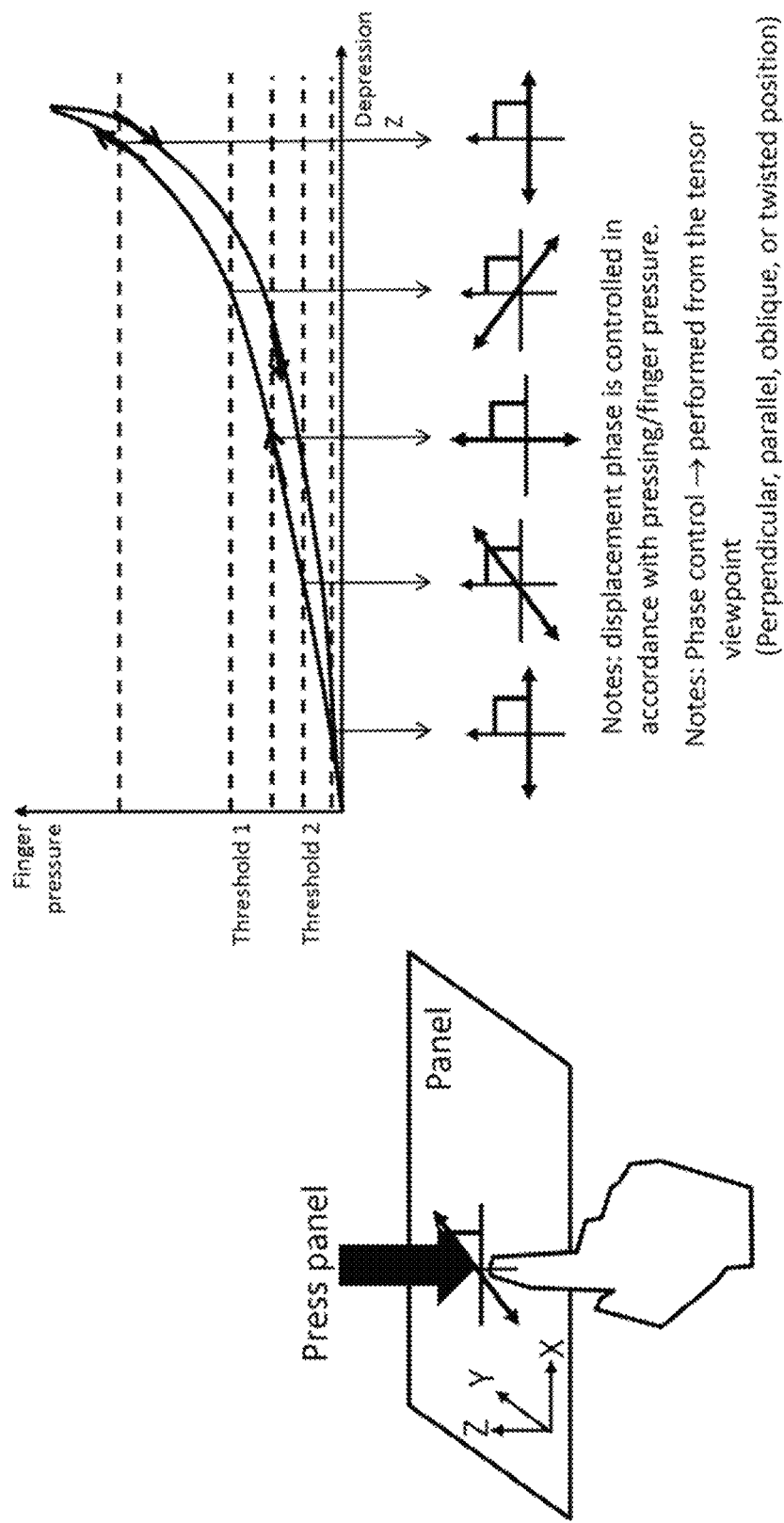
FIG. 127 Control of sense of depressing button (Phase control)

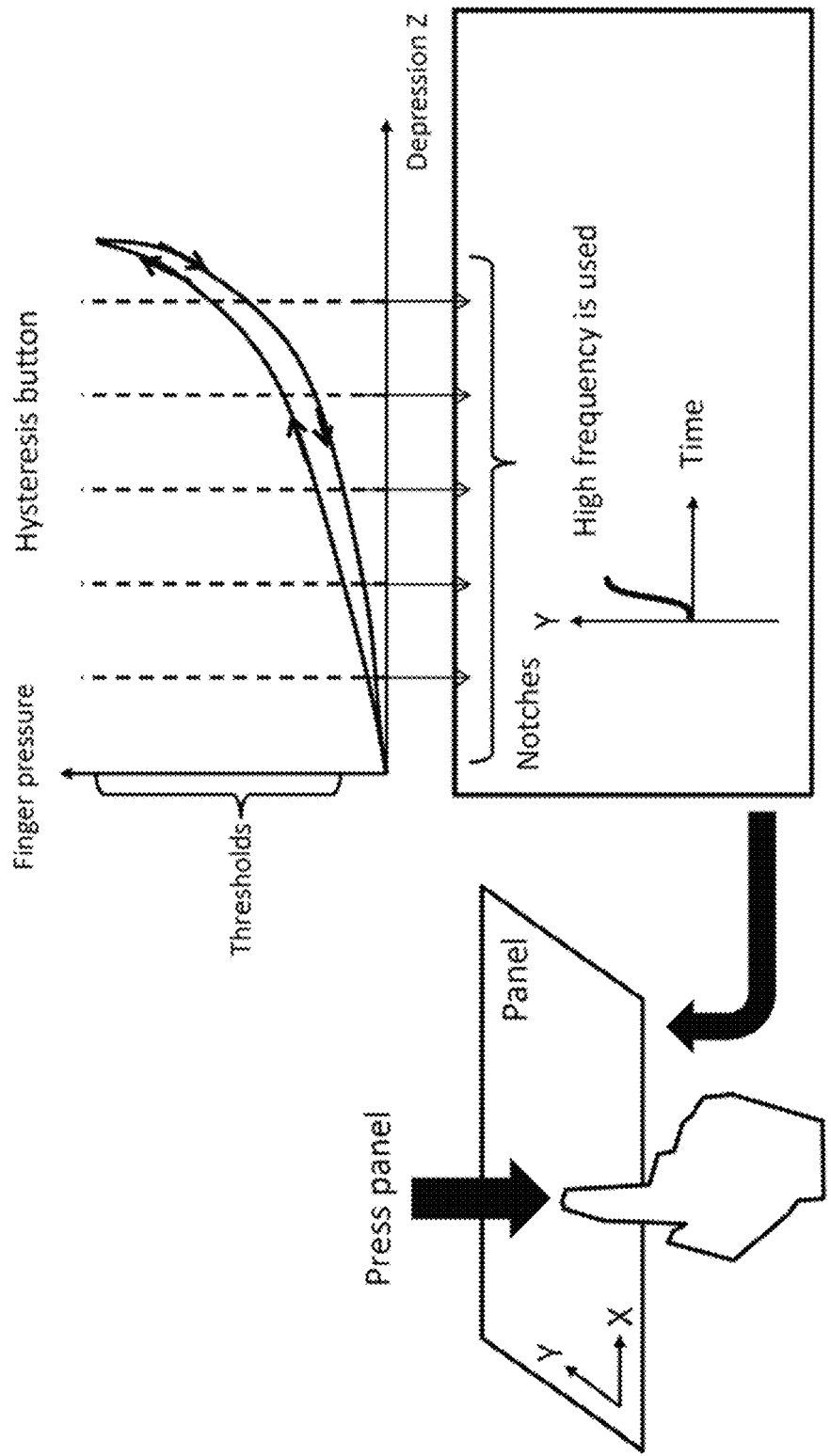
FIG. 128 Control of sense of depressing button (Depression at regular intervals)

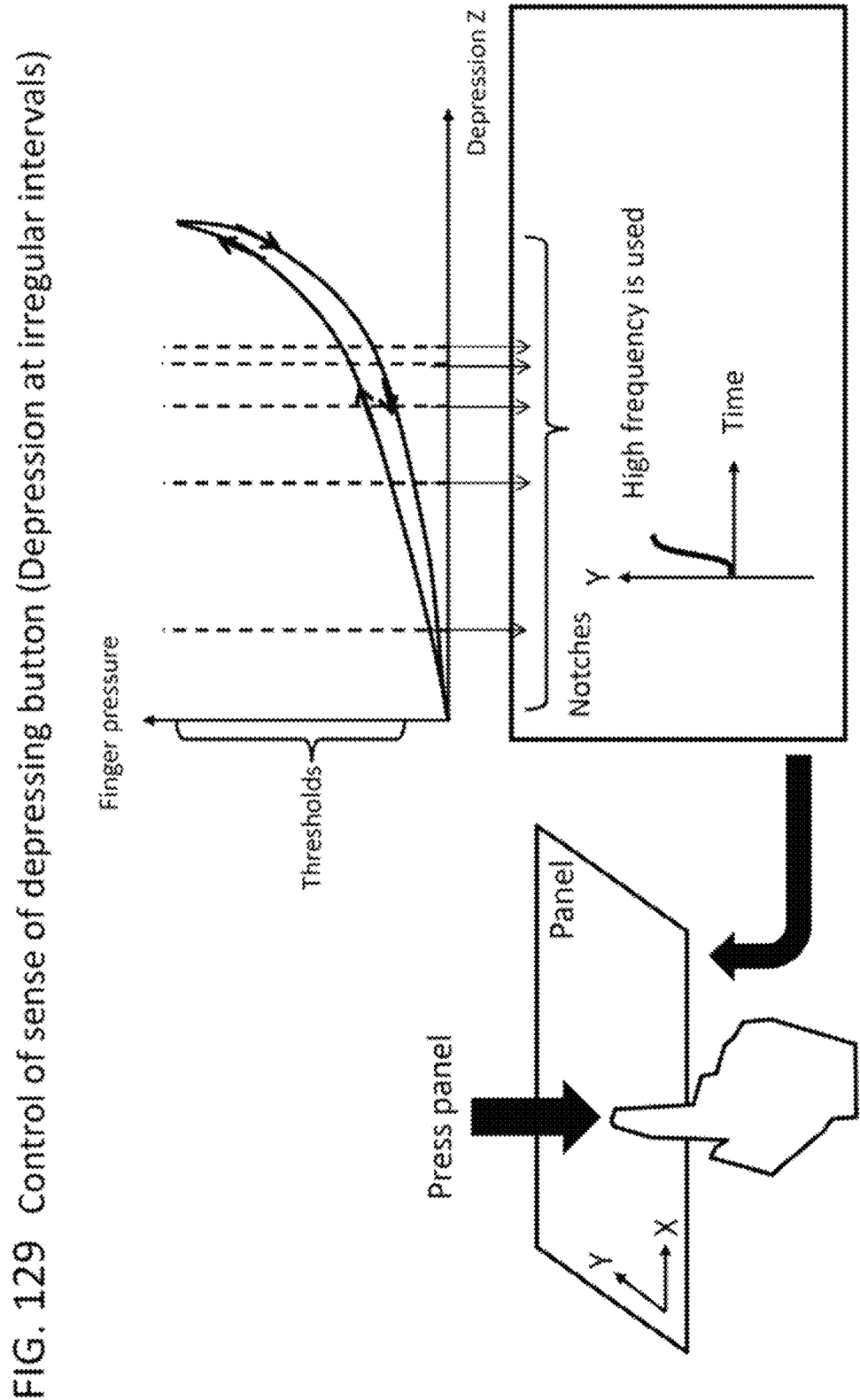
FIG. 129 Control of sense of depressing button (Depression at irregular intervals)

FIG. 130 Control of sense of depressing button
(Equally spaced thresholds)
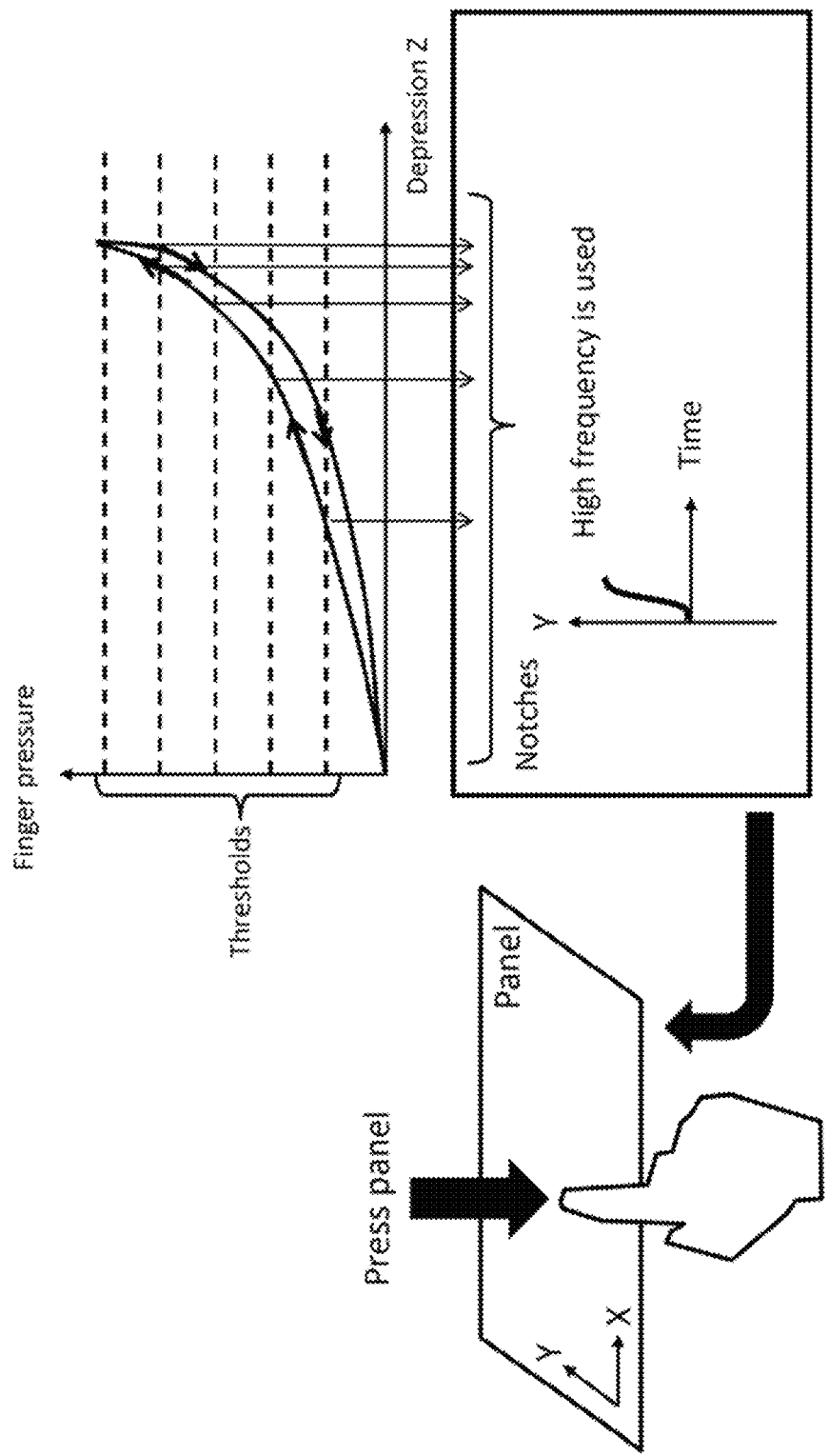

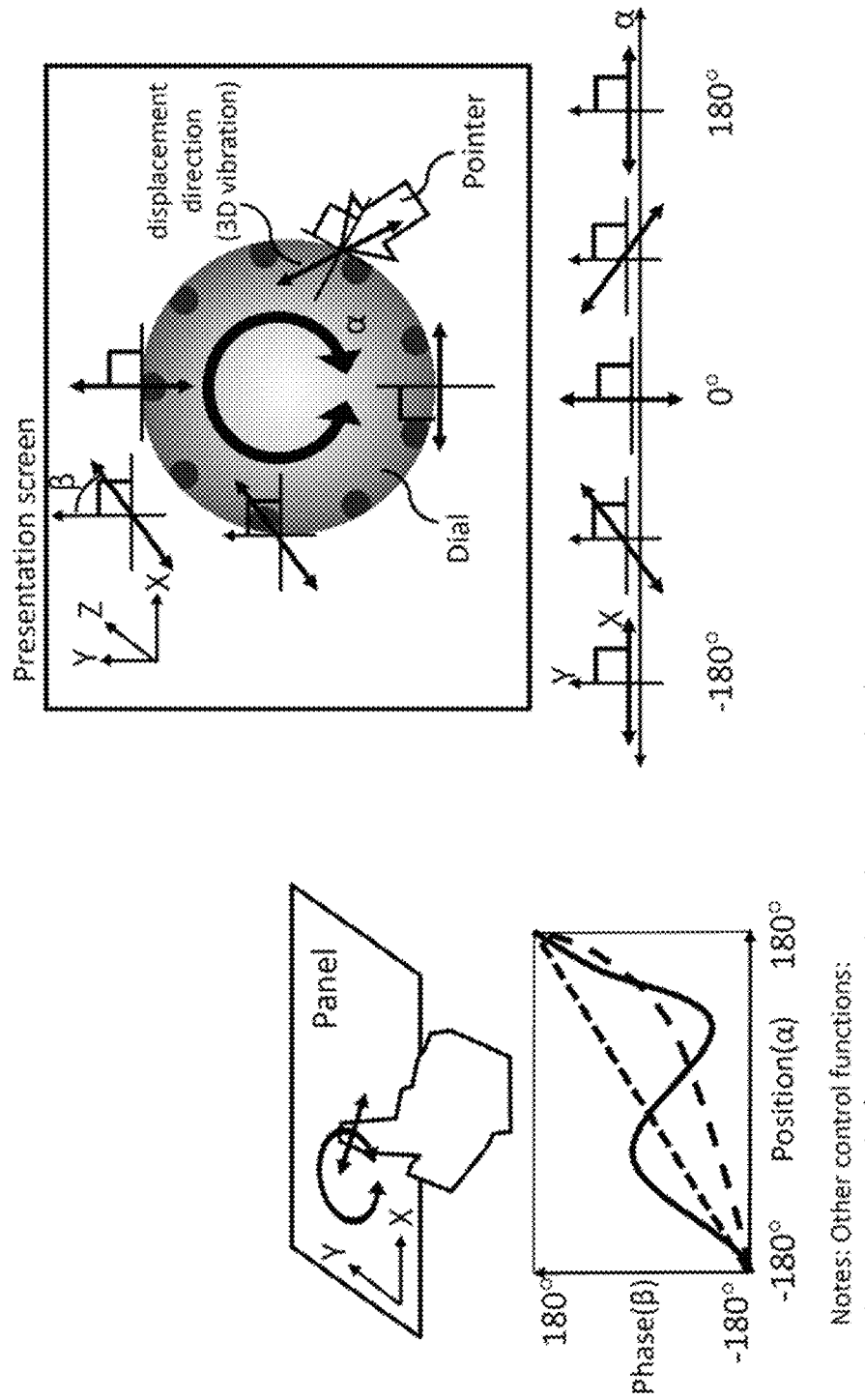
FIG. 131 Haptic sense dial (Basic representation and control functions)

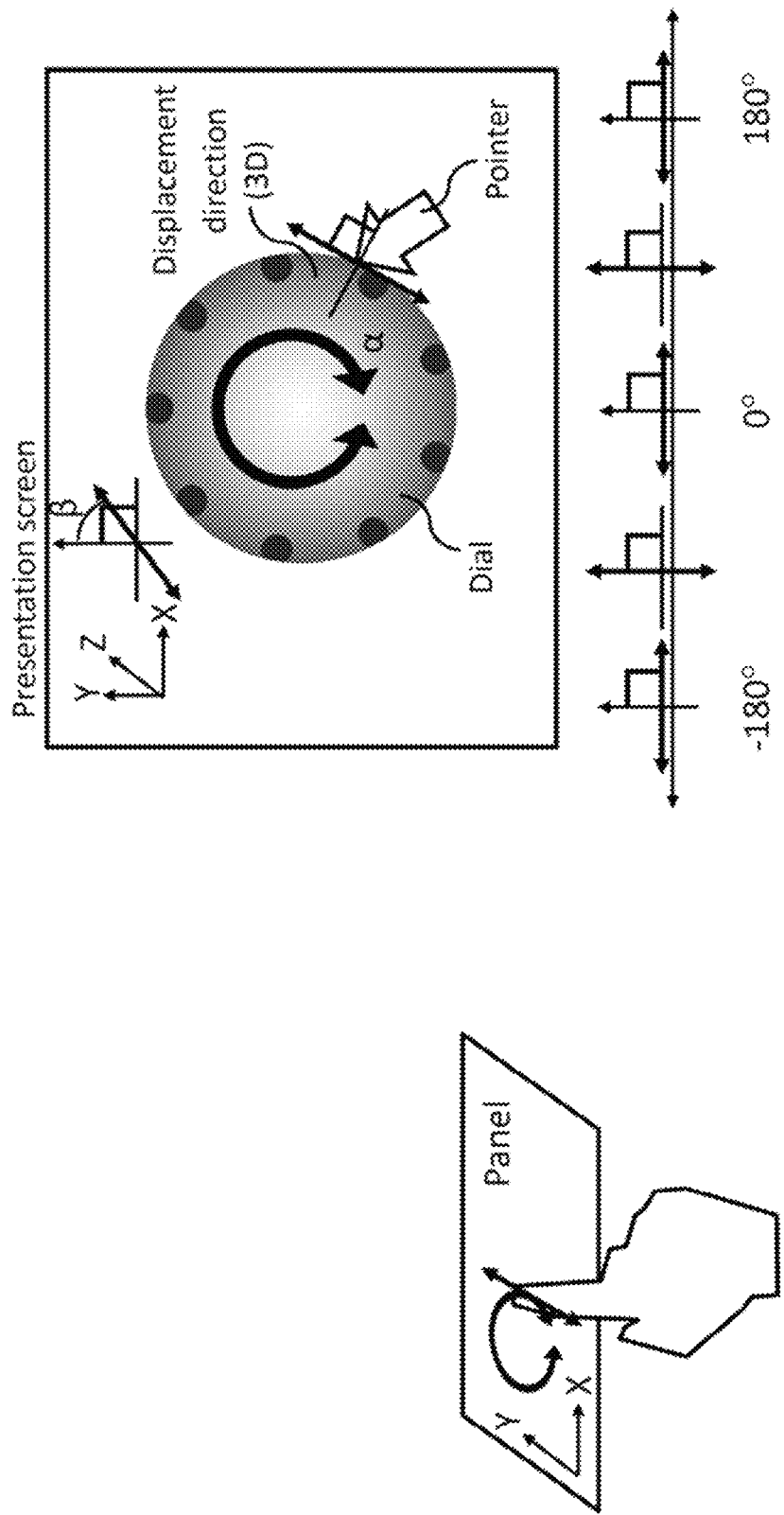
FIG. 132 Dial (Sense of acceleration)

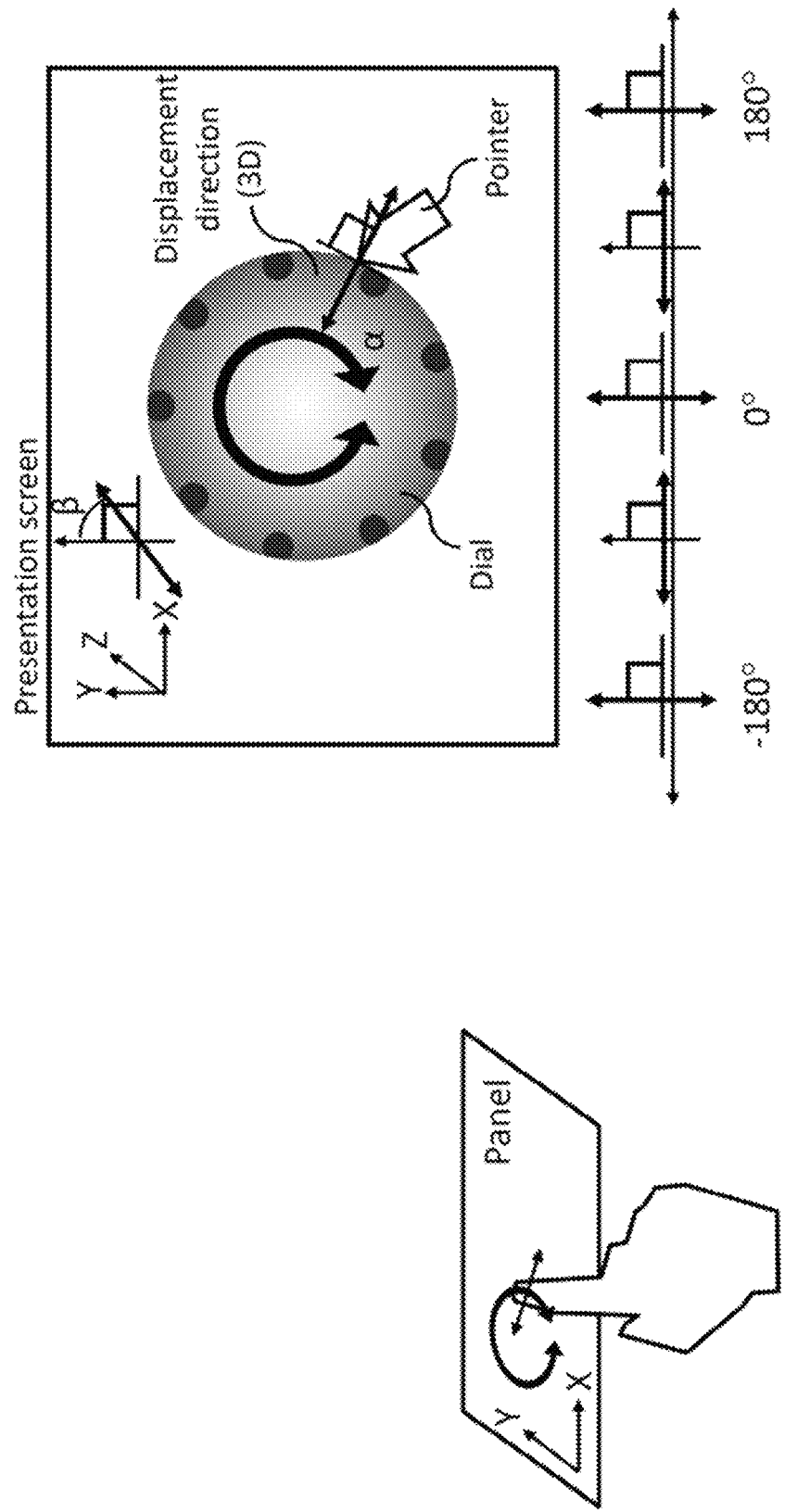
FIG. 133 Dial (Sense of resistance)

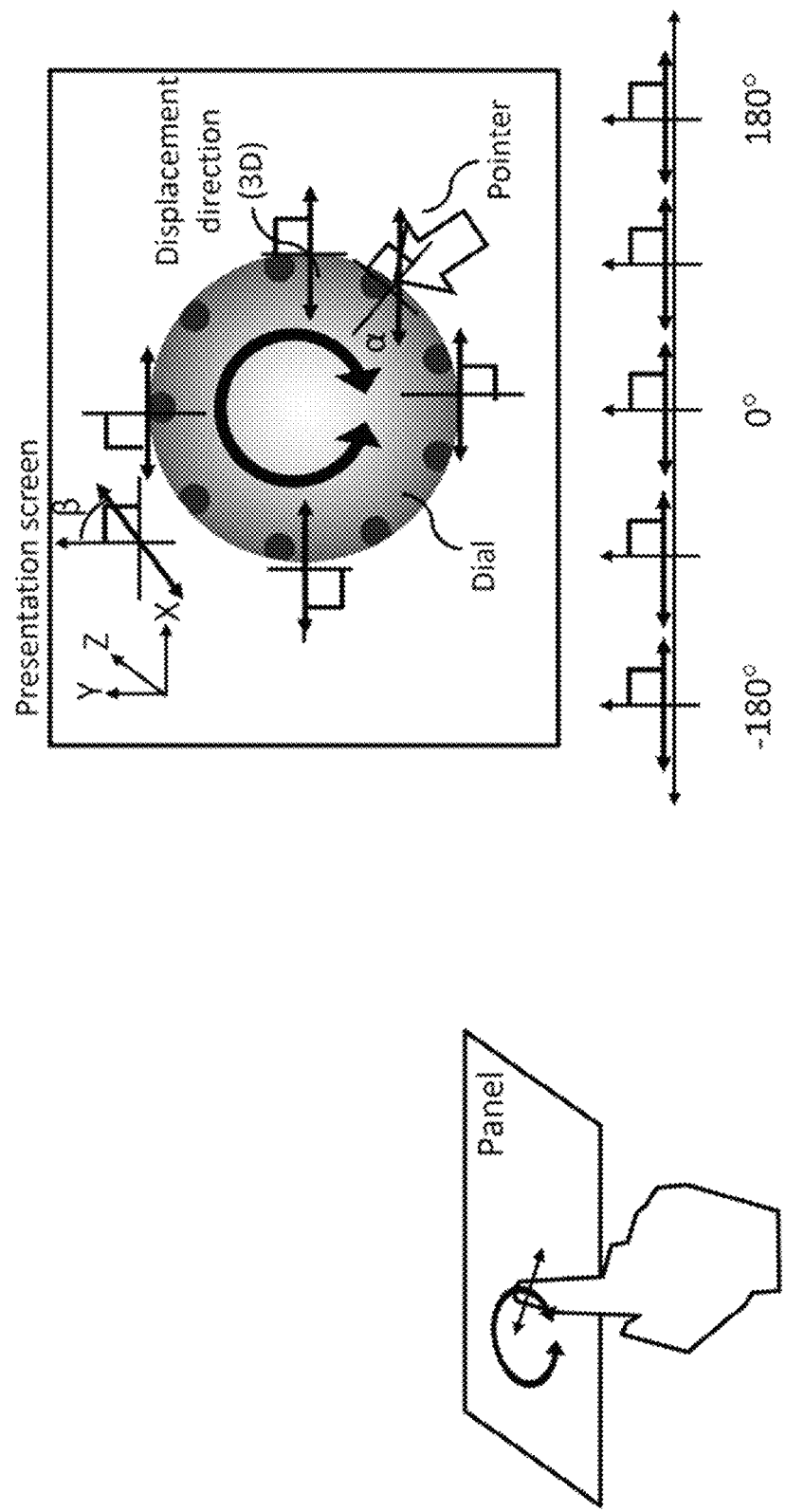
FIG. 134 Dial (Sense of horizontal acceleration)

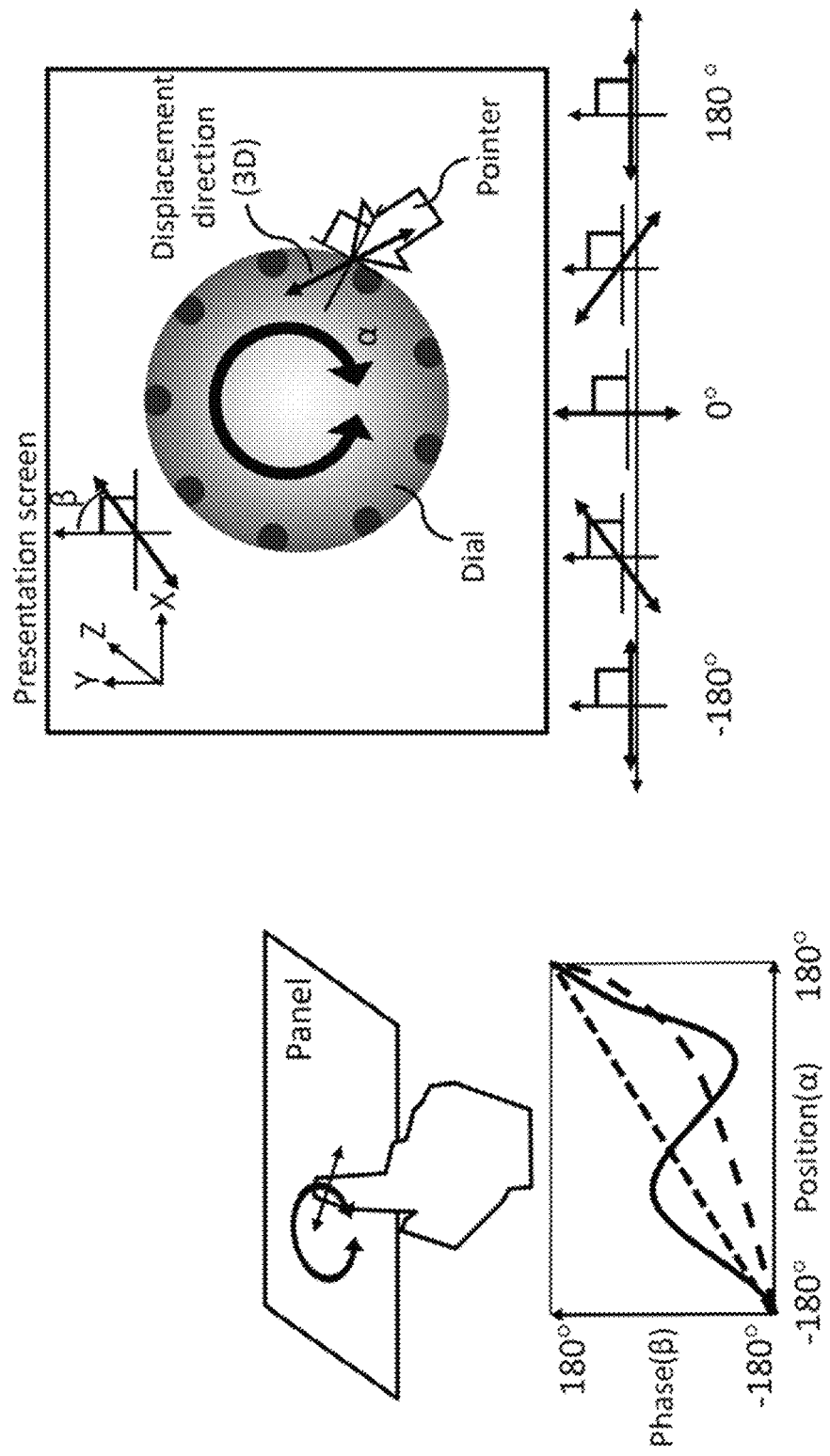
FIG. 135 Dial (Variable touch)

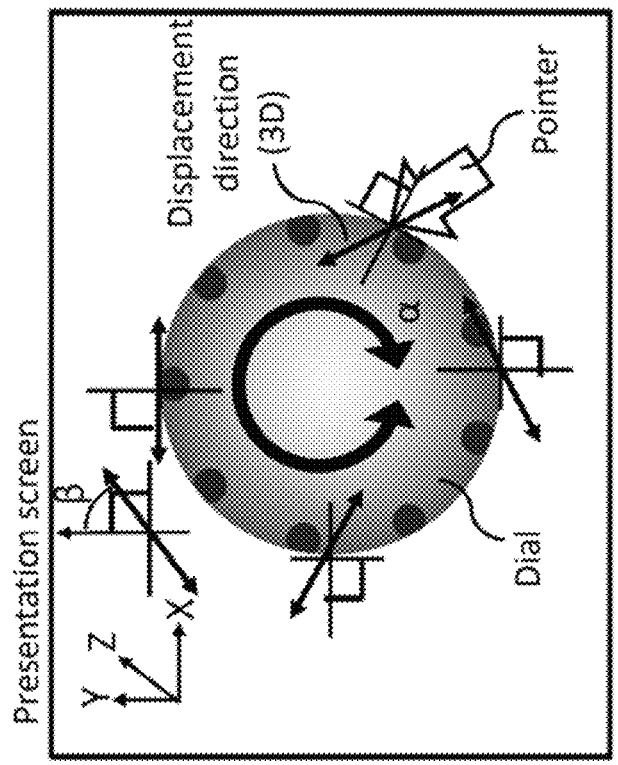
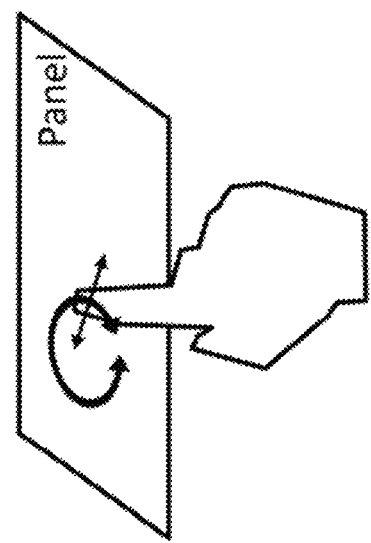
FIG. 136 Dial (Sense of randomness)

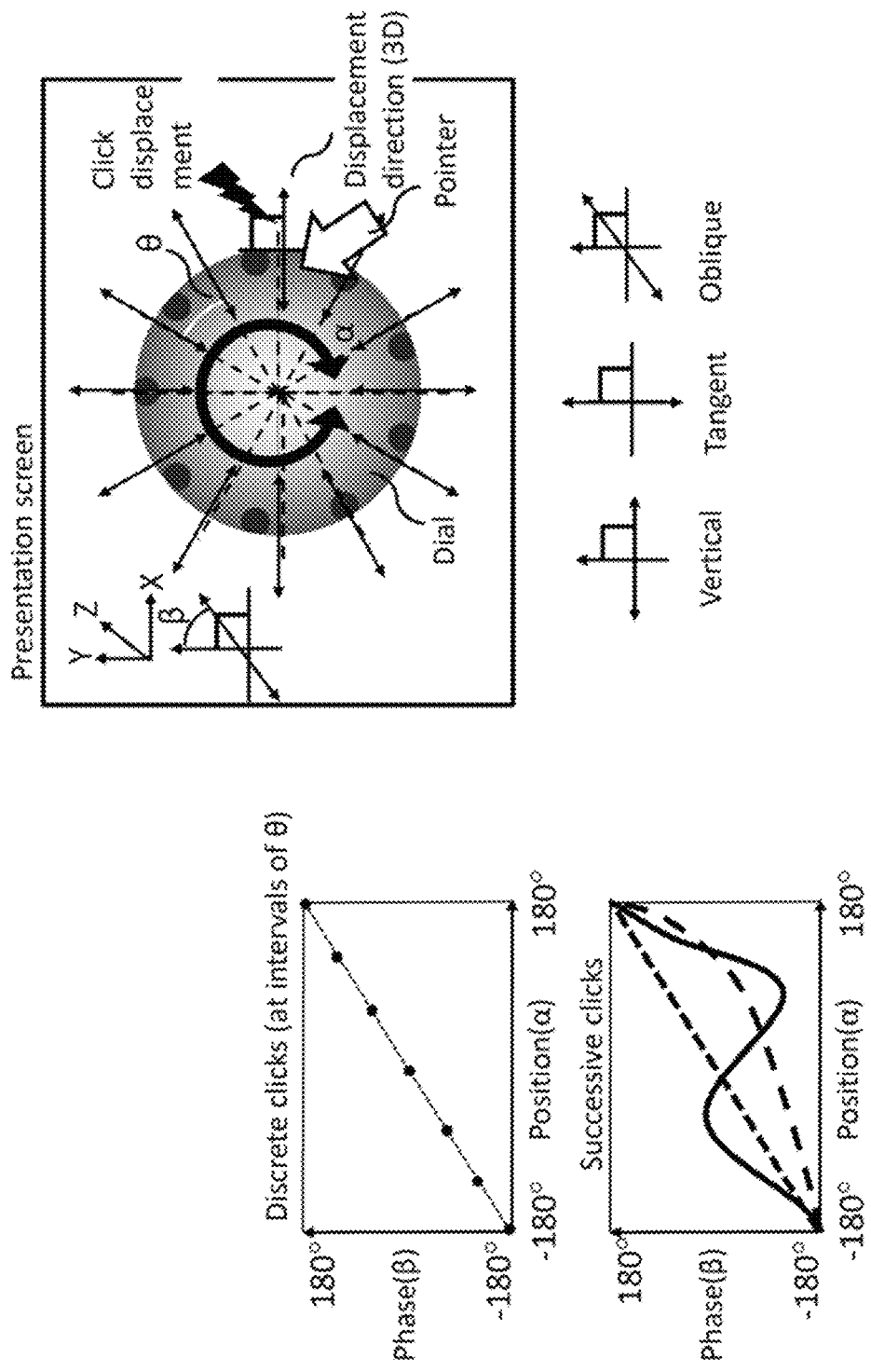
FIG. 137 Volume dial (Sense of click-clack)

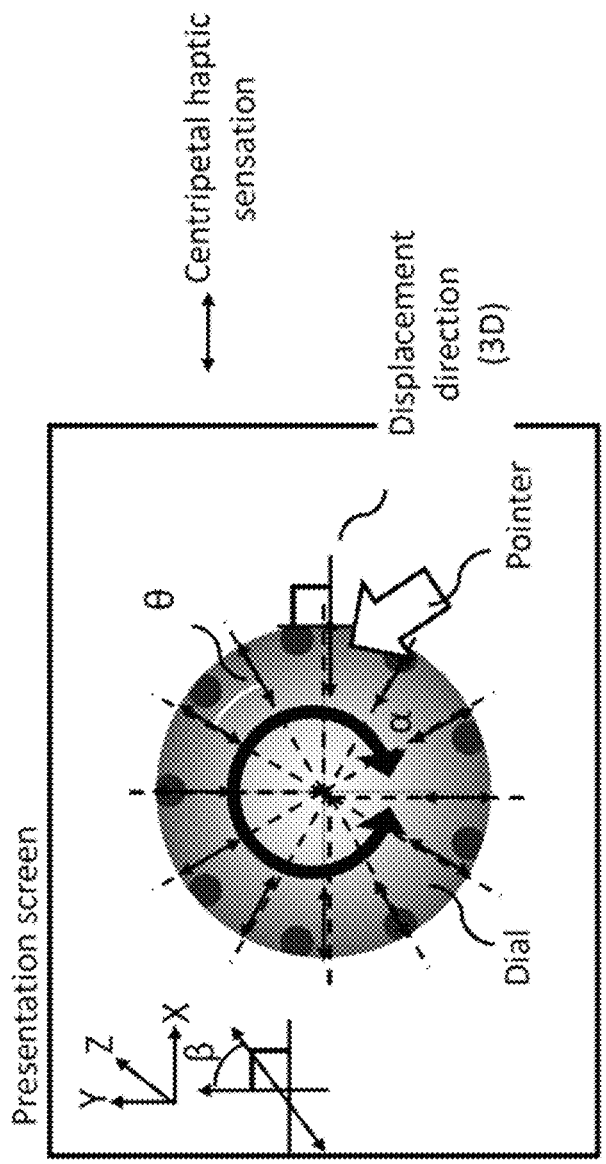
FIG. 138 Volume (Sense of receiving guidance on circumference of circle)

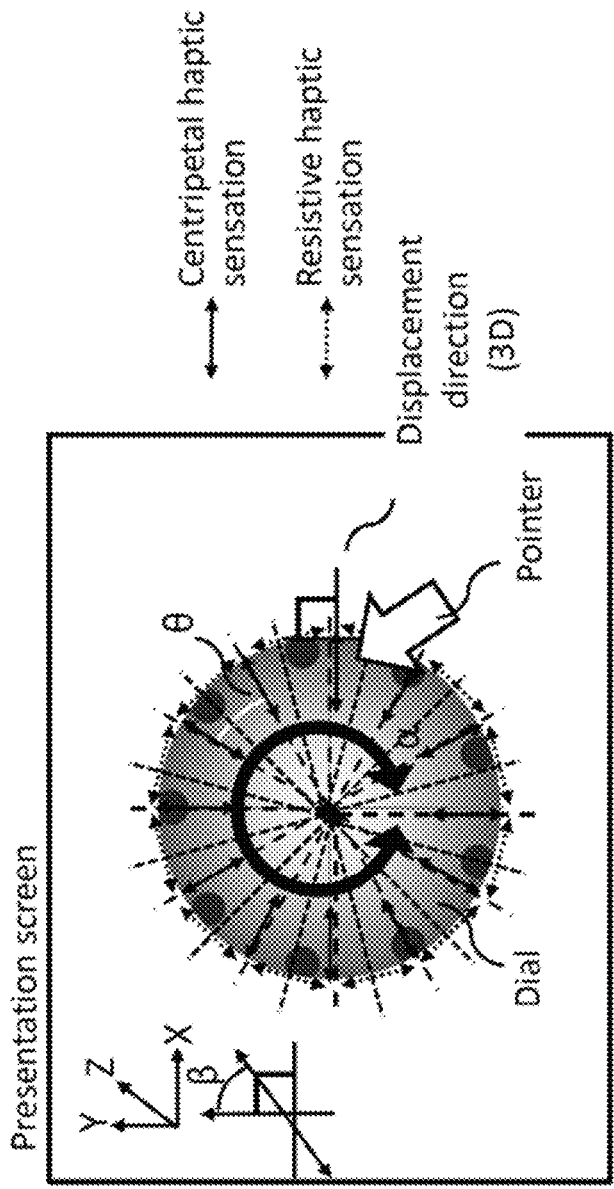
FIG. 139 Volume (Sense of receiving guidance on circumference of circle and sense of resistance)

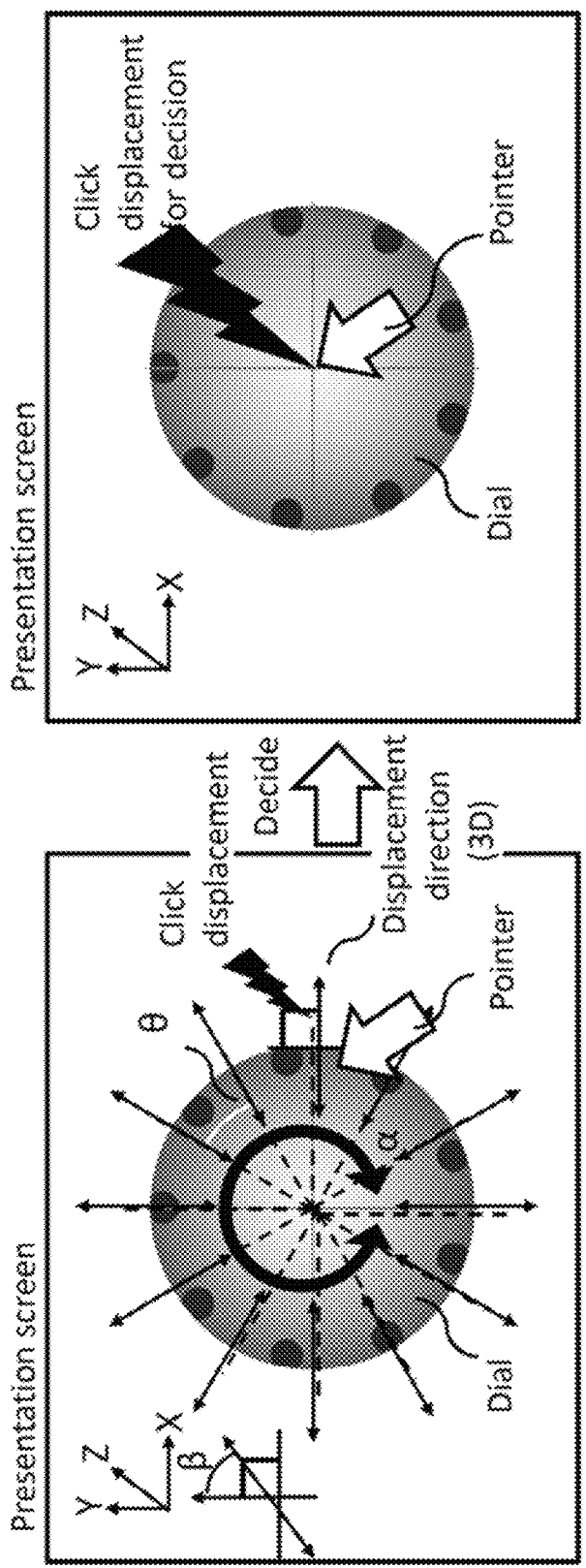
FIG. 140 Volume switch (Sense of decision)

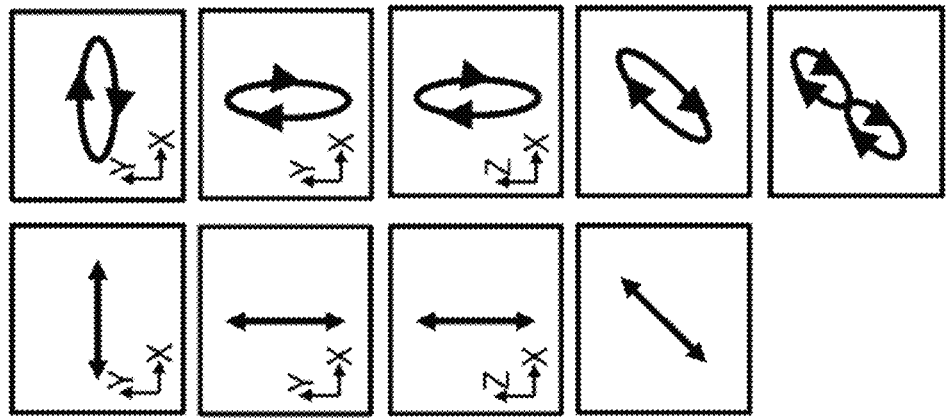
FIG. 141 Waveform control: variations of displacement direction

FIG. 142 Device size and shape characteristics
A haptic sense changes nonlinearly by weight (noise).
- Perceived sound pressure[dB] = Signal − Noise
- Perceived torque intensity[dB] ≈ torque − weight

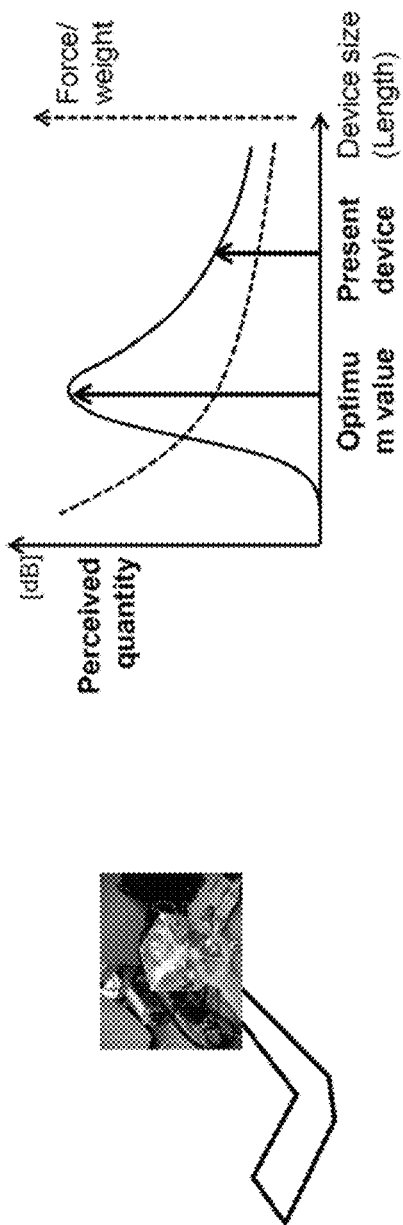
FIG. 143 Device size and shape characteristics

FIG. 144 Structure of texture

Haptic quality is formed by the three primary sensory structures.

- Pressure sense (Sense of contact)
  - Pressure (DC), warm/cold
- Tactile sense
  - Microscopic time structure
- Force sense
  - Macroscopic time structure
- Vibration sense
  - Frequency (AC)

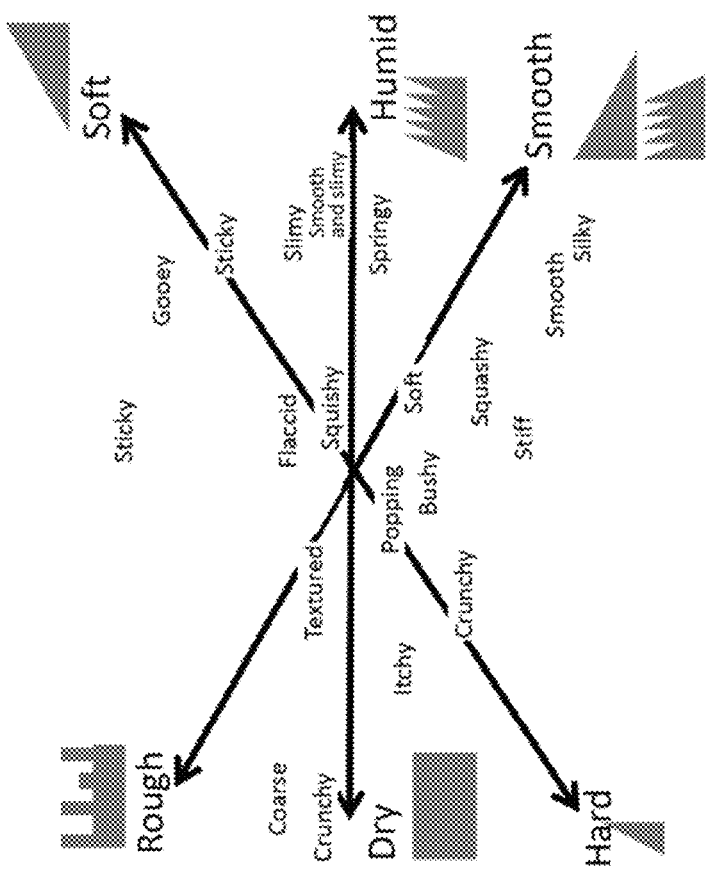
FIG. 145 Database of texture structure
Quality is represented by a variety of macroscopic and microscopic time structures.

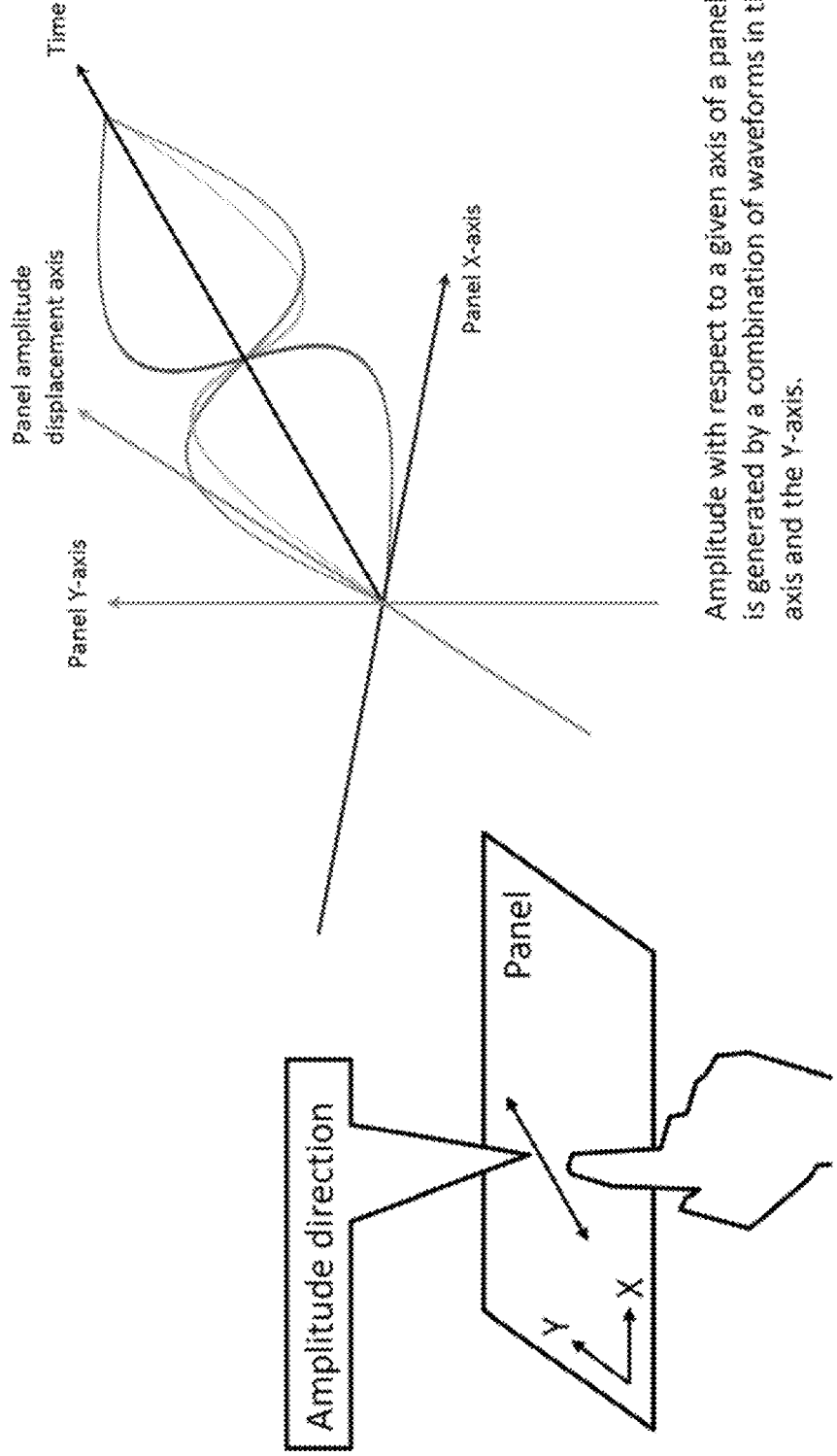
FIG. 146 Wavelength control: 2D amplitude direction control

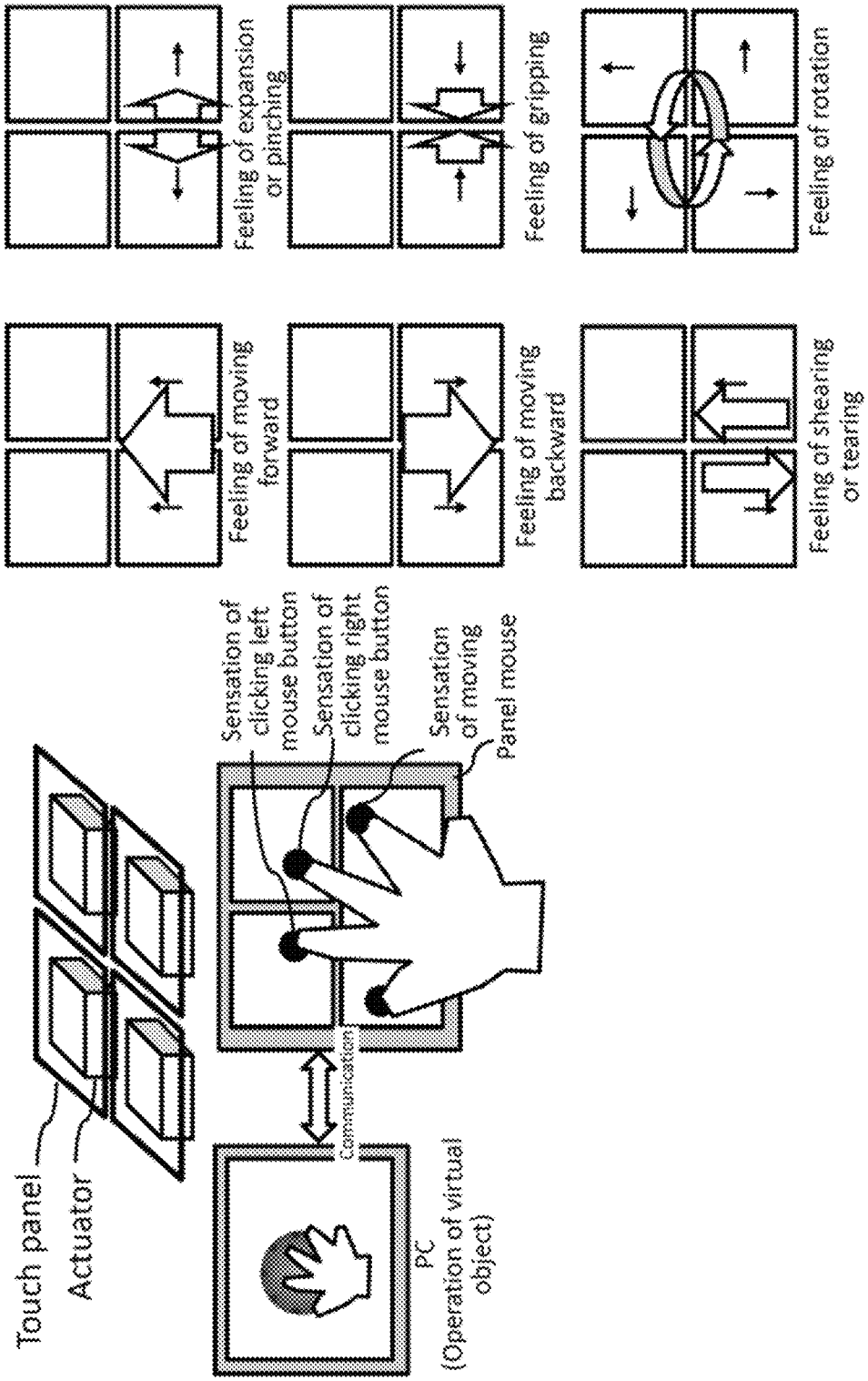
FIG. 147 Use example: digital mouse (Panel mouse)

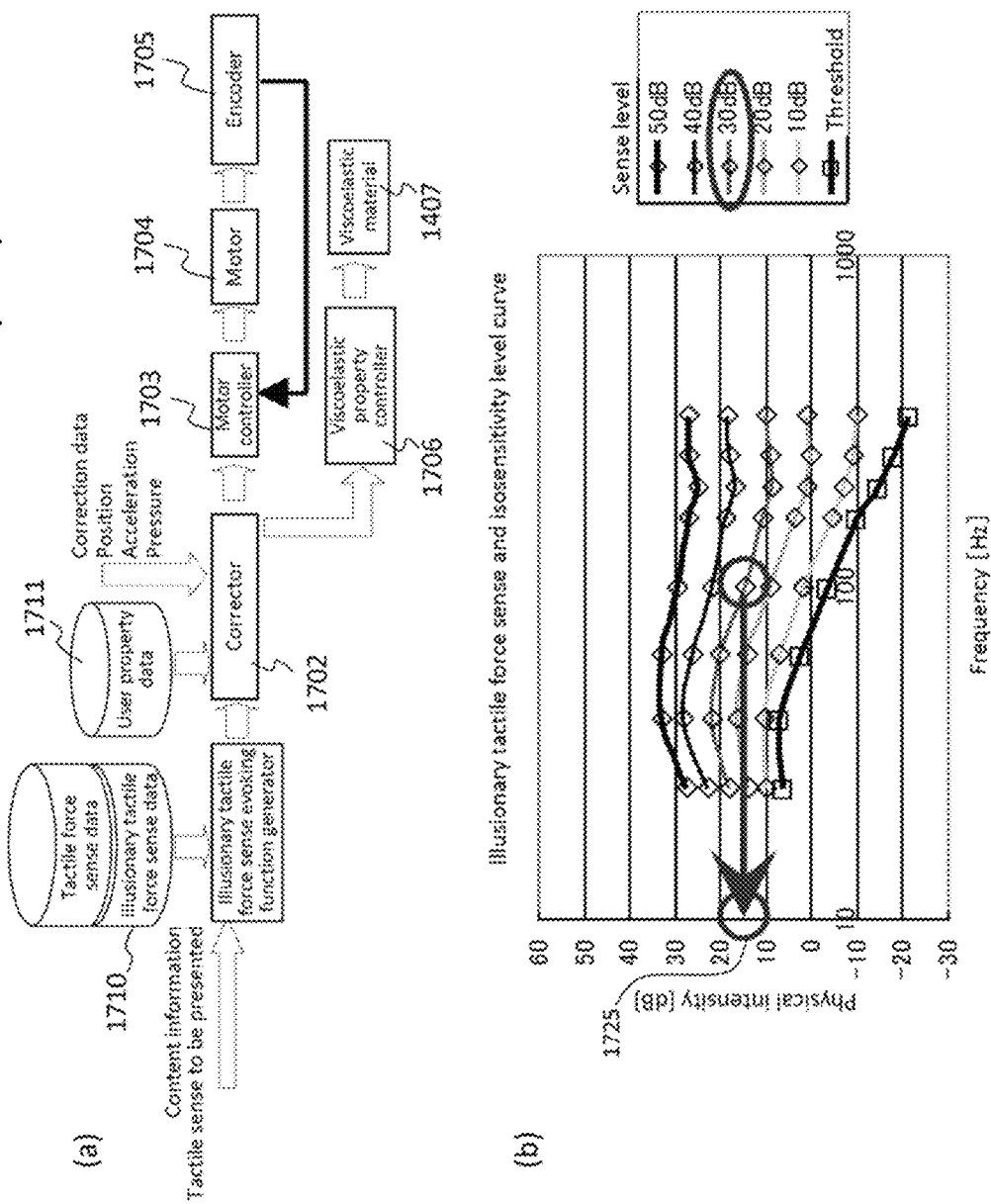
FIG. 148 Measurement of individual properties

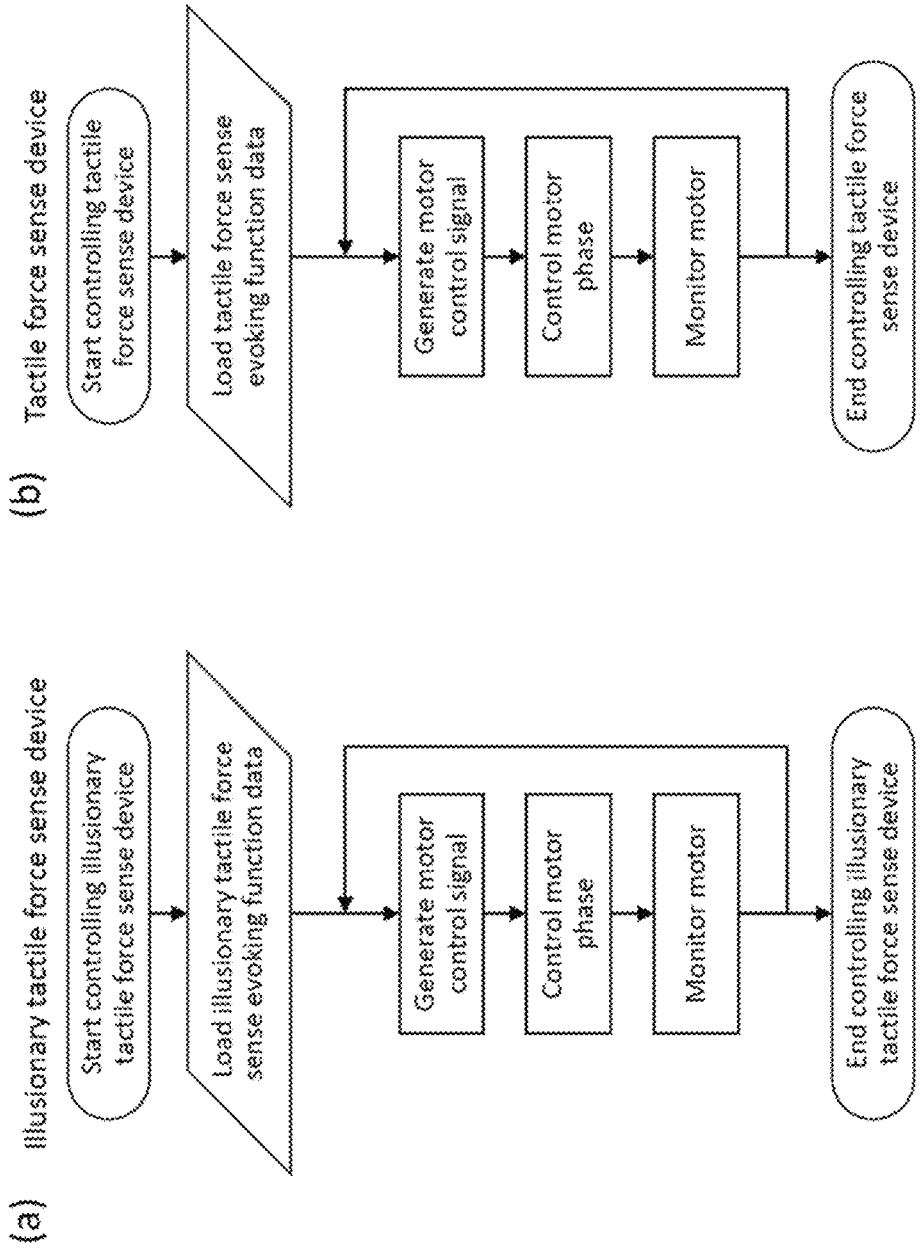
FIG. 149 Actuator control

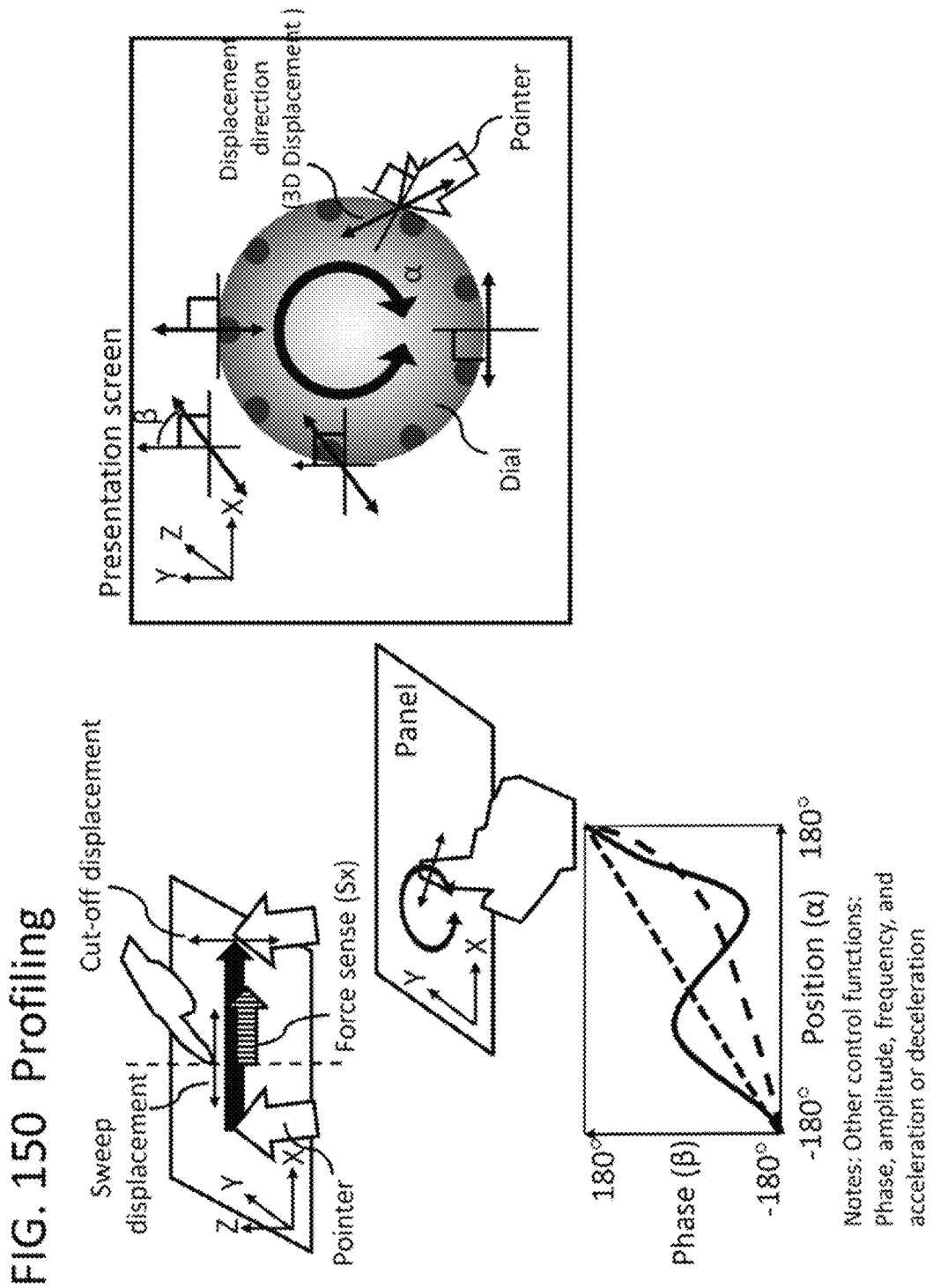

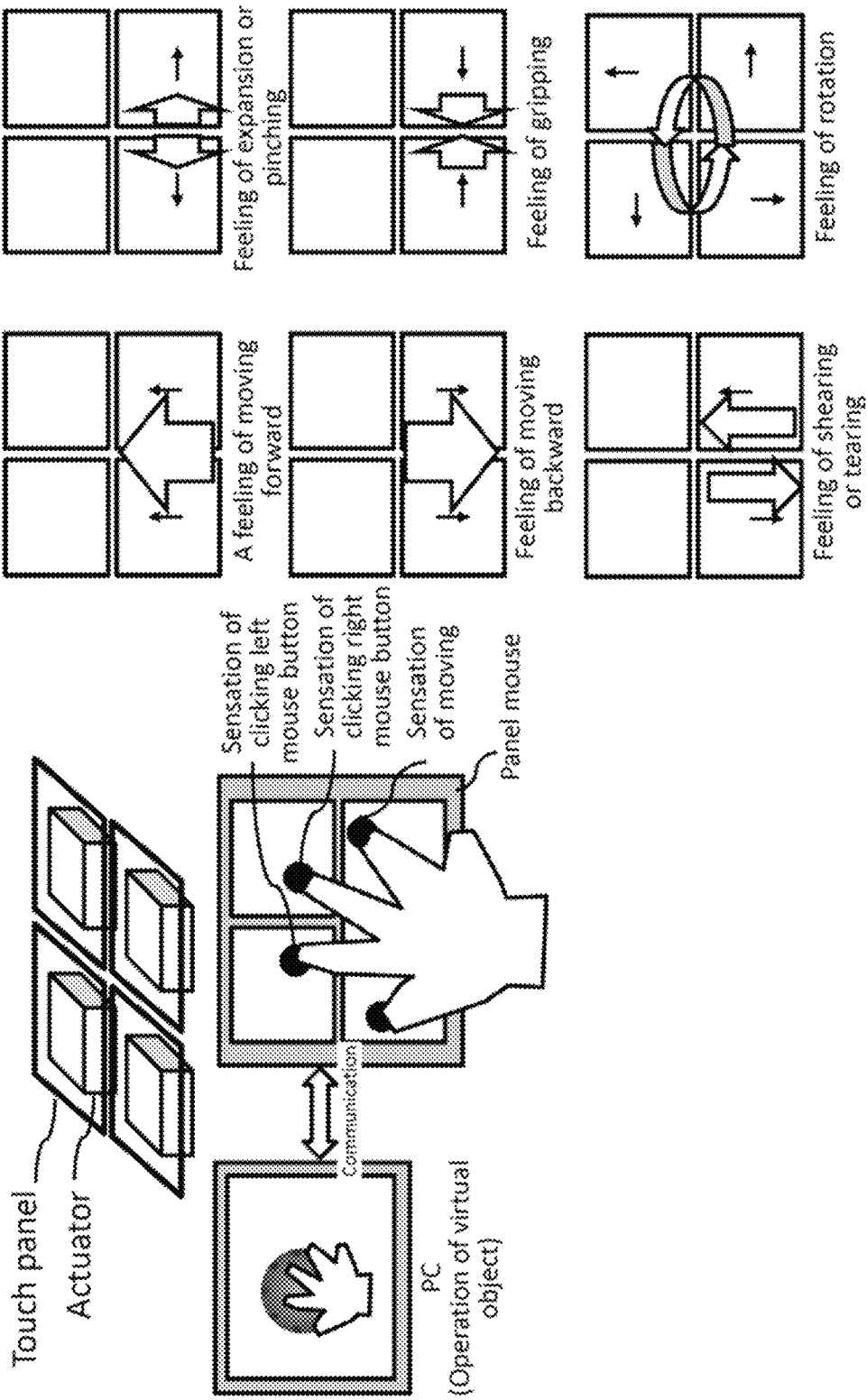
FIG. 151 Palpation simulator

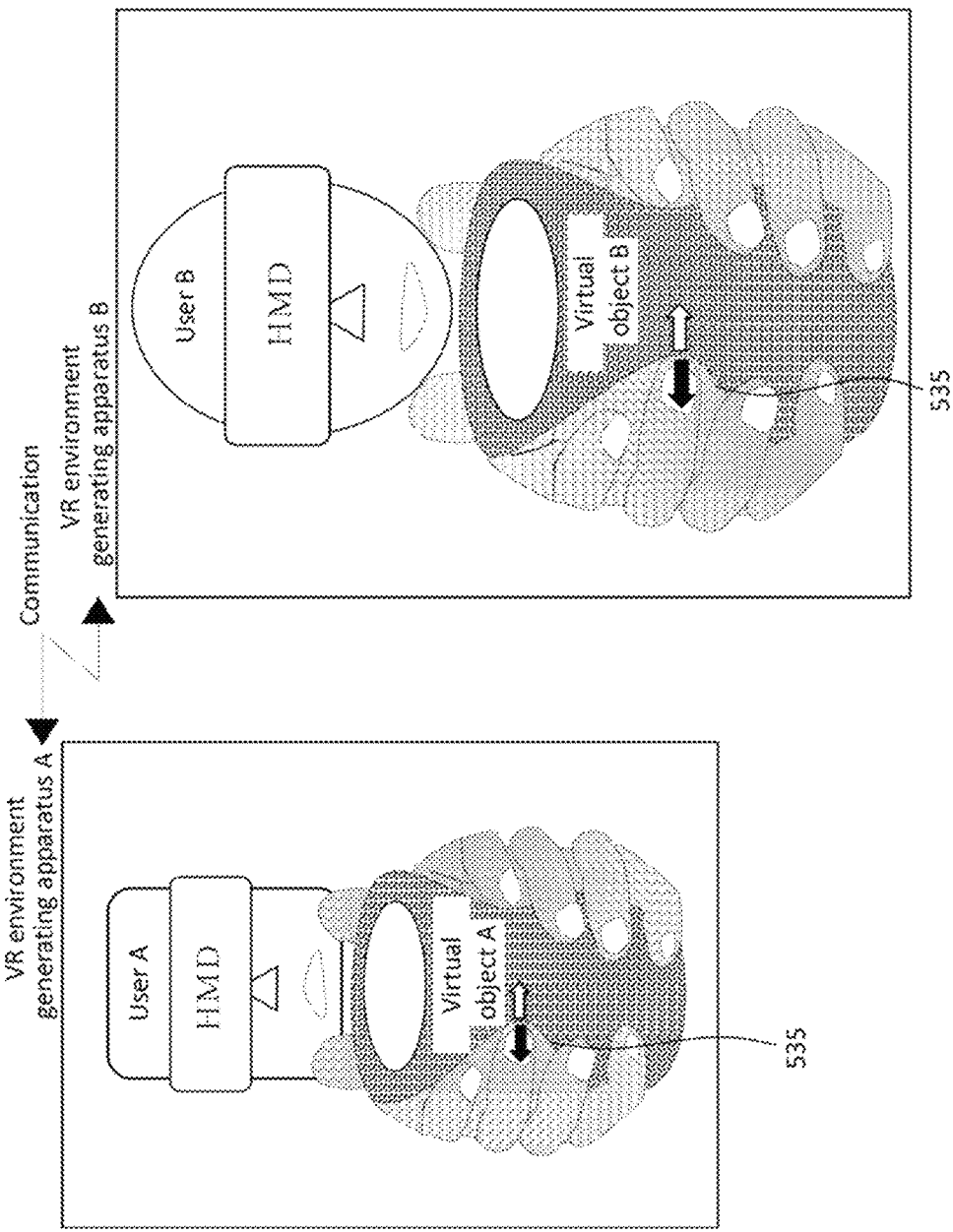
FIG. 152 Example of application (Remote synchronization)

HAPTIC INFORMATION PRESENTATION SYSTEM

FIELD OF THE INVENTION

The invention relates to a haptic information presenting system that uses a sensory characteristic.

BACKGROUND

A system that can continuously present a haptic sensation, such as torque and a force, in the same direction is disclosed in JP-A-2005-190465. The system is provided in a conventional non-grounded human-machine interface that does not have a base in a human body, informs a person of existence of a virtual object, and provides him/her with an impact force of a collision. The haptic sensation cannot be presented only with a physical characteristic of a haptic presenting machine.

The invention disclosed in such a patent application includes a following configuration. A controller controls a rotational speed of at least one rotor provided in a haptic presenting machine. A vibration, a force, and torque as physical characteristics of the haptic presenting machine are controlled, and the haptic presenting machine thereby allows a user to perceive various types of haptic information including the vibration, the force, the torque, and the like. This haptic information presenting system uses a sensory characteristic or a sensory illusion of a human to appropriately control a physical quantity and thereby allows the person to experience the force that cannot exist physically or a physical characteristic of a haptic sensation.

In the conventional technique, tactile directionalities are poorly discriminated. Displacement and a vibration in a Y-direction that are caused by applying finger pressure in a Z-direction are considered to occur in the Z-direction. The conventional technique has drawbacks in terms of sensitivity, a discrimination threshold, insensitivity and the sensory illusion, direction insensitivity, time insensitivity, anisotropy, and a hysteresis. In view of the above-described point, the invention has a purpose of providing an illusory phenomenon database that can realize an illusory phenomenon induced by a combination of vibrations and that includes a trigger vibration, a characteristic inducing stimulus and trigger stimulus, a misperceived (false) vibration, a synergistic effect related to a sensory illusion, and consonantal and vocalic vibration configurations.

SUMMARY

A haptic information presenting system according to the invention includes:

an object, said object being a an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic information presenting device that applies a sensory characteristic and/or a sensory illusion of an operator to the object, so as to present a haptic to said operator as if he/she actually operates said object; and a haptic presentation controller that controls said haptic presenting device on the basis of the stimulus from the sensor.

The haptic presentation controller uses such a fact that the sensory characteristic, which indicates a relationship between a quantity of stimulus applied to a human body and a sensory quantity, is nonlinear and/or the sensory illusion, so as to control the stimulus and present haptic information, the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically, and the haptic presenting device presents the stimulus by the object and/or to the object, controls the stimulus that is applied to the object in accordance with the operation by the operator, and thereby generates the tactile force.

In the haptic information presenting system, a touch panel is divided into plural units and disposed in at least one of an array, dots, and pixels, and the plural units of the touch panel are independently controlled.

In the haptic information presenting system, the object is a touch panel, and each of said touch panels generates a different sensation of touch and/or a different sensation of a force from each other.

A haptic information presenting system according to the invention includes:

an object, said object being a an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic presenting device that applies a sensory characteristic and/or a sensory illusion of an operator to the object, so as to present a haptic to said operator as if he/she actually operates said object; and a haptic presentation controller that controls said haptic presenting device on the basis of the stimulus from the sensor.

The haptic presentation controller uses such a fact that the sensory characteristic, which indicates a relationship between a quantity of stimulus applied to a human body and a sensory quantity, is nonlinear and/or the sensory illusion, so as to control the stimulus and present haptic information, the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically, and the haptic presenting device presents at least one of the oscillation, the displacement, and the deformation to the object.

In the haptic information presenting system, a touch panel is divided into plural units and disposed in at least one of an array, dots, and pixels, and the plural units of the touch panel are independently controlled.

In the haptic information presenting system, the tactile force presenting device presents the haptic in accordance with the oscillation, the displacement, and/or the deformation generated in the object.

In the haptic information presenting system, the haptic presenting device performs six-dimensional guidance of the object in terms of at least one of the oscillation, the displacement, and the deformation for at least one of each position, each phase, and each time.

In the haptic information presenting system, the haptic presenting device generates at least one of the oscillation, the displacement, and the deformation at right angles, in parallel with, or at an arbitrary angle with respect to a tangent of the object.

A haptic information presenting system according to the invention includes:

an object, said object being a an actual object or a virtual object;

a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;

a haptic presenting device that applies a sensory characteristic and/or a sensory illusion of an operator to the object, so as to present a tactile force to said operator as if he/she actually operates said object; and a haptic presentation controller that controls said tactile force presenting device on the basis of the stimulus from the sensor.

The haptic presentation controller uses such a fact that the sensory characteristic, which indicates a relationship between a quantity of stimulus applied to a human body and a sensory quantity, is nonlinear and/or the sensory illusion, so as to control the stimulus and present tactile force information, the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically, and the haptic presenting device is a sense synthesizing and guiding device that synthesizes sensations of guidance, and said sense synthesizing and guiding device generates at least one of a sensation of pressure, a sensation of a force, and the sensory illusion to the object by a vibration that includes a sweep vibration.

An illusory phenomenon database that can realize an illusory phenomenon induced by a combination of the vibrations and that includes a trigger vibration, a characteristic inducing stimulus and trigger stimulus, a misperceived (false) vibration, a synergistic effect related to a sensory illusion, and consonantal and vocalic vibration configurations can be provided.

BRIEF DESCRIPTION OF THE DRAWING

FIG. 1 is a schematic view that shows a system of a tactile force display;

FIG. 2 is a schematic view that shows a configuration of a haptic information presenting system;

FIG. 3 shows displacement control of a tactile force actuator;

FIG. 4 includes views that explain an illusory phenomenon;

FIG. 5 includes views that explain another illusory phenomenon;

FIG. 6 includes views that explain yet another illusory phenomenon;

FIG. 7 includes views that explain further another illusory phenomenon;

FIG. 8 includes views that explain further another illusory phenomenon;

FIG. 9 includes views that explain further another illusory phenomenon;

FIG. 10 includes views that explain further another illusory phenomenon;

FIG. 11 includes schematic views that explain a finger pressing method;

FIG. 12 includes schematic views that explain another finger pressing method;

FIG. 13 includes schematic views that explain yet another finger pressing method;

FIG. 14 includes schematic views that explain further another finger pressing method;

FIG. 15 includes schematic views that explain further another finger pressing method;

FIG. 16 includes schematic views that explain further another finger pressing method;

FIG. 17 includes schematic views that explain further another finger pressing method;

FIG. 18 includes schematic views that explain how to execute displacement and oscillation control;

FIG. 19 includes schematic views that explain how to execute the displacement and oscillation control;

FIG. 20 includes schematic views that explain how to execute the displacement and oscillation control;

FIG. 21 includes schematic views that explain how to execute the displacement and oscillation control;

FIG. 22 includes schematic views that explain how to execute the displacement and oscillation control;

FIG. 23 includes schematic views that explain how to execute the displacement and oscillation control;

FIG. 24 includes schematic views that explain how to execute the displacement and oscillation control;

FIG. 25 includes schematic views that explain vibration control of the tactile force actuator;

FIG. 26 includes schematic views that explain how to execute waveform control;

FIG. 27 includes schematic views that explain how to execute the waveform control;

FIG. 28 includes schematic views that explain how to execute the waveform control;

FIG. 29 includes schematic views that explain how to execute the waveform control;

FIG. 30 includes schematic views that explain an actuator control method;

FIG. 31 includes schematic views that explain the actuator control method;

FIG. 32 includes schematic views that explain the actuator control method;

FIG. 33 includes schematic views that explain generation of an illusory tactile force;

FIG. 34 includes schematic views that explain a sensory characteristic;

FIG. 35 includes schematic views that explain the sensory characteristic;

FIG. 36 includes schematic views that explain the sensory characteristic;

FIG. 37 includes schematic views that explain the sensory characteristic;

FIG. 38 includes schematic views that explain the sensory characteristic;

FIG. 39 includes schematic views that explain a control method of the sensory characteristic;

FIG. 40 includes schematic views that explain nonlinear control of a physical property;

FIG. 41 includes schematic views that explain a configuration of the actuator;

FIG. 42 includes schematic views of a wearing method;

FIG. 43 includes schematic views of the wearing method;

FIG. 44 includes schematic views of the implementation method;

FIG. 45 includes schematic views that explain a configuration of the tactile force actuator;

FIG. 46 is a schematic view that explains a basic unit of the tactile force actuator;

FIG. 47 is a schematic view that explains a table type tactile force actuator;

FIG. 48 is a schematic view that explains a table type tactile force actuator;

FIG. 49 is a schematic view that explains a steering wheel type tactile force actuator;

FIG. 50 is a schematic view that explains a steering wheel type tactile force actuator;

FIG. 51 is a schematic view that explains a steering wheel type tactile force actuator;

FIG. 52 is a schematic view that explains a steering wheel type tactile force actuator;

FIG. 53 is a schematic view that explains a surface layer type tactile force actuator;

FIG. 54 is a schematic view that explains a ring type tactile force actuator;

FIG. 55 is a schematic view that explains a wristband type tactile force actuator;

FIG. 56 is a schematic view that explains an arm ring type tactile force actuator;

FIG. 57 is a schematic view that explains wearable portions;

FIG. 58 is a schematic view that explains control wiring;

FIG. 59 is a schematic view that explains control wiring;

FIG. 60 is a schematic view that explains a system and parts;

FIG. 61 is a schematic view that explains a touch panel module;

FIG. 62 is a schematic view that explains an arrayed module;

FIG. 63 is a schematic view that explains the illusory phenomenon;

FIG. 64 is a schematic view that explains a module of a tactile force device;

FIG. 65 is a schematic view that explains a module of the tactile force device;

FIG. 66 is a schematic view that explains the tactile force device;

FIG. 67 is a schematic view that explains the tactile force device;

FIG. 68 is a schematic view that explains a touch panel type module;

FIG. 69 is a schematic view that explains a touch panel type module;

FIG. 70 is a schematic view that explains a touch panel type module;

FIG. 71 is a schematic view that explains a touch panel type module;

FIG. 72 is a schematic view that explains a touch panel type module;

FIG. 73 is a schematic view that explains a liquid crystal touch panel type module.

FIG. 74 is a schematic view that explains a liquid crystal touch panel type module.

FIG. 75 is a schematic view that explains a liquid crystal touch panel type module.

FIG. 76 is a schematic view that explains a touch panel type module;

FIG. 77 is a schematic view that explains a multimodal effect;

FIG. 78 is a schematic view that explains a multi-touch array unit;

FIG. 79 is a schematic view that explains sensation synthesizing control;

FIG. 80 is a schematic view that explains multi-touch sensation synthesizing control;

FIG. 81 is a schematic view that explains sensation synthesizing control;

FIG. 82 is a schematic view that explains sensation synthesizing control;

FIG. 83 is a schematic view that explains sensation synthesizing control;

FIG. 84 is a schematic view that explains sensation synthesizing control;

FIG. 85 is a schematic view that explains sensation synthesizing control;

FIG. 86 is a schematic view that explains sensation synthesizing control;

FIG. 87 is a schematic view that explains sensation synthesizing control;

FIG. 88 is a schematic view that explains generation of a sensation of a button shape;

FIG. 89 is a schematic view that explains the generation of the sensation of the button shape;

FIG. 90 is a schematic view that explains generation of a sensation of a button;

FIG. 91 is a schematic view that explains control of a sensation of guidance between buttons;

FIG. 92 is a schematic view that explains control of the sensation of guidance between the buttons;

FIG. 93 is a schematic view that explains control of the sensation of guidance between the buttons;

FIG. 94 is a schematic view that explains tactile force control by a slider;

FIG. 95 is a schematic view that explains tactile force control by the slider;

FIG. 96 is a schematic view that explains sensation control by the slider;

FIG. 97 is a schematic view that explains a static friction and kinetic friction control method;

FIG. 98 is a schematic view that explains a kinetic friction control method;

FIG. 99 is a schematic view that explains a static friction control method;

FIG. 100 a schematic view that explains a static friction control method;

FIG. 101 a schematic view that explains a static friction control method;

FIG. 102 a schematic view that explains a kinetic friction control method;

FIG. 103 is a schematic view that explains control of a button with a sensation of pressing;

FIG. 104 is a schematic view that explains the control of the button with the sensation of pressing;

FIG. 105 is a schematic view that explains the control of the button with the sensation of pressing;

FIG. 106 is a schematic view that explains the control of the button with the sensation of pressing;

FIG. 107 is a schematic view that explains the control of the button with the sensation of pressing;

FIG. 108 is a schematic view that explains the control of the button with the sensation of pressing;

FIG. 109 is a schematic view that explains the control of the button with the sensation of pressing;

FIG. 110 is a schematic view that explains the control of the button with the sensation of pressing;

FIG. 111 is a schematic view that explains the control of the button with the sensation of pressing;
FIG. 112 is a schematic view that explains the control of the button with the sensation of pressing;
FIG. 113 is a schematic view that explains the control of the button with the sensation of pressing;
FIG. 114 is a schematic view that explains the control of the button with the sensation of pressing;
FIG. 115 is a schematic view that explains the control of the button with the sensation of pressing;
FIG. 116 is a schematic view that explains the control of the button with the sensation of pressing;
FIG. 117 is a schematic view that explains the control of the button with the sensation of pressing;
FIG. 118 is a schematic view that explains the control of the button with the sensation of pressing;
FIG. 119 is a schematic view that explains the control of the button with the sensation of pressing;
FIG. 120 is a schematic view that explains the control of the button with the sensation of pressing;
FIG. 121 is a schematic view that explains the control of the button with the sensation of pressing;
FIG. 122 is a schematic view that explains the control of the button with the sensation of pressing;
FIG. 123 is a schematic view that explains the control of the button with the sensation of pressing;
FIG. 124 is a schematic view that explains the control of the button with the sensation of pressing;
FIG. 125 is a schematic view that explains the control of the button with the sensation of pressing;
FIG. 126 is a schematic view that explains the control of the button with the sensation of pressing;
FIG. 127 is a schematic view that explains the control of the button with the sensation of pressing;
FIG. 128 is a schematic view that explains the control of the button with the sensation of pressing;
FIG. 129 is a schematic view that explains the control of the button with the sensation of pressing;
FIG. 130 is a schematic view that explains the control of the button with the sensation of pressing;
FIG. 131 is a schematic view that explains tactile force dial control;
FIG. 132 is a schematic view that explains the tactile force dial control;
FIG. 133 is a schematic view that explains the tactile force dial control;
FIG. 134 is a schematic view that explains the tactile force dial control;
FIG. 135 is a schematic view that explains the tactile force dial control;
FIG. 136 is a schematic view that explains the tactile force dial control;
FIG. 137 is a schematic view that explains the tactile force dial control;
FIG. 138 is a schematic view that explains the tactile force dial control;
FIG. 139 is a schematic view that explains the tactile force dial control;
FIG. 140 is a schematic view that explains the tactile force dial control;
FIG. 141 is a schematic view that explains the waveform control;
FIG. 142 is a schematic view that explains a device size/shape characteristic;
FIG. 143 is a schematic view that explains the device size/shape characteristic;
FIG. 144 is a schematic view that explains a texture structure;
FIG. 145 is a schematic view that explains database of the texture structure;
FIG. 146 is a schematic view that explains the waveform control;
FIG. 147 is a schematic view that explains a digital mouse;
FIG. 148 is a schematic view that explains measurement of a personal characteristic;
FIG. 149 is a schematic view that explains actuator control;
FIG. 150 is a schematic view that explains profiling;
FIG. 151 is a schematic view that explains diagnosis simulation; and
FIG. 152 is a schematic view that explains remote synchronization.

DETAILED DESCRIPTION OF THE INVENTION

A haptic information presenting system according to the invention includes the followings.

the haptic information presenting system includes:
an object that is an actual object or a virtual object;
a sensor that detects a stimulus by the object and/or to the object including at least one of a position, a velocity, acceleration, a shape, displacement, deformation, oscillation, rotation, a vibration, a force, torque, pressure, a humidity, a temperature, viscosity, and elasticity;
a haptic presenting device that applies a sensory characteristic and/or a sensory illusion of an operator to the object, so as to present a haptic to said operator as if he/she actually operates said object; and
a haptic presentation controller that controls said haptic presenting device on the basis of the stimulus from the sensor.

the haptic presentation controller uses such a fact that the sensory characteristic, which indicates a relationship between a quantity of stimulus applied to a human body and a sensory quantity, is nonlinear and/or the sensory illusion, so as to control the stimulus and present haptic information, and the sensory characteristic includes: at least one of the quantity of stimulus that is provided to the operator and the quantity of stimulus that is generated through an operation by the operator; and the sensory quantity that is presented to the operator, and said sensory quantity is a sensory quantity that cannot exist physically.

The haptic presenting device presents the stimulus by the object and/or to the object, controls the stimulus that is applied to the object in accordance with the operation by the operator, and thereby generates the haptic.

A touch panel is divided into plural units and disposed in at least one of an array, dots, and pixels, and the plural units of the touch panel are independently controlled.

The object is the touch panel, and each of said touch panels generates a different sensation of touch and/or a different sensation of a force from each other.

The haptic presenting device presents at least one of the oscillation, the displacement, and the deformation to the object.

The touch panel is divided into the plural units and disposed in at least one of the array, the dots, and the pixels, and the plural units of the touch panel are independently controlled.

The haptic presenting device presents the haptic in accordance with the oscillation, the displacement, and/or the deformation generated in the object.

The haptic presenting device performs six-dimensional guidance of the object in terms of at least one of the oscillation, the displacement, and the deformation for at least one of each position, each phase, and each time.

The haptic presenting device generates at least one of the oscillation, the displacement, and the deformation at right angles, in parallel with, or at an arbitrary angle with respect to a tangent of the object.

The t haptic presenting device is a sense synthesizing • guiding device that synthesizes sensations of guidance, and said sense synthesizing and guiding device generates at least one of a sensation of pressure, a sensation of a force, and the sensory illusion to the object by the vibration that includes a sweep vibration.

FIG. 1 includes a configuration diagram of a system of a haptic display.

The system of the haptic display replicates the haptic that includes the sensation of pressure, the sensation of touch, and the sensation of the force on the display panel. The displacement and the vibration are controlled in accordance with motion of a finger. In this way, a stereoscopic feel with a sensation of depth can be obtained on the flat-plate object. The sensation of pressure and the sensation of the force are presented through the displacement and the vibration in different directions. Such a system may be applied to a button, a slider, a dial, and a switch.

The system of the haptic display includes a controller and a haptic actuator. The haptic actuator supplies a sensor signal to the controller, and the controller supplies a control signal to the haptic actuator.

The sensor signal includes a stimulus by the object and/or to the object that includes at least one of the position, the velocity, the acceleration, the shape, the displacement, the deformation, the oscillation, the rotation, the vibration, the force, the torque, the pressure, the humidity, the temperature, the viscosity, and the elasticity.

The controller is driven by a control algorithm and changes intensity of the stimulus over time in accordance with the motion of the finger. The stimulus includes the displacement, momentum, the vibration, and the oscillation. The control signal is generated by drive voltages of force information and oscillation information.

The actuator may be a motor, an eccentric motor, a linear motor, an electrostatic motor, a molecular motor, a piezo element, an artificial muscle, a memory alloy, a coil, a voice coil, a piezoelectric element, or any member that generates a magnetic force, static electricity, the displacement, the vibration, or the like.

The haptic display panel can be worn on any portion of the human body (see FIG. 57).

The present system presents haptic sense information such that the actual object is operated by an operator by applying sensory characteristics and sensory illusion of the operator. Specifically, the system is controlled based on stimulation that is detected by a sensor and presents haptic sense information by controlling stimulation utilizing the fact that the sensory characteristics that indicate a relationship between an amount of stimulation and a sensory amount applied to the human body are non-linear and sensory illusions.

The sensory characteristics include the amount of stimulation of at least one of the amount of stimulation that is applied to the operator and the amount of stimulation brought about by the operation of the operator and the sensory amount that is presented to the operator, and the sensory amount is a sensory amount that is unable to be physically present.

Here, the system presents stimulation from the object or to the object, and stimulation applied to the operator is controlled to match the operation of the operator. A minimum haptic sense information presentation system is configured from a haptic sense actuator and a controller. Position, speed, acceleration, form, displacement, deformation, amplitude, rotation, vibration, force, torque, pressure, humidity, temperature, viscosity, and elasticity are measured by the sensor that is attached to the haptic sense actuator, the information is sent to the controller, a control signal for controlling the haptic sense actuator is calculated and sent to the haptic sense actuator, and the haptic sense actuator is controlled.

The haptic sense actuator has a sensor function and a presentation function of a panel type and a display type, in the controller, measures displacement, momentum, vibration amplitude, displacement stimulation, vibration stimulation, time change of stimulation intensity, and the like accompanying movement of the body such as of a finger or a palm, controls the position, speed, acceleration, form, displacement, deformation, amplitude, rotation, vibration, force, torque, pressure, humidity, temperature, viscosity, elasticity, and the like of the tactile force sense actuator to match movement, pressure, and the like of the body such as the finger or the palm that is monitored by the sensor based on a control algorithm, and presents tactile force sense information such as a pressure sensation, a tactile sensation, and a sense of force to a person or the like.

In the control signal, force information (t), amplitude information (t), and the like are expressed by driving voltage and the like, and as long as the actuator is a motor, a piezo actuator, an artificial muscle, a memory alloy, a molecular motor, an electrostatic actuator, a coil, a magnetic force actuator, a static electricity actuator, or another actuator that generates displacement and vibration, device operating principles are not important. As a result, regardless of a panel and a display that are configured as a flat surface, a curved surface, or a three-dimensional shape being installed to be fixed or minutely vibrate in a casing or the like, an insertion feeling, a pushing feeling, a sinking feeling, a depth feeling, a push back feeling, a floating feeling, a convergence feeling of vibration and amplitude, a reverberation feeling of vibration and amplitude, a sense of orientation of displacement and movement, a sticking feeling, a hard feeling, a soft feeling, and a three-dimensional feel are felt. Regardless of if such a sense is not reproduced and presented physically, such a sense and bodily reaction and reflection are experienced sensuously.

As a result, regardless of if an information terminal and the like is a flat surface or a flat panel, it is possible to really obtain an operation feel of an object such as a button, a slider, a dial, a switch, and an operation panel.

FIG. 3 is a schematic view of a displacement control of the haptic sense actuator.

The haptic sense actuator has six degrees of freedom concerning translation and rotation, and is able to freely control displacement, amplitude, speed, acceleration, and phase difference. In addition, it is possible to control displacement, a displacement pattern, a waveform, electrical stimulation other than vibration stimulation, and stimulation such as Coulomb force.

FIGS. 4-10 indicate schematic views of an apparatus which indicates an illusion phenomenon.

In the drawings, the apparatus is provided with an actuator on a base material, and on the base material, provided are a touch panel and a sensor that measures position, rotation, and tensor by sensing displacement, pressure, acceleration, and the like of an object. The touch panel is displaced in a y direction, but pressing in is felt in a z direction of the button.

FIG. 4 indicates normal operation that is not the illusion phenomenon. A base unit of the haptic sense actuator is configured from the touch panel, the sensor, and the actuator. In the touch panel and the sensor, the position, speed, acceleration, form, displacement, deformation, amplitude, rotation, vibration, force, torque, pressure, humidity, temperature, viscosity, elasticity, and the like are measured as a scalar, vector, or tensor.

The actuator presents the position, speed, acceleration, form, displacement, deformation, amplitude, rotation, vibration, force, torque, pressure, humidity, temperature, viscosity, elasticity, and the like as a scalar, vector, or tensor. When the touch panel is often not normally rigidly deformed and the operator presses the touch panel at a pushing pressure P, Z=0 is maintained without the touch panel displacing or deforming in the Z direction. The pushing pressure P increases, a fingertip of the operator is deformed, and pressing pressure is perceived, but sinking displacement Z (=0) and sinking sense Sz (=0) is not felt.

In the present patent, perception of haptic sense information using the fingertip is described, but is not particularly limited to the fingertip, and it is assumed that the whole body of the operator is throughout the body.

FIG. 5 indicates an operation of a case of the illusion phenomenon. When the touch panel is often not normally rigidly deformed and the operator presses the touch panel at the pushing pressure P, Z=0 is maintained without the touch panel displacing or deforming in the Z direction.

Here, differently from normal, using the actuator, when the touch panel is displaced (Y) in the Y direction, regardless of if there is no sinking displacement Z (=0), along with perception of an increase of pushing force P, sinking sense Sz is felt in the Z direction. Even in a case where the touch panel is displaced (X) in the X direction, similarly, sinking sense Sz is felt in the Z direction. However, in a case where the direction (Y) that is pointed out by the fingertip and a displacement direction of the touch panel do not match, movement in the displacement direction may be weakly perceived. When the displacement direction of the touch panel is adjusted using the fingertip and the sinking direction of the finger, illusion is effective.

The phenomenon here is an illusion in which displacement in the Y direction is perceived in a sinking sense in the Z direction, and between the axes, is the illusion phenomenon (cross-direction effect) that exceeds the operating direction.

Displacement in the Y direction matches predetermined tactile feel and various displacement patterns are present. It is possible to express various tactile feel by a design of an arbitrary waveform, amplitude modulation, frequency modulation, convolution, and a combination there between to create tone and music of an musical instrument using a synthesizer not only in combination of a linear increase and decrease, sinusoidal vibration, and a fundamental frequency component.

An illusion pattern is provided with a combination of nine patterns of a pushing pressure method (three directions)× actuator displacement direction (three directions). Furthermore, a rotation pattern is provided. In addition, since there is an intermediate direction, the combinations are infinite. In addition to translational displacement, there may also be rotation displacement.

FIG. 6 indicates an operation of a latch continuous illusion phenomenon. Here, using the actuator, when the touch panel is displaced (Y) in a stepwise manner in the Y direction, regardless of if there is no sinking displacement Z (=0), along with perception of the increase of pushing force P, accompanying stepwise change of displacement (Y), sticking in the Z direction and stepwise sinking sense Sz are felt.

FIG. 7 indicates an operation of a latch continuous illusion phenomenon. Here, using the actuator, when the touch panel repeats displacement (Y) in the Y direction, regardless of if there is no sinking displacement Z (=0), along with perception of an increase of pushing force P, accompanying change of displacement (Y), sticking in the Z direction and sinking sense Sz are felt. A condition is present in which pressing displacement (Y) tends not to be felt.

The drawing respectively illustrates pressing, pressing force, displacement, and sinking sense. FIG. 8 expresses displacement in which the phase is delayed. When the touch panel is often not normally rigidly deformed and the operator presses the touch panel at the pushing pressure P, Z=0 is maintained without the touch panel displacing or deforming in the Z direction. Here, differently from normal, using the actuator, when the phase is delayed with respect to increase of the pushing force P and the touch panel is displaced (Y) in the Y direction, regardless of if there is no sinking displacement Z (=0), accompanying displacement (Y) in the Y direction, sinking sense Sz is felt in the Z direction. Until the increase in displacement (Y) starts, resistance with respect to pressing of a virtual button is presented, and pressing sense Sz (≠0) that is a maximum value of resistance is presented as hardness of the virtual button.

In FIG. 12, after a peak is indicated without displacement persisting, displacement is zero. Here, using the actuator, when the touch panel is reciprocally displaced (Y) in the Y direction, regardless of if there is no sinking displacement Z (=0), accompanying increase of pushing force P and change of displacement (Y), sinking sense Sz is felt such that the button "clicks" in the Z direction.

In FIG. 13, after a peak displacement in a positive direction and a peak displacement in a negative direction are indicated, displacement is zero. Here, using the actuator, when the touch panel is reciprocally displaced (Y) in the Y direction, regardless of if there is no sinking displacement Z (=0), accompanying increase of pushing force P and change of displacement (Y), sinking sense Sz is felt such that the button "clicks" in the Z direction.

FIG. 14 to FIG. 18 each include schematic views that show a finger pressing method that generates the stimulus by the object (the panel) and/or to the object. FIG. 15 to FIG. 16 each show presentation of stimuli that are generated by stepwise pressing of the button. The stimuli includes a stimulus by slight resistance of the button on the panel, a responsive stimulus by instantaneous reaction, a clicking stimulus after a feel of the button, a stimulus at a time when the button is not felt but only a wall is felt. FIGS. 15 to 16 show presentation of stimuli that are generated by the stepwise pressing of the button. The stimuli include a stimulus by motion of the panel, a stimulus by stillness of the panel, and a sensory stimulus between the finger and the panel. FIG. 17 shows presentation of stimuli that are generated by pressing of the button. The stimuli include a stimulus of a triangle wave and a stimulus of a sine wave that are generated to the panel.

FIG. 19 to FIG. 25 each include schematic views that show control of the displacement and the oscillation that are applied, as the stimuli, to the panel. In FIG. 20, the panel is displaced and generates the triangle wave when the panel is pressed right below. With this displacement, a sensory stimulus that induces a sensation of deepening of the finger, a physical stimulus of a tensile force to the finger, and a sensory stimulus of resistance to the finger are presented. In FIG. 20, the panel is displaced and generates the triangle wave when the panel is unconsciously moved and pressed down. With this displacement, a sensory stimulus that induces a sensation of advancing the finger, the physical stimulus of the tensile force to the finger, and the sensory stimulus that induces the sensation of deepening of the finger are presented. In FIG. 21, the panel is displaced and generates the triangle wave when the panel is provided with a viscous/elastic stimulus as a button characteristic. With this displacement, the sensory stimulus that induces the sensation of advancing the finger, the physical stimulus of the tensile force to the finger, and the sensory stimulus of a reactive force to the finger are presented on the panel.

In FIG. 22, the panel is displaced and generates the triangle wave when the panel is provided with the viscous/elastic stimulus as an artificial cutaneous sense. With this displacement, the sensory stimulus that induces the sensation of advancing the finger, the physical stimulus of the haptic to the finger, and the sensory stimulus of the reactive force to the finger are presented on the panel.

FIG. 23 shows the displacement of the panel at a time when the panel is displaced and generates the triangle wave due to application of the stimulus to the panel. When touch panel is displaced (Y) in the Y direction by the actuator, the panel generates a pushing feeling (Sz) such as button in the Z direction with the increase of pushing pressure (p) and the change of the displacement (Y) despite the absence of subduction displacement Z(=0). The panel will feel pushing (spot) and a feeling (Sz)(click) such as a button in the Z direction depending on how to change in the Y direction.

FIG. 24 shows the displacement of the panel at a time when the panel is displaced and generates the sine wave due to the application of the stimulus to the panel. When touch panel is sinusoidally displaced (Y) in the Y direction by the actuator, the panel generates a pushing feeling (Sz) such as button in the Z direction with the increase of pushing pressure (p) and the change of the displacement (Y) despite the absence of subduction displacement Z(=0).

The panel will feel pushing (spot) and a feeling (Sz) (click) such as a button in the Z direction depending on how to change in the Y direction.

FIG. 26 to FIG. 32 each show schematic views of vibration waveform control of the tactile force actuator. The haptic actuator can freely control the differences in vibrational amplitude, the velocity, the acceleration, and the phase.

FIG. 27 shows displacement waveforms, each of which generates the sensation of the force at a time when the waveform is accelerated/decelerated in an asymmetrical manner.

FIG. 28 shows acceleration/deceleration waveforms, each of which generates the sensation of the force at the time when the waveform is accelerated/decelerated in the asymmetrical manner.

FIG. 29 shows acceleration sweep waveforms (of a sensation of clicking) that are obtained in the cases where the panel is vibrated for a short time to generate the sensation of clicking and a frequency is changed for each of the waveforms so as to change the feel. A patterned deceleration waveform and a patterned acceleration waveform are generated. FIG. 29 includes schematic views of an acceleration/deceleration shift waveform and a phase shift waveform. In the acceleration/deceleration shift waveform, a phase of the waveform is fixed while acceleration/deceleration positions are switched. In the phase shift waveform, acceleration/deceleration positions are fixed while a phase of the waveform is switched. A velocity and the phase of the waveform are controlled.

FIG. 30 are views showing a haptic information presentation method using a sensory characteristic relating to a force sensation, in which rotations of two eccentric rotators A912 and B913 are phase-synchronized to combine the displacement.

Here, FIG. 30b schematically shows a case where the two eccentric rotators A912 and B913 in FIG. 30a are synchronously rotated in the same direction with a phase delay of 180 degrees. As a result of this synchronous rotation, a torque rotation without eccentricity can be formed.

FIG. 30c schematically shows a case where a sensory characteristic 931 has a logarithmic function characteristic, indicating that the sensory characteristic 931 has, similarly to the sensory characteristic 211, has a sensory quantity 933 having a nonlinear characteristic of a logarithm or the like to a physical quantity 932 as a stimulus. When consideration is given to a case where a positive torque is generated at an operation point A934 on the sensory characteristic 931 and a negative torque in the opposite direction is generated at an operation point B935, a torque sensation 944 is represented as in FIG. 30d. A torque 943 is proportional to the time differential of a rotation velocity 942 of a rotator. When an operation is performed at the operation points A934 and B935, the torque sensation 944 is perceived.

The torque 943 is physically returned to an initial state 948 in one cycle, and its integral value is zero. However, the sensory integral value of the torque sensation 944 as a sensory quantity does not necessarily become zero. By suitably selecting the operation points A934 and B935 to set an operation point A duration time 945 and an operation point B duration time 946 suitably, the torque sensation can continue to be freely presented in an arbitrary direction.

The above is also established in the case of a rotational or translational displacement as well as in the case of a torque rotation or when the sensory characteristic 931 exhibits a nonlinear characteristic of an exponential function or the like. Even when the sensory characteristic 931 in FIG. 75C has a threshold value, a similar torque sensation occurs and the torque sensation can continue to be intermittently presented only in one direction.

FIG. 31a shows the direction of a pseudo-haptic sensation that is induced by an initial phase (θi) of a phase pattern and perceived by the user.

A pseudo-haptic device 107 can control the direction 1202 of a pseudo-haptic sensation that is induced by a change in the momentum formed by the eccentric rotators to the direction of the initial phase (θi) by changing the initial phase (θi) at the beginning of rotation in FIG. 31b. For example, the pseudo-haptic device 107 can induce a pseudo-haptic sensation in an arbitrary direction within 360 degrees in a plane by changing the initial phase (θi) as shown in FIG. 18c.

At this time, when a pseudo-haptic interface device 101 has a large weight, the pseudo-haptic interface device 101 cannot create a sufficient buoyancy sensation 1202 which makes the user feel as if it is lifted up and may be felt heavy because an upward force sensation 1202 caused by the pseudo-haptic sensation and a downward force sensation 1204 caused by the gravity cancel each other out. In such a case, a decrease or inhibition of buoyancy sensation caused by the gravity can be reduced by inducing the pseudo-haptic sensation 1203 in a direction slightly offset from the direction opposite the direction of gravity.

When a pseudo-haptic sensation is desired to be presented in a direction opposite the direction of gravity, a pseudo-haptic sensation may be induced alternately in two directions slightly offset from the vertical direction, that is, at $180°+α°$ and $180°-α°$.

FIG. 32a to FIG. 32f show one example of control of a pseudo-haptic device (haptic device) that presents a basic haptic sensation or pseudo-haptic sensation.

FIG. 32a schematically shows a method for generating a rotational force in a pseudo-haptic device 107, and FIG. 32d schematically shows a method for generating a translational force. Two eccentric weights 814 in FIG. 32a rotate in the same direction with a phase delay of 180 degrees. On the other hand, in FIG. 77D, the eccentric weights 814 rotate in the opposite directions.

(1) When two eccentric rotators are synchronously rotated in the same direction with a phase delay of 180 degrees as shown in FIG. 32b, a torque rotation without eccentricity is formed because the two eccentric rotators are located at point symmetrical positions and therefore the center of gravity coincides with the axis of rotation. This enables presentation of a rotational force sensation. However, because a time differential of angular momentum is a torque and because it is necessary to continue to increase the rotation velocity of a motor continuously in order to continue to present a torque in one direction continuously, it is in reality difficult to present a rotational force sensation continuously.

(2) A pseudo-haptic sensation of a rotational force continuous in one direction (continuous torque sensation) is induced by synchronous control using angular velocities $ω1$ and $ω2$ as shown in FIG. 32c.

(3) When the two rotators are synchronously rotated in opposite directions at a constant angular velocity as shown in FIG. 32e, a force that vibrates linearly in an arbitrary direction (simple harmonic oscillation) can be formed by controlling an initial phase $θi201$.

(4) When the two rotators are respectively rotated synchronously in opposite directions at angular velocities $ω1$ and $ω2$ according to a sensory characteristic relating to a pseudo-haptic sensation as shown in FIG. 32f, a pseudo-haptic sensation of a translational force that is continuous in one direction (continuous force sensation) is induced.

In the pseudo-haptic interface device 101, when the rotation velocities (angular velocities) and the phase synchronization are adequately controlled based on a human sensory characteristic as shown in FIG. 32c and FIG. 32f, the control circuit can be simplified because a pseudo-haptic sensation can be induced only by combining two angular velocities ($ω1$, $ω2$).

FIG. 33 schematically shows the phenomenon in FIG. 30 and its effect. By controlling the rotation pattern of an eccentric motor 815 to vary the combined momentum of the two eccentric rotators temporally in view of a sensory characteristic relating to a pseudo-haptic sensation, it is possible to induce a sensory illusion 905 that makes the user perceive a force acting continuously in one direction from vibration 904 that periodically accelerate or decelerate about an equilibrium point. In other words, a sensory illusion that makes the user feel as if a force is acting in one direction is induced regardless of the fact that no force component acting in one direction exists physically.

When the rotators are alternately accelerated or decelerated at the operation points A and B every time the phase changes by 180 degrees, a force sensation 905 in one direction is continuously perceived. The force is physically returned to an initial state in one cycle, and its momentum and an integral value of the force are zero. In other words, the acceleration-deceleration mechanism remains around the equilibrium point and does not move leftward. However, the sensory integral value of the force sensation as a sensory quantity does not become zero. At this time, the perception of an integral 908 of a positive force decreases and only an integral 909 of a negative force is perceived.

Here, because a time differential of an angular momentum is a torque and a time differential of a momentum is a force and because it is necessary to continue to increase the rotation velocity of a motor or a linear motor continuously in order to continue to generate a torque and a force in one direction, a method in which a rotating body or the like is periodically rotated is not suitable for continuously presenting a force sensation in one direction. In particular, it is physically impossible to present a continuous force in one direction with a non-base type interface such as those used in mobile devices.

However, because humans have a nonlinear sensory characteristic, it is possible to make them perceive a force or force pattern that is different from physical properties illusionally by utilizing the perceptual sensitivity relating to a pseudo-haptic characteristic or controlling the acceleration-deceleration patterns of momentum when the method of the present invention is used. For example, the human's sensory characteristic has different sensitivities to stimuli of different intensities (here, sensitivity is defined as the ratio of the intensity of the perceived stimulus to the intensity of the given stimulus); they are more sensitive to weak stimuli and less sensitive to strong stimuli. Thus, by controlling the acceleration and deceleration phases of motor rotation to repeat acceleration and deceleration periodically, it is possible to present a continuous force sensation in the direction in which a weak stimulus is presented. In addition, it is also possible to present a continuous force sensation in the direction in which a strong stimulus is presented by selecting operation points A and B with an appropriate sensory characteristic.

A driving simulator is considered as a similar device. In a driving simulator, acceleration of a vehicle is presented by slowly returning the user to the original position with acceleration that is too small to be noticed after a target force (acceleration feeling) is given. Thus, the force is presented intermittently. It is, therefore, impossible to present a force sensation or acceleration feeling feel in one direction continuously with such an asymmetric acceleration type method. The situation is the same even with a conventional haptic interface device. However, in the present invention, a sensory illusion is utilized to present a translational force sensation 905 that is continuous in one direction. In particular, the pseudo-haptic interface device 101, which uses a sensory illusion, is characterized in enabling the user to perceive a continuous force in a direction opposite the direction of an intermittent force that is presented by a physical method in the above driving simulator.

In other words, by utilizing the human nonlinear sensory characteristic that shows different sensitivities to different intensities, even if the integral of forces that are generated by periodical acceleration and deceleration or vibration is physically zero, the forces are not cancelled out sensuously and a translational force-like force sensation 905 or torque feeling is presented continuously in a negative direction 909 as a target direction (see FIG. 20c for a method for producing a continuous torque sensation). In this case, a positive force 908 is not perceived. These phenomena provide the same effect for any nonlinear characteristics even when a sensory characteristic 831 has a non-logarithm sensory quantity with respect to a physical quantity 832 as a stimulus. This effect can be achieved with a non-base type interface as well as with a base type interface.

In FIG. 33, when the rotation duration time Ta at the operation point A is reduced close to zero, the combined momentum in the section of the rotation duration time Ta becomes large and the force sensation also become large because the momentum in the each section of the rotation duration times Ta and Tb are equal to each other. However, because the force sensation changes logarithmically and the sensitivity decreases, the integral of the perceived value in the section of the rotation duration time Ta approaches zero. Thus, the force sensation in the section of the rotation duration time Tb becomes relatively larger and the continuity of the force sensation 905 in one direction improves. As a result, it is possible to continue to present a force sensation freely in an arbitrary direction by suitably selecting the operation points A and B and suitably setting an operation point A duration time and an operation point B duration time to adjust the synchronized phase between the two eccentric rotators A and B.

FIG. 34 show nonlinear characteristics that are used in the pseudo-haptic interface device. In the drawing, a sensory characteristic (FIG. 34a and FIG. 34b), a nonlinear characteristic of a viscoelastic material (FIG. 34c), and a hysteresis characteristic of a viscoelastic material (FIG. 34d) are shown.

FIG. 34b is a schematic view showing, similarly to FIG. 30, a sensory characteristic of a human having a threshold value 2206 for a physical quantity. The drawing shows that a sensation which does not exist physically is induced as a pseudo-haptic sensation when the pseudo-haptic interface device is controlled in view of this sensory characteristic.

When a material having physical properties which show a nonlinear stress characteristic in response to an applied force is interposed between a device that generates a drive force such as displacement, vibration, torque or force and an integumentary sense organ of a human as shown in FIG. 34C, a similar pseudo-haptic sensation is also induced.

In addition, as shown in FIG. 35d, the sensory characteristic is not isotropic between a time when displacement is increased and a time when it is decreased, for example, between a time when a muscle is extended and a time when it is contracted, and often indicates a hysteresis sensory characteristic. A muscle contracts significantly immediately after it is pulled strongly. When such a strong hysteresis characteristic is generated, an induction of a similar pseudo-haptic sensation is promoted.

FIG. 35 is views showing a haptic information presentation method using a method in which a sensory characteristic is changed by a masking effect relating to a force sensation as one example of a method for changing the sensory characteristic.

The sensory characteristic is masked by a masking displacement (vibration), and a torque sensation 434 is decreased. As this masking method, simultaneous masking 424 (having satisfactory results in masking of the visual sense and hearing sense), forward masking 425 and backward masking 426 are enumerated. FIG. 35A schematically shows a torque 413 as a maskee, and the torque sensation 434 perceived at this time is represented as in FIG. 35C. The torque 413 is proportional to the time differential of a rotation velocity 412 of a rotator.

At this time, initialization times 415 in which the rotation velocity 412 of the rotator is initialized and masking duration times 425 corresponding thereto are shortened like initialization times 445 and masking duration times 455 shown in FIG. 6 (FIG. 36d) until they become shorter than a certain specific time, critical fusion occurs in which although a negative torque due to the initialization physically exists, it is felt as if torque is continuously presented like a torque sensation 464.

A masker to generate a masking displacement (vibration) may be a rotator different from a rotator as a maskee by which torque is masked or the rotator itself as the maskee. The case where the rotator of the maskee also serves as masker means that at the time of masking, the rotator is controlled to generate the masking displacement (vibration) by the control device. The displacement (vibration) direction of the masker may or may not be the same as the rotation direction of the rotator as the maskee.

The above can also occur in the case where the maskee and the masker are the same stimulus (in the case where the rotator of the maskee serves also as a masker).

FIG. 36 schematically shows this case. As shown in FIG. 36, before and after strong torque sensations 485 and 486, a torque sensation 484 is decreased by a forward masking 485 and a backward masking 486.

With respect to the sensory characteristic, the sensitivity of a torque sensation 517 is changed according to a muscle tensile state or at least one state of physical, physiological and psychological states. For example, when a muscle is instantaneously extended by a presented torque 514 (high torque 524 in a short time) as an external force, a sensor called a muscle spindle in the muscle senses this, and the muscle is quickly contracted in a conditioned reflex way by a muscle cause torque 515 (muscle reflex cause torque 525) having power not lower than this external force. At this time, myoelectricity 511 is generated. Upon detecting it, a control circuit 512 controls a haptic presentation device 513, and changes the sensitivity of the torque sensation 517 by activating a presented torque 516 (gentle middle torque 526) in synchronization with the contraction of the muscle.

The above is established not only in the muscle tensile state but also in the case of the change of sensory sensitivity due to at least one state of breath, posture and neural firing states.

In a palm, the sensitivity is different according to the palm direction because of the anatomical structure of a skeleton, joint, tendon, muscle and the like. A direction presentation with high precision becomes possible by correcting the intensity (rotation velocity ω612) of the presented physical quantity in conformity with the sensitivity (anisotropic sensitivity curve 611) dependent on the palm direction.

FIG. 37 is views showing a method for presenting vibration haptic information in an arbitrary direction using a method in which a sensory characteristic is changed by a masking effect relating to a force sensation as one example of a control method for continuously or intermittently presenting haptic information on at least one of a displacement sensation, a vibration sensation, a force sensation and a torque sensation in an arbitrary direction.

The sensory characteristic is masked by a masking displacement (vibration) 1216, and a force sensation 1224 is decreased. This masking displacement (vibration) can be generated by synchronizing the rotation velocity 1022 of the eccentric rotator A with the rotation velocity 1023 of the eccentric rotator A in FIG. 30b to change (fluctuate) the velocities as shown in FIG. 30b. FIG. 37a schematically shows this, and the force sensation 1224 perceived at this time is represented as in FIG. 37b. A force 1213 is proportional to the time differential of a magnitude 1212 of the combined rotation velocity of the two eccentric rotators.

At this time, when initialization times 1215 in which the rotation velocity 1212 of the rotator is initialized are shortened until they become shorter than a certain specific time as shown in FIG. 24c, critical fusion occurs in which although a negative force due to the initialization physically exists, it is felt as if a force is continuously presented like a force sensation 1244.

The above also occurs in the case where a maskee and a masker are different rotators, and a similar continuous presented sensation occurs not only in the case of a force but also in the case of a torque.

Like the sensory characteristic shown in FIG. 38a to FIG. 38c, different users have different sensory characteristics. Thus, some people clearly perceive a pseudo-haptic sensation but some do not, and some people improve their perceptivity by learning. The present invention has a device that corrects such differences among individuals. In addition, when the same stimulus is persistently presented, the sensation to the stimulus may become dull. Thus, fluctuating the intensity, frequency and/or direction of stimulus is effective to prevent the user from getting used to the stimulus.

FIG. 38d shows one example of a method for presenting a force in one direction using a pseudo-haptic sensation. When a high rotation velocity ω1 (high frequency f1) 1002a at an operation point A and a low rotation velocity ω2 (low frequency f2) 1002b at an operation point B are alternately presented at phase intervals of 180 degrees in a method in which displacement components or vibration components from two eccentric vibrators rotated in opposite directions are combined, the pseudo-haptic sensation intensity (II) is proportional to the logarithm of the acceleration-deceleration ratio Δf/f (wherein (f=(f1+f2)/2, Δf=f1−f2)) of the frequencies which are the rotation velocities of the eccentric rotators (FIG. 83E). The gradient n that is created when the logarithmic values of the pseudo-haptic sensation intensity and Δf/f are plotted represents an individual difference.

In addition, a sensation intensity (VI) represents the intensity of a displacement component or vibration component that is perceived simultaneously with a force sensation in one direction caused by a sensory illusion. The intensity of the displacement component or vibration component is approximately inversely proportional to the physical quantity f (logarithm), and the sensation intensity (VI) relatively decreases when the frequency f is increased (FIG. 83F). By controlling the intensity containing the displacement component or vibration component, the texture of force is changed when a pseudo-haptic sensation is presented. The gradient m that is created when the logarithms are plotted represents an individual difference. The values n and m each representing an individual difference change as learning proceeds and converges to a certain value when the learning is saturated.

FIG. 39a to FIG. 39c show a method for expressing a texture of a virtual flat plate 1100. The motion of the pseudo-haptic interface device 101 represents the motion 1101 (position, posture angle, velocity or acceleration) of a virtual object monitored by the pseudo-haptic interface device 101 through sensing, and a friction sensation 1109 or roughness sensation 1111 as a texture of the virtual flat plate and its shape are controlled by controlling the direction, intensity and texture parameters (contained vibration components) of a resisting force 1102 created by the pseudo-haptic sensation in response to the motion of the virtual object.

FIG. 39a shows a resisting force 1103 that acts from the virtual flat plate to a virtual object when the virtual object (pseudo-haptic interface device 101) is moved on the virtual flat plate 1100 and the resisting force 1102, which acts against the motion.

FIG. 39b shows that a frictional force 1104 that acts between the pseudo-haptic interface device 101 and the virtual flat plate 1100 when they are in contact with each other vibrationally alternates between kinetic and static frictions. In addition, the pseudo-haptic interface device 101 makes the user to perceive the presence and shape of the virtual flat plate by presenting a resisting force 1106 that push the pseudo-haptic interface device 101 back so that the pseudo-haptic interface device 101 remains within the tolerance thickness 1107 of the virtual flat plate by feedback control. The resisting force for pushing the pseudo-haptic interface device 101 back is not presented when the pseudo-haptic interface device 101 is not on the virtual flat plate 1100. The resisting force is presented only when the pseudo-haptic interface device 101 is on the virtual flat plate 1100 so that the user can perceive the presence of a wall.

FIG. 39c shows a method for expressing a surface roughness. The pseudo-haptic interface device 101 makes the user to feel resistance or stickiness 1108 by presenting a resisting force in a direction opposite the direction 1101 in which the pseudo-haptic interface device 101 is moved based on its moving velocity or acceleration. The pseudo-haptic interface device 101 can emphasize the smooth feeling 1110 of the virtual flat plate as if it is sliding on ice by presenting a negative resisting force (accelerating force 1113) in the same direction as the direction in which the pseudo-haptic interface device 101 is moved. Such an acceleration feeling or smooth feeling 1110, which is difficult to present with a non-base type haptic interface device using a conventional vibrator, is the texture and effect that are achieved by the pseudo-haptic interface device 101, which uses sensory illusions. In addition, the pseudo-haptic interface device 101 makes the user to perceive a surface roughness sensation 1111 of the virtual flat plate by vibrationally fluctuating the resisting force (a fluctuating resisting force 1112).

FIG. 40 shows a control algorithm using a viscoelastic material whose properties change depending on an applied voltage.

In a method using a viscoelastic material, materials with different stress-deformation characteristics (2403, 2404) are attached but a material 1707 whose viscoelastic properties change depending on an applied voltage as shown in FIG. 40a may be used. By controlling the applied voltage to change the viscoelastic coefficient (FIG. 40b), the rate of transfer of the momentum that is generated by the eccentric rotators and is changed periodically to the palm is changed in synchronization with the rotational phases of the eccentric rotators. Then, because the momentum that is transferred to the palm or finger tip can be controlled by temporally changing the viscoelastic properties so that they can reach the characteristic values at operation points B and A as shown in FIG. 40d, the same effect as that achieved by increasing or decreasing the rotation velocity of the eccentric rotators can be achieved even when the eccentric rotators are being rotated at a constant rotation velocity as shown in FIG. 85C (constant-velocity rotation).

In addition, this method has the same effect as simulatively changing the physical properties of the skin, and has the effect of simulatively changing the sensory characteristic curve (FIG. 40e). Thus, it can be used in control to absorb differences in sensory characteristic among individuals or to enhance the efficiency in inducing a pseudo-haptic sensation. In addition, a viscoelastic material may be attached to the finger tip or body of the user as shown in FIG. 40f similarly to the case where a viscoelastic material is attached to a surface of the pseudo-haptic device as shown in FIG. 40a. Here, the quality and characteristics of the viscoelastic material are not limited as long as its stress-strain characteristics can be linearly controlled by changing the applied voltage. In addition, the control method is not limited to the control using an applied voltage as long as nonlinear control can be used.

When the rotation of a motor is accelerated and decelerated repeatedly as shown in FIG. 40b, large energy loss and heat generation occur. In this method, however, because the rotation velocity of the motor is constant (FIG. 40c) or the acceleration ratio f1/f2 has a value close to 1 and because the characteristics are changed by changing the applied voltage, the energy consumed in this method is smaller than the energy that is consumed when a motor is accelerated and decelerated.

FIG. 41 shows one example of control of the pseudo-haptic interface device 101.

In this device, a motor 1704 is controlled by a motor feedback (FB) characteristic controller that controls a feedback characteristic of the motor 1704 and a control signal generator that converts a pseudo-haptic sensation induction pattern into a motor control signal. In the present invention, it is essential to control the synchronization of phase patterns $\theta(t)=F(u, II, VI, R)$ of motor rotation, and it is necessary to synchronously control it temporally with high accuracy. As one example of a method for that, position control using a pulse train for controlling a servo motor is herein shown. When a step rotator is used for position control, it often loses synchronism or becomes uncontrollable easily because of sudden acceleration or deceleration. Thus, here, pulse position control using a servo motor is described. In the present invention, which uses a number of pseudo-haptic interface devices 101 that are synchronously controlled, when control is divided into control of a motor feedback (FB) control characteristic and motor control using a pulse position control method, consistency of motor control signals that is required when a different motor is used, quick generation of a pseudo-haptic sensation induction pattern, and scalability which enables the devices to easily adapt to an increase of the number of control motors to be synchronously controlled can be achieved. In addition, correction of personal differences can be made easily.

In a pseudo-haptic induction function generator 1701, a motor FB characteristic controller and a motor control signal generator are controlled by separate control signals. A pulse signal train $gi(t)=gi(f(t))$ for controlling the phase position of the motor is generated in the motor control signal generator to control the phase pattern $\theta(t)$ of the motor.

In this method, the rotational phase of the motor is feedback-controlled by the number of pulses. For example, the motor is rotated by 1.8 degrees by one pulse. The direction of rotation is selected from forward and reverse by a direction control signal. The use of this pulse control method enables any acceleration or deceleration pattern (rotation velocity, rotation acceleration) to be controlled at arbitrary phase timing with the phase relationship among two or more motors maintained.

FIG. 42 shows an example of implementation of the pseudo-haptic interface device 101.

As shown in FIG. 42a and FIG. 42b, the pseudo-haptic interface device 101 is worn on a finger tip 533 with an adhesive tape 1301 or using a finger insertion portion 1303 of a housing 1302. The pseudo-haptic interface device 101 may be worn between fingers 533 (FIG. 42c) or may be held between fingers 533 (FIG. 42d) while in use. The housing 1302 may be made of a hard material which is not deformed easily, a material which is deformed easily, or a slimy material having viscoelasticity. Possible variations of these ways of wearing are shown in FIG. 30. By controlling the phases of two basic units of the pseudo-haptic device, it is possible to express a swelling sensation and a compressing or oppressing sensation in addition to a force sensation in leftward, rightward, upward and downward directions with a flexible adhesive tape or housing. An item used to mount the pseudo-haptic interface device 101 on the body of the user, such as the adhesive tape or the housing having a finger insertion portion, is referred to as "mounting portion." The mounting portion may be of any form as long as it can be mounted on an object or body. The mounting portion may be in the form of a sheet, belt or tights instead of an adhesive tape or housing having a finger insertion portion as described above. The pseudo-haptic interface device 101 can be mounted in a similar fashion on any part of the body such as finger tip, palm, arm and thigh.

The term "viscoelastic material" and "viscoelastic properties" as used herein referred to as a material having viscosity or elasticity.

FIG. 43 shows other examples of implementation of the pseudo-haptic interface device 101.

In FIG. 43a, a pseudo-haptic device 107 and an acceleration sensor 108 are located on opposite sides with respect to a finger 533 to reduce the influence of vibration on the acceleration sensor 108. Otherwise, the pseudo-haptic device 107 is detected as noise vibration by the acceleration sensor 108. In addition, noise contamination is further reduced by cancelling noise vibration detected by the acceleration sensor 108 based on a control signal from the pseudo-haptic device 107.

In FIG. 43c to FIG. 43e, a vibration absorbing material 1405 is interposed between the pseudo-haptic device 107 and the acceleration sensor 108 to reduce noise vibration contamination.

FIG. 43d shows a pseudo-haptic interface device 101 that enables the user to touch a real object and perceive a pseudo-haptic sensation simultaneously. A pseudo-haptic sensation is added to the feel of a real object. In a conventional data glove, a force sensation is presented by pulling wires attached to fingers to which a haptic sensation is presented. When haptic sensation is presented to fingers on a real object using a data glove, it is difficult to combine the feel of real and virtual objects since the fingers may be separated from the real object or grip may be inhibited. Such problems do not occur in the pseudo-haptic interface device 101. It can provide a combined sensation (mixed reality) which enables the user to feel a virtual touch even when the user holds a real object firmly.

In FIG. 43e, the feel of holding or contacting a real object is altered or converted into the feel of a virtual object 531 by adding a pseudo-haptic sensation based on the degree of contact with the real object and the grip pressure measured by a pressure sensor 110. In FIG. 43f, a shape sensor (such as a photosensor) for measuring a surface shape or changes in shape is used, instead of the pressure sensor shown in FIG. 43e, to measure the shape or surface shape of the held object that relates to its feel and measure the grip force, strain sear force or contact resulting from deformation. As a result, a touch sensation magnifier that emphasizes the measured stress, sear force or surface shape is realized. The user can not only visually recognize the minute surface shape on a display as if he or she is observing it under a microscope but also haptically recognize its shape. In addition, when a photosensor is used as a shape sensor, the user can feel the shape of an object only by laying a hand over it because it can measure the shape of an object in a contactless manner.

In addition, in the case of a variable touch button with a command on a touch panel that changes depending on the status of use or context, in particular, in the case of a variable touch button, such as those of cellular phones, which is hidden by a finger when it is pressed, the command of the variable touch button is hidden and made invisible by a finger. Similarly, when a variable touch button in a virtual space of VR content is pressed, the user becomes unaware of the meaning of the button he or she now wants to press because the menu or command changes depending on the context. Thus, when the meaning of the command on a pseudo-haptic button is displayed on a display 1406 on the pseudo-haptic interface device 101 as shown in FIG. 43e, the user can check it before pressing the button.

To enable the user to operate a virtual object 531 and the pressing information and pressing reaction force from a virtual button of a virtual controller in the same way as a real object without any discomfort, the time lag between the application of a pressing force and the presence of a pressing reaction force becomes a problem. For example, in the case of an arm-shaped grounding-type haptic interface, the position of the holding finger is measured based on the angle of the arm or the like, and stress to be presented is calculated after contact or interference with a digital model is determined. Thereafter, the rotation of the motor is controlled and motion or stress of the arm is presented. Thus, there may occur a response delay. In particular, when the user is playing a game, monitoring and controlling on the content side may lead to delays in response because the user operates buttons reflexively and quickly. In such a case, a CPU and a memory for monitoring the sensors (108, 109, 110) and controlling the pseudo-haptic device 107 and the viscoelastic material 1404 are also equipped in the pseudo-haptic interface device 101 to provide real-time control. This improves the response to pressing of virtual buttons and improves reality and operability.

The pseudo-haptic interface device 101 has a communication device 205 and communicates with other pseudo-haptic interface devices 101. For example, when pseudo-haptic interface devices 101 are mounted on all the fingers and thumb, it is possible to change the shape of a shape-changeable material in each pseudo-haptic interface device (1403 in FIG. 88B) in synchronization with a motion of the corresponding finger or thumb or to enable the user to perceive a change in shape or feel of a virtual controller or operate virtual buttons in real time. This improves reality and operability.

In FIG. 43a, in order to utilize a hysteresis characteristic of a sensation or muscle effectively, a myoelectric reaction is measured with a myoelectric sensor 110 and the pseudo-haptic induction function is corrected in a feedback manner so that the time and intensity of muscle contraction can increase. One factor that affects the induction of a pseudo-haptic sensation is the way of mounting the pseudo-haptic interface device 101 on a finger or palm (the way of pinching or pinching strength) or the user's manner of putting power into the arm that receives a force from the pseudo-haptic interface device 101. Different people have different sensitivities to a pseudo-haptic sensation. Some people feel a pseudo-haptic sensation with high sensitivity when they make a loose first and some feels a pseudo-haptic sensation with high sensitivity when they make a tight fist. Similarly, the sensitivity changes depending on the tightness with which the pseudo-haptic interface device 101 is worn. To absorb the differences between individuals, the pressure sensor 109 or the myoelectric sensor 110 monitors the user's way of making a first to measure the individual difference and correct the pseudo-haptic induction function in real time. People get used to physical simulations in content and learn the right way of making a fist. This correction has the effect of promoting it.

While the pseudo-haptic interface device 101 has a large thickness so that the component structure can be seen in FIG. 43a to FIG. 43e, each component may be of a sheet-like flat configuration.

FIG. 44a shows a device that emphasizes a pseudo-haptic sensation 905 induced by a pseudo-haptic device by changing the shape 3001 of a pseudo-haptic interface device in synchronization with a pseudo-haptic force with shape changing motors 3002 in addition to causing the pseudo-haptic device to induce a pseudo-haptic sensation.

For example, when this is applied to a fishing game as shown in FIG. 44b, the tensile force sensation from the fishing line induced by the pseudo-haptic sensation 905 is enhanced by bending the shape 3001 of the interface backward in synchronization with the fish pulling the fishing rod. At this time, the user cannot experience such a real tug by simply changing the shape of the interface without a pseudo-haptic sensation. The addition of a change in shape of the interface to the pseudo-haptic sensation improves reality. In addition, when basic units of a pseudo-haptic device are spatially arranged as shown in FIG. 44C, a deformation effect can be created without the shape changing motors 3002.

Instead of the shape changing motors 3002, any mechanism that can change a shape, such as a drive unit using a shape-memory alloy or piezoelectric element, may be used to create such a change in shape.

FIG. 45 shows an alternative device for the pseudo-haptic device 107.

Instead of eccentric weights 814 of the eccentric rotators and the eccentric motor 815 for driving them shown in FIG. 45a, a weight 2302 and extendable members 2303 are used in FIG. 45(b) to FIG. 45e. For example, FIG. 45b shows a plan view, a front view and a side view in a case where the weight 2302 is supported by eight extendable members 2303, and FIG. 45d show a plan view, a front view and a side view in a case where the weight 2302 is supported by four extendable members 2303. In each drawing, the weight can be moved in an arbitrary direction by extending and contracting paired extendable members 2303. As a result, translational or rotational displacement or vibration can be generated. Any structure having an acceleration-deceleration mechanism that can generate and control a translational movement of the center of gravity or a rotation torque can be used as an alternative.

FIGS. 46 to 56 indicate various configurations of a haptic sense display or the touch panel. The haptic sense display or the touch panel is provided with an actuator which is provided on the base material and a sensor that detects the touch panel, and displacement, pressure, acceleration, and the like of the touch panel, and measures a position of displacement, pressure, acceleration, and the like, rotation, and tensor.

FIGS. 47 and 48 indicate various configurations of a table form haptic sense display or the touch panel.

FIG. 46 indicates a base unit of the haptic sense actuator, and is configured from the touch panel, the sensor, and the actuator. In the touch panel and the sensor, the position, speed, acceleration, form, displacement, deformation, amplitude, rotation, vibration, force, torque, pressure, humidity, temperature, viscosity, elasticity, and the like are measured as a scalar, vector, or tensor. The actuator presents the position, speed, acceleration, form, displacement, deformation, amplitude, rotation, vibration, force, torque, pressure, humidity, temperature, viscosity, elasticity, and the like as a scalar, vector, or tensor. Here, perception of haptic sense information using the fingertip is described, but is not particularly limited to the fingertip, and it is assumed that the whole body of the operator is throughout the body. FIG. 48 indicates an example in which the base unit of the haptic sense actuator is used in a table form and for a table. Other than the operation by the fingertip, it is possible to operate by the palm.

In FIG. 48, a virtual button is provided for operating by an operator on a wall or the like in a table form. It is possible to execute operation by a body part such as an elbow and an operation by an object such as the virtual button via the body part.

In FIGS. 49 to 52 in a steering wheel form, an actuator such as a steering wheel of a vehicle and the virtual button close to the steering wheel for operation by the operator are provided. Examples in which the base unit of the haptic sense actuator is used in a steering wheel form and for a steering wheel are indicated. In FIG. 49, it is possible to execute operation by the body part such as a finger or palm and operation by the object such as the virtual button via the body part. In FIG. 50, a liquid crystal display is provided on the steering wheel. A posture of the liquid crystal display even if the steering wheel turns during operation is maintained in a state without change. It is possible to execute operation by the body part such as the finger or palm and operation by the object such as the virtual button via the body part. At this time, in visual information presentation of the liquid crystal display and the like, the posture of the liquid crystal display is maintained to be fixed even if the steering wheel is rotated such that it is possible to secure a perspective and field of view.

In FIG. 51, it is possible to execute operation by the body part such as the finger or palm and operation by the object such as the virtual button via the body part. The haptic sense actuator is disposed on the entirety of the steering wheel, and even if the steering wheel is rotated it is possible to use the haptic sense actuator at a position such as the finger, palm, and an arm.

In FIG. 52, it is possible to execute operation by the body part such as the finger or palm and operation by the object such as the virtual button via the body part. The entire steering wheel is a haptic sense actuator, and even if the steering wheel is rotated it is possible to use the haptic sense actuator at a position such as the finger, palm, and arm.

In FIG. 53, it is possible to execute operation by the body part such as the finger or the palm and operation by the object such as the virtual button via the body part. Thereby, even if there is no door handle, it is possible to feel or operate the door handle. A curved surface liquid crystal panel and a haptic panel are provided on a windowpane. It is possible to perform an operation like this in all of a button, a slider, a dial, a switch, an operation panel, and the like of the object.

In FIG. 54, the haptic sense actuator is mounted on the finger, in FIG. 56, the actuator is mounted on the wrist, and in FIG. 57, the actuator is mounted, and the virtual button is pressed and operated by the finger. FIG. 54 indicates an example in which the base unit of the haptic sense actuator is used in a ring form and for a ring. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIG. 55 indicates an example in which the base unit of the haptic sense actuator is used in a list form and for a list. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIG. 56 indicates an example in which the base unit of the haptic sense actuator is used in an arm ring form and for an arm ring. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIG. 57 indicates an example in which the base unit of the haptic sense actuator is used in the whole body. It is possible to execute operation by the body part such as the finger or palm and operation by the object such as the virtual button via the body part. Thereby, even if there is no door handle, it is possible to feel or operate the door handle. It is possible to perform an operation like this in all of a button, a slider, a dial, a switch, an operation panel, and the like of the object.

FIGS. 58 and 59 indicate an outline of a method of a wiring that connects the controller and the tactile force sense actuator. FIG. 58 indicates a case where the haptic sense actuator is connected in a parallel arrangement, and FIG. 59 indicates a case where the haptic sense actuator is connected in a cross arrangement.

FIG. 60 indicates a schematic view of a system in which information is exchanged by communication of a haptic display panel and a computer (PC). The touch panel is equipped with an actuator array, or is integrally provided.

The present system presents haptic sense information such that the actual object is operated by an operator by applying sensory characteristics and sensory illusion of the operator. Specifically, the system is controlled based on stimulation that is detected by a sensor and presents haptic sense information by controlling stimulation utilizing the fact that the sensory characteristics that indicate a relationship between an amount of stimulation and a sensory amount applied to the human body are non-linear and sensory illusions. The sensory characteristics include the amount of stimulation of at least one of the amount of stimulation that is applied to the operator and the amount of stimulation brought about by the operation of the operator and the sensory amount that is presented to the operator, and the sensory amount is a sensory amount that is unable to be physically present.

Here, the system presents stimulation from the object or to the object, and stimulation applied to the operator is controlled to match the operation of the operator. Components of a minimum value are configured from the tactile force sense actuator and the controller, and are able to be used as the component. The components are accumulated to create an actuator array, and a video touch panel that has a haptic sense information presentation function is thus configured. The haptic sense information presentation system is configured by a system such as a latch display using a module and the like other than the components. In this manner, it is possible to configure the haptic sense information presentation system of various forms or shapes such as a flat surface, a curved surface, and a solid body by accumulating as the actuator array.

Position, speed, acceleration, form, displacement, deformation, amplitude, rotation, vibration, force, torque, pressure, humidity, temperature, viscosity, and elasticity are measured by the sensor that is attached to the haptic sense actuator, and the haptic sense actuator is controlled by the information being sent to the controller, a control signal for controlling the haptic sense actuator being calculated and sent to the haptic sense actuator. The haptic sense actuator has a sensor function and a presentation function of a panel type and a display type, in the controller, measures displacement, momentum, vibration amplitude, displacement stimulation, vibration stimulation, time change of stimulation intensity, and the like accompanying movement of the body such as of a finger or a palm, controls the position, speed, acceleration, form, displacement, deformation, amplitude, rotation, vibration, force, torque, pressure, humidity, temperature, viscosity, elasticity, and the like of the tactile force sense actuator to match movement, pressure, and the like of the body such as the finger or the palm that is monitored by the sensor based on a control algorithm, and presents haptic sense information such as a pressure sensation, a tactile sensation, and a sense of force to a person or the like.

In the control signal, force information (t), amplitude information (t), and the like are expressed by driving voltage and the like, and as long as the actuator is a motor, a piezo actuator, an artificial muscle, a memory alloy, a molecular motor, an electrostatic actuator, a coil, a magnetic force actuator, a static electricity actuator, or another actuator that generates displacement and vibration, device operating principles are not important.

As a result, regardless of the panel and the display that are configured as the flat surface, the curved surface, or the three-dimensional shape being devices so as to be fixed or minutely positioned and minutely vibrate in a casing or the like, an insertion feeling, a pushing feeling, a sinking feeling, a depth feeling, a pushed back feeling, a floating feeling, a convergence feeling of vibration and amplitude, a reverberation feeling of vibration and amplitude, a sense of orientation of displacement and movement, a sticking feeling, a hard feeling, a soft feeling, and a three-dimensional feel are felt. Regardless of if such a sense is not reproduced and presented physically, such a sense and bodily reaction and reflection are experienced sensuously. In addition, regardless of if the information terminal and the like is a flat surface or a flat panel, it is possible to really obtain an operation feel of the object such as a button, a slider, a dial, a switch, and an operation panel.

In addition to the description above, it is possible to use in stationery, a notebook, a pen, a home appliance, a billboard, signage, a kiosk terminal, a wall, a table, a chair, a massager, a vehicle, a robot, a wheelchair, tableware, a shaker, a simulator (surgery, operation, massage, sports, walking, musical instrument, for crafts, for painting, for art), and the like.

FIG. 61 shows various configurations of the integrated haptic display panel system.

Plural units of the actuators are attached to the touch panel. The actuators may be arranged in an array. The actuators may be integrated in the touch panel. The actuators comprises a units composed of a plurality of modules, integrated array type, sphere or solid type arranged on the surface, solid type packed in a sphere or solid. As the actuator is arranged as an array, a tactile force information presenting system can comprise the system of various shaped or size such as plane, curved plane, or solid.

In FIG. 62, the actuators that are provided on the haptic display panel are arranged in the array. These units are attached to each other via a link mechanism, a vibration buffer, or a buffering mechanism. The vibration buffer or the buffering mechanism may not be interposed between the units. The plurality of module provide arrangement method such as plain, curved surface, stereo, the module connected by link mechanism, vibration damping material, or damping mechanism, and independently.

FIG. 64 to FIG. 67 each show schematic views of a basic module of a tactile force device. The basic module of the haptic device digitizes and presents digitalized expression of the sensation of the button, a sensation of friction, the haptic sensation obtained through a sensation of an irregularity, a sensation of pain, a sensation of existence of the virtual object, and a sensation of expression.

The haptic device presents the haptic and the illusory haptic that is a physical quantity and the stimulus of the displacement, the rotation, the deformation, the vibration, or the like in accordance with contact or the motion of the finger, the human body, or the like with the device. Then, the haptic device measures the displacement, the rotation, the velocity, the acceleration, the pressure, or the force of the contact, the motion, or the like by using a photo device or a sensor that uses distortion, bending, resistance, conduction, capacitance, a sound wave, a laser, or the like.

The sensor signal includes the stimulus by the object and/or to the object that includes at least one of the position, the velocity, the acceleration, the shape, the displacement, the deformation, the oscillation, the rotation, the vibration, the force, the torque, the pressure, the humidity, the temperature, the viscosity, and the elasticity. Therefore, sense, or pain sense of haptic sensation such as button feeling, friction feeling, uneven feeling and presence or feel of virtual object is expressed.

The touch panel can have any type of a plane and a shape.

An instantaneous change in the haptic can be presented digitally. Prior to the contact with the touch panel, motion in the vicinity of the touch panel is monitored. In this way, real-time responsiveness of the touch panel at the time of the contact therewith can be improved. The displacement, the rotation, the velocity, the acceleration, the pressure, or the force of the motion or the like is measured by a non-contact sensor or the like. In this way, a sensation of a shock and a sensation of a collision can be expressed.

A contact state of the finger that is related to the haptic can be expressed digitally. The contact state is monitored in terms of a contact angle, a contact area, moistness, and the like of the finger, and control that reflects such a state can be executed. Thus, a sensation of tracing can be expressed further precisely.

FIG. 68 to FIG. 76 each show a schematic view of a panel type module. The panel type module of the haptic device digitizes and presents digitalized expression of the sensation of the button, the sensation of friction, the sensation of the haptic obtained through the sensation of the irregularity, the sensation of pain, the sensation of existence of the virtual object, and the sensation of expression.

The panel type module of the haptic device presents the haptic and the illusory haptic that are the physical quantity and the stimulus of the displacement, the rotation, the deformation, the vibration, or the like in accordance with the contact, a contact position, or the motion of the finger, the human body, or the like with the module. Then, the panel type module of the haptic device presents the haptic and the illusory haptic that are the physical quantity and the stimulus of the displacement, the rotation, the deformation, the vibration, or the like in accordance with the contact, the contact position, or the motion and that represent spatial balance, intensity distribution, and temporal changes of the stimulus on the touch panel. Accordingly, a sense (phantom sensation) of the force, the object, movement of the existence, transmission, or a shape change that is generated through the spatial balance, the intensity distribution, and the temporal change of the stimulus can be presented. Thus, the object, and the sensation of the existence thereof can be presented on the rigid panel.

FIG. 69 shows a structure of the touch panel in which a photointerrupter is mounted on the base material.

The photointerrupter perceives a sensation of pressing (a sinking pitch, depth) of the button by detecting a distance and a change. Accordingly, when the sensation of the button is expressed digitally on the rigid panel, expression of sensations of texture and touch can instantaneously and adaptively be changed in accordance with use or preference.

FIG. 70, FIG. 71, and FIG. 72 each show a structure in which the actuators are attached to the touch panel in a hanging manner. FIG. 70 shows the structure in which the actuator is attached to the vicinity of the center of the touch panel in the hanging manner.

FIG. 71 shows the structure in which the actuators are attached to both ends of the touch panel in the hanging manner. In the structures shown in FIG. 70 and FIG. 71, a viscous/elastic material or the vibration buffer is preferably provided on a lateral wall between the touch panel and the wall.

FIG. 72 shows the structure in which the actuators are attached to both ends of the touch panel in the hanging manner. In the structure shown in FIG. 72, a low-friction material is preferably provided on the lateral wall between the touch panel and the wall.

With each of these structures, intensity of the sensation of the tactile force and an effect thereof can be increased. The structure shown in FIG. 70, 71 has a three-dimensional speaker mechanism in which the touch panel and the actuator are hung and that generates the vibration with six degrees of freedom. Accordingly, the physical quantity and the quantity of stimulus that are transmitted to the finger or the human body through the touch panel can be increased. In addition, in FIG. 72, the structure in which the actuators are attached to both of the ends of the touch panel is provided. In FIG. 73, the structure in which the inertial actuators are attached to both of the ends of the touch panel is provided. Accordingly, the physical quantity and the quantity of stimulus that are transmitted to the finger or the human body through the touch panel can be increased. The sensory quantity of the haptic is increased. Furthermore, a sensory quantity of pressing, the sinking pitch, and the sensation of depth are increased. Each of such structures can be applied to an IoT device. Regardless of selection of a mounting position, each of these modules can increase the sensory quantity and the efficiency.

FIG. 73 to FIG. 75 are schematic views of a touch panel module in which the liquid-crystal panel is incorporated into the touch panel. In a touch panel module shown in FIG. 73, the liquid-crystal panel is arranged in a pair of spatial portions of the module on both sides of the touch panel. Because the touch panel and each of the actuators are separated from each other, a video displayed on the liquid-crystal panel is neither distorted nor vibrated. The sensation of touch, the feel, and the sensation of existence of the object that is displayed on the liquid-crystal panel are presented. Thus, the sensation of touch and the feel of a three-dimensional object can be simulated by a two-dimensional model.

FIG. 74 and FIG. 75 are schematic views of a thin touch panel module. FIG. 74 shows the same arrangement as that in FIG. 73. In FIG. 75, the actuators are arranged on both of the ends of the touch panel. Thus, the module can be mounted in thin equipment, such as a smartphone.

FIG. 76 is a schematic view of a touch panel module system in which a screen is provided on the surface of the touch panel of the touch panel module shown in FIG. 73 to FIG. 75 and a projector is disposed above the screen. In this way, a function of presenting the digitized tactile force of the video can be realized. Video projection by the projector and the tactile force touch panel are controlled.

FIG. 77 is a schematic view in which a five sense information presenter is installed on the touch panel module shown in FIG. 73 to FIG. 76. With installation of the five sense information presenter, a sensation of reality that is obtained through use of five senses that includes sight, hearing, touch, and the like can be improved. In addition, the video, sound, the texture, smell, a taste, and the like that are obtained by using the five senses can be used. With a mutual effect of the tactile force information and the five sense information that either corresponds or does not correspond to (match) the tactile force information of the object, the sensory illusion can be enhanced or promoted. In addition, a sensation that does not exist in reality can be extended.

FIG. 78 is a schematic view of a multi-touch array unit. The multi-touch array unit presents the basic sensations of movement and motion. The multi-touch array unit executes phase control in a vibration direction in each of the panels and thus can express the sensations of movement and motion other than the simple vibration presented through a stimulus of movement. The multi-touch array unit also presents a sensation of rotation by the fixed panels.

FIG. 79 shows presentation of complicated sensations of motion. The phase control in the vibration direction is executed in each of the panels to control synthesis of sensations on a fingertip. In this way, a sensation of expansion, a sensation of constriction, and a sensation of twisting are presented. In addition, a sensation of deformation is presented on the fixed panels.

FIG. 80 shows presentation of complicated sensations of motion. The phase control in the vibration direction is executed in each of the panels, sensations in a perception layer and a recognition layer are synthesized, and a multi-touch sensation is synthesized and controlled. In this way, the sensation of expansion, the sensation of constriction, and the sensation of twisting are obtained, and the sensation of expansion and the sensation of constriction are presented. In addition, the sensation of deformation is presented on the fixed panels.

FIG. 81 shows presentation of the sensation of touch and the sensation of the force by a single device. Sensation synthesizing control is executed to simulate a different component (the sensation of touch or the sensation of the force) on each of the panels. The sensation of touch and the sensation of the force are simultaneously presented in the Z-direction by controlling driving of the sensation of pressure in the Z-direction by finger pressure and an X-Y vibration trigger. In this way, plural resonance peaks are realized.

FIG. 82 shows presentation of the sensation of touch and the sensation of the haptic by the single device. The different component (the touch sensation or the haptic sensation) is simulated on each of the panels. The touch sensation and the haptic sensation are simultaneously presented on the panels by controlling driving of the pressure sensation in the Z-direction by the finger pressure and the X-Y vibration trigger and by generating and controlling the pressure sensation in the Z-direction. In this way, the plural resonance peaks are realized.

FIG. 83 shows presentation of the touch sensation and the haptic sensation by the single device. The different component (the touch sensation or the haptic sensation) is simulated on each of the panels at different timing. However, a synthesizing method is not limited thereto. A mutual effect, such as mutual masking of the touch sensation and the haptic sensation, is avoided. Consonants and vowels are presented.

In FIG. 84, induction patterns are controlled so as to control a forward vibration pattern and a rearward vibration pattern.

FIG. 85 shows presentation of the touch sensation and the haptic sensation by the single device.

The different component (the touch sensation and the haptic sensation) is simulated on each of the panels at the different timing. However, a synthesizing method is not limited thereto in the case where there are portions in inductive patterns where the touch sensation and the haptic sensation overlap each other and where the touch sensation and the haptic sensation do not overlap each other.

The mutual effect, such as mutual masking of the touch sensation and the haptic sensation, is avoided. The consonants and the vowels are presented.

FIG. 86 shows presentation of the touch sensation and the haptic sensation by the single device. A different component (the intensity, the oscillation, the frequency, the waveform, or the phase) is presented on each of the panels.

Due to a comparison of the waveforms, a difference in the waveforms, a phase difference, and the synergistic effect, a different sensation from the component is generated.

FIG. 87 shows presentation of the touch sensation and the haptic sensation of the haptic by the single device.

The different component (the intensity, the oscillation, the frequency, the waveform, or the phase) is presented on each of the panels.

Due to the comparison of the waveforms, the difference in the waveforms, the phase difference, and the synergistic effect, the different sensation from the component is generated.

In FIG. 88, a sensation of a mountaintop projection by the haptic is presented by generating a sensation of a button shape.

The oscillation of the panel is increased as the fingertip approaches the center thereof, and is reduced as the fingertip separates from the center thereof.

Sensations (a sensation of being pulled and a sensation of crossing) at the mountaintop are presented. Sensations of gradients and the pointed projection are presented on the panel. In FIG. 89, a sensation of a projected semicircular column by the haptic is presented. The stimulus, the intensity of the vibration, and the oscillation are controlled. The sensations (the sensation of being pulled and the sensation of crossing) are presented. In this way, the sensation of the projection is presented on the panel.

In FIG. 90, a sensation of a recessed gap by the haptic is presented. A sensation of a gap is presented by momentarily eliminating a sensation of resistance. In this way, the sensation of the recessed gap is presented on the panel.

In FIG. 91, movement of the finger (a sensation of connecting) between the buttons is controlled through control of the sensation of guidance. The stimulus, the intensity of the vibration, and the oscillation are controlled. In this way, the fingertip is not retained at a position between the buttons for a long time and is guided to the button. The movement of the finger is guided on the flat panel like an attractor on a potential.

A pointer is operated on the panel to move between the buttons. When the pointer moves out of a button region, the finger is guided to a next pointer. The oscillation of the panel is increased as the pointer approaches the center of a guidance section (and is reduced as the pointer separates therefrom). A direction of the sensation of the force is switched at the center of the guidance section.

In FIG. 92, the sensation of guidance between the buttons is controlled to present a sensation of an edge and a sensation of an end point. A clicking vibration is generated at an end of the guidance section. In this way, a sensation of existence of the edge, a floating sensation of the button can be obtained. The pointer is operated on the panel to move between the buttons. When the pointer moves out of the button region, the finger is guided to the next pointer. The oscillation of the panel is increased as the pointer approaches the center of the guidance section (and is reduced as the pointer separates therefrom). The direction of the sensation of the haptic is switched at the center of the guidance section.

In FIG. 93, the sensation of guidance is controlled to present the sensation of the edge of the button. A masking variation occurs in an edge portion. In this way, the sensation of existence of the edge and sensations of a step and a recess of the button on the flat panel are obtained. The pointer is operated on the panel to move between the buttons. When the pointer moves out of the button region, the finger is guided to the next pointer. The oscillation of the panel is increased as the pointer approaches the center of the guidance section (and is reduced as the pointer separates therefrom). The direction of the sensation of the force is switched at the center of the guidance section.

In FIG. 94, a stable haptic is presented by executing tactile force control of a slider. The pointer is operated on the panel to move between the buttons. When the pointer moves out of the button region, the pointer is guided to the button. The oscillation of the panel is increased as the pointer approaches the center of the guidance section (and is reduced as the pointer separates therefrom). The direction of the sensation of the haptic is switched at the center of the guidance section. In this way, a sensation of the slider is obtained.

In FIG. 95, the stable haptic is presented by executing the haptic control of the slider. A clicking vibration is generated at an end point of the slider. In this way, the sensation of the slider is obtained. FIG. 96 shows sensation control of the slider.

In FIG. 97, the stable tactile force during sweeping is presented. The haptic is controlled in accordance with a case with static friction and a case with kinetic friction. The stable haptic is presented in different control modes. In FIG. 98, the static haptic is presented by controlling (equalizing intervals of) the kinetic friction during sweeping. Coherent vibration phases by cutout vibrations are controlled. In this way, the stable haptic is presented in the different control modes.

In FIG. 99, the stable haptic is presented by controlling the static friction during sweeping. A virtual slider is moved by fixing the finger (or a portion of the human body) thereto. The virtual slider is fixed. Then, the finger slides thereon to cause reciprocal motion. In this way, the sensation of the slider is obtained. In FIG. 100, the stable haptic is presented by controlling the static friction during sweeping.

The virtual slider is moved by fixing the finger (or the portion of the human body) thereto. The virtual slider is fixed. Then, the finger slides thereon. Once the finger reaches an end, the movement is reset (the finger is lifted off from the surface of the panel). In this way, the sensation of the slider is obtained.

In FIG. 101, the stable haptic is presented by controlling the static friction during sweeping.

The virtual slider is moved by fixing the finger (or the portion of the human body) thereto. The virtual slider is fixed. Then, the finger slides thereon. Once the finger reaches the end, the movement is reset (the vibration is cut). In this way, the sensation of the slider is obtained. In FIG. 102, the stable haptic is presented by controlling the kinetic friction during sweeping.

The virtual slider is moved by fixing the finger (or the portion of the human body) thereto. The virtual slider is fixed. Then, the finger slides thereon. When the friction exceeds a tensile limit, contact fixation is eliminated. In this way, the sensation of the slider is obtained.

In the arbitrary waveform, various waveform patterns exist in accordance with the desired feel or feel. The arbitrary waveform are not limited the combination of linear increase or decrease, sinusoidal vibration, and basic frequency components, but also by arbitrary waveform design and the combination as if to create timbre and music of instruments with synthesizer various feel or feel can be expressed.

In FIG. 103, the sensation of pressing of the button is presented by controlling pressing of the button. The panel is oscillated (or vibrated) at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency. Accordingly, even with the panel that is not dented, the sensation of pressing depth is felt. That is, the sensation of the dent can be presented without physical pressing.

In FIG. 104, the sensation of pressing of the button is controlled and presented. Plural thresholds are set to express a sensation of half pressing such as of a shutter release button, a sensation of holding a focus of a camera, and the like.

In FIG. 106, a sensation of pressing of the shutter release button is controlled and presented. Plural thresholds are set to express the sensation of half pressing such as of the shutter release button, the sensation of holding the focus of the camera, and the like.

In FIG. 107, the sensation of pressing of the button is controlled and presented. Sensations of pressing and releasing are separated (no sensation of releasing in the first time, and the sensation of releasing in the second time).

In FIG. 108, the sensation of pressing of the button is subjected to latch control and presented. The sensations of pressing and releasing are separated (no sensation of releasing in the first time, and the sensation of releasing in the second time).

In FIG. 109, notch pulse thresholds are controlled to have equal intervals. In this way, a sensation of cutting a mille-feuille or a chocolate-covered ice cream is obtained. In FIG. 110, the notch pulse thresholds are controlled to have unequal intervals. In FIG. 111, the notch pulse thresholds are controlled to have equal intervals. In this way, the sensation of cutting the mille-feuille or the chocolate-covered ice cream is obtained.

In FIG. 112, the notch pulse thresholds are controlled to have unequal intervals. In this way, the sensation of cutting the mille-feuille or the chocolate-covered ice cream is obtained.

In FIG. 113, the notch pulse thresholds are controlled to have equal intervals. In this way, the sensation of cutting the mille-feuille or the chocolate-covered ice cream is obtained.

In FIG. 114, the notch pulse thresholds are controlled to have unequal intervals. In this way, the sensation of cutting the mille-feuille or the chocolate-covered ice cream is obtained.

In FIG. 115, a button with the sensation of pressing is subjected to hysteresis control.

The panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 116, the button with the sensation of pressing is subjected to finger pressure function control. The panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 117, application of a waveform is controlled. The waveform adds oscillation to the panel at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 118, the button with the sensation of pressing is pressed, and a vibration surface (the phase) thereof is three-dimensionally controlled in accordance with the thresholds.

The panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 119, the panel is oscillated at the timing at which the press-down pressure during the increase exceeds the threshold 1 and the timing at which the press-down pressure during the reduction exceeds the threshold 2, and the button with the sensation of pressing is controlled in accordance with a situation. The stiffness of the button is expressed by the values of the thresholds, the oscillation of the panel, and the frequency.

In FIG. 120, the panel is oscillated at the timing at which the press-down pressure during the increase exceeds the threshold 1 and the timing at which the press-down pressure during the reduction exceeds the threshold 2, and the button with the sensation of pressing is controlled in accordance with the situation. The stiffness of the button is expressed by the values of the thresholds, the oscillation of the panel, and the frequency.

In FIG. 121, the button with the sensation of pressing is controlled in accordance with a time pattern. In FIG. 122, the notch pulse thresholds are controlled to have equal intervals.

In FIG. 123, the notch pulse thresholds are controlled to have equal intervals, and a panel oscillation is controlled.

In FIG. 124, the notch pulse thresholds are subjected to the waveform control so as to have equal intervals.

In FIG. 125, the notch pulse thresholds are subjected to masking control so as to have equal intervals.

In FIG. 126, the button with the sensation of pressing is subjected to kinetic and static friction control, and the panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 127, the button with the sensation of pressing is subjected to the phase control, and the panel is oscillated at the timing at which the press-down pressure during the increase exceeds the threshold 1 and the timing at which the press-down pressure during the reduction exceeds the threshold 2. The stiffness of the button is expressed by the values of the thresholds, the oscillation of the panel, and the frequency.

In FIG. 128, equal pressing intervals are controlled, and the panel is oscillated only at the timing at which the press-down pressure during the increase exceeds each of plural thresholds. A high frequency is used for the oscillation of the notch. A notch button is realized in combination with the button.

In FIG. 129, unequal pressing intervals are controlled, and the panel is oscillated only at the timing at which the press-down pressure during the increase exceeds each of the plural thresholds. The high frequency is used for the oscillation of the notch. The notch button is realized in combination with the button.

In FIG. 130, threshold equal intervals are controlled, and the panel is oscillated only at the timing at which the press-down pressure during the increase exceeds each of the plural thresholds. The high frequency is used for the oscillation of the notch. The notch button is realized in combination with the button.

In FIG. 131, a haptic dial is controlled by a control function. The vibration direction is controlled for each position phase. The vibration can be controlled in a three-dimensional direction. In this way, various feels of the dial can be realized. In addition, a realistic feel of the dial is presented on the flat panel without a need of a physical/analog dial mechanism.

In FIG. 132, the pointer is operated on the panel to rotate the dial with a sensation of acceleration. The panel is oscillated in parallel with a tangent of the dial, and the sensation of acceleration is thereby realized. For sliding expression, the dial is controlled to present the sensation of the force in a rotational direction thereof.

In FIG. 133, the pointer is operated on the panel to rotate the dial with the sensation of resistance. The panel is oscillated in a manner to be orthogonal to the tangent of the dial, and the sensation of resistance is thereby realized.

In FIG. 134, the pointer is operated on the panel to rotate the dial with a sensation of horizontal acceleration. The panel is oscillated in the manner to be orthogonal to the tangent of the dial, and the sensation of horizontal acceleration is thereby realized.

In FIG. 135, the pointer is operated on the panel to rotate the dial with a variable feel. The panel is oscillated in the manner to be orthogonal to the tangent of the dial, and the variable feel is thereby realized. In this way, various feels are generated by changing the phase (the vibration surface) at each position.

In FIG. 136, the pointer is operated on the panel to rotate the dial with a random sensation. The panel is oscillated in the manner to be orthogonal to the tangent of the dial, and the random sensation is thereby realized.

In FIG. 137, the clicking vibration is generated in constant position phases to realize the sensation of clicking. In this way, a feel of a loader/encoder, a sensation of a digital dial, and a sensation of a volume knob are realized on the flat panel.

In FIG. 138, a sensation of a circumferential guiding operation of volume on a circumference of the volume knob, a sensation of the finger held in the circumference or moving on the circumference, and a sensation of a circumferential operation that is obtained at a time when an actual rotary volume knob is rotated are each presented as a centripetal tactile force in constant position phases.

In FIG. 139, the sensation of motion can be expressed by presenting the sensation of the circumferential operation of the volume knob, a sensation of circumferential guidance at the time when the actual rotary volume knob is rotated, and the sensation of resistance.

The centripetal tactile force and the resistant tactile force are presented either alternatively or temporally and exclusively in the constant position phases. At the same time, the sensation of the circumferential operation that is obtained at the time when the volume knob is rotated is realized.

In FIG. 140, the haptic volume adjustment and confirmation operations are expressed.

The clicking vibration is presented in the constant position phases. In this way, a sensation of the rotary volume knob is realized by the clicking vibration, and the sensation of pressing of the button is realized by the clicking vibration for confirmation. Thus, sensations of the volume operation, confirmation, and switching are realized on the flat panel.

In FIG. 141, variations of the feels of the tactile force dial are increased. The vibration direction and a vibration method are controlled by each of the position phases. The vibration can be controlled in the three-dimensional direction. Various feels and touches of the dial are realized, so as to differently use presentations of the directions, each of which calls the operators attention. The various feels and touches of the dial are appropriately presented at appropriate positions on the open panel at appropriate timing. The feel and the touch are controlled at the appropriate timing in accordance with the situation.

In FIG. 142, when size and/or the shape of the device is changed, the haptic is nonlinearly changed by weight. Perceived sound pressure and perceived torque intensity are set to be variable. In FIG. 143, the threshold and a quantity of perception of the haptic are changed by the device size. The perceived torque intensity is obtained by subtracting the weight from the torque. The optimum quantity of perception differs by the device size.

In FIG. 144, the texture includes the pressure sensation (a contact sensation); pressure, hotness/coldness, the sensation of touch; micro-time structure, the sensation of the force; macro-time structure, the sensation of the vibration; the frequency. FIG. 145 shows database of a texture structure in which numerous types of the texture are expressed in macro-time and micro-time structures.

In FIG. 146, the waveforms are controlled, so as to control a two-dimensional oscillation direction. An X-axis waveform and a Y-axis waveform are synthesized to generate oscillation on an arbitrary axis of the panel surface.

In FIG. 147, the numerous touch panels are arranged in the array, and the actuator is provided for each of the touch panels. In this way, the position in the vibration direction can be controlled on each of the panels. The sensation of advancing, a sensation of retreating, a sensation of shearing and tearing, a sensation of enlarging and pinching, a sensation of grasping, and the sensation of rotation can be realized. An intuitive mouse operation can be realized in a subtle level.

FIG. 148 shows a system that uses an illusory force inducing function generator to measure a characteristic of an individual.

FIG. 149 is a flowchart that illustrates an actuator control method.

FIG. 150 to FIG. 152 indicates a application example and the effects.

In FIG. 150, profiling of the individual is realized by using the dial and the pointer. An individual ID, a psychological state, a health state, and a degree of fatigue are estimated through an analysis of operation profile and physiological information like graphoanalysis.

In FIG. 151, the numerous touch panels are disposed in the array, and the actuator is provided for each of the touch panels. In this way, the position in the vibration direction can be controlled on each of the panels. The sensation of advancing, the sensation of retreating, the sensation of shearing and tearing, the sensation of enlarging and pinching, the sensation of grasping, and the sensation of rotation can be realized. In this way, palpation training can be realized by providing a state of a human body (solidness, softness, a shape, and the like) such as an organ or the like in addition to the video, a way of moving the fingertips, and a way of applying the force.

In FIG. 152, a remote synthesizing operation can be realized by connecting virtual reality environment generators via communication. Despite a flat panel of a information terminal device or the like, the operation feeling of object such as button, slider, dial, switch, operation panel etc. can be realistically obtained. The tactile force sense presentation device can present a various feelings.

Therefore, the haptic sense presentation device can use stationary, note, pen, home electrical, appliance, signager, kiosk terminal, wall, table, chair, massager, ride, wheel chair, dish, shaker, simulator (surgery, driving, massager, sport, walking, musical instrument, craft, painting, art). An added value such as tactile sensation and feel can be added to products such as sense of plug-in, filling, depth, returned, floal, convergence, reverberation, direction sense, zubusubu, hardness, soft, slippery, stuffed, slimy, rough, bumpy, tiny, here and there, drudgeru, and bibunyuu.

Implementation of the present invention makes it possible to achieve a useful man-machine interface that can be mounted in machines and instruments used in the field of virtual reality, machines and instruments used in the field of game, amusement and entertainment, portable communication devices used in the field of IT, information terminal devices, navigation devices, personal digital assistants, in machines and instruments used in the field of automobile and robot, machines and instruments used in medical and welfare services, machines and instruments used in the field of space technology and so on.

More specifically, in the field of virtual reality or intelligent home appliances, it is possible to provide someone with haptic information such as a haptic sense or texture via a man-machine interface to which the present invention is applied or to present the existence of an object in virtual and real spaces, the impact from a collision or an operational feeling for a device by applying a resisting force or reaction force to limit the movement of someone. When the interface is mounted in a cellular phone, a portable navigation device or the like, various instructions and guidance that were impossible with conventional technology can be provided via the skin of the operator.

Because the interface of the present invention can present various textures, it is applicable to stationery, notebooks, pens, home appliance, advertising displays, signage, kiosk terminals, walls, tables, chairs, massagers, vehicles, robots, wheelchairs, tableware, shakers, simulators (for surgery, driving, massage, sports, walking, musical instruments, crafts, paintings, art) to give added value, such as senses or texture including a sense of insertion, a sense of denting, a sense of depth, a sense of being pushed back, a sense of floating, a sense of convergence, a sense of reverberation, a sense of direction, a sense of sinking, a sense of hardness, a sense of softness, a sense of smoothness, a sense of slipperiness, a sense of greasiness, a sense of sliminess, a sense of sandiness, a sense of unevenness, a sense of prickliness, a sense of stiffness, a sense of solidness or a sense of marshmallowiness, to products.

The invention claimed is:

1. A medium device comprising:
   a medium comprising one or more actual objects and/or one or more virtual objects, wherein a haptic information is presented to the medium using an illusion effect and/or a nonlinear effect; and
   a sensor for detecting at least one of a position, a velocity, an acceleration, a shape, a displacement, a deformation, an oscillation, a rotation, a vibration, a force, a torque, a pressure, a humidity, a temperature, a viscosity, and an elasticity,
   wherein the sensor detects at least one motion of a finger of an operator, a palm of the operator, a hand of the operator, an arm of the operator, a leg of the operator, a head of the operator, and a body of the operator,
   wherein a torque sensation is induced by using that a sensory characteristic representing a relationship between a quantity of a stimulus applied to a human body and sensory quantity is nonlinear and/or a sensory illusion and by using one or more positions of the actual objects and/or one or more positions of the virtual objects,
   wherein the sensory characteristic comprises at least one of quantity of the stimulus that is provided to the operator and the quantity of the stimulus that is generated through an operation by the operator, and sensory quantity that is presented to the operator, and
   wherein the sensory quantity may not exist physically by utilizing the illusion and/or the sensory characteristic.

2. A medium device comprising:
   a haptic presenting device for applying a sensory characteristic and/or a sensory illusion of a member to a medium to present a haptic information to the member and/or the medium;
   a sense synthesizing and guiding device for generating and synthesizing sensation of guidance, wherein the sense synthesizing and guiding device generates by at least one of a vibration, a pressure, a sensation of a force, an illusion, a sensation of touch, and a sensation with respect to one or more objects; and a haptic presentation controller for controlling the haptic presenting device based on a stimulus, wherein the stimulus is controlled by using that a sensory characteristic representing a relationship between a quantity of the stimulus applied to a human body and sensory quantity is nonlinear and/or a sensory illusion and by using one or more positions of the objects.

3. A medium device comprising:
a medium comprising one or more actual objects and/or one or more virtual objects, wherein a haptic information is presented to the medium using an illusion effect and/or a nonlinear effect; and
a sensor for detecting at least one of a position, a velocity, an acceleration, a shape, a displacement, a deformation, an oscillation, a rotation, a vibration, a force, a torque, a pressure, a humidity, a temperature, a viscosity, and an elasticity,
wherein the sensor detects at least one motion of a finger of an operator, a palm of the operator, a hand of the operator, an arm of the operator, a leg of the operator, a head of the operator, and a body of the operator,
wherein a force sensation is induced by using that a sensory characteristic representing a relationship between a quantity of a stimulus applied to a human body and sensory quantity is nonlinear and/or a sensory illusion and by using one or more positions of the actual objects and/or one or more positions of the virtual objects,
wherein the force sensation induced by using that a sensory characteristic representing a relationship between a quantity of the stimulus applied to a human body and sensory quantity is nonlinear and/or a sensory illusion is obtained by the stimulus,
wherein the sensory characteristic comprises at least one of quantity of the stimulus that is provided to the operator and the quantity of the stimulus that is generated through an operation by the operator, and sensory quantity that is presented to the operator, and
wherein the sensory quantity may not exist physically by utilizing the illusion and/or the sensory characteristic.

4. A medium device comprising:
a medium comprising one or more actual objects and/or one or more virtual objects, wherein a haptic information is presented to the medium using an illusion effect and/or a nonlinear effect; and
a sensor for detecting at least one of a position, a velocity, an acceleration, a shape, a displacement, a deformation, an oscillation, a rotation, a vibration, a force, a torque, a pressure, a humidity, a temperature, a viscosity, and an elasticity,
wherein the sensor detects at least one motion of a finger of an operator, a palm of the operator, a hand of the operator, an arm of the operator, a leg of the operator, a head of the operator, and a body of the operator,
wherein a sensory illusion is induced by using that a sensory characteristic representing a relationship between a quantity of a stimulus applied to a human body and sensory quantity is nonlinear and/or a sensory illusion and by using one or more positions of the actual objects and/or one or more positions of the virtual objects,
wherein the sensory characteristic comprises at least one of quantity of the stimulus that is provided to the operator and the quantity of the stimulus that is generated through an operation by the operator, and sensory quantity that is presented to the operator, and
wherein the sensory quantity may not exist physically by utilizing the illusion and/or the sensory characteristic.

5. The medium device according to claim 1, wherein the sensor detects at least one motion of a finger of an operator, a palm of the operator, a hand of the operator, an arm of the operator, a leg of the operator, a head of the operator, and a body of the operator placed on at least one of a surface of the medium, and over a surface of the medium, and in a space around a surface of the medium, and around a surface of the medium.

6. The medium device according to claim 1, wherein the torque sensation induced by using that a sensory characteristic representing a relationship between a quantity of the stimulus applied to a human body and sensory quantity is nonlinear and/or a sensory illusion and by using one or more positions of the actual objects and/or one or more positions of the virtual objects is obtained by the stimulus.

* * * * *